(12) United States Patent
Kabashima et al.

(10) Patent No.: US 7,807,738 B2
(45) Date of Patent: Oct. 5, 2010

(54) COMPOUND FOR COLOR-PRODUCING COMPOSITION, AND RECORDING MATERIAL

(75) Inventors: Kazuo Kabashima, Yokohama (JP); Hiroshi Kobayashi, Yokohama (JP); Tetsurou Iwaya, Kawasaki (JP)

(73) Assignee: Chemipro Kasei Kaisha, Ltd., Kobe-shi (JP)

( * ) Notice: Subject to any disclaimer, the term of this patent is extended or adjusted under 35 U.S.C. 154(b) by 0 days.

(21) Appl. No.: 12/603,272

(22) Filed: Oct. 21, 2009

(65) Prior Publication Data

US 2010/0105941 A1 Apr. 29, 2010

Related U.S. Application Data

(60) Division of application No. 09/796,471, filed on Mar. 2, 2001, now Pat. No. 7,635,662, which is a continuation-in-part of application No. PCT/JP99/04776, filed on Sep. 3, 1999.

(30) Foreign Application Priority Data

| Sep. 4, 1998 | (JP) | ................................. 10-250671 |
| Apr. 27, 1999 | (JP) | ................................. 11-120683 |
| Mar. 2, 2000 | (JP) | ................................. 2000-057538 |
| Mar. 2, 2000 | (JP) | ................................. 2000-057693 |
| Mar. 3, 2000 | (JP) | ................................. 2000-058249 |
| Mar. 3, 2000 | (JP) | ................................. 2000-058279 |
| Mar. 3, 2000 | (JP) | ................................. 2000-058468 |
| Mar. 3, 2000 | (JP) | ................................. 2000-058594 |
| Mar. 3, 2000 | (JP) | ................................. 2000-058770 |
| Mar. 3, 2000 | (JP) | ................................. 2000-058823 |
| Mar. 3, 2000 | (JP) | ................................. 2000-058861 |
| Mar. 3, 2000 | (JP) | ................................. 2000-058891 |
| Mar. 3, 2000 | (JP) | ................................. 2000-059047 |
| Mar. 3, 2000 | (JP) | ................................. 2000-059216 |
| Mar. 3, 2000 | (JP) | ................................. 2000-059298 |
| May 31, 2000 | (JP) | ................................. 2000-162679 |
| Sep. 4, 2000 | (JP) | ................................. 2000-267302 |
| Sep. 4, 2000 | (JP) | ................................. 2000-267467 |

(51) Int. Cl.
*C08K 5/205* (2006.01)
*C07C 271/00* (2006.01)

(52) U.S. Cl. .................. 524/212; 560/157; 560/158; 560/163; 560/165

(58) Field of Classification Search ................ 560/157, 560/158, 163, 165; 524/212
See application file for complete search history.

(56) References Cited

U.S. PATENT DOCUMENTS 3,539,375 A 11/1970 Baum
4,203,883 A 5/1980 Hangauer, Jr.

(Continued)

FOREIGN PATENT DOCUMENTS

EP 0 138 769 A2 4/1985

(Continued)

*Primary Examiner*—Taylor Victor Oh
(74) *Attorney, Agent, or Firm*—Birch, Stewart, Kolasch & Birch, LLP

(57) ABSTRACT

A urea-urethane compound having one or more urea groups and one or more urethane groups in the molecular structure, the number of said urea groups (A) and the number of said urethane groups (B) satisfying the following numerical formula:

$$10 \geq (A+B) \geq 3$$

wherein each of A and B is an integer of 1 or more.

1 Claim, 2 Drawing Sheets

U.S. PATENT DOCUMENTS

| | | | |
|---|---|---|---|
| 4,314,924 A | 2/1982 | Haubennestel et al. | |
| 4,384,102 A | 5/1983 | Rasshofer et al. | |
| 4,388,238 A | 6/1983 | Heitkamper et al. | |
| 4,520,377 A | 5/1985 | Iwakura et al. | |
| 4,521,793 A | 6/1985 | Kabashima et al. | |
| 4,550,329 A | 10/1985 | Gonda et al. | |
| 5,055,567 A | 10/1991 | Liechti et al. | |
| 5,441,743 A | 8/1995 | McGinniss et al. | |
| 5,780,483 A | 7/1998 | Widdowson et al. | |
| 5,854,183 A | 12/1998 | Hasegawa et al. | |

FOREIGN PATENT DOCUMENTS

| | | |
|---|---|---|
| EP | 0 160 402 A2 | 11/1985 |
| EP | 0 535 887 A1 | 4/1993 |
| EP | 0 633 145 A1 | 1/1995 |
| EP | 0 709 225 A1 | 5/1996 |
| EP | 0 769 391 A1 | 4/1997 |
| EP | 0 832 757 A1 | 4/1998 |
| JP | 45-2594 | 1/1970 |
| JP | 59-30919 A | 2/1984 |
| JP | 59-115887 A | 7/1984 |
| JP | 59-174838 A | 10/1984 |
| JP | 60-104055 A | 6/1985 |
| JP | 61-35444 A | 2/1986 |
| JP | 2-141288 A | 5/1990 |
| JP | 4-69278 A | 3/1992 |
| JP | 5-68873 A | 3/1993 |
| JP | 5-116459 A | 5/1993 |
| JP | 8-002111 A | 1/1996 |
| JP | 8-002112 A | 1/1996 |
| JP | 8-311357 A | 11/1996 |
| JP | 10-310633 A | 11/1998 |
| WO | WO-90/06975 A1 | 6/1990 |
| WO | WO-92/20747 A1 | 11/1992 |
| WO | WO-98/03518 A2 | 1/1998 |
| WO | WO-99/51692 A1 | 10/1999 |
| WO | WO-00/14058 A1 | 3/2000 |

COMPOUND FOR COLOR-PRODUCING COMPOSITION, AND RECORDING MATERIAL

CROSS-REFERENCE TO RELATED APPLICATION

This application is a divisional of allowed application Ser. No. 09/796,471 filed Mar. 2, 2001 now U.S. Pat. No. 7,635,662, which is a continuation-in-part of PCT/JP99/04776 filed Sep. 3, 1999, the content of which is herein incorporated by reference.

BACKGROUND OF THE INVENTION

1. Field of the Invention

The present invention relates to a novel urea-urethane compound. The present invention relates also to a novel color-producing composition obtained by using the urea-urethane compound, and a recording material obtained by using the color-producing composition.

The color-producing composition of the present invention is useful as a color-producing composition for recording materials used by means of recording energy such as heat, pressure or the like, and the present invention relates to, in particular, a color-producing composition capable of giving an improved storage stability to an uncolored portion (an original recording material surface) and a developed color image, and a recording material, in particular, a heat-sensitive recording material, which is obtained by using the color-producing composition.

2. Description of the Related Art

Various chemical color-producing systems used by means of recording energy such as heat, pressure or the like have been known. Of these systems, color-producing systems usually composed of a two-component color-producing system consisting of a colorless or light-colored dye precursor and a developer capable of causing color development on contact with the dye precursor have been known since early times and are commonly utilized in recording materials. There are, for example, pressure-sensitive recording materials used by means of pressure energy, heat-sensitive recording materials used by means of heat energy, and light-sensitive recording materials used by means of light energy.

Pressure-sensitive recording materials used by means of pressure energy have been very generally used as if they were plane paper. In general, the pressure-sensitive recording material is obtained by dissolving a dye precursor in a suitable solvent, emulsifying the resulting solution to several microns, and making the emulsion into microcapsules. Upper paper obtained by coating a substrate with the microcapsules and under paper obtained by coating another substrate with a developer layer containing a developer are placed one upon the other so that the microcapsule-coated surface and the developer-coated surface may face each other. When a pressure is applied to the resulting assembly by writing, striking or the like, the microcapsules are destroyed to release the contents including the dye precursor. The dye precursor transfers to the developer layer to come into contact with the developer, so that color development reaction occurs, resulting in recording of an image.

In recent years, a heat-sensitive recording method comprising recording by means of heat energy has been often adopted in various information machines such as facsimiles, printers, recorders and the like. A heat-sensitive recording material used in the heat-sensitive recording method has many excellent characteristics such as a high whiteness, appearance and feel which are similar to those of plane paper, and excellent aptitudes for recording, for example, a high color development sensitivity. The heat-sensitive recording method is advantageous, for example, in that an apparatus used in the method is small, requires no maintenance and produces no noise. Therefore, the range of use of the heat-sensitive recording method have been increased in various fields of, for instance, recorders for measurement, facsimiles, printers, terminals of computer, labels, and automatic vending machines for railroad tickets or the like.

In the heat-sensitive recording method, a recording material obtained by forming on a substrate a color-producing layer containing a two-component color-producing composition is mainly used, and the components of the heat-sensitive composition are brought into contact with each other by treating the recording material with heat supplied as recording energy from a thermal head, a hot stamp, laser beams or the like. Many of compositions used as the color-producing composition are those obtained by using a colorless or light-colored, electron-donating dye precursor (in particular, a leuco dye) and an acidic developer such as a phenolic compound. An example of recording material obtained by using a leuco dye is thermal paper obtained by using a combination of Crystal Violet lactone and 4,4'-isopropylidenediphenol (bisphenol A) as a heat-sensitive color-producing composition (see U.S. Pat. No. 3,539,375, etc.).

As the dye precursor and developer used in each of the recording methods described above, an electron-donating compound and an electron-accepting compound, respectively, are mainly used. This is because the electron-donating compound and the electron-accepting compound have, for example, the following excellent characteristics: the dye precursor as electron-donating compound and the developer as electron-accepting compound come into contact with each other to give a developed color image with a high density in a moment; and a nearly white appearance can be obtained and various hues such as red, orange, yellow, green, blue, black, etc. can be obtained. However, the developed color image obtained is so poor in chemical resistance that the record disappears easily on contact with a plasticizer contained in a plastic sheet or an eraser, or a chemical contained in food or cosmetics, and the developed color image is so poor in record storage stability that the record fades or, what is worse, disappears when exposed to sunlight for a relatively short period of time. Therefore, color-producing compositions comprising the dye precursor and the developer are limited in their use to a considerable extent, and their improvement is eagerly desired.

In recent years, phenolic compounds represented by bisphenol A are considered unsuitable for use because they are likely to be endocrine disrupters, and hence a non-phenolic developer is requested.

For fulfilling such a request, for example, JP-A-59-115,887 and U.S. Pat. No. 4,521,793 disclose recording materials comprising a combination of color-producing compositions comprising an aromatic isocyanate and an imino compound, as recording materials having a high shelf stability. These references disclose various recording materials in which the two color-producing compositions are brought into contact with each other to be reacted, by application of recording energy such as heat, pressured, light or the like. The references describe the fact that various colors such as red, orange, yellow, light brown, dark brown, etc. can be developed by properly selecting the color-producing compositions. However, in the inventions disclosed in the references, the development of a black color is not yet sufficient which is eagerly desired in the case of recording materials commonly used at present.

JP-A-8-2,111 and JP-A-8-2,112 disclose heat-sensitive recording materials having a color-producing layer containing a colorless or light-colored dye precursor and a urea compound, as heat-sensitive recording materials obtained by using a non-phenolic developer. These recording materials, however, give a low coloring density and have an insufficient shelf stability.

JP-A-5-116,459 discloses a heat-sensitive recording material having a heat-sensitive color-producing layer containing a colorless or light-colored dye precursor and a sulfonylurea compound. This recording material, however, gives a low whiteness and has an insufficient shelf stability.

SUMMARY OF THE INVENTION

The present invention is intended to provide a novel urea-urethane compound or urea-urethane composition that exhibits excellent performance characteristics when used as developer in a color-producing composition.

The present invention is also intended to provide a novel color-producing composition excellent in image preservability and coloring density, and a recording material, in particular, a heat-sensitive recording material, which is obtained by the use of the color-producing composition, by using any of various urea-urethane compounds or urea-urethane compositions.

In addition, the present invention relates to a novel color-producing composition possessing further improved performance characteristics by virtue of the addition of various additives to a urea-urethane compound or a urea-urethane composition and a dye precursor, and a recording material obtained by using said color-producing composition.

The present inventors earnestly investigated the synthesis of various compounds for color-producing composition and consequently found that specific compounds exhibit surprisingly excellent performance characteristics, whereby the present invention has been accomplished. Furthermore, the present inventors found that specific compounds exhibit surprisingly excellent performance characteristics in combination with a dye precursor, whereby the present invention has been accomplished.

That is, the present invention is as follows.

A first aspect of the invention is directed to a urea-urethane compound having one or more urea groups and one or more urethane groups in the molecular structure, the number of said urea groups (A) and the number of said urethane groups (B) satisfying the following numerical formula:

$$10 \geq (A+B) \geq 3$$

wherein each of A and B is an integer of 1 or more.

A second aspect of the invention is directed to a urea-urethane compound represented by any of the following formulas (I) to (VI):

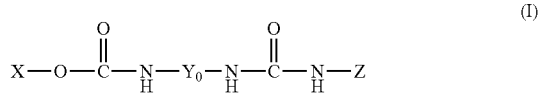

wherein X and Z are independently an aromatic compound residue, a heterocyclic compound residue or an aliphatic compound residue, each of the residues being able to have one or more substituents, and $Y_0$ is a group selected from the group consisting of tolylene group, xylylene group, naphthylene group, hexamethylene group and -φ-$CH_2$-φ- group wherein -φ- is a phenylene group;

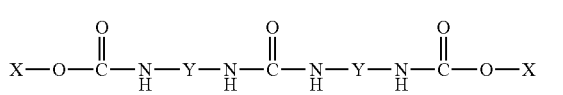

wherein X and Y are independently an aromatic compound residue, a heterocyclic compound residue or an aliphatic compound residue, each of the residues being able to have one or more substituents;

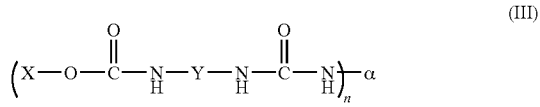

wherein X and Y are independently an aromatic compound residue, a heterocyclic compound residue or an aliphatic compound residue, a is a residue having a valence of 2 or more, and n is an integer of 2 or more, each of the residues being able to have one or more substituents;

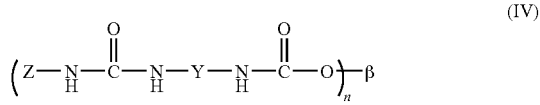

wherein Z and Y are independently an aromatic compound residue, a heterocyclic compound residue or an aliphatic compound residue, β is a residue having a valence of 2 or more, and n is an integer of 2 or more, each of the residues being able to have one or more substituents;

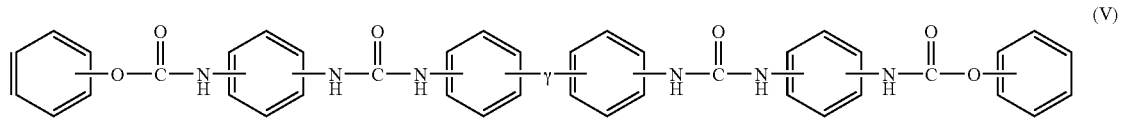

wherein at least one hydrogen atom of each benzene ring may be replaced by a substituent group, which is preferably an aromatic compound residue, an aliphatic compound residue or a heterocyclic compound residue or which may be a nitro group, a hydroxyl group, a carboxyl group, a nitroso group, a nitrile group, a carbamoyl group, a ureido group, an isocyanate group, a mercapto group, a sulfo group, a sulfamoyl group or a halogen atom, each of the residues may have one or more substituents, γ is a group selected from the group consisting of —$SO_2$—, —O—, —$(S)_n$—, —$(CH_2)_n$—, —CO—, —CONH— and any of groups represented by the formulas (a);

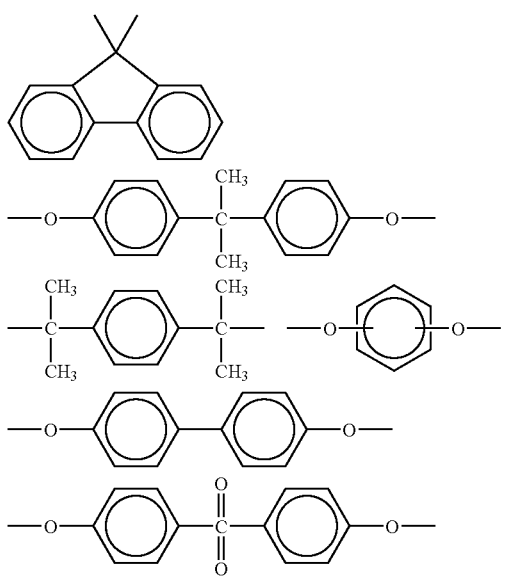

or is absent, and n is 1 or 2; and

A third aspect of the invention is directed to a urea-urethane compound characterized in that it is represented by the following formula (c) and has a molecular weight of 5,000 or less:

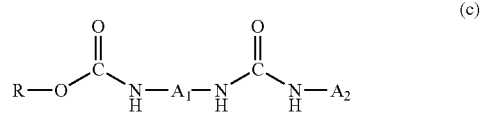

wherein R is an aliphatic compound residue, $A_1$ and $A_2$ are independently an aromatic compound residue, the nitrogen atoms of the urea group are directly bonded to the carbon atoms, respectively, of the aromatic rings of $A_1$ and $A_2$, and R, $A_1$ and $A_2$ may have one or more substituents.

A fourth aspect of the invention is directed to a urea-urethane compound characterized by being represented by the following formula (d):

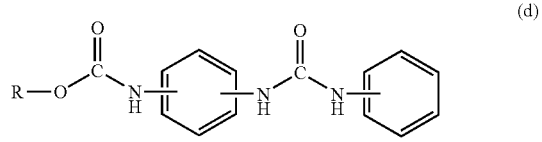

wherein R is an aliphatic compound residue, at least one hydrogen atom of each benzene ring may be replaced by an aromatic compound residue, an aliphatic compound residue, a heterocyclic compound residue, a hydroxyl group, a nitro group, a nitrile group, a carbamoyl group, a sulfamoyl group, a carboxyl group, a nitroso group, an amino group, an oxyamino group, a nitroamino group, a hydrazino group, a ureido group, an isocyanate group, a mercapto group, a sulfo group or a halogen atom, and R may have one or more substituents.

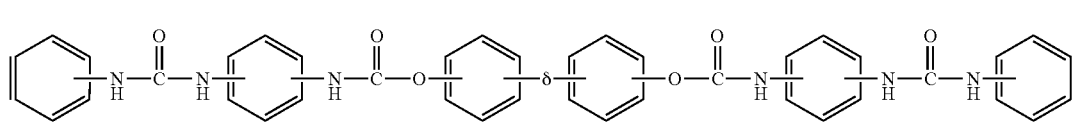

wherein at least one hydrogen atom of each benzene ring may be replaced by a substituent group, which is preferably an aromatic compound residue, an aliphatic compound residue or a heterocyclic compound residue or which may be a hydroxyl group, a nitro group, a nitrile group, a carbamoyl group, a sulfamoyl group, a carboxyl group, a nitroso group, an amino group, an oxyamino group, a nitroamino group, a hydrazino group, a ureido group, an isocyanate group, a mercapto group, a sulfo group or a halogen atom, each of the residues may have one or more substituents, δ is a group selected from the group consisting of —$SO_2$—, —O—, —$(S)_n$—, —$(CH)_n$—, —CO—, —CONH—, —NH—, —CH($COOR_1$)—, —$C(CF_3)_n$— and —$CR_2R_3$— or is absent, each of $R_1$, $R_2$ and $R_3$ is an alkyl group, and n is 1 or 2.

A fifth aspect of the invention is directed to a urea-urethane compound characterized in that it is represented by the following formula (e) or (f), has at least one urethane group and at least one urea group in a total number of not more than 10 and not less than 3, and has a molecular weight of 5,000 or less:

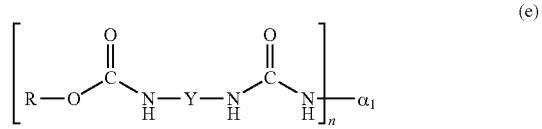

wherein R is an aliphatic compound residue, Y is an aromatic compound residue, a heterocyclic compound residue or an aliphatic compound residue, $\alpha_1$ is an aromatic compound residue, heterocyclic compound residue or aliphatic compound residue which is different from Y and has a valence of 2 or more, n is an integer of 2 or more, and each of the residues may have one or more substituents; or

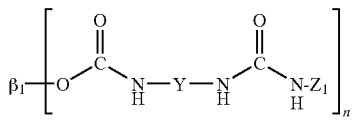
(f)

wherein $Z_1$ and Y are independently an aromatic compound residue or a heterocyclic compound residue, $\beta_1$ is an aliphatic compound residue having a valence of 2 or more, n is an integer of 2 or more, and each of the residues may have one or more substituents.

A sixth aspect of the invention is directed to a urea-urethane compound characterized by being represented by the following formula (g) or (h):

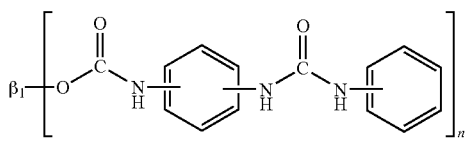
(g)

wherein at least one hydrogen atom of each benzene ring may be replaced by an aromatic compound residue, an aliphatic compound residue, a heterocyclic compound residue, a hydroxyl group, a nitro group, a nitrile group, a carbamoyl group, a sulfamoyl group, a carboxyl group, a nitroso group, an amino group, an oxyamino group, a nitroamino group, a hydrazino group, a ureido group, an isocyanate group, a mercapto group, a sulfo group or a halogen atom, $\beta_1$ is an aliphatic compound residue having a valence of 2 or more, n is an integer of 2 or more, and each of the residues may have one or more substituents; or

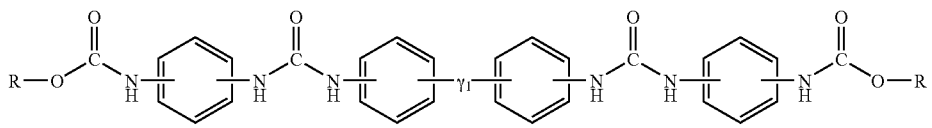
(h)

wherein Rs are independently an aliphatic compound residue, at least one hydrogen atom of each benzene ring may be replaced by an aromatic compound residue, an aliphatic compound residue or a heterocyclic compound residue, each of the residues may have one or more substituents, $\gamma_1$ is a group selected from the group consisting of —$SO_2$—, —O—, —(S)$_n$—, —(CH$_2$)$_n$—, —CO—, —CONH—, —NH—, —CH(COOR$_1$)—, —C(CF$_3$)$_2$—, —CR$_2$R$_3$— and any of groups represented by the formulas (a);

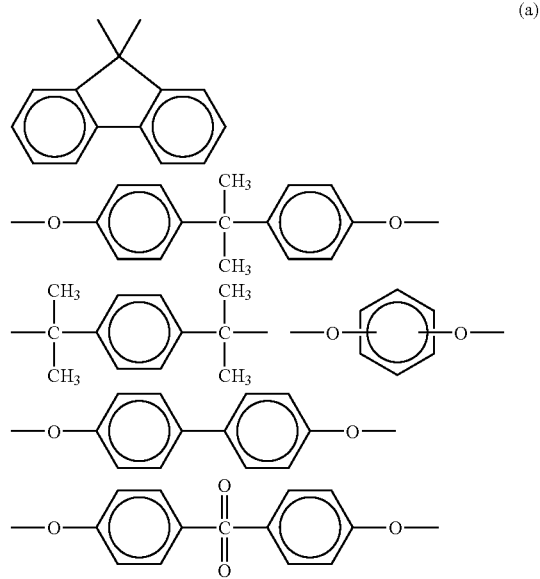
(a)

or is absent, each of $R_1$, $R_2$ and $R_3$ is an alkyl group, and n is 1 or 2.

Another aspect of the invention is directed to a urea-urethane composition comprising a urea-urethane compound having at least one urea group and at least one urethane group in a total number of 2 to 10 in the molecular structure and having a molecular weight of 5,000 or less and 0.0001 to 50 wt % of a diluent based on the total of the urea-urethane compound and the diluent.

Yet another aspect of the invention is directed to a urea-urethane composition according to the above another aspect of the invention, wherein the diluent is a urea compound and/or a urethane compound.

Still yet another aspect of the invention is directed to a urea-urethane composition according to the above another aspect of the invention, wherein the diluent is a compound obtained by reacting a polyisocyanate compound with a hydroxy compound or an amino compound.

A seventh aspect of the invention is directed to a urea-urethane composition obtained by reacting a polyisocyanate compound with a hydroxy compound and an amino compound, which is characterized by comprising 50 wt % or more of a urea-urethane compound having at least one urea group and at least one urethane group in a total number of 2 to 10 in the molecular structure and having a molecular weight of 5,000 or less.

An eighth aspect of the invention is directed to a urea-urethane composition according to the seventh aspect of the invention, wherein the hydroxy compound is a phenol compound.

A ninth aspect of the invention is directed to a urea-urethane composition according to the seventh aspect of the invention, wherein the hydroxy compound is an alcohol compound.

A tenth aspect of the invention is directed to a urea-urethane composition according to any one of the seventh to ninth aspects of the invention, wherein the amino compound is an aromatic amino compound.

An eleventh aspect of the invention is directed to a urea-urethane composition according to any one of the seventh to tenth aspects of the invention, wherein the polyisocyanate compound is an aromatic polyisocyanate compound.

A twelfth aspect of the invention is directed to a process for producing a urea-urethane composition which is characterized by reacting a polyisocyanate compound with a hydroxy compound so that the ratio of the number of moles of the polyisocyanate compound to the number of hydroxyl equivalents of the hydroxy compound may be 100/1 to 1/2, to form one or more urethane groups from some of the isocyanate groups of the polyisocyanate compound, and then adding an amino compound thereto to react the same with the remaining isocyanate groups of the polyisocyanate compound to form one or more urea groups.

A thirteenth aspect of the invention is directed to a process for producing a urea-urethane composition which is characterized by reacting a polyisocyanate compound with an amino compound so that the ratio of the number of moles of the polyisocyanate compound to the number of amino equivalents of the amino compound may be 100/1 to 1/2, to form one or more urea groups from some of the isocyanate groups of the polyisocyanate compound, and then adding a hydroxy compound thereto to react the same with the remaining isocyanate groups of the polyisocyanate compound to form one or more urethane groups.

A fourteenth aspect of the invention is directed to a process for producing a urea-urethane composition according to the twelfth or thirteenth aspect of the invention, which is characterized by successively carrying out the reaction for forming one or more urethane groups and the reaction for forming one or more urea groups.

A fifteenth aspect of the invention is directed to a process for producing a urea-urethane composition which comprises reacting an amino compound with a polyisocyanate adduct obtained by the reaction of a polyisocyanate compound with a hydroxy compound, so that the equivalent ratio of isocyanate group to amino group may be 2/1 to 1/100, to form one or more urea groups, and then removing the unreacted amino compound.

A sixteenth aspect of the invention is directed to a process for producing a urea-urethane composition which comprises reacting a hydroxy compound with a polyisocyanate adduct obtained by the reaction of a polyisocyanate compound with an amino compound, so that the equivalent ratio of isocyanate group to hydroxyl group may be 2/1 to 1/100, to form one or more urethane groups, and then removing the unreacted hydroxy compound.

A seventeenth aspect of the invention is directed to a process for producing a urea-urethane composition according to any one of the twelfth to sixteenth aspects of the invention, which is characterized by carrying out the reaction for forming one or more urethane groups and/or the reaction for forming one or more urea groups, without a solvent, or carrying out the reaction for forming one or more urethane groups and the reaction for forming one or more urea groups, by the use of the same solvent.

An eighteenth aspect of the invention is directed to a process for producing a urea-urethane composition according to any one of the twelfth to seventeenth aspects of the invention, wherein the reaction for forming one or more urethane groups and/or the reaction for forming one or more urea groups are carried out at a temperature of 0-300° C.

A nineteenth aspect of the invention is directed to a process for producing a urea-urethane composition according to any one of the twelfth to eighteenth aspects of the invention, wherein the reaction for forming one or more urethane groups and/or the reaction for forming one or more urea groups are carried out in the presence of a catalyst.

A twentieth aspect of the invention is directed to a color-producing composition comprising a developer comprising a urea-urethane compound, and a colorless or light-colored dye precursor.

A twenty-first aspect of the invention is directed to a color-producing composition according to the twentieth aspect of the invention, wherein said developer is a urea-urethane compound according to the first aspect of the invention.

A twenty-second aspect of the invention is directed to a color-producing composition according to the twentieth aspect of the invention, wherein said developer is a urea-urethane compound according to the second aspect of the invention or a urea-urethane compound represented by the following formula (VII):

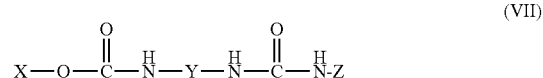

$$(VII)$$

wherein X, Y and Z are independently an aromatic compound residue, a heterocyclic compound residue or an aliphatic compound residue, each of the residues being able to have one or more substituents, and each of X, Y and Z being preferably an aromatic compound residue or a heterocyclic compound residue.

A twenty-third aspect of the invention is directed to a color-producing composition according to the twentieth aspect of the invention, wherein said developer is a urea-urethane compound according to any one of the third to sixth aspects of the invention or a urea-urethane composition according to any one of the seventh to eleventh aspects of the invention.

A twenty-fourth aspect of the invention is directed to a color-producing composition according to any one of the twentieth to twenty-third aspects of the invention, wherein the colorless or light-colored dye precursor is a leuco dye.

A twenty-fifth aspect of the invention is directed to a color-producing composition according to the twenty-fourth aspect of the invention, which is characterized in that the leuco dye is at least one leuco dye selected from triarylmethane type leuco dyes, fluoran type leuco dyes, fluorene type leuco dyes and diphenylmethane type leuco dyes.

A twenty-sixth aspect of the invention is directed to a color-producing composition according to the twenty-fourth aspect of the invention, which is characterized in that the leuco dye is a compound represented by the following formula (I):

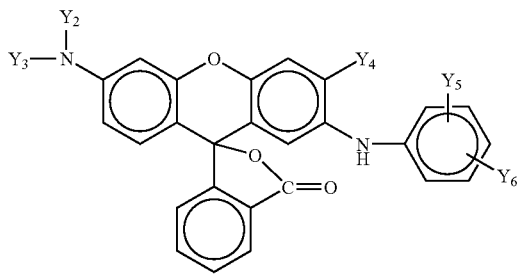

wherein both $Y_2$ and $Y_3$ are alkyl groups or alkoxyalkyl groups, $Y_4$ is a hydrogen atom, an alkyl group or an alkoxy group, and each of $Y_5$ and $Y_6$ is a hydrogen atom, a halogen atom, an alkyl group or an alkoxy group.

A twenty-seventh aspect of the invention is directed to a color-producing composition according to the twenty-fourth aspect of the invention, which is characterized in that the leuco dye is a compound represented by the following formula (j):

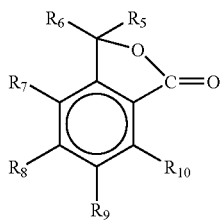

wherein each of $R_5$ and $R_6$ is a group represented by the formula (k) or the formula (l):

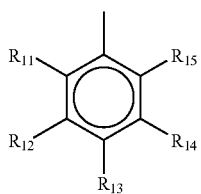

(wherein each of $R_{11}$ through $R_{15}$ is a hydrogen atom, a halogen atom, an alkyl group of 1 to 8 carbon atoms, an alkoxy group of 1 to 8 carbon atoms, or —$NR_{16}R_{17}$ wherein each of $R_{16}$ and $R_{17}$ is an alkyl group of 1 to 8 carbon atoms), or

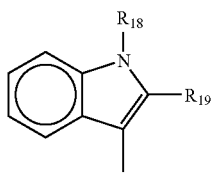

(wherein each of $R_{18}$ and $R_{19}$ is a hydrogen atom, an alkyl group of 1 to 8 carbon atoms, or a phenyl group), and each of $R_7$ through $R_{10}$ is a hydrogen atom, a halogen atom, an alkyl group of 1 to 8 carbon atoms, an alkoxy group of 1 to 8 carbon atoms, or —$NR_{20}R_{21}$ wherein each of $R_{20}$ and $R_{21}$ is an alkyl group of 1 to 8 carbon atoms.

A twenty-eighth aspect of the invention is directed to a color-producing composition according to any one of the twentieth to twenty-seventh aspects of the invention, which is characterized in that the melting point of the urea-urethane compound developer is not higher than 500° C. and not lower than 40° C.

A twenty-ninth aspect of the invention is directed to a color-producing composition according to any one of the twentieth to twenty-eighth aspects of the invention, which further comprises a heat-meltable material.

A thirtieth aspect of the invention is directed to a color-producing composition according to the twenty-ninth aspect of the invention, which is characterized in that the heat-meltable material is at least one material selected from β-naphthylbenzyl ether, p-benzylbiphenyl, 1,2-di(m-methylphenoxy)ethane, di-p-methylbenzyl oxalate, 1,2-diphenoxymethylbenzene, m-terphenyl and stearamide.

A thirty-first aspect of the invention is directed to a color-producing composition according to the twenty-ninth aspect of the invention, wherein the heat-meltable material is that represented by the following structural formula (XVIII):

(XVIII)

wherein Y is any of —$SO_2$—, —$(S)_n$—, —O—, —CO—, —$CH_2$—, —$CH(C_6H_5)$—, —$C(CH_3)_n$—, —COCO—, —$CO_3$—, —$COCH_2CO$—, —$COOCH_2$—, —CONH—, —$OCH_2$— and —NH—, n is 1 or 2, and at least one hydrogen atom of each benzene ring may be replaced by a halogen atom, a hydroxyl group, a nitro group, a nitroso group, a nitrile group, an isocyanate group, an isothiocyanate group, a mercapto group, a sulfamoyl group, a sulfonic acid group, an amino group, an aromatic compound residue, an aliphatic compound residue or a heterocyclic compound residue.

A thirty-second aspect of the invention is directed to a color-producing composition according to the thirty-first aspect of the invention, wherein the heat-meltable material is that represented by the following structural formula (XIX):

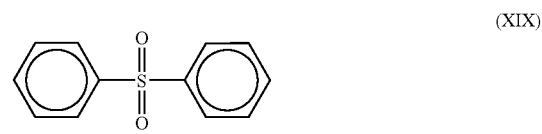

(XIX)

wherein at least one hydrogen atom of each benzene ring may be replaced by a halogen atom, a hydroxyl group, a nitro group, a nitroso group, a nitrile group, an isocyanate group, an isothiocyanate group, a mercapto group, a sulfamoyl group, a sulfonic acid group, an amino group, an aromatic compound residue, an aliphatic compound residue or a heterocyclic compound residue.

A thirty-third aspect of the invention is directed to a color-producing composition according to any one of the twentieth to thirtieth aspects of the invention, which further comprises an isocyanate compound.

A thirty-fourth aspect of the invention is directed to a color-producing composition according to any one of the twentieth to thirtieth aspects of the invention, which further comprises an isocyanate compound and an imino compound.

A thirty-fifth aspect of the invention is directed to a color-producing composition according to any one of the twentieth to thirty-second aspects of the invention, which further comprises an amino compound.

A thirty-sixth aspect of the invention is directed to a color-producing composition according to any one of the twentieth to thirty-fifth aspects of the invention, wherein the developer further comprises an acidic developer.

A thirty-seventh aspect of the invention is directed to a color-producing composition according to the thirty-sixth aspect of the invention, which is characterized in that the acidic developer is at least one developer selected from 2,2-bis(4-hydroxyphenyl)-propane, 4-isopropyloxyphenyl-4'-hydroxyphenylsulfone, bis(3-ally-4-hydroxyphenyl)sulfone, 2,4'-dihydroxydiphenylsulfone and 4,4'-[oxybis(ethyleneoxy-p-phenylenesulfonyl)]diphenol.

A thirty-eighth aspect of the invention is directed to a color-producing composition according to any one of the twentieth to thirty-seventh aspects of the invention, which further comprises a fluorescent dye.

A thirty-ninth aspect of the invention is directed to a color-producing composition according to any one of the twentieth to thirty-eighth aspects of the invention, which further comprises a preservability-imparting agent.

A fortieth aspect of the invention is directed to a recording material comprising a substrate and a color-producing layer formed thereon, said color-producing layer comprising a urea-urethane compound according to any one of the first and second aspects of the invention or the third to sixth aspects of the invention, or a urea-urethane composition according to any one of the seventh to eleventh aspects of the invention, or comprising a color-producing composition according to any one of the twentieth to thirty-ninth aspects of the invention.

A forty-first aspect of the invention is directed to a recording material according to the fortieth aspect of the invention, which is characterized in that a protective layer for the color-producing layer is formed on the color-producing layer.

A forty-second aspect of the invention is directed to a recording material according to the forty-first aspect of the invention, which is characterized in that the protective layer comprises a water-soluble polymer.

A forty-third aspect of the invention is directed to a recording material according to either of the forty-first and forty-second aspects of the invention, which is characterized in that the protective layer comprises an inorganic pigment and/or an organic pigment.

A forty-fourth aspect of the invention is directed to a recording material according to any one of the forty-first and forty-third aspects of the invention, which is characterized in that the protective layer comprises a lubricant.

A forty-fifth aspect of the invention is directed to a recording material according to the fortieth aspect of the invention, which is characterized in that an intermediate layer is formed on the substrate and that the color-producing layer is formed on said intermediate layer.

A forty-sixth aspect of the invention is directed to a recording material according to the forty-fifth aspect of the invention, which is characterized in that the intermediate layer comprises a water-soluble polymer.

A forty-seventh aspect of the invention is directed to a recording material according to either of the forty-sixth and forty-seventh aspects of the invention, which is characterized in that the intermediate layer comprises an inorganic pigment and/or an organic pigment.

A forty-eighth aspect of the invention is directed to a recording material according to the fortieth aspect of the invention, which is characterized in that a back coating layer is formed on the substrate on the side reverse to the side having the color-producing layer formed thereon.

A forty-ninth aspect of the invention is directed to a recording material according to the forty-eighth aspect of the invention, which is characterized in that the back coating layer comprises a water-soluble polymer.

A fiftieth aspect of the invention is directed to a recording material according to either of the forty-eighth and forty-ninth aspects of the invention, which is characterized in that the back coating layer comprises an inorganic pigment and/or an organic pigment.

A fifty-first aspect of the invention is directed to a recording material according to any one of the fortieth to fiftieth aspects of the invention, which is characterized by using at least one material selected from water-soluble polymers and anionic surfactants, as a dispersing agent for the urea-urethane compound.

A fifty-second aspect of the invention is directed to a recording material according to any one of the fortieth to fiftieth aspects of the invention, which is characterized by using at least one material selected from poly(vinyl alcohol)s, modified poly(vinyl alcohol)s, methyl cellulose, hydroxypropylmethyl cellulose, sodium condensed naphthalenesulfonate, polycarboxylic acid ammonium salts, water-soluble low-molecular weight copolymers, and sodium 2-ethylhexyl-sulfosuccinate, as a dispersing agent for the urea-urethane compound.

A fifty-third aspect of the invention is directed to a recording material according to any one of the fortieth to fifty-second aspects of the invention, which is characterized by using at least one material selected from water-soluble polymers, nonionic surfactants and anionic surfactants, as a dispersing agent for a leuco dye.

A fifty-fourth aspect of the invention is directed to a recording material according to any one of the fortieth to fifty-second aspects of the invention, which is characterized by using at least one material selected from methyl cellulose, hydroxypropylmethyl cellulose, polyethylene glycol fatty acid esters, polyoxyethylene alkyl ether sulfates and sodium 2-ethylhexylsulfosuccinate, as a dispersing agent for a leuco dye.

A fifty-fifth aspect of the invention is directed to a recording material according to any one of the fortieth to fifty-fourth aspects of the invention, which is a heat-sensitive recording material.

A fifty-sixth aspect of the invention is directed to a heat-sensitive recording material according to the fifty-fifth aspect of the invention, which is characterized in that the average particle size of the urea-urethane compound is not more than 5 μm and not less than 0.05 μm.

A fifty-seventh aspect of the invention is directed to a heat-sensitive recording material according to the fifty-fifth aspect of the invention, which is characterized in that a liquid temperature at grinding of the urea-urethane compound is 60° C. or lower.

A fifty-eighth aspect of the invention is directed to a heat-sensitive recording material according to the fifty-seventh aspect of the invention, which is characterized in that a pH at grinding of the urea-urethane compound is 5 to 10.

A fifty-ninth aspect of the invention is directed to a heat-sensitive recording material according to any one of the fifty-fifth to fifty-eighth aspects of the invention, which is characterized by using at least one material selected from water-soluble polymers and anionic surfactants, as a dispersing agent for a heat-meltable material.

A sixtieth aspect of the invention is directed to a heat-sensitive recording material according to any one of the fifty-fifth to fifty-eighth aspects of the invention, which is characterized by using at least one material selected from poly(vinyl alcohol)s, modified poly(vinyl alcohol)s, methyl cellulose, hydroxypropylmethyl cellulose, sodium condensed naphthalenesulfonate, polycarboxylic acid ammonium salts, water-soluble low-molecular weight copolymers, and sodium 2-ethylhexylsulfosuccinate, as a dispersing agent for a heat-meltable material.

A sixty-first aspect of the invention is directed to a heat-sensitive recording material according to any one of the fifty-fifth to fifty-eighth aspects of the invention, which is characterized in that the urea-urethane compound and a heat-meltable material are finely ground at the same time.

A sixty-second aspect of the invention is directed to a heat-sensitive recording material according to any one of the fifty-fifth to sixty-first aspects of the invention, which is characterized in that the pH of the substrate surface to be coated with the heat-sensitive recording layer of the heat-sensitive recording material is 3 to 9.

A sixty-third aspect of the invention is directed to a process for producing a heat-sensitive recording material according to any one of the fifty-fifth to sixty-second aspects of the invention, which is characterized by applying on a substrate a heat-sensitive coating liquid of pH 5 to 12 for forming the heat-sensitive recording layer of the heat-sensitive recording material.

A sixty-fourth aspect of the invention is directed to a recording material according the fortieth aspect of the invention, which is a heat-sensitive magnetic recording material.

A sixty-fifth aspect of the invention is directed to a heat-sensitive magnetic recording material characterized by comprising a substrate, a heat-sensitive recording layer comprising a urea-urethane compound developer and formed on one side of the substrate, and a magnetic recording layer formed on the other side of the substrate.

A sixty-sixth aspect of the invention is directed to a railroad ticket that is a heat-sensitive magnetic recording material according to the sixty-fourth or sixty-fifth aspect of the invention.

A sixty-seventh aspect of the invention is directed to a ticket that is a heat-sensitive magnetic recording material according to the sixty-fourth or sixty-fifth aspect of the invention.

A sixty-eighth aspect of the invention is directed to a recording material according to the fortieth aspect of the invention, which is a label for heat-sensitive recording.

A sixty-ninth aspect of the invention is directed to a label for heat-sensitive recording characterized by comprising a substrate, a heat-sensitive recording layer comprising a urea-urethane compound developer and formed on one side of the substrate, and an adhesive layer formed on the other side of the substrate.

A seventieth aspect of the invention is directed to a label for heat-sensitive recording according to the sixty-ninth aspect of the invention, characterized in that a back coating layer is formed between the adhesive layer and the substrate.

A seventy-first aspect of the invention is directed to a label for heat-sensitive recording according to either of the sixty-ninth and seventieth aspects of the invention, characterized in that an intermediate layer is formed between the heat-sensitive recording layer and the substrate.

A seventy-second aspect of the invention is directed to a recording material according the fortieth aspect of the invention, which is a multicolor heat-sensitive recording material.

A seventy-third aspect of the invention is directed to a multicolor heat-sensitive recording material according the seventy-second aspect of the invention, wherein at least two heat-sensitive recording layers are formed on one side of the substrate, said recording material being characterized in that at least one of said heat-sensitive recording layers comprises a urea-urethane compound developer.

A seventy-fourth aspect of the invention is directed to a multicolor heat-sensitive recording material according to the seventy-third aspect of the invention, which is characterized in that an intermediate layer is formed between the heat-sensitive recording layers.

A seventy-fifth aspect of the invention is directed to a multicolor heat-sensitive recording material characterized by comprising a substrate and two heat-sensitive recording layers laminated on one side of the substrate which have different color development temperatures, respectively, and undergo color development in different color tones, respectively, the upper heat-sensitive recording layer comprising either an agent used both as developer and tone reducer, or a reversible developer, and the lower heat-sensitive recording layer comprising a urea-urethane compound developer.

A seventy-sixth aspect of the invention is directed to a multicolor heat-sensitive recording material according to the seventy-fifth aspect of the invention, which is characterized in that of the two heat-sensitive recording layers, the upper layer is a low-temperature color-producing layer capable of undergoing color development at a low temperature and undergoing achromatization at a high temperature, and the lower layer is a high-temperature color-producing layer capable of undergoing color development at a high temperature.

A seventy-seventh aspect of the invention is directed to an article for laser marking characterized by having on the surface a heat-sensitive recording layer comprising a colorless or light-colored dye precursor, a urea-urethane compound developer and a recording sensitivity improving agent.

A seventy-eighth aspect of the invention is directed to an article for laser marking according to the seventy-seventh aspect of the invention, which is characterized by having on the heat-sensitive recording layer a protective layer comprising an aqueous binder having a glass transition point of 20-80° C.

A seventy-ninth aspect of the invention is directed to an article for laser marking according to either of the seventy-seventh and seventy-eighth aspects of the invention, wherein the recording sensitivity improving agent is at least one material selected from aluminum hydroxide, muscovite, wollastonite and kaolin.

An eightieth aspect of the invention is directed to an article for laser marking according to any one of the seventy-seventh to seventy-ninth aspects of the invention, which is any of labels, packaging materials and containers.

An eighty-first aspect of the invention is directed to a process for producing an article for laser marking which is characterized by applying on a substrate a color-producing marking agent comprising a colorless or light-colored dye precursor, a urea-urethane compound developer and a recording sensitivity improving agent, and drying the thus treated substrate.

An eighty-second aspect of the invention is directed to a method for marking an article, which is characterized by irradiating the heat-sensitive recording layer of an article for laser marking according to any one of the seventy-seventh to eightieth aspects of the invention, with laser beams.

An eighty-third aspect of the invention is directed to a color-producing marking agent characterized by comprising a colorless or light-colored dye precursor, a urea-urethane compound developer and a recording sensitivity improving agent.

PREFERRED EMBODIMENT OF THE INVENTION

Figure 1:
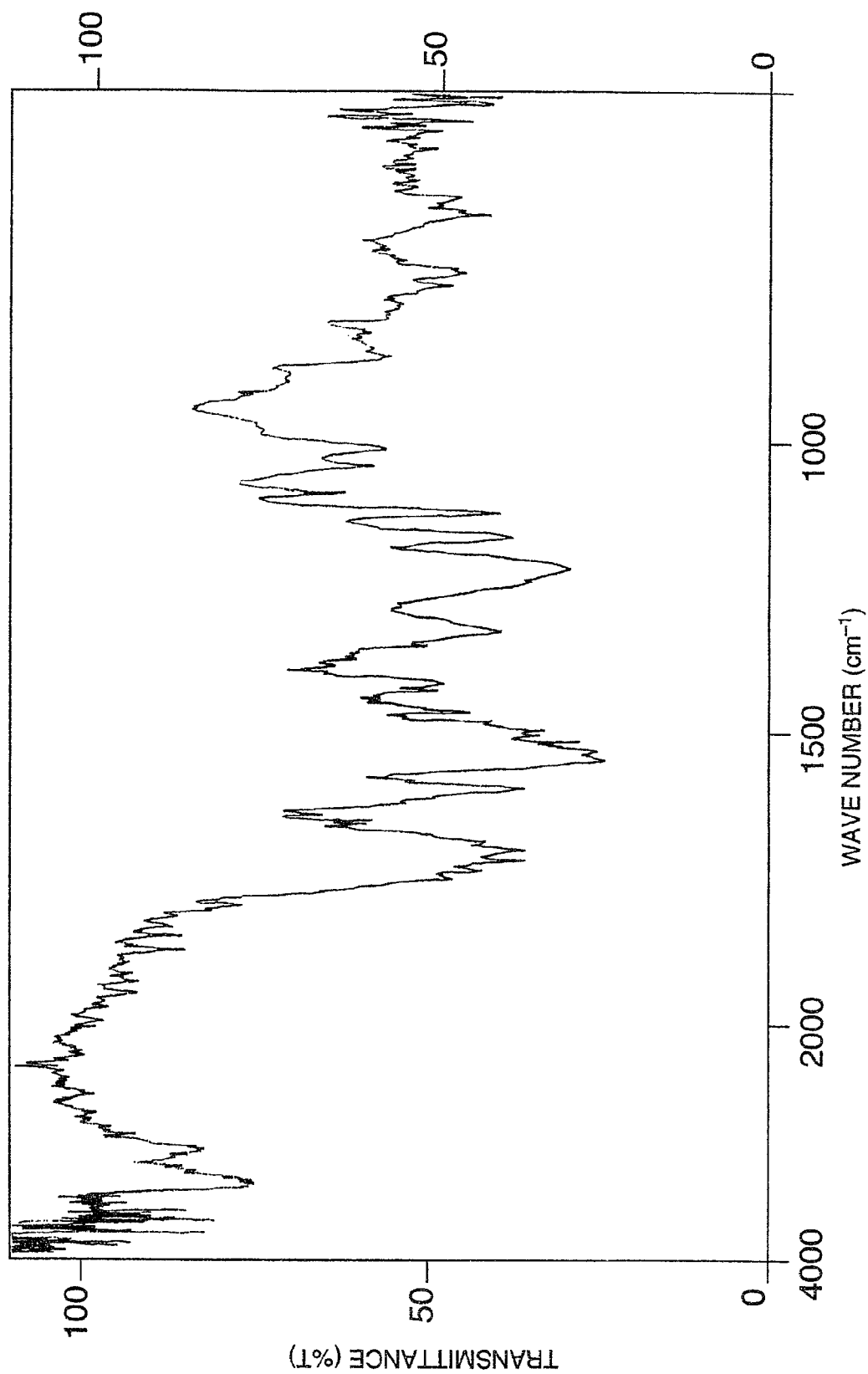
FIG. 1 is an IR spectrum of the white crystals obtained in Example 1.

The present invention is explained below in detail.

The urea-urethane compound of the first aspect of the present invention which satisfies the numeral formula:

$$10 \geq (A+B) \geq 3$$

wherein each of A and B is an integer of 1 or more, is a compound having a molecular structure in which at least one urea group (—NHCONH— group) and at least one urethane group (—NHCOO— group) are present in a total number of not more than 10 and not less than 3.

Such a compound has not been known and is a quite novel compound. This novel compound is useful in the case of recording materials used by means of recording energy such as heat, pressure or the like. The molecular weight of the urea-urethane compound is preferably 5,000 or less, more preferably 2,000 or less. The ratio of urea group(s) to urethane group(s) in the molecular structure of the urea-urethane compound is preferably 1:3 to 3:1, in particular, 1:2 to 2:1.

A process for synthesizing the urea-urethane compound of the first aspect of the present invention is not particularly limited so long as at least one urea group (—NHCONH— group) and at least one urethane group (—NHCOO— group) are formed in a total number of 3 to 10. A process in which the urea-urethane compound is produced by the reaction of an OH group-containing compound with an amine compound is preferable because of its ease.

In detail, as the urea-urethane compound of the first aspect of the present invention, a urea-urethane compound having at least one urea group and at least one urethane group in a total number of at least 3 can be obtained, for example, by using an isocyanate having at least two isocyanate groups, as a starting material, reacting all the isocyanate groups except at least one with an OH group-containing compound to form one or more urethane groups, and then reacting the remaining isocyanate groups of two molecules of the resulting urethane compound with each other by the use of water to bond them to each other.

In addition, a urea-urethane compound having at least one urea group and at least one urethane group in a total number of at least 3 can be obtained, for example, by using an isocyanate having at least two isocyanate groups, as a starting material, reacting all the isocyanate groups except at least one with an OH group-containing compound to form one or more urethane groups, reacting the remaining isocyanate group(s) with an amine compound having two or more amino groups, to form one or more urea groups, and reacting the remaining amino group(s) with an isocyanate compound.

Furthermore, a urea-urethane compound having at least one urea group and at least one urethane group in a total number of at least 3 can be obtained also by reacting all the isocyanate groups except at least one with an amine compound at first to form one or more urea groups, reacting the remaining isocyanate group(s) with a compound containing two or more OH groups, to form one or more urethane groups, and then reacting the resulting compound with an isocyanate compound.

In this case, a urea-urethane compound having at least one urea group and at least one urethane group in a total number of 3 to 10 can be obtained by using an isocyanate compound having two or more isocyanate groups, as the isocyanate to be lastly reacted, and repeating a procedure of reacting the remaining isocyanate group(s) with a compound containing two or more OH groups or an amine compound having two or more amino groups.

The starting isocyanate is not particularly limited so long as it has two or more isocyanate groups. The starting isocyanate includes, for example, p-phenylene diisocyanate, 2,5-dimethoxybenzene-1,4-diisocyanate, 2,4-toluene diisocyanate, 2,6-toluene diisocyanate, diphenylmethane diisocyanate, o-tolidine diisocyanate, diphenyl ether diisocyanate, 1,5-naphthylene diisocyanate, dianisidine diisocyanate, 9-ethylcarbazole-3,6-diisocyanate, 3,3'-dimethyl-4,4'-diphenylmethane diisocyanate, hexamethylene diisocyanate, isophorone diisocyanate, triphenylmethane triisocyanate, tris(4-phenylisocyanate) thiophosphate, 4,4',4"-triisocyanato-2,5-dimethoxytriphenylamine, 4,4',4"-triisocyanatotriphenylamine, m-xylylene diisocyanate, lysine diisocyanate, dimer acid diisocyanate, isopropylidene bis-4-cyclohexylisocyanate, dicyclohexylmethane diisocyanate and methylcyclohexane diisocyanate. As the starting isocyanate, there may also be used diisocyanate dimers such as N,N'-(4,4'-dimethyl-3,3'-diphenyldiisocyanato)urethodione (Desmodur TT, a trade name), a toluene diisocyanate dimer; and diisocyanate trimers such as 4,4',4"-trimethyl-3,3',3"-triisocyanato-2,4,6-triphenylcyanurate. There may also be used water adduct isocyanates of toluene diisocyanate, diphenylmethane diisocyanate and the like, such as 1,3-bis(3-isocyanato-4-methylphenyl)urea; polyol adducts such as trimethylolpropane adduct of toluene diisocyanate (Desmodur L, a trade name); and amine adducts. There may also be used compounds having two or more isocyanate groups, among the isocyanate compounds and isocyanate adduct compounds described in the specification of JP-A-10-76,757 and the specification of JP-A-10-95,171 (the contents of these references are hereby incorporated herein by reference).

Especially preferable examples of the starting isocyanate are toluene diisocyanates. Of the toluene diisocyanates, 2,4-toluene diisocyanate is preferable. Besides 2,4-toluene diisocyanate, mixtures of 2,4-toluene diisocyanate and 2,6-toluene diisocyanate are generally on the market and available at a low price and may also be used as the staring isocyanate. The mixtures of these toluene diisocyanate isomers are liquid at ordinary temperature.

As the amine compound that is reacted with the starting isocyanate for the urea-urethane compound to form one or more urea groups, any compound may be used so long as it has one or more amino groups. The amine compound includes, for example, aromatic amines such as aniline, o-toluidine, m-toluidine, p-toluidine, o-anisidine, p-anisidine, p-phenetidine, N,N-dimethylaniline, N,N-diethylaniline, N,N-dimethyl-p-phenylenediamine, N,N-diethyl-p-phenylene-diamine, 2,4-dimethoxyaniline, 2,5-dimethoxyaniline, 3,4-dimethoxyaniline, p-aminoacetanilide, p-aminobenzoic acid, o-aminophenol, m-aminophenol, p-aminophenol, 2,3-xylidine, 2,4-xylidine, 3,4-xylidine, 2,6-xylidine, 4-aminobenzonitrile, anthranilic acid, p-cresidine, 2,5-dichloroaniline, 2,6-dichloroaniline, 3,4-dichloroaniline, 3,5-dichloroaniline, 2,4,5-trichloroaniline, α-naphthylamine, aminoanthracene, o-ethylaniline, o-chloroaniline, m-chloroaniline, p-chloroaniline, N-methylaniline, N-ethylaniline, N-propylaniline, N-butylaniline, N,N-diglycidylaniline, N,N-diglycidyl-o-toluidine, acetoacetic acid anilide, trimethylphenylammonium bromide, 4,4'-diamino-3,3'-diethyldiphenylmethane, 4,4'-diaminobenzanilide, 3,5-diaminochlorobenzene, diaminodiphenyl ether, 3,3'-dichloro-4,4'-diaminodiphenylmethane, 3,3'-dimethyl-4,4'-diaminodiphenylmethane, tolidine base, o-phenylenediamine, m-phenylenediamine, p-phenylenediamine, 2-chloro-p-phenylenediamine, dianisidine, methyl p-aminobenzoate, ethyl p-aminobenzoate, n-propyl p-aminobenzoate, isopropyl p-aminobenzoate, butyl p-aminobenzoate, dodecyl p-aminobenzoate, benzyl p-aminobenzoate, o-aminobenzophenone, m-aminoacetophenone, p-aminoacetophenone, m-aminobenzamide, o-aminobenzamide, p-aminobenzamide, p-amino-N-methylbenzamide, 3-amino-4-methylbenzamide, 3-amino-4-methoxybenzamide, 3-amino-4-chlorobenzamide, p-(N-phenylcarbamoyl)aniline, p-[N-(4-chlorophenyl)carbamoyl]aniline, p-[N-(4-aminophenyl)carbamoyl]-aniline, 2-methoxy-5-(N-phenylcarbamoyl)aniline, 2-methoxy-5-[N-(2'-methyl-3'-chlorophenyl)carbamoyl]-aniline, 2-methoxy-5-[N-(2'-chlorophenyl)carbamoyl]-aniline, 5-acetylamino-2-methoxyaniline, 4-acetylaminoaniline, 4-(N-methyl-N-acetylamino)aniline, 2,5-diethoxy-4-(N-benzoylamino)aniline, 2,5-dimethoxy-4-(N-benzoylamino)aniline, 2-methoxy-4-(N-benzoylamino)-5-methylaniline, 4-sulfamoylaniline, 3-sulfamoylaniline, 2-(N-ethyl-N-phenylaminosulfonyl)aniline, 4-dimethylaminosulfonylaniline, 4-diethylaminosulfonylaniline, sulfathiazole, 4-aminodiphenyl sulfone, 2-chloro-5-N-phenylsulfamoylaniline, 2-methoxy-5-N,N-diethylsulfamoylaniline, 2,5-dimethoxy-4-N-phenysulfamoylaniline, 2-methoxy-5-benzylsulfonylaniline, 2-phenoxysulfonylaniline, 2-(2'-chlorophenoxy)sulfonylaniline, 3-anilinosulfonyl-4-methylaniline, bis[4-(m-aminophenoxy)phenyl] sulfone, bis[4-(p-aminophenoxy)phenyl]sulfone, bis[3-methyl-4-(p-aminophenoxy)phenyl] sulfone, 3,3'-dimethoxy-4,4'-diaminobiphenyl, 3,3'-dimethyl-4,4'-diaminobiphenyl, 2,2'-dichloro-4,4'-diamino-5,5'-dimethoxybiphenyl, 2,2',5,5'-tetrachloro-4,4'-diaminobiphenyl, o-tolidine sulfone, 2,4'-diaminobiphenyl, 2,2'-diaminobiphenyl, 4,4'-diaminobiphenyl, 2,2'-dichloro-4,4'-diaminobiphenyl, 3,3'-dichloro-4,4'-diaminobiphenyl, 2,2'-dimethyl-4,4'-diaminobiphenyl, 4,4'-thiodianiline, 4,4'-dithiodianiline, 4,4'-diaminodiphenyl ether, 3,3'-diaminodiphenyl ether, 3,4'-diaminodiphenyl ether, 4,4'-diaminodiphenylmethane, 3,4'-diaminodiphenylmethane, bis(3-amino-4-chlorophenyl)sulfone, bis(3,4-diaminophenyl)sulfone, 4,4'-diaminodiphenyl sulfone, 3,3'-diaminodiphenyl sulfone, 3,4'-diaminodiphenyl sulfone, 3,3'-diaminodiphenylmethane, 4,4-diaminodiphenylamine, 4,4'-ethylenedianiline, 4,4'-diamino-2,2'-dimethyldibenzyl, 3,3'-diaminobenzophenone, 4,4'-diaminobenzophenone, 1,4-bis(4-aminophenoxy)benzene, 1,3-bis(4-aminophenoxy)benzene, 1,3-bis(3-aminophenoxy)benzene, 9,9-bis(4-aminophenyl)fluorene, 2,2-bis(4-aminophenoxyphenyl)propane, 4,4'-bis(4-aminophenoxy)diphenyl, 3,3',4,4'-tetraminodiphenyl ether, 3,3',4,4'-tetraminodiphenyl sulfone, 3,3',4,4'-tetraminobenzophenone, 3-aminobenzonitrile, 4-phenoxyaniline, 3-phenoxyaniline, 4,4'-methylenebis-o-toluidine, 4,4'-(p-phenyleneisopropylidene)-bis-(2,6-xylidine), o-chloro-p-nitroaniline, o-nitro-p-chloroaniline, 2,6-dichloro-4-nitroaniline, 5-chloro-2-nitroaniline, 2-amino-4-chlorophenol, o-nitroaniline, m-nitroaniline, p-nitroaniline, 2-methyl-4-nitroaniline, m-nitro-p-toluidine, 2-amino-5-nitrobenzonitrile, Metol, 2,4-diaminophenol, N-(β-hydroxyethyl)-o-aminophenol sulfate, sulfanilic acid, metanilic acid, 4B acid, C acid, 2B acid, p-fluoroaniline, o-fluoroaniline, 3-chloro-4-fluoroaniline, 2,4-difluoroaniline, 2,3,4-trifluoroaniline, m-aminobenzotrifluoride, m-toluoylenediamine, 2-aminothiophenol, 2-amino-3-bromo-5-nitrobenzonitrile, diphenylamine, p-aminodiphenylamine, octylated diphenylamine, 2-methyl-4-methoxydiphenylamine, N,N-diphenyl-p-phenylenediamine, dianisidine, 3,3'-dichlorobenzidine, 4,4'-diaminostilbene-2,2'-disulfonic acid, benzylethylaniline, 1,8-naphthalenediamine, sodium naphthionate, Tobias acid, H acid, J acid, phenyl J acid, 1,4-diaminoanthraquinone, 1,4-diamino-2,3-dichloroanthraquinone, etc.; heterocyclic compound amines such as 3-amino-1,2,4-triazole, 2-aminopyridine, 3-aminopyridine, 4-aminopyridine, α-amino-ϵ-caprolactam, acetoguanamine, 2,4-diamino-6-[2'-methylimidazolyl-(1)]ethyl-5-triazine, 2,3-diaminopyridine, 2,5-diaminopyridine, 2,3,5-triaminopyridine, 1-amino-4-methylpiperazine, 1-(2-aminoethyl)piperazine, bis(aminopropyl)piperazine, N-(3-aminopropyl)-morpholine, etc.; and aliphatic amines such as methylamine, ethylamine, dimethylamine, diethylamine, stearylamine, allylamine, diallylamine, isopropylamine, diisopropylamine, 2-ethylhexylamine, ethanolamine, 3-(2-ethylhexyloxy)propylamine, 3-ethoxypropylamine, diisobutylamine, 3-(diethylamino)propylamine, di-2-ethylhexylamine, 3-(dibutylamino)propylamine, t-butylamine, propylamine, 3-(methylamino)propylamine, 3-(dimethylamino)propylamine, 3-methoxypropylamine, methylhydrazine, 1-methylbutylamine, methanediamine, 1,4-diaminobutane, cyclohexanemethylamine, cyclohexylamine, 4-methylcyclohexylamine, 2-bromoethylamine, 2-methoxyethylamine, 2-ethoxymethylamine, 2-amino-1-propanol, 2-aminobutanol, 3-amino-1,2-propanediol, 1,3-diamino-2-hydroxypropane, 2-aminoethanethiol, ethylenediamine, diethylenetriamine, hexamethylenediamine, etc.

Of the above-exemplified amine compounds, aniline derivatives having at least one amino group and represented by the following formula (VIII) are especially preferable:

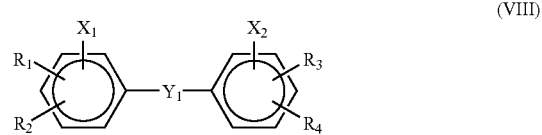

(VIII)

wherein $R_1$, $R_2$, $R_3$ and $R_4$ are independently a hydrogen atom, a halogen atom, an alkyl group, an alkoxy group or an amino group, $X_1$ and $X_2$ are independently an amino group or a group represented by the formula (b):

(b)

and $Y_1$ is any of —$SO_2$—, —O—, —(S)—, —$(CH_2)_n$—, —CO—, —CONH— and a group represented by any of the formulas (a):

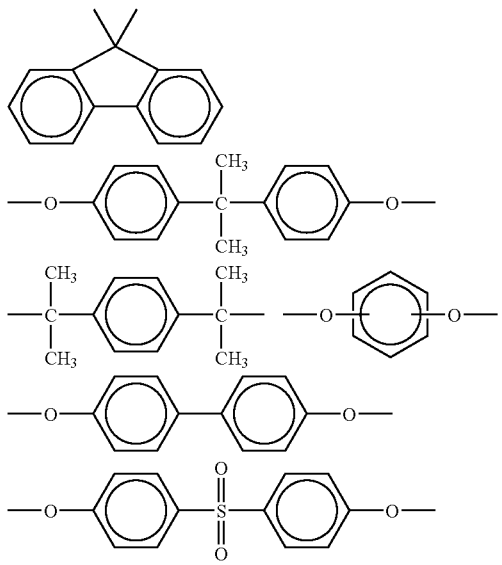

or is absent, and n is 1 or 2.

As the OH group-containing compound that is reacted with the isocyanate to form one or more urethane groups, any compound may be used so long as it contains one or more OH groups. The OH group-containing compound includes, for example, phenols such as phenol, cresol, xylenol, p-ethylphenol, o-isopropylphenol, resorcinol, p-tert-butylphenol, p-tert-octylphenol, 2-cyclohexylphenol, 2-allylphenol, 4-indanol, thymol, 2-naphthol, p-nitrophenol, o-chlorophenol, p-chlorophenol, 2,2-bis(4-hydroxyphenyl)propane, 2,2-bis(hydroxyphenyl)butane, 2,2-bis(hydroxyphenyl)pentane, 2,2-bis(hydroxyphenyl)heptane, catechol, 3-methylcatechol, 3-methoxycatechol, pyrogallol, hydroquinone, methylhydroquinone, 4-phenylphenol, p,p'-biphenol, 4-cumylphenol, butyl bis(4-hydroxyphenyl)acetate, benzyl bis(4-hydroxyphenyl)acetate, bis(4-hydroxyphenyl)sulfone, bis(3-methyl-4-hydroxyphenyl)sulfone, bis(3,5-dimethyl-4-hydroxyphenyl)sulfone, 4-hydroxyphenyl-4'-methylphenyl sulfone, 3-chloro-4-hydroxyphenyl-4'-methylphenyl sulfone, 3,4-dihydroxyphenyl-4'-methylphenyl sulfone, 4-isopropyloxyphenyl-4'-hydroxyphenyl sulfone, bis(2-allyl-4-hydroxyphenyl) sulfone, 4-hydroxyphenyl-4'-benzyloxyphenyl sulfone, 4-isopropylphenyl-4'-hydroxyphenyl sulfone, 4-hydroxy-4'-isopropoxydiphenyl sulfone, bis(2-methyl-3-tert-butyl-4-hydroxyphenyl)sulfide, 4,4'-dihydroxydiphenyl ether, 4,4'-thiodiphenol, 4,4'-dihydroxybenzophenone, 2,2-bis(4-hydroxyphenyl)hexafluoropropane, 4,4'-dihydroxydiphenylmethane, 3,3'-dihydroxydiphenylamine, bis(4-hydroxy-3-methylphenyl)sulfide, bis(4-(2-hydroxy)phenyl) sulfone, 2,4-dihydroxybenzophenone, 2,2',4,4'-tetrahydroxybenzophenone, phenyl salicylate, salicylanilide, methyl 4-hydroxybenzoate, benzyl 4-hydroxybenzoate, (4'-chlorobenzyl) 4-hydroxybenzoate, ethyl 1,2-bis(4'-hydroxybenzoate), pentyl 1,5-bis(4'-hydroxybenzoate), hexyl 1,6-bis(4'-hydroxybenzoate), dimethyl 3-hydroxyphthalate, stearyl gallate, lauryl gallate, methyl gallate, 4-methoxyphenol, 4-(benzyloxy)phenol, 4-hydroxybenzaldehyde, 4-n-octyloxysalicylic acid, 4-n-butyloxysalicylic acid, 4-n-pentyloxysalicylic acid, 3-n-dodecyloxysalicylic acid, 3-n-octanoyloxysalicylic acid, 4-n-octyloxy-carbonylaminosalicylic acid, 4-n-octanoyloxy-carbonylaminosalicylic acid, etc.

However, as such phenols, those having an amino group are not desirable. Since the amino group has a higher reactivity with an isocyanate group than does an OH group, the amino group reacts with the isocyanate group before the OH group, so that it is difficult in some cases to obtain a desired compound. The OH group-containing compound also includes alcohols such as methanol, ethanol, propanol, butanol, pentanol, hexanol, heptanol, octanol, isopropanol, iosbutanol, isoheptanol, 2-ethyl-1-hexanol, 1-decanol, 2-pentanol, 3-hexanol, tert-butanol, tert-amyl alcohol, methyl Cellosolve, butyl Cellosolve, methyl Carbitol, allyl alcohol, 2-methyl-2-propen-1-ol, benzyl alcohol, 4-pyridinemethanol, phenyl Cellosolve, furfuryl alcohol, cyclohexanol, cyclohexylmethanol, cyclopentanol, 2-chloroethanol, 1-chloro-3-hydroxypropane, glycerin, glycerol, etc.; polyether type polyols such as polypropylene glycols, polytetramethylene ether glycols, adipate-derived polyols, epoxy-modified polyols, polyether ester polyols, polycarbonate polyols, polycaprolactone diols, phenolic polyols, amine-modified polyols, etc.; and polyols such as ethylene glycol, diethylene glycol, 1,3-propanediol, 1,2-propanediol, propylene glycol, dipropylene glycol, 1,4-butanediol, 1,5-pentanediol, 1,6-hexanediol, 1,6-hexane glycol, 1,9-nonanediol, acryl polyols, fluorocarbon polyols, polybutadiene polyols, polyhydroxy polyols, trimethylolpropane, trimethylolethane, hexanetriol, phosphoric acid, neopentyl glycol, pentaerythritol, castor-oil-derived polyols, polymer polyols, methylpentanediol, halogen-containing polyols, phosphorus-containing polyols, ethylenediamine, α-methylglucoside, sorbitol, sucrose, etc.

The urea-urethane compound represented by any of the formulas (I) to (VI) of the second aspect of the present invention is also a quite novel compound. This novel compound is useful in the case of, for example, recording materials used by means of recording energy such as heat, pressure or the like.

A process for producing the urea-urethane compound represented by the formula (I) of the second aspect of the present invention is not limited. This compound can be obtained, for example, by reacting an OH group-containing compound of the following general formula (IX) with an isocyanate compound of the following general formula (X) and an amine compound of the following general formula (XI) according to, for instance, the reaction formula (A) shown below:

$$X\text{—}OH \quad (IX)$$

$$OCN\text{—}Y_0\text{—}NCO \quad (X)$$

$$Z\text{—}NH_2 \quad (XI)$$

wherein X and Z are independently an aromatic compound residue, a heterocyclic compound residue or an aliphatic compound residue, each of the residues being able to have one or more substituents; and $Y_0$ is a group selected from the group consisting of tolylene group, xylylene group, naphthylene group, hexamethylene group and -φ-$CH_2$-φ- group wherein -φ- is a phenylene group.

The term "aliphatic" used herein includes the term "alicyclic".

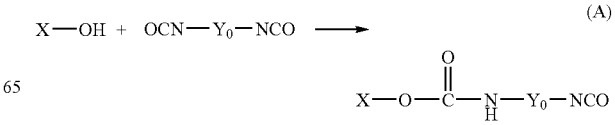

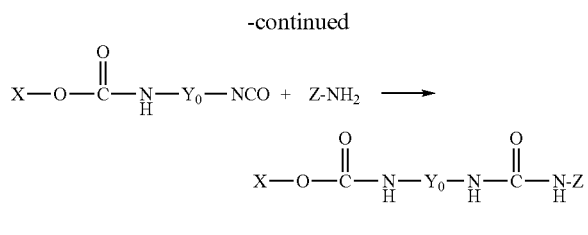

A process for producing the urea-urethane compound represented by the formula (II) of the second aspect of the present invention is not limited. This compound can be obtained, for example, by reacting an OH group-containing compound of the general formula (IX) with an isocyanate compound of the following general formula (XII) and water according to, for instance, the reaction formula (B) shown below:

OCN—Y—NCO  (XII)

wherein Y is an aromatic compound residue, a heterocyclic compound residue or an aliphatic compound residue, each of the residues being able to have one or more substituents.

(B)

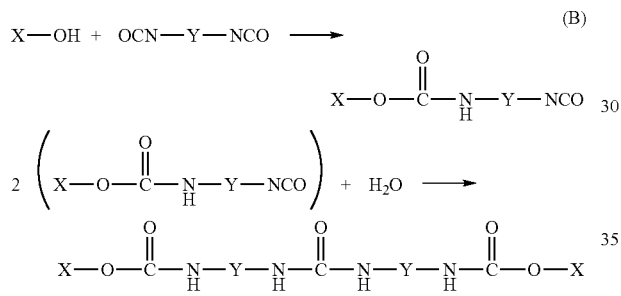

A process for producing the urea-urethane compound represented by the formula (III) of the second aspect of the present invention is not limited. This compound can be obtained, for example, by reacting an OH group-containing compound of the general formula (IX) with an isocyanate compound of the general formula (XII) and an amine compound of the following general formula (XIII) according to, for instance, the reaction formula (C) or (D) shown below:

α—(NH₂)ₙ  (XIII)

wherein α is a residue having a valence of 2 or more, and n is an integer of 2 or more.

(C)

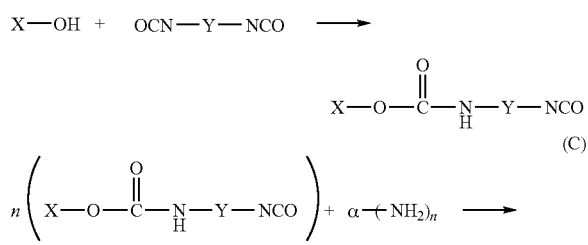

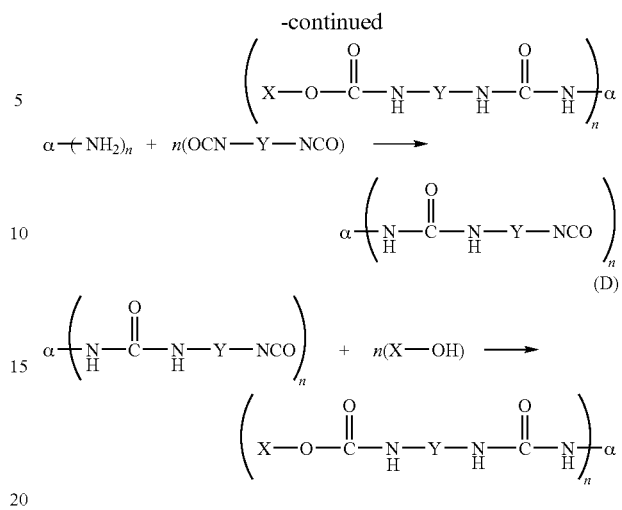

(D)

A process for producing the urea-urethane compound represented by the formula (IV) of the second aspect of the present invention is not limited. This compound can be obtained, for example, by reacting an amine compound of the general formula (XI) with an isocyanate compound of the general formula (XII) and an OH group-containing compound of the following general formula (XIV) according to, for instance, the reaction formula (E) or (F) shown below:

β—(OH)ₙ  (XIV)

wherein β is a residue having a valence of 2 or more, and n is an integer of 2 or more.

(E)

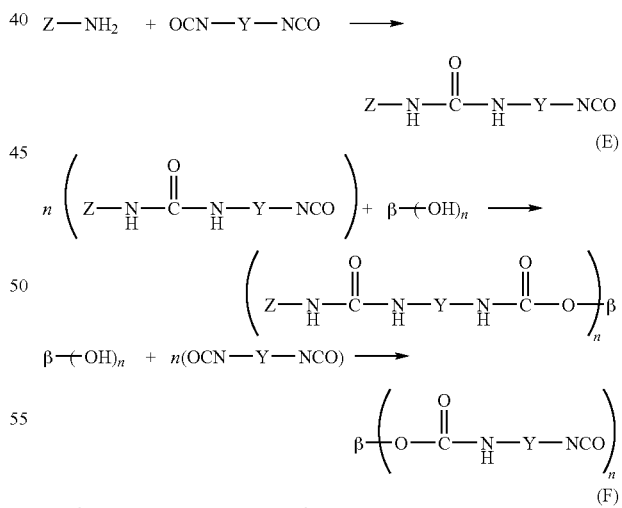

(F)

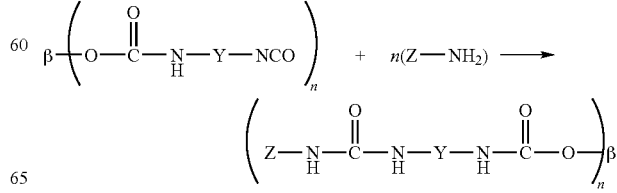

The compounds of the general formulas (IX) to (XIV) are explained below in further detail which can be used for synthesis of the urea-urethane compounds of the above formulas (I) to (IV).

The OH group-containing compound of the general formula (IX) is not particularly limited so long as it has one or more OH groups. This compound includes, for example, monophenols such as phenol, cresol, xylenol, p-ethylphenol, o-isopropylphenol, resorcinol, p-tert-butylphenol, p-tert-octylphenol, 2-cyclohexylphenol, 4-indanol, thymol, 2-naphthol, p-nitrophenol, o-chlorophenol, p-chlorophenol, 4-phenylphenol, 4-hydroxyphenyl-4'-methylphenyl sulfone, 3-chloro-4-hydroxyphenyl-4'-methylphenyl sulfone, 4-isopropylphenyl-4'-hydroxyphenyl sulfone, 4-isopropyloxyphenyl-4'-hydroxyphenyl sulfone, 4-hydroxyphenyl-4'-benzyloxyphenyl sulfone, 4-isopropylphenyl-4'-hydroxyphenyl sulfone, 4-hydroxy-4'-isopropoxydiphenyl sulfone, phenyl salicylate, salicylanilide, methyl 4-hydroxybenzoate, benzyl 4-hydroxybenzoate, (4'-chlorobenzyl) 4-hydroxybenzoate, ethyl 1,2-bis(4'-hydroxybenzoate), pentyl 1,5-bis(4'-hydroxybenzoate), hexyl 1,6-bis(4'-hydroxybenzoate), dimethyl 3-hydroxyphthalate, 4-methoxyphenol, 4-(benzyloxy)phenol, 4-hydroxybenzaldehyde, 4-n-octyloxysalkylic acid, 4-n-butyloxysalkylic acid, 4-n-pentyloxysalkylic acid, 3-n-dodecyloxysalkylic acid, 3-n-octanoyloxysalkylic acid, 4-n-octyloxycarbonylaminosalkylic acid, 4-n-octanoyloxycarbonylaminosalkylic acid, etc. The compound of the general formula (IX) also includes diphenols such as 2,2-bis(4-hydroxyphenyl)propane, 2,2-bis(hydroxyphenyl)butane, 2,2-bis(hydroxyphenyl)pentane, 2,2-bis(hydroxyphenyl)heptane, catechol, 3-methylcatechol, 3-methoxycatechol, pyrogallol, hydroquinone, methylhydroquinone, 4-phenylphenol, 4,4'-biphenol, 4-cumylphenol, butyl bis(4-hydroxyphenyl)acetate, benzyl bis(4-hydroxyphenyl)acetate, bis(4-hydroxyphenyl)sulfone, bis(3-methyl-4-hydroxyphenyl)sulfone, bis(3,5-dimethyl-4-hydroxyphenyl)sulfone, 3,4-dihydroxyphenyl-4'-methylphenyl sulfone, bis (2-allyl-4-hydroxyphenyl)sulfone, bis(2-methyl-3-tert-butyl-4-hydroxyphenyl)sulfide, 4,4'-dihydroxydiphenyl ether, 4,4'-thiodiphenol, 4,4'-dihydroxybenzophenone, 2,2-bis(4-hydroxyphenyl)hexafluoropropane, 4,4'-dihydroxy diphenylmethane, 3,3'-dihydroxydiphenylamine, bis(4-hydroxy-3-methylphenyl)sulfide, etc. However, as such OH group-containing compounds, those having an amino group are not desirable. When the amino group is present together with the OH group(s), the amino group has a higher reactivity with an isocyanate group than does the OH group and hence reacts with the isocyanate group before the OH group, so that it is difficult in some cases to obtain a desired compound. The compound of the general formula (IX) further includes monohydric alcohols such as methanol, ethanol, propanol, butanol, pentanol, hexanol, heptanol, octanol, isopropanol, isobutanol, isopentanol, 2-ethyl-1-hexanol, 1-decanol, 2-pentanol, 3-hexanol, tert-butanol, tert-amyl alcohol, methyl Cellosolve, butyl Cellosolve, methyl Carbitol, allyl alcohol, 2-methyl-2-propen-1-ol, benzyl alcohol, 4-pyridinemethanol, phenyl Cellosolve, furfuryl alcohol, cyclohexanol, cyclohexylmethanol, cyclopentanol, 2-chloroethanol, 1-chloro-3-hydroxypropane, glycerin, glycerol, etc. As the compound of the general formula (IX), there may also be used polyether type polyols such as polypropylene glycols, polytetramethylene ether glycols, adipate-derived polyols, epoxy-modified polyols, polyether ester polyols, polycarbonate polyols, polycaprolactone diols, phenolic polyols, amine-modified polyols, etc.; and polyols such as ethylene glycol, diethylene glycol, 1,3-propanediol, 1,2-propanediol, propylene glycol, dipropylene glycol, 1,4-butanediol, 1,5-pentanediol, 1,6-hexanediol, 1,6-hexane glycol, 1,9-nonanediol, acryl polyols, fluorocarbon polyols, polybutadiene polyols, polyhydroxy polyols, trimethylolpropane, trimethylolethane, hexanetriol, phosphoric acid, neopentyl glycol, pentaerythritol, castor-oil-derived polyols, polymer polyols, methylpentanediol, halogen-containing polyols, phosphorus-containing polyols, ethylenediamine, α-methylglucoside, sorbitol, sucrose, etc. Of these, the monophenols are preferably used.

The isocyanate compound of the general formula (X) includes 2,4-toluene diisocyanate, 2,6-toluene diisocyanate, diphenylmethane diisocyanate, hexamethylene diisocyanate, 1,5-naphthylene diisocyanate, m-xylylene diisocyanate, etc. Of these, the toluene diisocyanates are preferable.

The isocyanate compound of the general formula (XII) is not particularly limited so long as it has two or more isocyanate groups. This compound includes, for example, p-phenylene diisocyanate, 2,5-dimethoxybenzene-1,4-diisocyanate, 2,4-toluene diisocyanate, 2,6-toluene diisocyanate, diphenylmethane diisocyanate, o-tolidine diisocyanate, 1,5-naphthylene diisocyanate, dianisidine diisocyanate, 9-ethylcarbazole-3,6-diisocyanate, 3,3'-dimethyl-4,4'-diphenylmethane diisocyanate, hexamethylene diisocyanate, isophorone diisocyanate, triphenylmethane triisocyanate, tris (4-phenylisocyanato)thiophosphate, 4,4',4"-triisocyanato-2, 5-dimethoxytriphenylamine, 4,4',4"-triisocyanatotriphenylamine, m-xylylene diisocyanate, lysine diisocyanate, dimer acid diisocyanate, isopropylidene bis-4-cyclohexylisocyanate, dicyclohexylmethane diisocyanate and methylcyclohexane diisocyanate. As the isocyanate compound of the general formula (XII), there may also be used diisocyanate dimers such as N,N'-(4,4'-dimethyl-3,3'-diphenyldiisocyanato)urethodione (Desmodur TT, a trade name), a toluene diisocyanate dimer; and diisocyanate trimers such as 4,4',4"-trimethyl-3,3',3"-triisocyanato-2,4,6-triphenylcyanurate. There may also be used water adduct isocyanates of toluene diisocyanate, diphenylmethane diisocyanate and the like, such as 1,3-bis(3-isocyanato-4-methylphenyl)urea; polyol adducts such as trimethylolpropane adduct of toluene diisocyanate (Desmodur L, a trade name); and amine adducts. There may also be used compounds having two or more isocyanate groups, among the isocyanate compounds and isocyanate adduct compounds described in the specifications of JP-A-10-76757 and JP-A-10-95171. An especially preferable example of the isocyanate compound of the general formula (XII) is toluene diisocyanate.

The amine compound of the general formula (XI) is not particularly limited so long as it has one or more amino groups. This compound includes, for example, aromatic monoamines such as aniline, o-toluidine, m-toluidine, p-toluidine, o-anisidine, p-anisidine, p-phenetidine, 2,4-dimethoxyaniline, 2,5-dimethoxyaniline, 3,4-dimethoxyaniline, p-aminoacetanilide, p-aminobenzoic acid, o-aminophenol, m-aminophenol, p-aminophenol, 2,3-xylidine, 2,4-xylidine, 2,6-xylidine, 4-aminobenzonitrile, anthranilic acid, p-cresidine, 2,5-dichloroaniline, 2,6-dichloroaniline, 3,4-dichloroaniline, 3,5-dichloroaniline, 2,4,5-trichloroaniline, α-naphthylamine, aminoanthracene, o-ethylaniline, o-chloroaniline, m-chloroaniline, p-chloroaniline, methyl p-aminobenzoate, ethyl p-aminobenzoate, n-propyl p-aminobenzoate, isopropyl p-aminobenzoate, butyl p-aminobenzoate, dodecyl p-aminobenzoate, benzyl p-aminobenzoate, o-aminobenzophenone, m-aminoacetophenone, p-aminoacetophenone, m-aminobenzamide, o-aminobenzamide, p-aminobenzamide, p-amino-N-methylbenzamide, 3-amino-4-methylbenzamide, 3-amino-4-methoxybenzamide, 3-amino-4-chlorobenzamide, p-(N-phenylcarbamoyl) aniline, p-[N-(4-chlorophenyl)carbamoyl]aniline, p-[N-(4- aminophenyl)carbamoyl]aniline, 2-methoxy-5-(N-phenyl-carbamoyl)aniline, 2-methoxy-5-[N-(2'-methyl-3'-chlorophenyl)carbamoyl]aniline, 2-methoxy-5-[N-(2'-chlorophenyl)carbamoyl]aniline, 5-acetylamino-2-methoxyaniline, 4-acetylaminoaniline, 2-methoxy-4-(N-benzoylamino)-5-methylaniline, 4-sulfamoylaniline, 3-sulfamoylaniline, 2-(N-ethyl-N-phenyl-aminosulfonyl)aniline, 4-dimethylaminosulfonylaniline, 4-diethylaminosulfonylaniline, sulfathiazole, 4-aminodiphenyl sulfone, 2-chloro-5-N-phenylsulfamoylaniline, 2-methoxy-5-N,N-diethylsulfamoylaniline, 2,5-dimethoxy-4-N-phenysulfamoylaniline, 2-methoxy-5-benzylsulfonylaniline, 2-phenoxysulfonylaniline, 2-(2'-chlorophenoxy)sulfonylaniline, 3-anilinosulfonyl-4-methylaniline, o-chloro-p-nitroaniline, o-nitro-p-chloroaniline, 2,6-dichloro-4-nitroaniline, 5-chloro-2-nitroaniline, 2-amino-4-chlorophenol, o-nitroaniline, m-nitroaniline, p-nitroaniline, 2-methyl-4-nitroaniline, m-nitro-p-toluidine, 2-amino-5-nitrobenzonitrile, sulfanilic acid, metanilic acid, 4B acid, C acid, 2B acid, p-fluoroaniline, o-fluoroaniline, 3-chloro-4-fluoroaniline, 2,4-difluoroaniline, 2,3,4-trifluoroaniline, m-aminobenzotrifluoride, 2-amino-3-bromo-5-nitrobenzonitrile, etc.; and aromatic diamines such as 4,4'-diamino-3,3'-diethyldiphenylmethane, 4,4'-diaminobenzanilide, 3,5-diaminochlorobenzene, diaminodiphenyl ether, 3,3'-dichloro-4,4'-diaminodiphenylmethane, 3,3'-dimethyl-4,4'-diaminodiphenylmethane, tolidine base, dianisidine, bis[4-(m-aminophenoxy)phenyl] sulfone, bis[4-(p-aminophenoxy)phenyl] sulfone, bis[3-methyl-4-(p-aminophenoxy)phenyl] sulfone, 3,3'-dimethoxy-4,4'-diaminobiphenyl, 3,3'-dimethyl-4,4'-diaminobiphenyl, 2,2'-dichloro-4,4'-diamino-5,5'-dimethoxybiphenyl, 2,2',5,5'-tetrachloro-4,4'-diaminobiphenyl, o-tolidine sulfone, 2,4'-diaminobiphenyl, 2,2'-diaminobiphenyl, 4,4'-diaminobiphenyl, 2,2'-dichloro-4,4'-diaminobiphenyl, 3,3'-dichloro-4,4'-diaminobiphenyl, 2,2'-dimethyl-4,4'-diaminobiphenyl 4,4'-thiodianiline, 2,2'-dithiodianiline, 4,4'-dithiodianiline, 4,4'-diaminodiphenyl ether, 3,3'-diaminodiphenyl ether, 3,4'-diaminodiphenyl ether, 4,4'-diaminodiphenylmethane, 3,4'-diaminodiphenylmethane, bis(3-amino-4-chlorophenyl)sulfone, bis(3,4-diaminophenyl)sulfone, 4,4'-diaminodiphenyl sulfone, 3,3'-diaminodiphenyl sulfone, 3,4'-diaminodiphenyl sulfone, 3,3'-diaminodiphenylmethane, 4,4'-diaminodiphenylamine, 4,4'-ethylenedianiline, 4,4'-diamino-2,2'-dimethyldibenzyl, 3,3'-diaminobenzophenone, 4,4'-diaminobenzophenone, 1,4-bis(4-aminophenoxy)benzene, 1,3-bis(4-aminophenoxy)benzene, 1,3-bis(3-aminophenoxy)benzene, 9,9-bis(4-aminophenyl)fluorene, 2,2-bis(4-aminophenoxyphenyl)propane, 4,4'-bis(4-aminophenoxy)diphenyl, dianisidine, 3,3'-dichlorobenzidine, etc. The amine compound of the general formula (XI) also includes, for example, heterocyclic compound amines such as 3-amino-1,2,4-triazole, 2-aminopyridine, 3-aminopyridine, 4-aminopyridine, α-amino-ε-caprolactam, acetoguanamine, 2,4-diamino-6-[2'-methylimidazolyl-(1)]ethyl-S-triazine, 2,3-diaminopyridine, 2,5-diaminopyridine, 2,3,5-triaminopyridine, 1-amino-4-methylpiperazine, 1-(2-aminoethyl)piperazine, bis(aminopropyl)piperazine, N-(3-aminopropyl)morpholine, etc.; and aliphatic amines such as methylamine, ethylamine, stearylamine, allylamine, isopropylamine, 2-ethylhexylamine, ethanolamine, 3-(2-ethylhexyloxy)propylamine, 3-ethoxypropylamine, 3-(diethylamino)propylamine, 3-(dibutylamino)propylamine, t-butylamine, propylamine, 3-(methylamino)propylamine, 3-(dimethylamino)propylamine, 3-methoxypropylamine, methylhydrazine, 1-methylbutylamine, methanediamine, 1,4-diaminobutane, cyclohexanemethylamine, cyclohexylamine, 4-methylcyclohexylamine, 2-bromoethylamine, 2-methoxyethylamine, 2-ethoxymethylamine, 2-amino-1-propanol, 2-aminobutanol, 3-amino-1,2-propanediol, 1,3-diamino-2-hydroxypropane, 2-aminoethanethiol, ethylenediamine, diethylenetriamine, hexamethylenediamine, etc. Of these, the aromatic monoamines are preferably used.

The amine compound of the general formula (XIII) is not particularly limited so long as it has two or more amino groups. This compound includes, for example, aromatic amines such as 4,4'-diamino-3,3'-diethyldiphenylmethane, 4,4'-diaminobenzanilide, 3,5-diaminochlorobenzene, diaminodiphenyl ether, 3,3'-dichloro-4,4'-diaminodiphenylmethane, 3,3'-dimethyl-4,4'-diaminodiphenylmethane, tolidine base, dianisidine, bis[4-(m-aminophenoxy)phenyl] sulfone, bis[4-(p-aminophenoxy)phenyl] sulfone, bis[3-methyl-4-(p-aminophenoxy)phenyl] sulfone, 3,3'-dimethoxy-4,4'-diaminobiphenyl, 3,3'-dimethyl-4,4'-diaminobiphenyl, 2,2'-dichloro-4,4'-diamino-5,5'-dimethoxybiphenyl, 2,2',5,5'-tetrachloro-4,4'-diaminobiphenyl, o-tolidine sulfone, 2,4'-diaminobiphenyl, 2,2'-diaminobiphenyl, 4,4'-diaminobiphenyl, 2,2'-dichloro-4,4'-diaminobiphenyl, 3,3'-dichloro-4,4'-diaminobiphenyl, 2,2'-dimethyl-4,4'-diaminobiphenyl, 4,4'-thiodianiline, 2,2'-dithiodianiline, 4,4'-dithiodianiline, 4,4'-diaminodiphenyl ether, 3,3'-diaminodiphenyl ether, 3,4'-diaminodiphenyl ether, 4,4'-diaminodiphenylmethane, 3,4'-diaminodiphenylmethane, bis(3-amino-4-chlorophenyl)sulfone, bis(3,4-diaminophenyl)sulfone, 4,4'-diaminodiphenyl sulfone, 3,3'-diaminodiphenyl sulfone, 3,4'-diaminodiphenyl sulfone, 3,3'-diaminodiphenylmethane, 4,4'-diaminodiphenylamine, 4,4'-ethylenedianiline, 4,4'-diamino-2,2'-dimethyldibenzyl, 3,3'-diaminobenzophenone, 4,4'-diaminobenzophenone, 1,4-bis(4-aminophenoxy)benzene, 1,3-bis(4-aminophenoxy)benzene, 1,3-bis(3-aminophenoxy)benzene, 9,9-bis(4-aminophenyl)fluorene, 2,2-bis(4-aminophenoxyphenyl)propane, 4,4'-bis(4-aminophenoxy)diphenyl, dianisidine, 3,3'-dichlorobenzidine, tolidine base, o-phenylenediamine, m-phenylenediamine, p-phenylenediamine, etc. Of the above-exemplified amine compounds, aniline derivatives having at least two amino groups and represented by the following formula (VIII) are especially preferable:

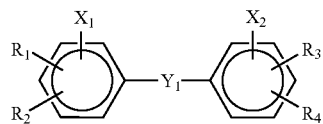

(VIII)

wherein $R_1$, $R_2$, $R_3$, and $R_4$, are independently a hydrogen atom, a halogen atom, an alkyl group, an alkoxy group or an amino group, $X_1$ and $X_2$ are independently an amino group or a group represented by the formula (b):

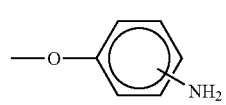

(b)

and $Y_1$ is any of —$SO_2$—, —O—, —$(S)_n$—, —CO—, —CONH— and a group represented by any of the formulas (a):

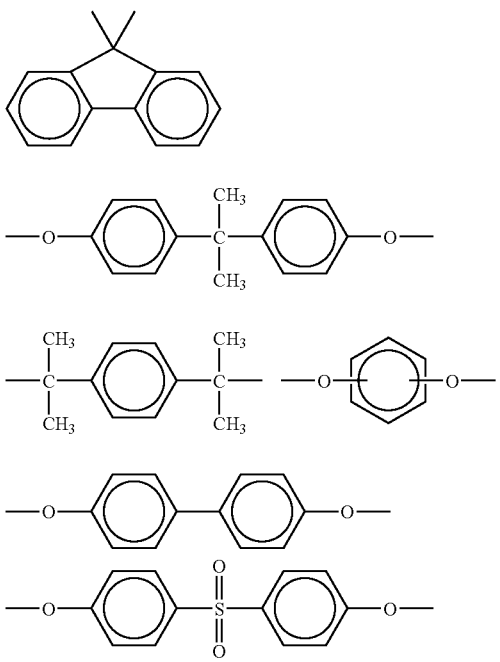

or is absent, and n is 1 or 2.

The OH group-containing compound of the general formula (XIV) is not particularly limited so long as it has two or more OH groups. This compound includes, for example, diphenols such as 2,2-bis(4-hydroxyphenyl)propane, 2,2-bis(hydroxyphenyl)butane, 2,2-bis(hydroxyphenyl)pentane, 2,2-bis(hydroxyphenyl)heptane, catechol, 3-methylcatechol, 3-methoxycatechol, pyrogallol, hydroquinone, methylhydroquinone, p,p'-biphenol, butyl bis(4-hydroxyphenyl)acetate, benzyl bis(4-hydroxyphenyl)acetate, bis(4-hydroxyphenyl)sulfone, bis(3-methyl-4-hydroxyphenyl)sulfone, bis(3,5-dimethyl-4-hydroxyphenyl)sulfone, 3,4-dihydroxyphenyl-4'-methylphenyl sulfone, bis(2-allyl-4-hydroxyphenyl)sulfone, bis(2-methyl-3-tert-butyl-4-hydroxyphenyl)sulfide, 4,4'-dihydroxydiphenyl ether, 4,4'-thiodiphenol, 4,4'-dihydroxybenzophenone, 2,2-bis(4-hydroxyphenyl)hexafluoropropane, 4,4'-dihydroxydiphenylmethane, 3,3'-dihydroxydiphenylamine, bis(4-hydroxy-3-methylphenyl)sulfide, etc. However, as such diphenols, those having an amino group are not desirable. Since the amino group has a higher reactivity with an isocyanate group than does an OH group, the amino group reacts with the isocyanate group before the OH group, so that it is difficult in some cases to obtain a desired compound. The OH group-containing compound of the general formula (XIV) also includes polyether type polyols such as polypropylene glycols, polytetramethylene ether glycols, adipate-derived polyols, epoxy-modified polyols, polyether ester polyols, polycarbonate polyols, polycaprolactone diols, phenolic polyols, amine-modified polyols, etc.; and polyols such as ethylene glycol, diethylene glycol, 1,3-propanediol, 1,2-propanediol, propylene glycol, dipropylene glycol, 1,4-butanediol, 1,5-pentanediol, 1,6-hexanediol, 1,6-hexane glycol, 1,9-nonanediol, acryl polyols, fluorocarbon polyols, polybutadiene polyols, polyhydroxy polyols, trimethylolpropane, trimethylolethane, hexanetriol, phosphoric acid, neopentyl glycol, pentaerythritol, castor-oil-derived polyols, polymer polyols, methylpentanediol, halogen-containing polyols, phosphorus-containing polyols, ethylenediamine, α-methylglucoside, sorbitol, sucrose, etc.

A process for producing the urea-urethane compound represented by the formula (V) of the second aspect of the present invention is not limited. This compound can be obtained, for example, by reacting a monophenol compound with an aromatic diisocyanate compound and a diamine compound of the following general formula (XV) according to the reaction formula (G) or (H) shown below:

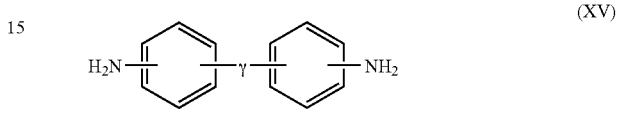

(XV)

wherein at least one hydrogen atom of each benzene ring may be replaced by a substituent group, which is preferably an aromatic compound residue, an aliphatic compound residue or a heterocyclic compound residue or which may be a nitro group, a hydroxyl group, a carboxyl group, a nitroso group, a nitrile group, a carbamoyl group, a ureido group, an isocyanate group, a mercapto group, a sulfo group, a sulfamoyl group or a halogen atom, each of the residues may have one or more substituents, and γ is any of —SO$_2$—, —O—, —(S)$_n$—, —(CH$_2$)$_n$—, —CO—, —CONH— and a group represented by any of the formulas (a);

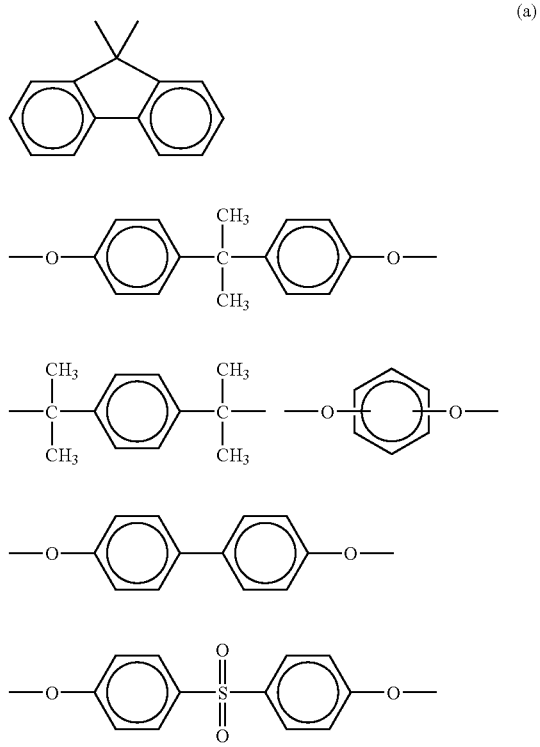

or is absent, and n is 1 or 2.

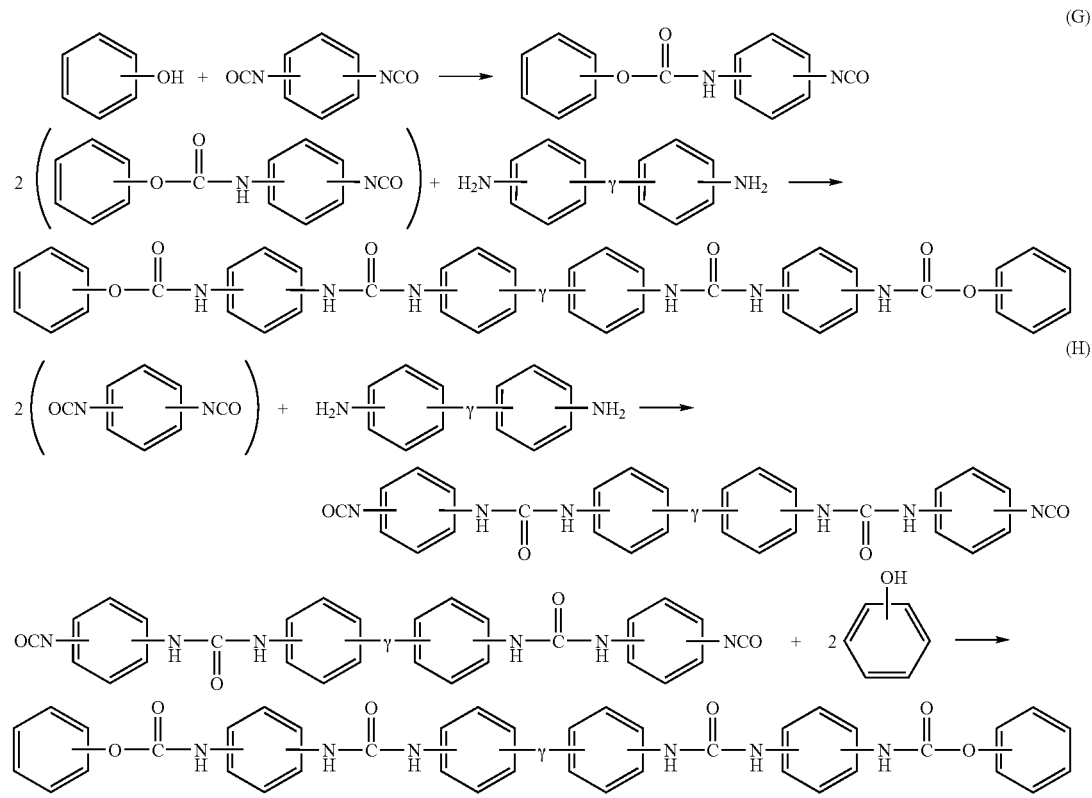

(G)

(H)

A process for producing the urea-urethane compound represented by the formula (VI) of the second aspect of the present invention is not limited. This compound can be obtained, for example, by reacting an aniline derivative with an aromatic diisocyanate compound and a dihydroxy compound of the following general formula (XVI) according to the reaction formula (J) or (K) shown below:

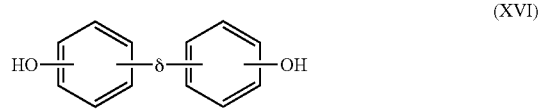

(XVI)

wherein at least one hydrogen atom of each benzene ring may be replaced by a substituent group, which is preferably an aromatic compound residue, an aliphatic compound residue or a heterocyclic compound residue or which may be a hydroxyl group, a nitro group, a nitrile group, a carbamoyl group, a sulfamoyl group, a carboxyl group, a nitroso group, an amino group, an oxyamino group, a nitroamino group, a hydrazino group, a ureido group, an isocyanate group, a mercapto group, a sulfo group or a halogen atom, each of the residues may have one or more substituents, $\delta$ is any of —$SO_2$—, —O—, —(S)$_n$—, —($CH_2$)$_n$—, —CO—, —CONH—, —NH—, —CH(COOR$_1$)—, —C(CF$_3$)$_2$— and —CR$_2$R$_3$— or is absent, R$_1$, R$_2$ and R$_3$ are independently an alkyl group, and n is 1 or 2.

(J)

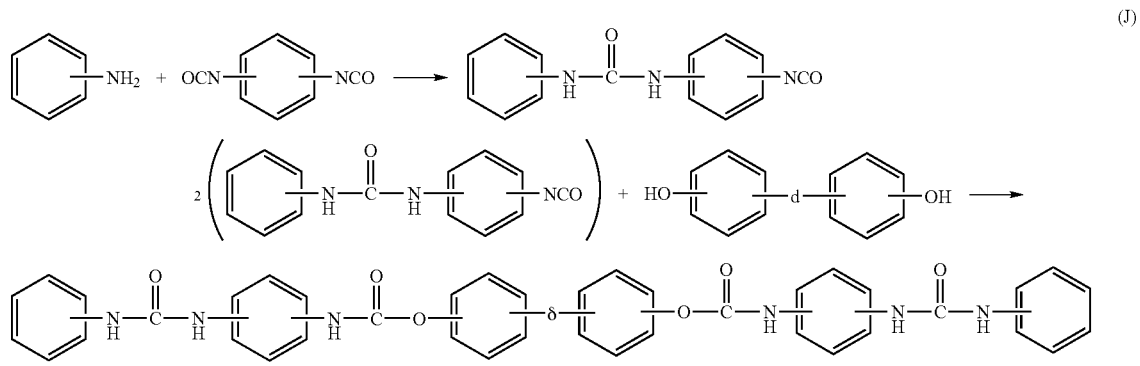

-continued (K)

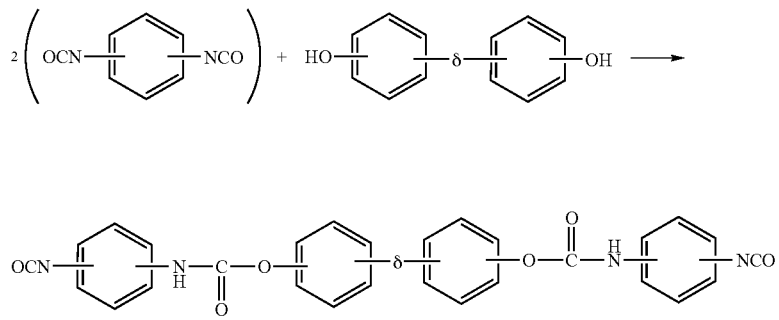

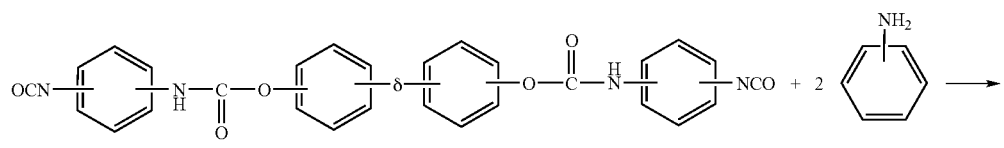

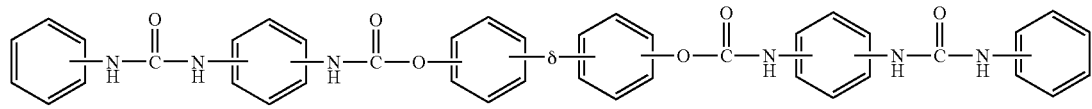

The compounds usable for synthesis of the urea-urethane compounds represented by the formulas (V) and (VI) of the second aspect of the present invention are explained below in detail.

The phenol compound usable for synthesizing the urea-urethane compound of the formula (V) is not particularly limited so long as it has one or more OH groups on the benzene ring. In addition, at least one hydrogen atom of the benzene ring may be replaced by a substituent other than OH group, such as an aromatic compound residue, an aliphatic compound residue, a heterocyclic compound residue, a nitro group, a carboxyl group, a nitroso group; a nitrile group, a carbamoyl group, a ureido group, an isocyanate group, a mercapto group, a sulfo group, a sulfamoyl group or a halogen atom. The preferable phenol compound includes, for example, phenols such as phenol, cresol, xylenol, p-ethylphenol, o-isopropylphenol, resorcinol, p-tert-butylphenol, p-tert-octylphenol, 2-cyclohexylphenol, 2-allylphenol, 4-indanol, thymol, 2-naphthol, nitro-substituted phenols (e.g. p-nitrophenol), halogen-substituted phenols (e.g. o-chlorophenol and p-chlorophenol), 4-phenylphenol, 4-hydroxyphenyl-4'-methylphenyl sulfone, 3-chloro-4-hydroxyphenyl-4'-methylphenyl sulfone, 4-isopropylphenyl-4'-hydroxyphenyl sulfone, 4-isopropyloxyphenyl-4'-hydroxyphenyl sulfone, 4-hydroxyphenyl-4'-benzyloxyphenyl sulfone, 4-isopropylphenyl-4'-hydroxyphenyl sulfone, 4-hydroxy-4'-isopropoxydiphenyl sulfone, phenyl salicylate, salicylanilide, methyl 4-hydroxybenzoate, benzyl 4-hydroxybenzoate, (4'-chlorobenzyl) 4-hydroxybenzoate, dimethyl 3-hydroxyphthalate, 4-methoxyphenol, 4-(benzyloxy)phenol, 4-hydroxybenzaldehyde, 4-n-octyloxysalicylic acid, 4-n-butyloxysalicylic acid, 4-n-pentyloxysalicylic acid, 3-n-dodecyloxysalicylic acid, 3-n-octanoyloxysalicylic acid, 4-n-octyloxycarbonylaminosalicylic acid, 4-n-octanoyloxycarbonylaminosalicylic acid, etc. The phenol compound also includes phenol compounds having one or more substituents including carboxyl group, nitroso group, nitrile group, carbamoyl group, ureido group, isocyanate group, mercapto group, sulfo group, sulfamoyl group, etc. However, as such phenols, those having an amino group are not desirable. Since the amino group has a higher reactivity with an isocyanate group than does an OH group, the amino group reacts with the isocyanate group before the OH group, so that it is difficult in some cases to obtain a desired compound.

The aromatic diisocyanate compound usable for synthesizing the urea-urethane compound of the formula (V) or (VI) is not particularly limited so long as it has two isocyanate groups bonded to its benzene ring. The aromatic diisocyanate compound includes, for example, p-phenylene diisocyanate, 2,5-dimethoxybenzene-1,4-diisocyanate, 2,4-toluene diisocyanate and 2,6-toluene diisocyanate. Especially preferable examples of the aromatic diisocyanate compound are toluene diisocyanates. Of the toluene diisocyanates, 2,4-toluene diisocyanate is preferable. Besides 2,4-toluene diisocyanate, mixtures of 2,4-toluene diisocyanate and 2,6-toluene diisocyanate are generally on the market and available at a low price and may also be used as the aromatic diisocyanate. The mixtures of these toluene diisocyanate isomers are liquid at ordinary temperature.

The diamine compound of the general formula (XV) which is usable for synthesizing the urea-urethane compound of the formula (V) includes, for example, aromatic diamines such as 4,4'-diamino-3,3'-diethyldiphenylmethane, 4,4'-diaminobenzanilide, 3,5-diaminochlorobenzene, diaminodiphenyl ether, 3,3'-dichloro-4,4'-diaminodiphenylmethane, 3,3'-dimethyl-4,4'-diaminodiphenylmethane, tolidine base, dianisidine, bis[4-(m-aminophenoxy)phenyl] sulfone, bis[4-(p-aminophenoxy)phenyl] sulfone, bis[3-methyl-4-(p-aminophenoxy)phenyl] sulfone, 3,3'-dimethoxy-4,4'-diaminobiphenyl, 3,3'-dimethyl-4,4'-diaminobiphenyl, 2,2'-dichloro-4,4'-diamino-5,5'-dimethoxybiphenyl, 2,2',5,5'-tetrachloro-4,4'-diaminobiphenyl, o-tolidine sulfone, 2,4'-diaminobiphenyl, 2,2'-diaminobiphenyl, 4,4'-diaminobiphenyl, 2,2'-dichloro-4,4'-diaminobiphenyl, 3,3'-dichloro-4,4'-diaminobiphenyl, 2,2'-dimethyl-4,4'-diaminobiphenyl, 4,4'-thiodianiline, 2,2'-dithiodianiline, 4,4'-dithiodianiline, 4,4'-diaminodiphenyl ether, 3,3'-diaminodiphenyl ether, 3,4'-diaminodiphenyl ether, 4,4'-diaminodiphenylmethane, 3,4'-diaminodiphenylmethane, bis(3-amino-4-chlorophenyl)sulfone, bis(3,4-diaminophenyl)sulfone, 4,4'-diaminodiphenyl sulfone, 3,3'-diaminodiphenyl sulfone, 3,4'-diaminodiphenyl sulfone, 3,3'-diaminodiphenylmethane, 4,4'-diaminodiphenylamine, 4,4'-ethylenedianiline, 4,4'-diamino-2,2'-dimethyldibenzyl, 3,3'-diaminobenzophenone, 4,4'-diaminobenzophenone, 1,4-bis(4-aminophenoxy)benzene, 1,3-bis(4-aminophenoxy)benzene, 1,3-bis(3-aminophenoxy)benzene, 9,9-bis(4-aminophenyl)fluorene, 2,2-bis(4-aminophenoxyphenyl)propane, 4,4'-bis(4-aminophenoxy)-diphenyl, dianisidine, 3,3'-dichlorobenzidine, etc.

The aniline derivative usable for synthesizing the urea-urethane compound of the formula (VI) is not particularly limited so long as it is an aniline compound having one or more amino groups on the benzene ring. In addition, at least one hydrogen atom of the benzene ring may be replaced by an aromatic compound residue, an aliphatic compound residue, a heterocyclic compound residue, a hydroxyl group, a nitro group, a nitrile group, a carbamoyl group, a sulfamoyl group, a carboxyl group, a nitroso group, an amino group, an oxyamino group, a nitroamino group, a hydrazino group, a ureido group, an isocyanate group, a mercapto group, a sulfo group or a halogen atom. The preferable aniline derivative includes, for example, aniline, o-toluidine, m-toluidine, p-toluidine, o-anisidine, p-anisidine, p-phenetidine, N,N-dimethyl-p-phenylenediamine, N,N-diethyl-p-phenylenediamine, 2,4-dimethoxyaniline, 2,5-dimethoxyaniline, 3,4-dimethoxyaniline, p-aminoacetanilide, carboxy-substituted anilines (e.g. p-aminobenzoic acid), hydroxyl-substituted anilines (e.g. o-aminophenol, m-aminophenol, 2-amino-4-chlorophenol and p-aminophenol), 2,3-xylidine, 2,4-xylidine, 3,4-xylidine, 2,6-xylidine, nitrile-substituted anilines (e.g. 4-aminobenzonitrile), anthranilic acid, p-cresidine, halogen-substituted anilines (e.g. 2,5-dichloroaniline, 2,6-dichloroaniline, 3,4-dichloroaniline, 3,5-dichloroaniline, 2,4,5-trichloroaniline, o-chloroaniline, m-chloroaniline and p-chloroaniline), α-naphthylamine, aminoanthracene, o-ethylaniline, methyl p-aminobenzoate, ethyl p-aminobenzoate, n-propyl p-aminobenzoate, isopropyl p-aminobenzoate, butyl p-aminobenzoate, dodecyl p-aminobenzoate, benzyl p-aminobenzoate, o-aminobenzophenone, m-aminoacetophenone, p-aminoacetophenone, m-aminobenzamide, o-aminobenzamide, p-aminobenzamide, p-amino-N-methylbenzamide, 3-amino-4-methylbenzamide, 3-amino-4-methoxybenzamide, 3-amino-4-chlorobenzamide, carbamoylanilines (e.g. p-(N-phenylcarbamoyl)aniline, p-[N-(4-chlorophenyl)carbamoyl]aniline, p-[N-(4-aminophenyl)carbamoyl]aniline, 2-methoxy-5-(N-phenylcarbamoyl)aniline, 2-methoxy-5-[N-(2'-methyl-3'-chlorophenyl)carbamoyl]aniline and 2-methoxy-5-[N-(2'-chlorophenyl)carbamoyl]aniline), 5-acetylamino-2-methoxyaniline, 4-acetylaminoaniline, 4-(N-methyl-N-acetylamino)aniline, 2,5-diethoxy-4-(N-benzoylamino)aniline, 2,5-dimethoxy-4-(N-benzoylamino)aniline, 2-methoxy-4-(N-benzoylamino)-5-methylaniline, sulfamoylanilines (e.g. 4-sulfamoylaniline, 3-sulfamoylaniline, 2-chloro-5-N-phenylsulfamoylaniline, 2-methoxy-5-N,N-diethylsulfamoylaniline and 2,5-dimethoxy-4-N-phenysulfamoylaniline), 2-(N-ethyl-N-phenylaminosulfonyl)aniline, 4-dimethylaminosulfonylaniline, 4-diethylaminosulfonylaniline, sulfathiazole, 4-aminodiphenyl sulfone, 2-methoxy-5-benzylsulfonylaniline, 2-phenoxysulfonylaniline, 2-(2'-chlorophenoxy)sulfonylaniline, 3-anilinosulfonyl-4-methylaniline, nitro-substituted anilines (e.g. o-chloro-p-nitroaniline, o-nitro-p-chloroaniline, 2,6-dichloro-4-nitroaniline, 5-chloro-2-nitroaniline, o-nitroaniline, m-nitroaniline, p-nitroaniline, 2-methyl-4-nitroaniline, m-nitro-p-toluidine and 2-amino-5-nitrobenzonitrile), p-fluoroaniline, o-fluoroaniline, 3-chloro-4-fluoroaniline, 2,4-difluoroaniline, 2,3,4-trifluoroaniline, m-aminobenzotrifluoride and 2-amino-3-bromo-5-nitrobenzonitrile.

The aniline derivative also includes aniline derivatives having one or more substituents including carboxyl group, nitroso group, oxyamino group, nitroamino group, hydrazino group, ureido group, isocyanate group, mercapto group, sulfo group, etc.

The dihydroxy compound of the general formula (XVI) which is usable for synthesizing the urea-urethane compound of the formula (VI) includes diphenols such as 2,2-bis(4-hydroxyphenyl)propane, 2,2-bis(hydroxyphenyl)butane, 2,2-bis(hydroxyphenyl)pentane, 2,2-bis(hydroxyphenyl)heptane, 4,4'-biphenol, butyl bis(4-hydroxyphenyl)acetate, benzyl bis(4-hydroxyphenyl)acetate, bis(4-hydroxyphenyl)sulfone, bis(3-methyl-4-hydroxyphenyl)sulfone, bis(3,5-dimethyl-4-hydroxyphenyl)sulfone, bis(2-allyl-4-hydroxyphenyl)sulfone, bis(2-methyl-3-tert-butyl-4-hydroxyphenyl)sulfide, 4,4'-dihydroxydiphenyl ether, 4,4'-thiodiphenol, 4,4'-dihydroxybenzophenone, 2,2-bis(4-hydroxyphenyl)hexafluoropropane, 4,4'-dihydroxydiphenylmethane, 3,3'-dihydroxydiphenylamine, bis(4-hydroxy-3-methylphenyl)sulfide, etc. However, as such diphenols, those having an amino group are not desirable. Since the amino group has a higher reactivity with an isocyanate group than does an OH group, the amino group reacts with the isocyanate group before the OH group, so that it is difficult in some cases to obtain a desired compound.

The urea-urethane compound of the second aspect of the present invention may be obtained by mixing the isocyanate with the corresponding reactants in an organic solvent or without a solvent, reacting them, and then collecting the resulting crystals by filtration. As each of the reactants, one or more compounds may be used depending on purposes. As the solvent, any solvent may be used so long as it does not react with an isocyanate group and the functional groups of the reactants. The solvent includes, for example, aliphatic hydrocarbons, alicyclic hydrocarbons, aromatic hydrocarbons, chlorinated aliphatic hydrocarbons, chlorinated aromatic hydrocarbons, chlorinated alicyclic hydrocarbons, and ketones. Especially preferable are methyl ethyl ketone, toluene and the like, which dissolve the isocyanate and in which the reaction product has a low solubility. The reaction product obtained by the above reaction procedure is not always a single compound, but is obtained as a mixture of compounds different in the position of a substituent, in some cases.

Specific examples of the urea-urethane compound of the second aspect of the present invention are the following compounds ((E-1) to (E-43)).

(E-1) 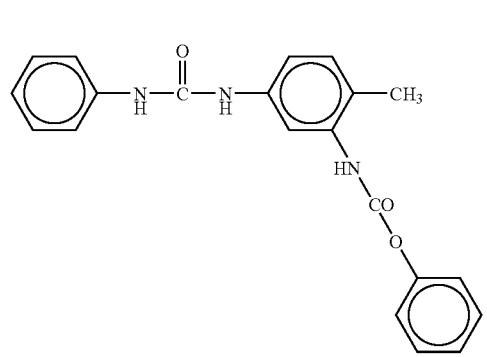
(E-2) 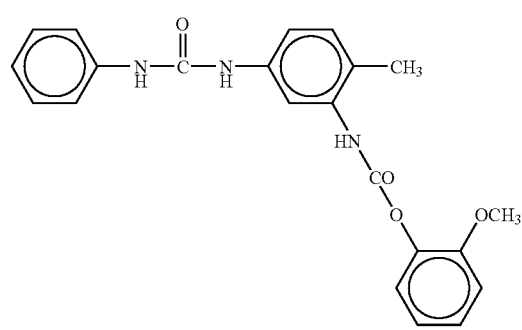
(E-3) 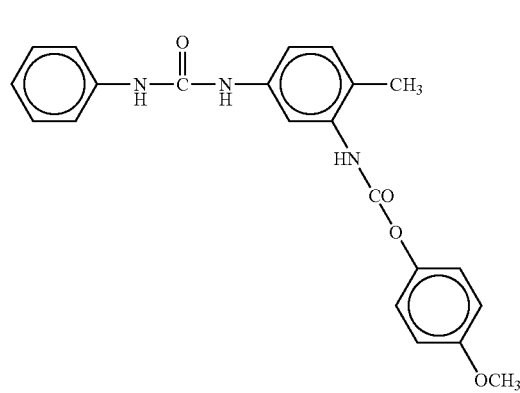
(E-4) 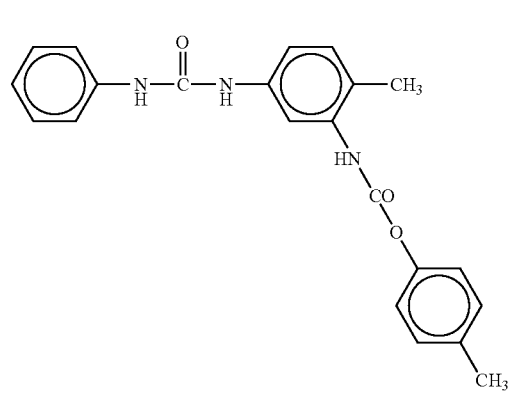
(E-5) 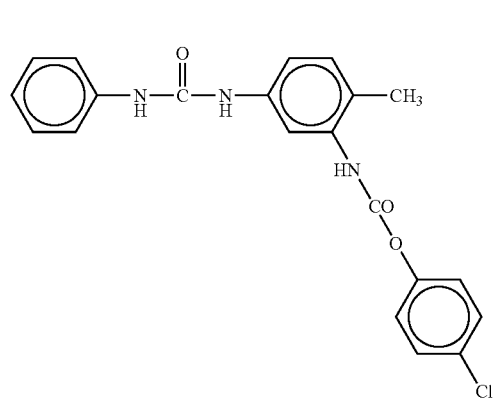
(E-6) 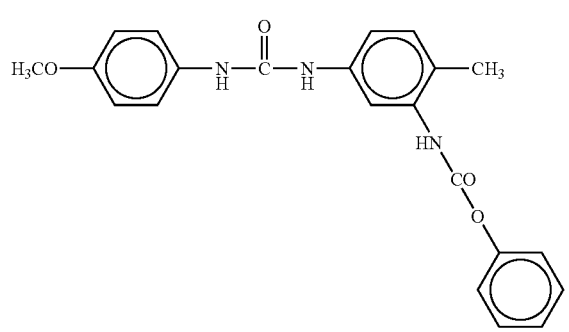
(E-7) 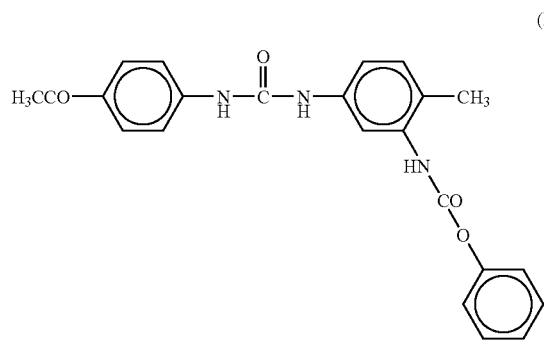
(E-8) 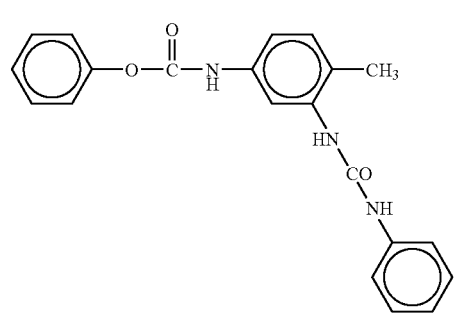

-continued
(E-9)
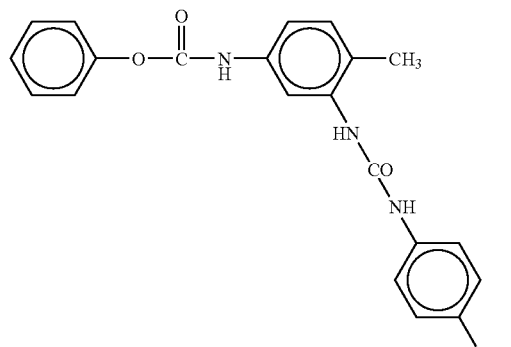
(E-10)
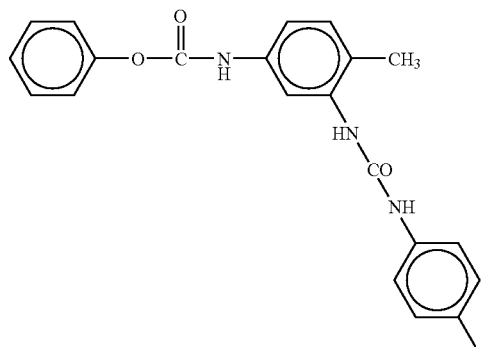
(E-11)
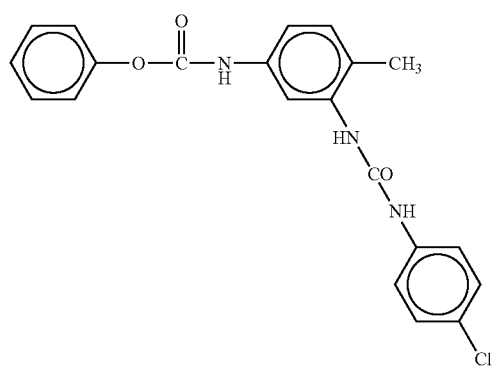
(E-12)
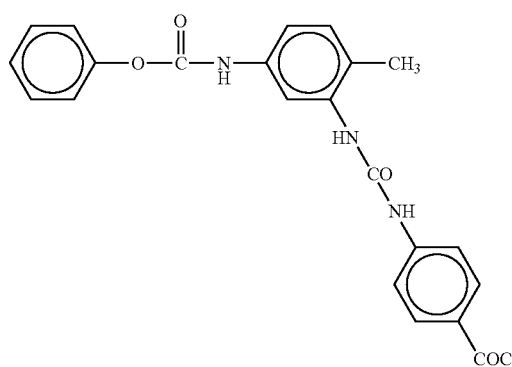
(E-13)
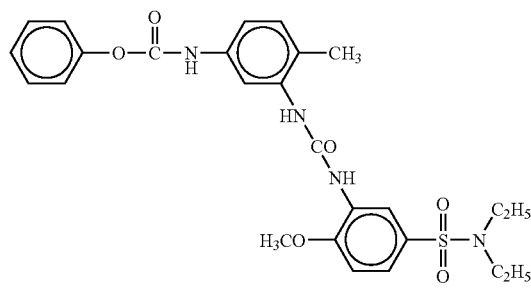
(E-14)
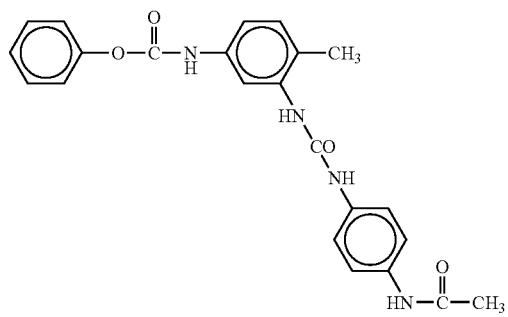
(E-15)
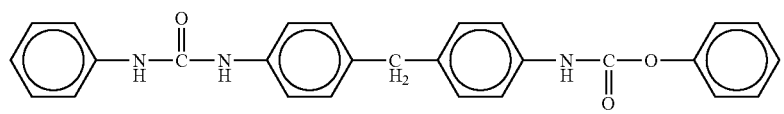
(E-16)
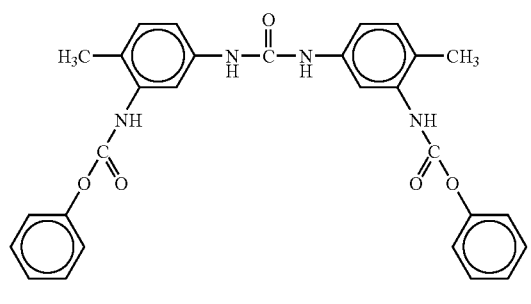
(E-17)
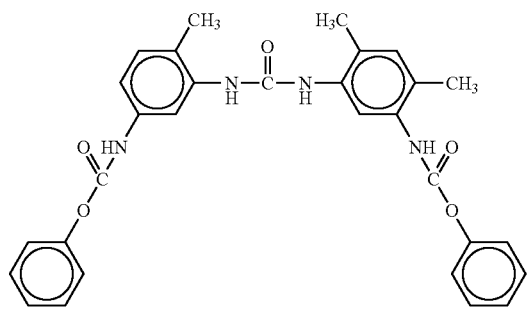

-continued
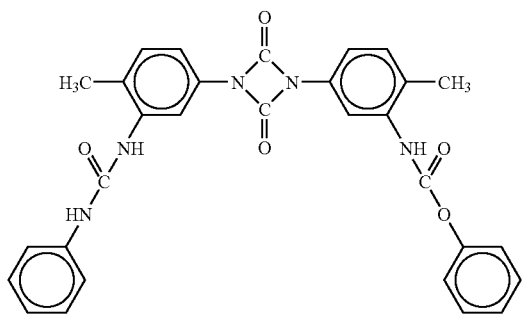
(E-18)
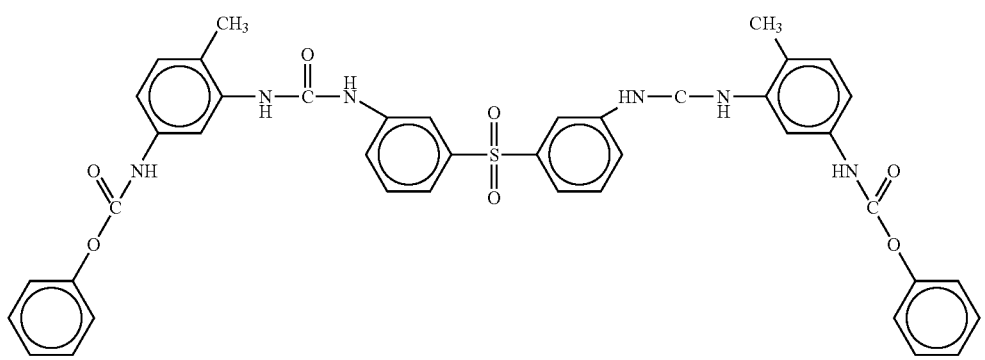
(E-19)
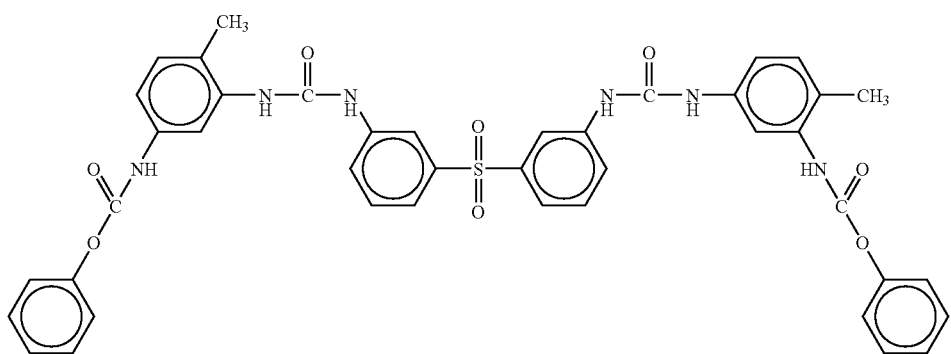
(E-20)
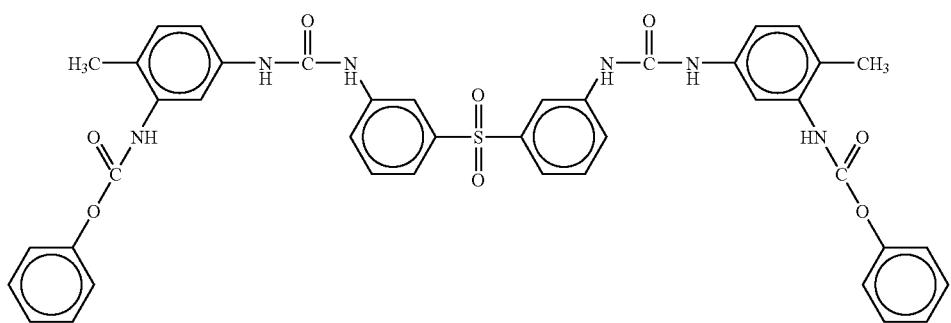
(E-21)

-continued
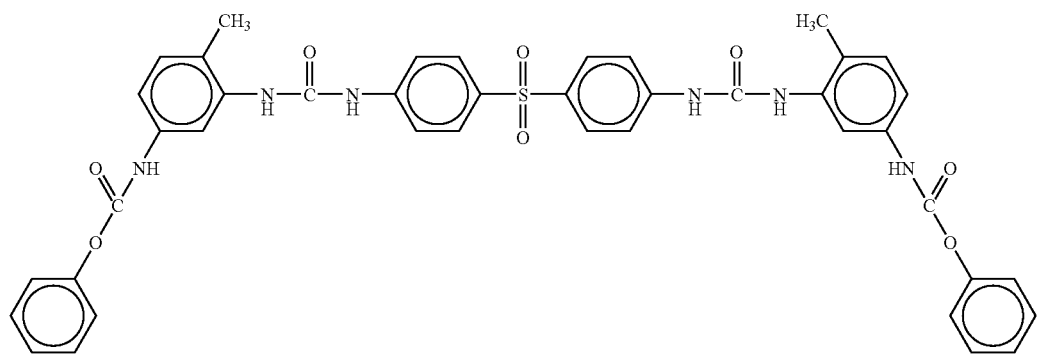
(E-22)
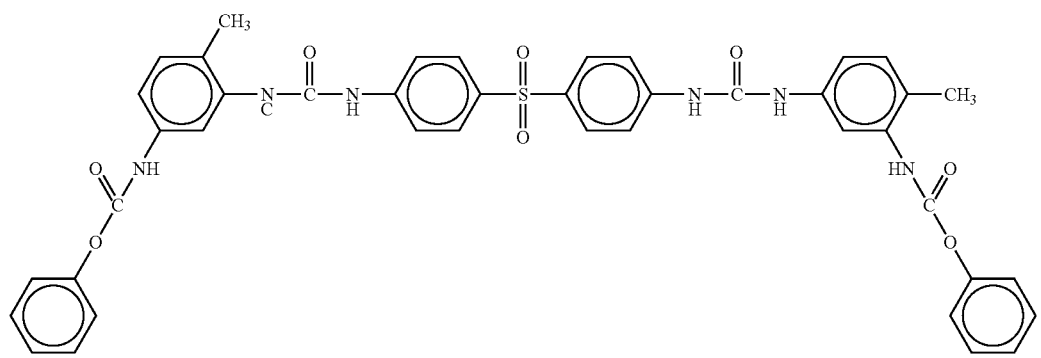
(E-23)
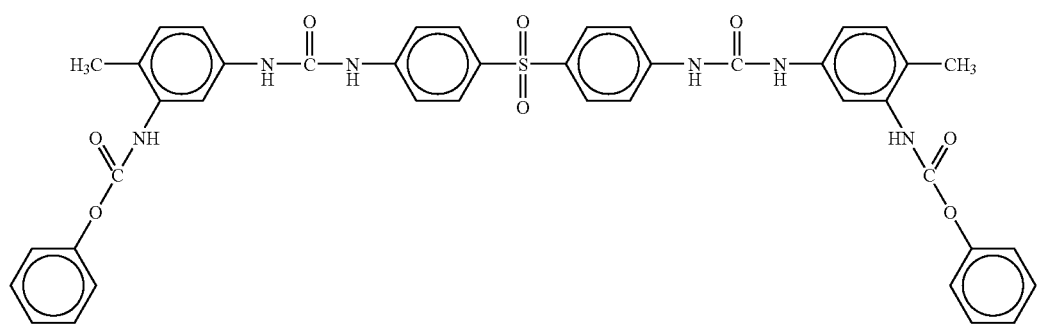
(E-24)
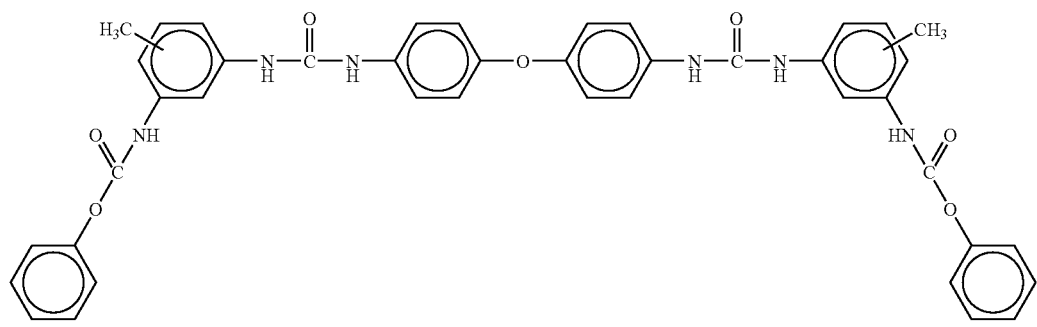
(E-25)

-continued
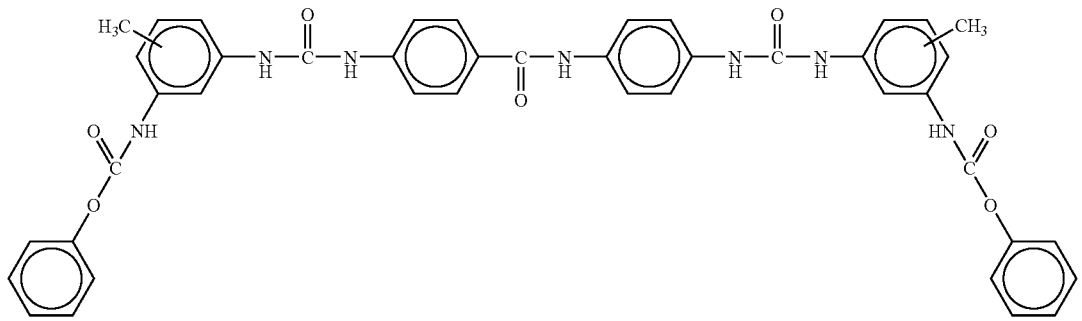
(E-26)
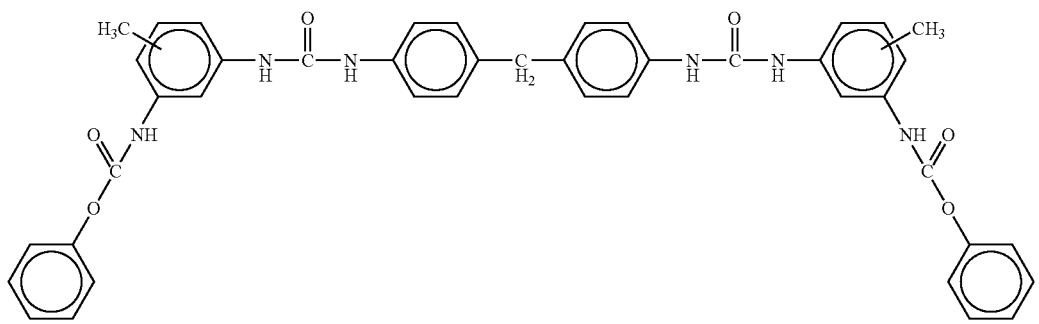
(E-27)
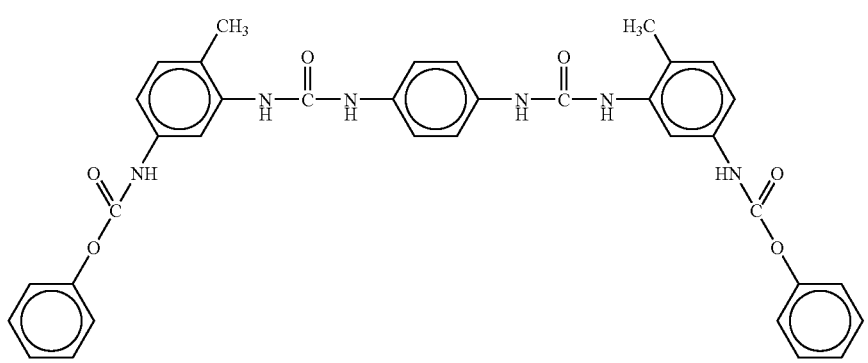
(E-28)
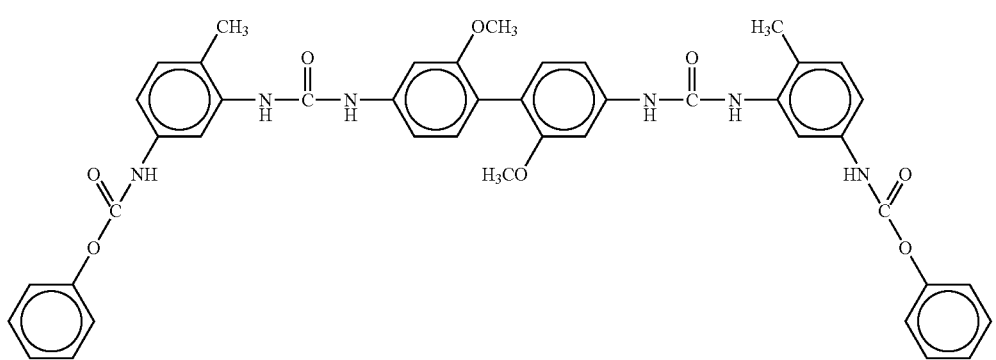
(E-29)

-continued
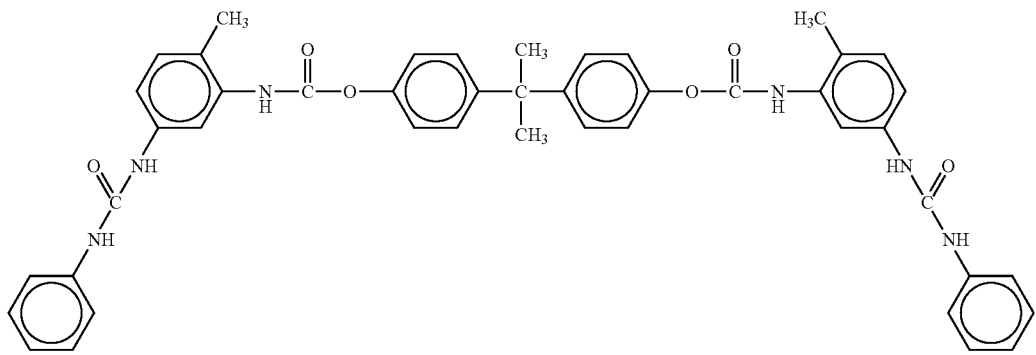
(E-30)
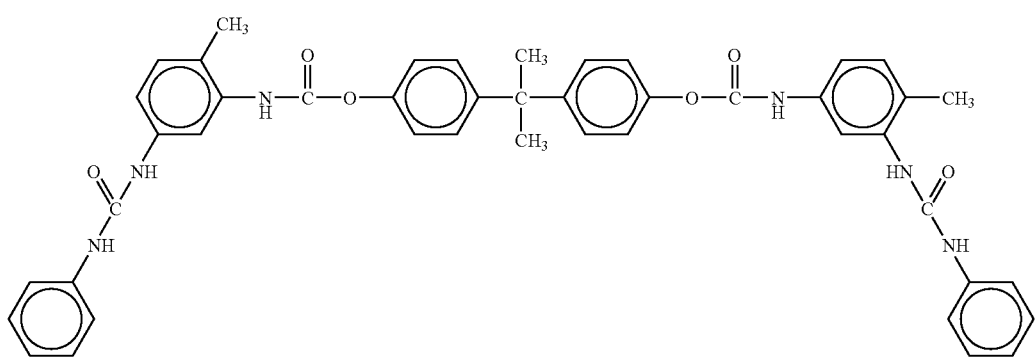
(E-31)
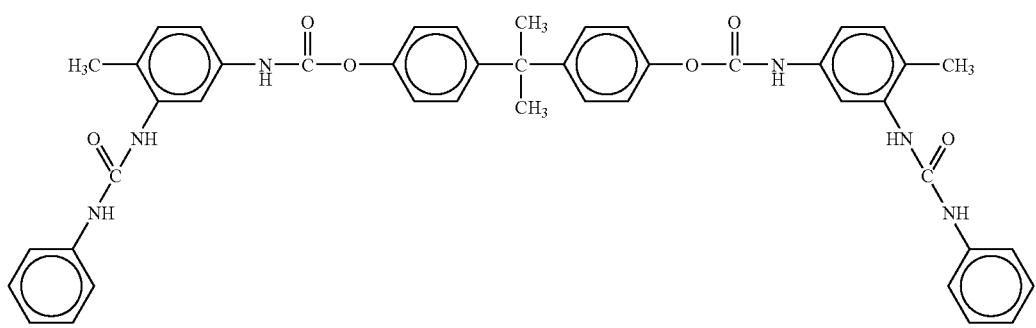
(E-32)
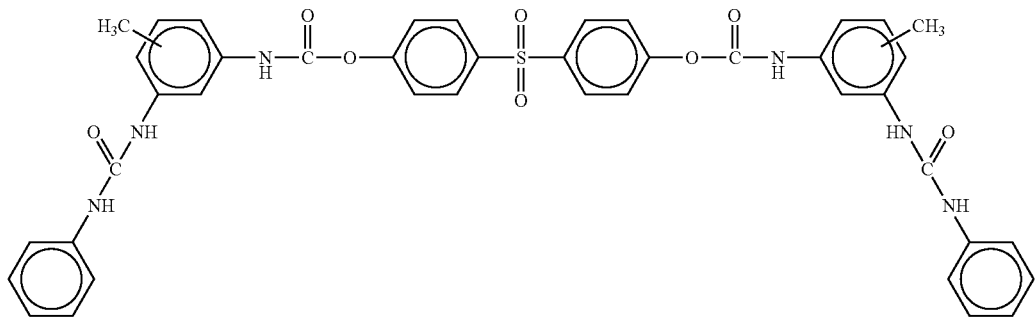
(E-33)

-continued
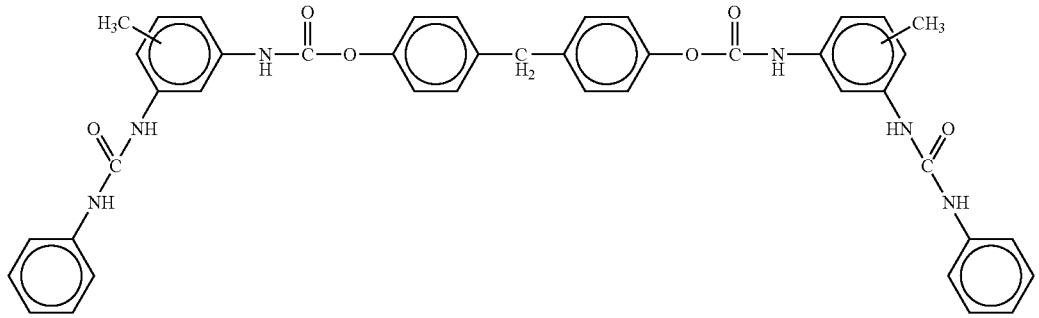
(E-34)
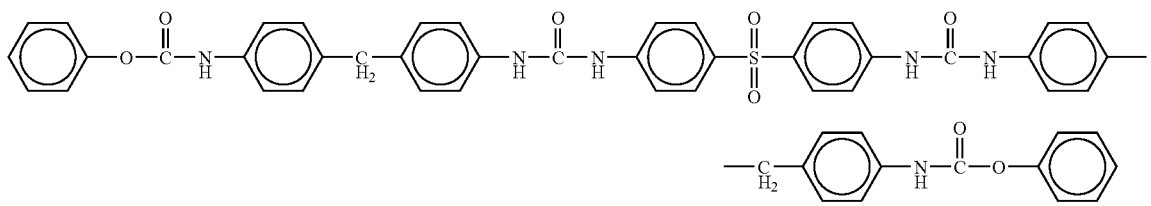
(E-35)
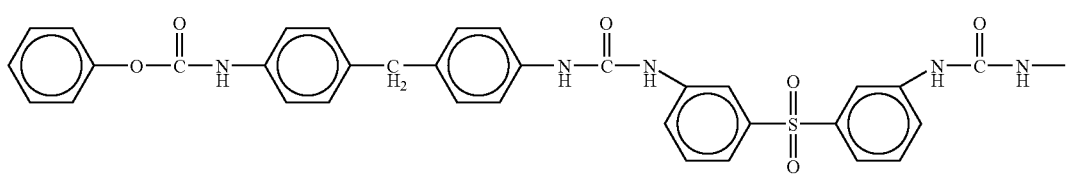
(E-36)
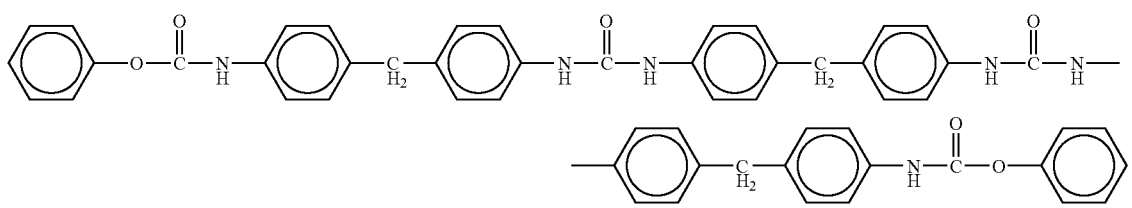
(E-37)
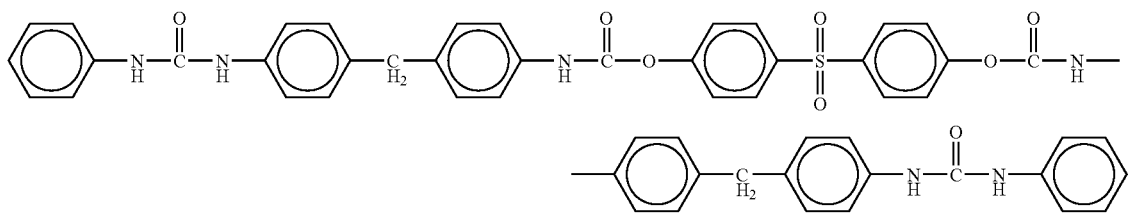
(E-38)
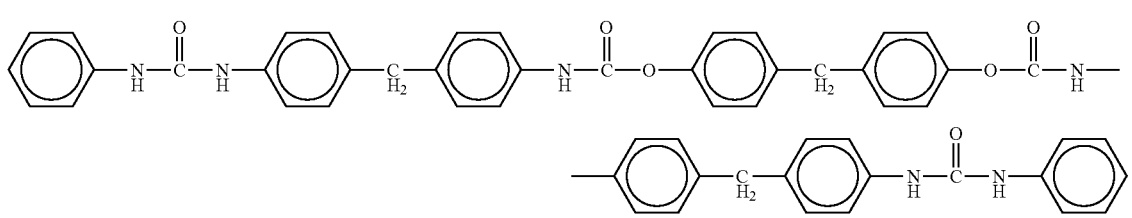
(E-39)

-continued
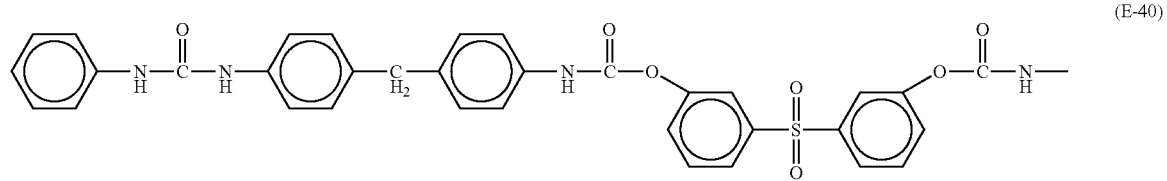
(E-40)
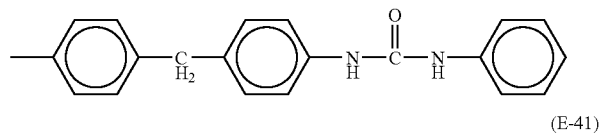
(E-41)
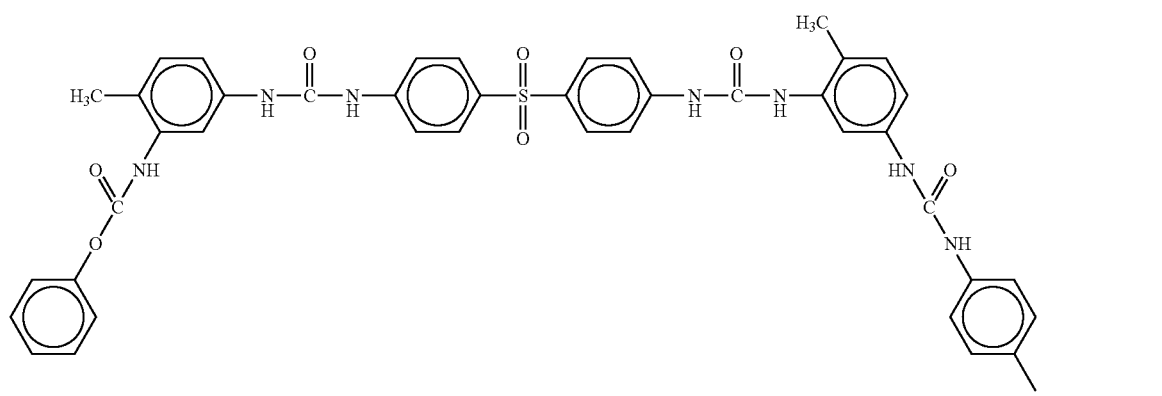
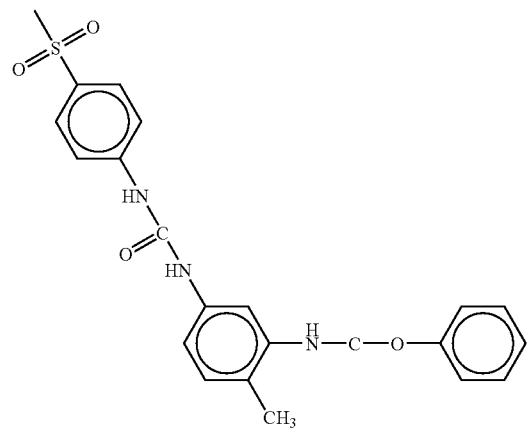
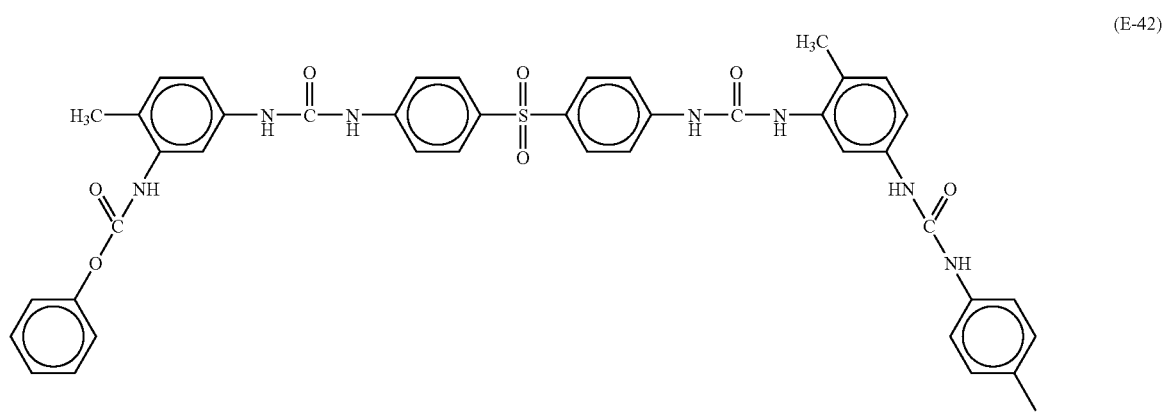
(E-42)

-continued

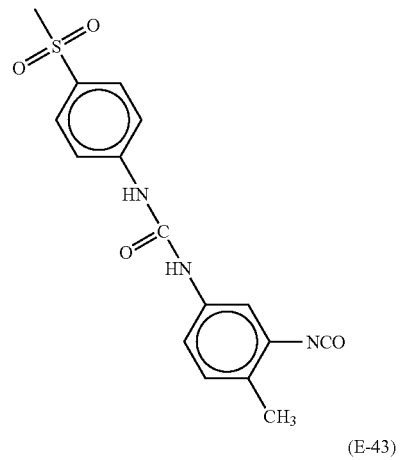

(E-43)

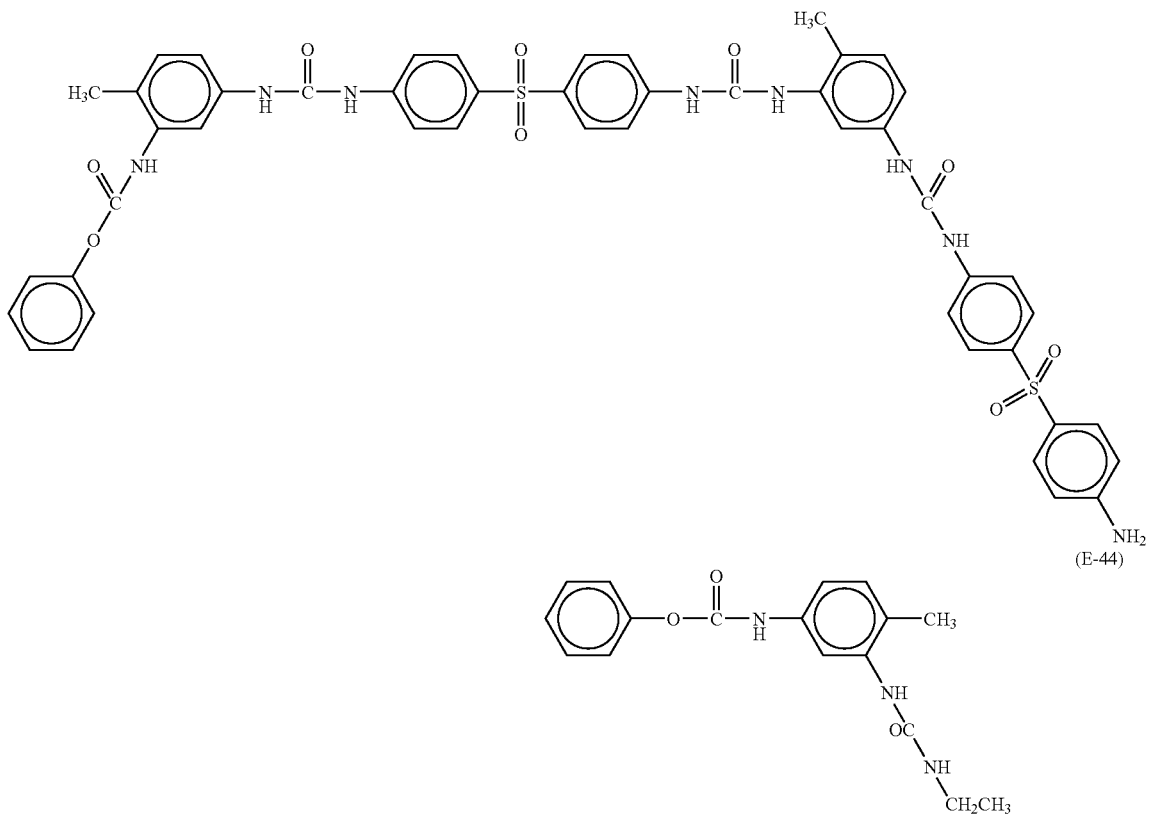

(E-44)

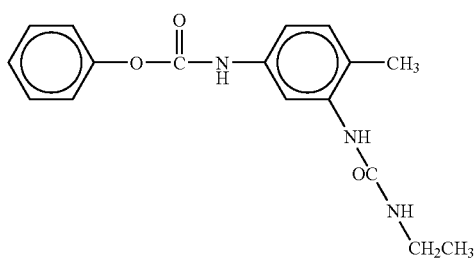

The urea-urethane compound of the second aspect of the present invention is useful in the case of, for example, recording materials.

Each of the urea-urethane compounds of the third to sixth aspects of the present invention has both at least one urea group and at least one urethane group.

In the urea-urethane compounds of the third to sixth aspects of the present invention, an aliphatic compound residue is bonded to the terminal oxygen atom of the urethane group. Therefore, the urea-urethane compounds can be obtained as compounds excellent in physical and chemical stability, in particular, heat stability. Moreover, the urea-urethane compounds can be obtained by using relatively inexpensive materials.

Preferable forms at the ends of the urea group vary depending on the molecular size of the urea-urethane compound. In the urea-urethane compound of the formula (c), each end of the urea group should be bonded to an aromatic compound residue. The aromatic compound residue is preferably an aromatic ring shown in the formula (d). In the urea-urethane compounds of the formulas (e) and (f) having a relatively large molecular size, a group at each end of the urea group is, for example, as follows: in the formula (e), the group at the end may be any of an aromatic compound residue, a heterocyclic compound residue and an aliphatic compound residue, and in the formula (f), the group at the end may be either an aromatic compound residue or a heterocyclic compound residue. In both the formulas (e) and (f), each end of the urea group is preferably an aromatic compound residue. The urea group and the urethane group are adjacent to each other through at least one compound residue (such a structure portion is hereinafter referred to as a urea-urethane structure portion). It is preferable that only one compound residue be present between the urea group and the urethane group. In addition, this residue is preferably an aromatic ring.

Although a mechanism by which the urea-urethane compounds of the third to sixth aspects of the present invention have a function as a developer is unknown, it is conjectured that the function is due to the interaction between the urea group and the urethane group in the urea-urethane structure portion. The number of urea-urethane structure portions is two or more in the formulas (e) and (f). On the other hand, the number of urea-urethane structure portions is one in some cases in the urea-urethane compound of the formula (c) or (d). In this case, the following is conjectured: in the urea-urethane compound of the formula (c) or (d), a residue to be bonded to each end of the urethane group is limited to the most preferable residue, i.e., an aromatic compound residue in order to enable the compound to perform its function as a developer to a certain extent; on the other hand, in the formulas (e) and (f), a residue to be bonded to each end of the urethane group need not always be an aromatic compound residue.

It is sufficient that the number of urea-urethane structure portions present in the molecule is 1 to 10, preferably 1 to 5, more preferably 2 to 4.

The urea-urethane compound may have in the molecule one or more other urea groups and urethane groups in addition to the urea-urethane structure portion(s).

The term "aliphatic" used in the case of the third to sixth aspects of the present invention includes the term "alicyclic".

The term "aliphatic compound residue" used in the case of the third to sixth aspects of the present invention means a residue bonded by the carbon atom of the aliphatic hydrocarbon portion in the residue. The term "aromatic compound residue" used therein means a residue bonded by the carbon atom of the aromatic ring such as benzene ring in the residue. The term "heterocyclic compound residue" used therein means a residue bonded by the carbon atom forming the heterocyclic ring in the residue.

Preferable examples of the substituents of the aliphatic compound residue, the heterocyclic compound residue and the aromatic compound residue are alkyl groups, cycloalkyl groups, phenyl group, amide group, alkoxyl groups, nitro group, nitrile group, halogen atoms, formyl group, dialkylamino groups, toluenesulfonyl group and methanesulfonyl group.

When it is considered that the urea-urethane compounds of the third to sixth aspects of the present invention are used as a developer or in a heat-sensitive recording material, the total number of one or more aliphatic urethane groups and one or more urea groups, which are present in the molecular structure of each of the urea-urethane compounds is not more than 11 and not less than 2, preferably not more than 11 and not less than 3, more preferably not more than 11 and not less than 4. The ratio of the urethane group(s) to the urea group(s) is preferably 1:3 to 3:1, more preferably 1:2 to 2:1, most preferably 1:1. The molecular weight of the urea-urethane compounds is 5,000 or less, preferably 2,000 or less.

In a heat-sensitive recording material, a compound having a melting point is preferably used. The melting point or the urea-urethane compounds of the third to sixth aspects of the present invention ranges preferably from 40° C. to 500° C., more preferably from 60° C. to 300° C., most preferably from 60° C. to 250° C.

Although a process for synthesizing each of the urea-urethane compounds of the third to sixth aspects of the present invention is not particularly limited, a process in which the urea-urethane compound is synthesized by the reaction of an isocyanate compound with an alcohol and an amine compound is preferably because of its ease.

That is, although a process for producing the urea-urethane compound of the formula (c) of the third aspect of the present invention is not particularly limited, this compound can be obtained, for example, by reacting an alcohol compound of the following formula (m) with an isocyanate compound of the following formula (n) and an amine compound of the following formula (o) according to, for example, the reaction formula (A') or (B') shown below:

R—OH            (m)

wherein R is an aliphatic compound residue which may have one or more substituents;

OCN-A$_1$-NCO            (n)

wherein A$_1$ is an aromatic compound residue which may have one or more substituents; and

A$_2$-NH$_2$            (o)

wherein A$_2$ is an aromatic compound residue which may have one or more substituents.

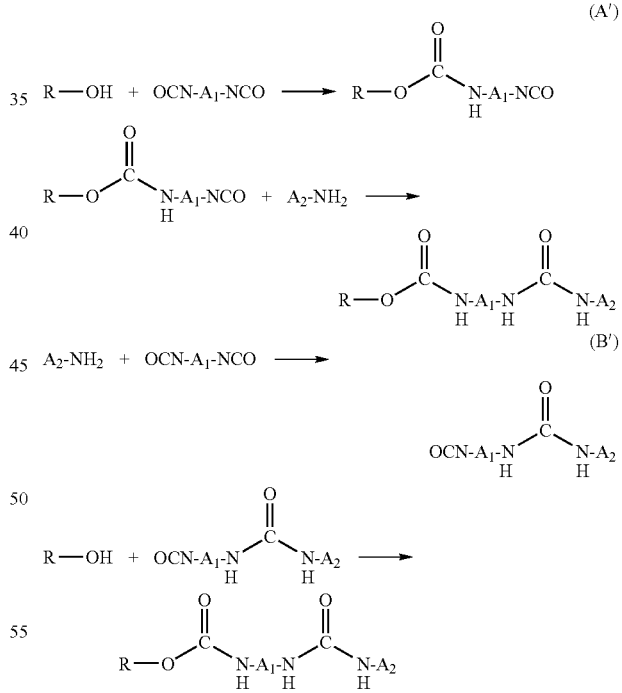

Although a process for producing the urea-urethane compound of the formula (d) of the fourth aspect of the present invention is not particularly limited, this compound can be obtained, for example, by reacting an alcohol compound of the formula (m) with an isocyanate compound of the following formula (p) and an amine compound of the following formula (q) according to, for example, the reaction formula (C') or (D') shown below:

(p)

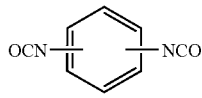

wherein at least one hydrogen atom of the benzene ring may be replaced by an aromatic compound residue, an aliphatic compound residue, a heterocyclic compound residue, a hydroxyl group, a nitro group, a nitrile group, a carbamoyl group, a sulfamoyl group, a carboxyl group, a nitroso group, an amino group, an oxyamino group, a nitroamino group, a hydrazino group, a ureido group, an isocyanate group, a mercapto group, a sulfo group or a halogen atom, and each of the residues may have one or more substituents; and (q)

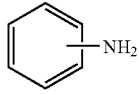

wherein at least one hydrogen atom of the benzene ring may be replaced by an aromatic compound residue, an aliphatic compound residue or a heterocyclic compound residue, and each of the residues may have one or more substituents.

-continued

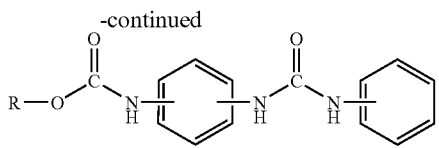

Although a process for producing the urea-urethane compound of the formula (e) of the fifth aspect of the present invention is not particularly limited, this compound can be obtained, for example, by reacting an alcohol compound of the general formula (m) with an isocyanate compound of the following general formula (r) and an amine compound of the following general formula (s) according to, for example, the reaction formula (E') or (F') shown below:

$$OCN-Y-NCO \qquad (r)$$

wherein Y is an aromatic compound residue, a heterocyclic compound residue or an aliphatic compound residue, each of the residues being able to have one or more substituents; and $$\alpha_1-(NH_2)_n \qquad (s)$$

wherein $\alpha_1$ is an aromatic compound residue, aliphatic compound residue or heterocyclic compound residue having a valence of 2 or more, n is an integer of 2 or more, and each of the residues may have one or more substituents.

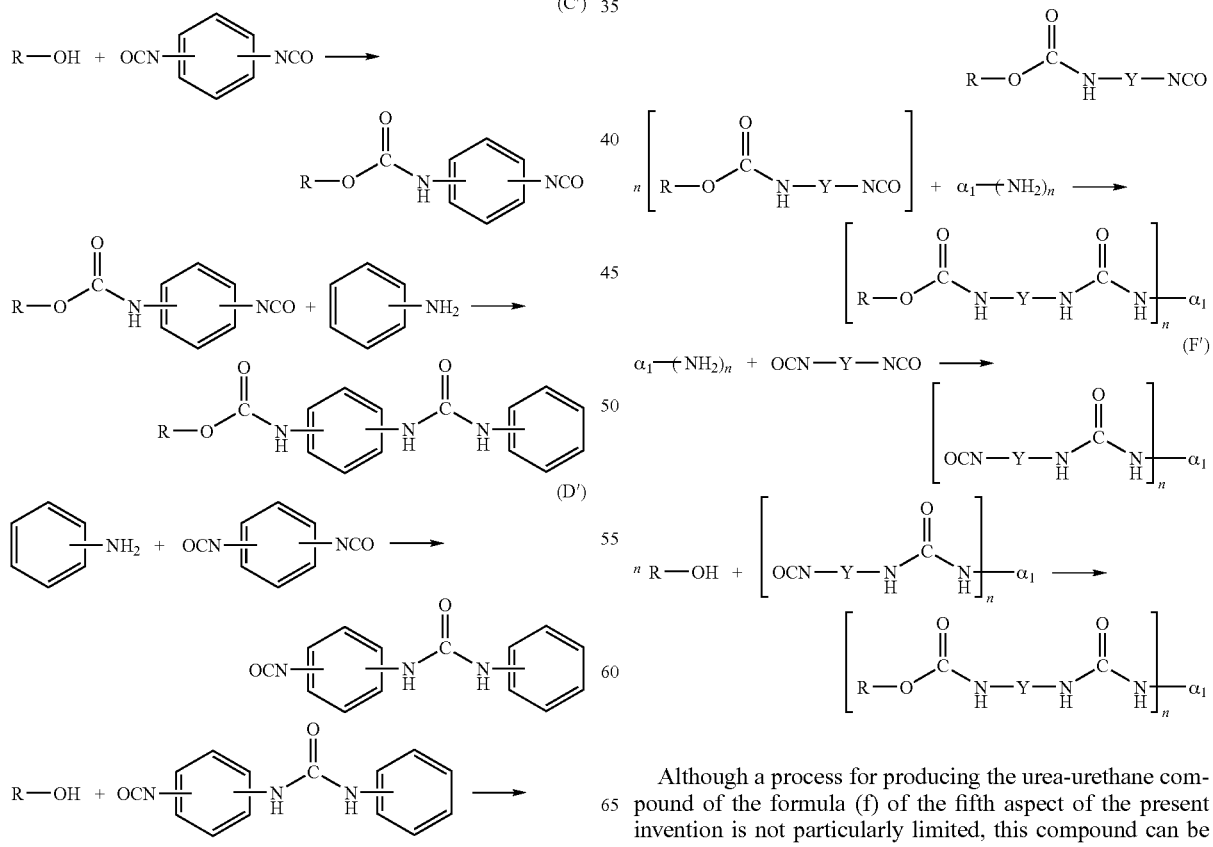

Although a process for producing the urea-urethane compound of the formula (f) of the fifth aspect of the present invention is not particularly limited, this compound can be obtained, for example, by reacting an amine compound of the following general formula (t) with an isocyanate compound of the general formula (r) and an alcohol compound of the following general formula (u) according to, for example, the reaction formula (G') or (H') shown below:

  (t)

wherein $Z_1$ is an aromatic compound residue or a heterocyclic compound residue, each of the residues being able to have one or more substituents; and

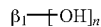  (u)

wherein $\beta_1$ is an aliphatic compound residue which has a valence of 2 or more and may have one or more substituents, and n is an integer of 2 or more

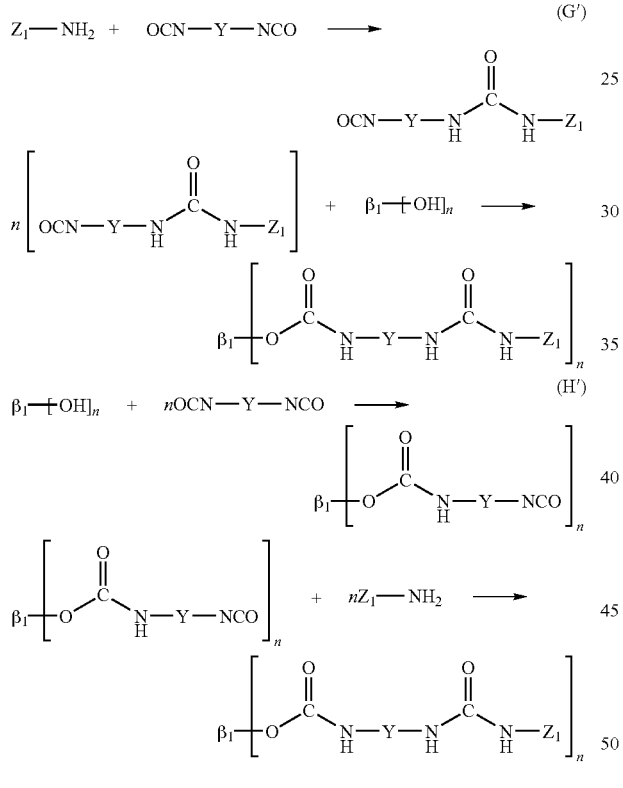

Although a process for producing the urea-urethane compound of the formula (g) of the sixth aspect of the present invention is not particularly limited, this compound can be obtained, for example, by reacting an alcohol compound of the formula (u) with an isocyanate compound of the formula (p) and an amine compound of the formula (q) according to, for example, the reaction formula (i') or (J') shown below:

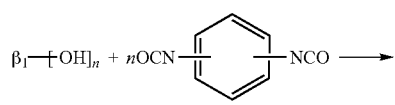  (i')

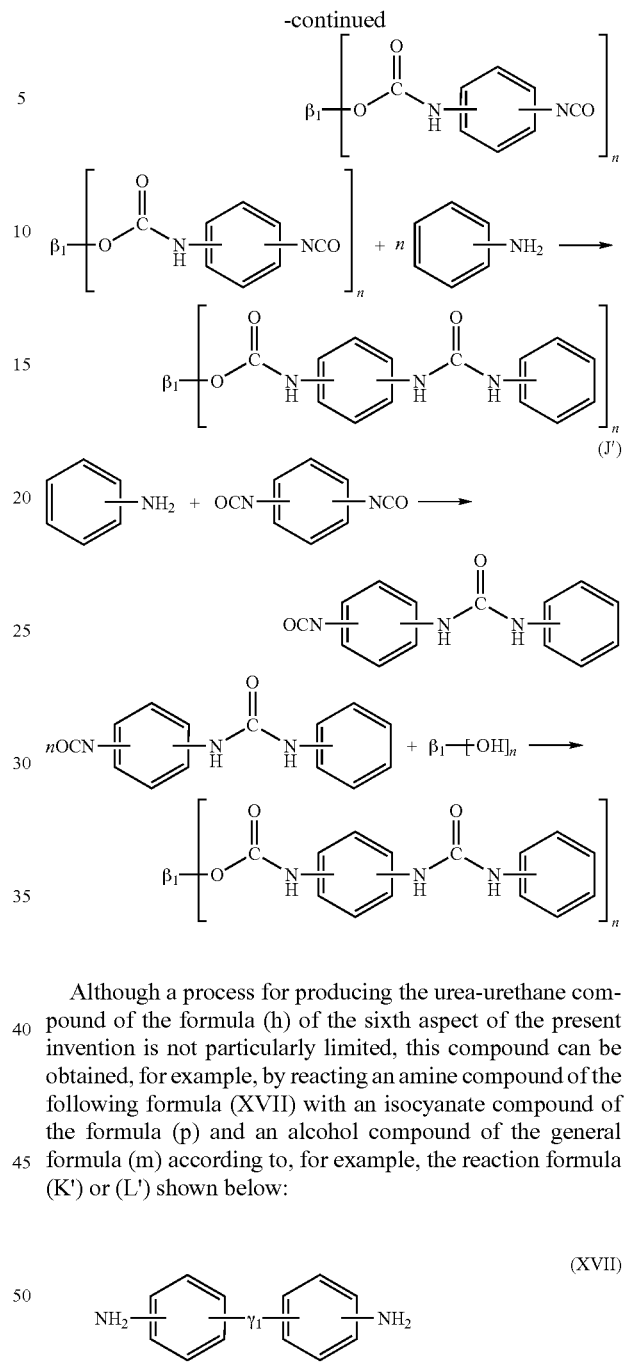

Although a process for producing the urea-urethane compound of the formula (h) of the sixth aspect of the present invention is not particularly limited, this compound can be obtained, for example, by reacting an amine compound of the following formula (XVII) with an isocyanate compound of the formula (p) and an alcohol compound of the general formula (m) according to, for example, the reaction formula (K') or (L') shown below:

wherein at least one hydrogen atom of each benzene ring may be replaced by an aromatic compound residue, an aliphatic compound residue, a heterocyclic compound residue, a nitro group, a hydroxyl group, a carboxyl group, a nitroso group, a nitrile group, a carbamoyl group, a ureido group, an isocyanate group, a mercapto group, a sulfo group, a sulfamoyl group or a halogen atom, each of the residues may have one or more substituents, $\gamma_1$ is a group selected from the group consisting of —$SO_2$—, —O—, —$(S)_n$—, —$(CH_2)_n$—, —CO—, —CONH—, —NH—, —CH($COOR_1$)—, —C($CF_3)_2$—, —$CR_2R_3$— and any of groups represented by the formulas (a);

(a)
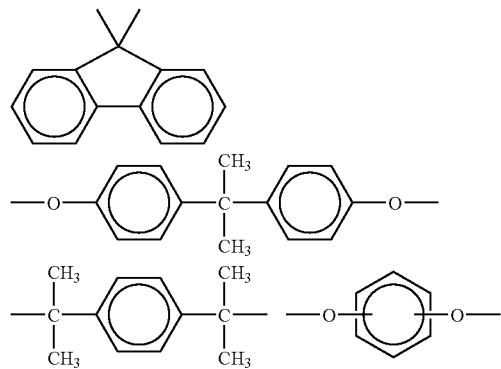
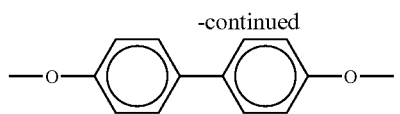
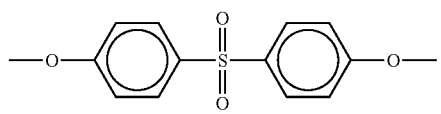
or is absent, each of $R_1$, $R_2$ and $R_3$ is an alkyl group, and n is 1 or 2.
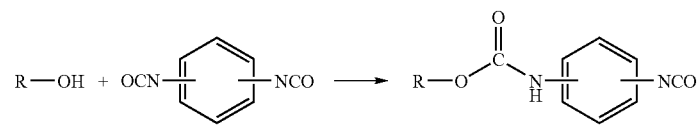 (K′)
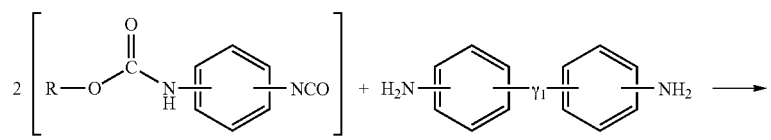
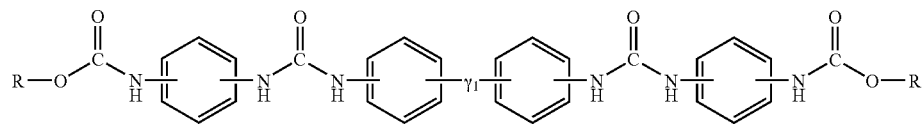
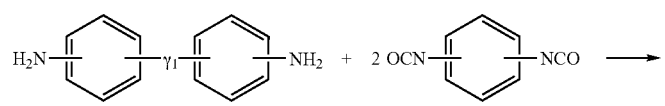 (L′)
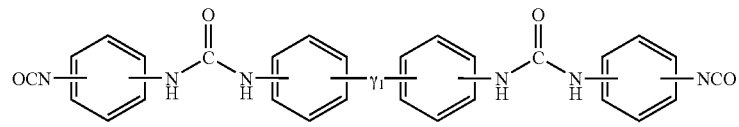
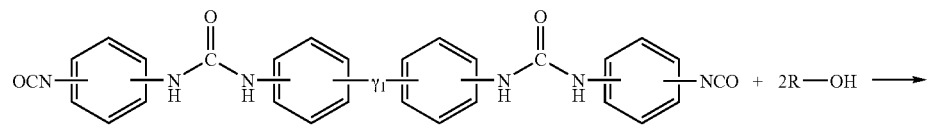
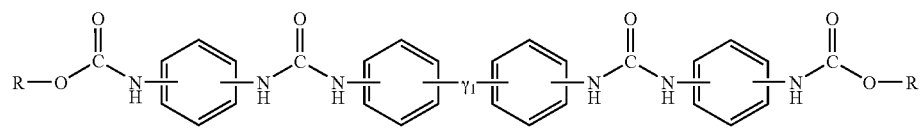

The compounds of the formulas (m) to (u) which can be used for synthesis of the urea-urethane compounds of the above formulas (c) to (h) are explained below in further detail.

As the alcohol compound of the general formula (m), any alcohol compound having at least one OH group bonded to the carbon atom of an aliphatic compound may be used. Examples of the alcohol compound are the alcohols described in Solvent Handbook, Kodansha Scientific Co., Ltd., the ninth impression (1989), pp. 327-420 and pp. 772-817. The alcohol compound includes, for example, aliphatic alcohols such as methanol, ethanol, propanol, isopropanol, n-butanol, isobutanol, sec-butanol, tert-butanol, pentanol, cyclopentanol, tert-amyl alcohol, 2-pentanol, isoamyl alcohol, hexanol, 3-hexanol, cyclohexanol, cyclohexylmethanol, 4-methyl-2-pentanol, heptanol, isoheptanol, octanol, 2-ethyl-1-hexanol, capryl alcohol, nonyl alcohol, isononyl alcohol, decanol, undecyl alcohol, dodecyl alcohol, tridecyl alcohol, tetradecyl alcohol, hexadecyl alcohol, octadecyl alcohol, isostearyl alcohol, etc.; unsaturated aliphatic alcohols such as ally alcohol, 2-methyl-2-propen-1-ol, crotyl alcohol, propargyl alcohol, etc.; aliphatic alcohols having an aromatic compound residue bonded thereto, such as benzyl alcohol, cinnamyl alcohol, etc.; aliphatic alcohols having a heterocyclic compound residue bonded thereto, such as 2-pyridinemethanol, 3-pyridinemethanol, 4-pyridinemethanol, furfuryl alcohol, etc.; halogenated aliphatic alcohols such as 2-chloroethanol, 1-chloro-3-hydroxypropane, etc.; glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monoisobutyl ether, ethylene glycol monohexyl ether, ethylene glycol monophenyl ether, diethylene glycol monomethyl ether, diethylene glycol monoethyl ether, diethylene glycol monopropyl ether, diethylene glycol monoisopropyl ether, diethylene glycol monobutyl ether, diethylene glycol monoisobutyl ether, diethylene glycol monohexyl ether, diethylene glycol monophenyl ether, propylene glycol monomethyl ether, propylene glycol monoethyl ether, propylene glycol monopropyl ether, propylene glycol monoisopropyl ether, propylene glycol monobutyl ether, propylene glycol monoisobutyl ether, propylene glycol monophenyl ether, dipropylene glycol monomethyl ether, dipropylene glycol monoethyl ether, dipropylene glycol monopropyl ether, dipropylene glycol monoisopropyl ether, dipropylene glycol monobutyl ether, dipropylene glycol monoisobutyl ether, dipropylene glycol monophenyl ether, etc.; diols such as ethylene glycol, diethylene glycol, triethylene glycol, 1,3-propanediol, 1,2-propanediol, propylene glycol, dipropylene glycol, tripropylene glycol, 1,4-butanediol, 1,5-pentanediol, 1,6-hexanediol, hexylene glycol, 1,9-nonanediol, neopentyl glycol, methylpentanediol, etc.; aliphatic polyols such as glycerin, castor oil, trimethylolpropane, trimethylolethane, hexanetriol, pentaerythritol, α-methyl glucoside, sorbitol, sucrose, etc.; polyols such as polyethylene glycols, polypropylene glycols, polytetramethylene glycols, adipate-derived polyols, epoxy-modified polyols, polyether ester polyols, polycarbonate polyols, polycaprolactone diols, amine-modified polyols, polyether polyols obtained by adding one of or a mixture of two or more of alkylene oxides (e.g. ethylene oxide and propylene oxide) to one of or a mixture of two or more of polyhydric alcohols (glycerin and propylene glycol), acryl polyols, fluorinated polyols, polybutadiene polyols, polyhydroxy polyols, castor oil-derived polyols, polymer polyols, halogen-containing polyols, phosphorus-containing polyols, etc.; and alkanolamines such as N,N-dialkylethanolamines, N,N-dialkylisopropanolamines, N-alkyldiethanolamines, N-alkyldiisopropanolamines, triethanolamine, triisopropanolamine, N,N,N',N'-tetrakis(2-hydroxyethyl) ethylenediamine, N,N,N',N'-tetrakis(2-hydroxypropyl) ethylenediamine, etc. Of the above-exemplified alcohol compounds, monoalcohols having one OH group are preferable, and aliphatic alcohols and glycol ethers, which have 10 or less carbon atoms are more preferable.

The isocyanate compound of the formula (n) is not particularly limited so long as it is an aromatic isocyanate having two or more isocyanate groups bonded to carbon atoms, respectively. This compound includes, for example, p-phenylene diisocyanate, m-phenylene diisocyanate, o-phenylene diisocyanate, 2,5-dimethoxybenzene-1,4-diisocyanate, 2,4-toluene diisocyanate, 2,6-toluene diisocyanate, diphenylmethane diisocyanate, o-tolidine diisocyanate, diphenyl ether diisocyanate, 1,5-naphthylene diisocyanate, dianisidine diisocyanate, 3,3'-dimethyl-4,4'-diphenylmethane diisocyanate, triphenylmethane triisocyanate, tris(4-phenylisocyanate) thiophosphate, 4,4',4''-triisocyanato-2,5-dimethoxytriphenylamine and 4,4',4''-triisocyanatotriphenylamine. As the isocyanate compound of the formula (n), there may also be used diisocyanate dimers such as N,N'-(4,4'-dimethyl-3,3'-diphenyldiisocyanato)urethodione (Desmodur TT, a trade name), a toluene diisocyanate dimer; and diisocyanate trimers such as 4,4',4''-trimethyl-3,3',3''-triisocyanato-2,4,6-triphenylcyanurate. There may also be used water adduct isocyanates of toluene diisocyanate, diphenyl methane diisocyanate and the like, such as 1,3-bis(3-isocyanato-4-methylphenyl)urea; polyol adducts such as trimethylolpropane adducts of toluene diisocyanate (Desmodur L and Coronate L trade names); and amine adducts. There may also be used compounds having two or more isocyanate groups, among the isocyanate compounds and isocyanate adduct compounds described in the specification of JP-A-10-76757 and the specification of JP-A-10-95171 (the contents of these references are hereby incorporated herein by reference).

Of the above-exemplified isocyanate compounds, aromatic isocyanates having isocyanate groups bonded to a benzene ring are preferable. More preferable are p-phenylene diisocyanate, m-phenylene diisocyanate, o-phenylene diisocyanate, 2,4-toluene diisocyanate, 2,6-toluene diisocyanate, diphenylmethane diisocyanate, o-tolidine diisocyanate, diphenyl ether diisocyanate, 1,5-naphthylene diisocyanate, triphenylmethane triisocyanate, N,N'-(4,4'-dimethyl-3,3'-diphenyldiisocyanato)urethodione (Desmodur TT, a trade name), 4,4',4''-trimethyl-3,3',3''-triisocyanato-2,4,6-triphenylcyanurate, 1,3-bis(3-isocyanato-4-methylphenyl)urea, and trimethylolpropane adducts of toluene diisocyanate (Desmodur L and Coronate L, trade names). Especially preferable examples of the isocyanate compound of the formula (n) are toluene diisocyanates. Of the toluene diisocyanates, 2.4-toluene diisocyanate is preferable. Besides 2.4-toluene diisocyanate, mixtures of 2.4-toluene diisocyanate and 2,6-toluene diisocyanate are generally on the market and available at a low price and may also be used as the isocyanate compound of the formula (n).

As the amine compound of the general formula (o), there are mentioned, for example, aromatic amines such as aniline, o-toluidine, m-toluidine, p-toluidine, o-anisidine, p-anisidine, p-phenetidine, N,N-dimethyl-p-phenylenediamine, N,N-diethyl-p-phenylenediamine, 2,4-dimethoxyaniline, 2,5-dimethoxyaniline, 3,4-dimethoxyaniline, p-aminoacetanilide, p-aminobenzoic acid, o-aminophenol, m-aminophenol, p-aminophenol, 2,3-xylidine, 2,4-xylidine, 3,4-xylidine, 2,6-xylidine, 4-aminobenzonitrile, anthranilic acid, p-cresidine, 2,5-dichloroaniline, 2,6-dichloroaniline, 3,4-dichloroaniline, 3,5-dichloroaniline, 2,4,5-trichloroaniline, α-naphthylamine, aminoanthracene, o-ethylaniline, o-chloroaniline, m-chloroaniline, p-chloroaniline, N-methylaniline, N-ethylaniline, N-propylaniline, N-butylaniline, acetoacetic acid anilide, trimethylphenylammonium bromide, 4,4'-diamino-3,3'-diethyldiphenylmethane, 4,4'-diaminobenzanilide, 3,5-diaminochlorobenzene, diaminodiphenyl ether, 3,3'-dichloro-4,4'-diaminodiphenylmethane, 3,3'-dimethyl-4,4'-diaminodiphenylmethane, tolidine base, o-phenylenediamine, m-phenylenediamine, p-phenylenediamine, 2-chloro-p-phenylenediamine, dianisidine, methyl p-aminobenzoate, ethyl p-aminobenzoate, n-propyl p-aminobenzoate, isopropyl p-aminobenzoate, butyl p-aminobenzoate, dodecyl p-aminobenzoate, benzyl p-aminobenzoate, o-aminobenzophenone, m-aminoacetophenone, p-aminoacetophenone, m-aminobenzamide, o-aminobenzamide, p-aminobenzamide, p-amino-N-methylbenzamide, 3-amino-4-methylbenzamide, 3-amino-4-methoxybenzamide, 3-amino-4-chlorobenzamide, p-(N-phenylcarbamoyl)aniline, p-[N-(4-chlorophenyl)carbamoyl]aniline, p-[N-(4-aminophenyl)carbamoyl]-aniline, 2-methoxy-5-(N-phenylcarbamoyl)aniline, 2-methoxy-5-[N-(2'-methyl-3'-chlorophenyl)carbamoyl]-aniline, 2-methoxy-5-[N-(2'-chlorophenyl)carbamoyl]-aniline, 5-acetylamino-2-methoxyaniline, 4-acetylaminoaniline, 4-(N-methyl-N-acetylamino)aniline, 2,5-diethoxy-4-(N-benzoylamino)aniline, 2,5-dimethoxy-4-(N-benzoylamino)aniline, 2-methoxy-4-(N-benzoylamino)-5-methylaniline, 4-sulfamoylaniline, 3-sulfamoylaniline, 2-(N-ethyl-N-phenylaminosulfonyl)aniline, 4-dimethylaminosulfonylaniline, 4-diethylaminosulfonylaniline, sulfathiazole, 4-aminodiphenyl sulfone, 2-chloro-5-N-phenylsulfamoylaniline, 2-methoxy-5-N,N-diethylsulfamoylaniline, 2,5-dimethoxy-4-N-phenysulfamoylaniline, 2-methoxy-5-benzylsulfonylaniline, 2-phenoxysulfonylaniline, 2-(2'-chlorophenoxy)sulfonylaniline, 3-anilinosulfonyl-4-methylaniline, bis[4-(m-aminophenoxy)phenyl] sulfone, bis[4-(p-aminophenoxy)phenyl] sulfone, bis[3-methyl-4-(p-aminophenoxy)phenyl] sulfone, 3,3'-dimethoxy-4,4'-diaminobiphenyl, 3,3'-dimethyl-4,4'-diaminobiphenyl, 2,2'-dichloro-4,4'-diamino-5,5'-dimethoxybiphenyl, 2,2',5,5'-tetrachloro-4,4'-diaminobiphenyl, o-tolidine sulfone, 2,4'-diaminobiphenyl, 2,2'-diaminobiphenyl, 4,4'-diaminobiphenyl, 2,2'-dichloro-4,4'-diaminobiphenyl, 3,3'-dichloro-4,4'-diaminobiphenyl, 2,2'-dimethyl-4,4'-diaminobiphenyl, 4,4'-thiodianiline, 2,2'-dithiodianiline, 4,4'-dithiodianiline, 4,4'-diaminodiphenyl ether, 3,3'-diaminodiphenyl ether, 3,4'-diaminodiphenyl ether, 4,4'-diaminodiphenylmethane, 3,4'-diaminodiphenylmethane, bis(3-amino-4-chlorophenyl)sulfone, bis(3,4-diaminophenyl)sulfone, 4,4'-diaminodiphenyl sulfone, 3,3'-diaminodiphenyl sulfone, 3,4'-diaminodiphenyl sulfone, 3,3'-diaminodiphenylmethane, 4,4-diaminodiphenylamine, 4,4'-ethylenedianiline, 4,4'-diamino-2,2'-dimethyldibenzyl, 3,3'-diaminobenzophenone, 4,4'-diaminobenzophenone, 1,4-bis(4-aminophenoxy)benzene, 1,3-bis(4-aminophenoxy)benzene, 1,3-bis(3-aminophenoxy)benzene, 9,9-bis(4-aminophenyl)fluorene, 2,2-bis(4-aminophenoxyphenyl)propane, 4,4'-bis(4-aminophenoxy)diphenyl, 3,3',4,4'-tetraminodiphenyl ether, 3,3',4,4'-tetraminodiphenyl sulfone, 3,3',4,4'-tetraaminobenzophenone, 3-aminobenzonitrile, 4-phenoxyaniline, 3-phenoxyaniline, 4,4'-methylenebis-o-toluidine, 4,4'-(p-phenyleneisopropylidene)-bis-(2,6-xylidine), o-chloro-p-nitroaniline, o-nitro-p-chloroaniline, 2,6-dichloro-4-nitroaniline, 5-chloro-2-nitroaniline, 2-amino-4-chloroaniline, o-nitroaniline, m-nitroaniline, p-nitroaniline, 2-methyl-4-nitroaniline, m-nitro-p-toluidine, 2-amino-5-nitrobenzonitrile, Metol, 2,4-diaminophenol, N-(β-hydroxyethyl)-o-aminophenol sulfate, sulfanilic acid, metanilic acid, 4B acid, C acid, 2B acid, p-fluoroaniline, o-fluoroaniline, 3-chloro-4-fluoroaniline, 2,4-difluoroaniline, 2,3,4-trifluoroaniline, m-aminobenzotrifluoride, m-toluoylenediamine, 2-aminothiophenol, 2-amino-3-bromo-5-nitrobenzonitrile, diphenylamine, p-aminodiphenylamine, octylated diphenylamine, 2-methyl-4-methoxydiphenylamine, N,N-diphenyl-p-phenylenediamine, dianisidine, 3,3'-dichlorobenzidine, 4,4'-diaminostilbene-2,2'-disulfonic acid, benzylethylaniline, 1,8-naphthalenediamine, sodium naphthionate, Tobias acid, H acid, J acid, phenyl J acid, 1,4-diamino-anthraquinone, 1,4-diamino-2,3-dichloroanthraquinone, etc.

The aromatic isocyanate compound of the formula (p) includes 2,4-toluene diisocyanate, 2,6-toluene diisocyanate, m-phenylene diisocyanate, p-phenylene diisocyanate, o-phenylene diisocyanate, etc. Of these, the toluene diisocyanates are preferable, and 2,4-toluene diisocyanate is more preferable.

The aromatic amine compound of the formula (q) is not particularly limited so long as it has at least one amino group directly bonded to the carbon atom of the benzene ring. In addition, the hydrogen atom of the benzene ring may be replaced by an aromatic compound residue, an aliphatic compound residue, a heterocyclic compound residue, a hydroxyl group, a nitro group, a nitrile group, a carbamoyl group, a sulfamoyl group, a carboxyl group, a nitroso group, an oxyamino group, a nitroamino group, a hydrazino group, a ureido group, an isocyanate group, a mercapto group, a sulfo group or a halogen atom. The aromatic amine compound of the formula (q) includes, for example, aniline, o-toluidine, m-toluidine, p-toluidine, o-anisidine, p-anisidine, p-phenetidine, 2,4-dimethoxyaniline, 2,5-dimethoxyaniline, 3,4-dimethoxyaniline, p-aminoacetanilide, carboxy-substituted aniline (e.g. p-aminobenzoic acid), hydroxyl-substituted anilines (e.g. o-aminophenol, m-aminophenol, p-aminophenol and 2-amino-4-chlorophenol), 2,3-xylidine, 2,4-xylidine, 3,4-xylidine, 2,6-xylidine, nitrile-substituted aniline (e.g. 4-aminobenzonitrile), anthranilic acid, p-cresidine, halogen-substituted anilines (e.g. 2,5-dichloroaniline, 2,6-dichloroaniline, 3,4-dichloroaniline, 3,5-dichloroaniline, 2,4,5-trichloroaniline, o-chloroaniline, m-chloroaniline and p-chloroaniline), α-naphthylamine, aminoanthracene, o-ethylaniline, methyl p-aminobenzoate, ethyl p-aminobenzoate, n-propyl p-aminobenzoate, isopropyl p-aminobenzoate, butyl p-aminobenzoate, dodecyl p-aminobenzoate, benzyl p-aminobenzoate, o-aminobenzophenone, m-aminoacetophenone, p-aminoacetophenone, m-aminobenzamide, o-aminobenzamide, p-aminobenzamide, p-amino-N-methylbenzamide, 3-amino-4-methylbenzamide, 3-amino-4-methoxybenzamide, 3-amino-4-chlorobenzamide; carbamoylanilines (e.g. p-(N-phenylcarbamoyl)aniline, p-[N-(4-chlorophenyl)carbamoyl]aniline, p-[N-(4-aminophenyl)carbamoyl]aniline, 2-methoxy-5-(N-phenylcarbamoyl)aniline, 2-methoxy-5-[N-(2'-methyl-3'-chlorophenyl)carbamoyl]aniline and 2-methoxy-5-[N-(2'-chlorophenyl)carbamoyl]aniline), 5-acetylamino-2-methoxyaniline, 4-acetylaminoaniline, 2-methoxy-4-(N-benzoylamino)-5-methylaniline, sulfamoylanilines (e.g. 4-sulfamoylaniline, 3-sulfamoylaniline, 2-chloro-5-N-phenylsulfamoylaniline, 2-methoxy-5-N,N-diethylsulfamoylaniline and 2,5-dimethoxy-4-N-phenysulfamoylaniline), 2-(N-ethyl-N-phenylaminosulfonyl)aniline, 4-dimethylaminosulfonylaniline, 4-diethylaminosulfonylaniline, sulfathiazole, 4-aminodiphenyl sulfone, 2-methoxy-5-benzylsulfonylaniline, 2-phenoxysulfonylaniline, 2-(2'-chlorophenoxy)sulfonylaniline, 3-anilinosulfonyl-4-methylaniline, nitro-substituted anilines (e.g. o-chloro-p-nitroaniline, o-nitro-p-chloroaniline, 2,6-dichloro-4-nitroaniline, 5-chloro-2- nitroaniline, o-nitroaniline, m-nitroaniline, p-nitroaniline, 2-methyl-4-nitroaniline, m-nitro-p-toluidine and 2-amino-5-nitrobenzonitrile), sulfanilic acid, metanilic acid, 4B acid, C acid, 2B acid, p-fluoroaniline, o-fluoroaniline, 3-chloro-4-fluoroaniline, 2,4-difluoroaniline, 2,3,4-trifluoroaniline, m-aminobenzotrifluoride, 2-amino-3-bromo-5-nitrobenzonitrile, etc.; aromatic monoamines having one or more substituents including carboxyl group, nitroso group, oxyamino group, nitroamino group, hydrazine group, ureido group, isocyanate group, mercapto group, sulfo group, etc.; aromatic diamines such as 4,4'-diamino-3,3'-diethyldiphenylmethane, 4,4'-diaminobenzanilide, 3,5-diaminochlorobenzene, diaminodiphenyl ether, 3,3'-dichloro-4,4'-diaminodiphenylmethane, 3,3'-dimethyl-4,4'-diaminodiphenylmethane, tolidine base, dianisidine, bis[4-(m-aminophenoxy)phenyl] sulfone, bis[4-(p-aminophenoxy)phenyl] sulfone, bis[3-methyl-4-(p-aminophenoxy)phenyl] sulfone, 3,3'-dimethoxy-4,4'-diaminobiphenyl, 3,3'-dimethyl-4,4'-diaminobiphenyl, 2,2'-dichloro-4,4'-diamino-5,5'-dimethoxybiphenyl, 2,2',5,5'-tetrachloro-4,4'-diaminobiphenyl, o-tolidine sulfone, 2,4'-diaminobiphenyl, 2,2'-diaminobiphenyl, 4,4'-diaminobiphenyl, 2,2'-dichloro-4,4'-diaminobiphenyl, 3,3'-dichloro-4,4'-diaminobiphenyl, 2,2'-dimethyl-4,4'-diaminobiphenyl, 4,4'-thiodianiline, 2,2'-dithiodianiline, 4,4'-dithiodianiline, 4,4'-diaminodiphenyl ether, 3,3'-diaminodiphenyl ether, 3,4'-diaminodiphenyl ether, 4,4'-diaminodiphenylmethane, 3,4'-diaminodiphenylmethane, bis(3-amino-4-chlorophenyl)sulfone, bis(3,4-diaminophenyl) sulfone, 4,4'-diaminodiphenyl sulfone, 3,3'-diaminodiphenyl sulfone, 3,4'-diaminodiphenyl sulfone, 3,3'-diaminodiphenylmethane, 4,4'-diaminodiphenylamine, 4,4'-ethylenedianiline, 4,4'-diamino-2,2'-dimethyldibenzyl, 3,3'-diaminobenzophenone, 4,4'-diaminobenzophenone, 1,4-bis(4-aminophenoxy)benzene, 1,3-bis(4-aminophenoxy)benzene, 1,3-bis(3-aminophenoxy)benzene, 9,9-bis(4-aminophenyl)fluorene, 2,2-bis(4-aminophenoxyphenyl)propane, 4,4'-bis(4-aminophenoxy)diphenyl, dianisidine, 3,3'-dichlorobenzidine, etc. Of these, the aromatic monoamines are preferably used, and aniline or the aniline derivatives are more preferably used.

The isocyanate compound of the formula (r) is not particularly limited so long as it has two or more isocyanate groups bonded to carbon atoms, respectively. This compound includes, for example, p-phenylene diisocyanate, m-phenylene diisocyanate, o-phenylene diisocyanate, 2,5-dimethoxybenzene-1,4-diisocyanate, 2,4-toluene diisocyanate, 2,6-toluene diisocyanate, diphenylmethane diisocyanate, o-tolidine diisocyanate, diphenyl ether diisocyanate, 1,5-naphthylene diisocyanate, dianisidine diisocyanate, 9-ethylcarbazole-3,6-diisocyanate, 3,3'-dimethyl-4,4'-diphenylmethane diisocyanate, hexamethylene diisocyanate, isophorone diisocyanate, triphenylmethane triisocyanate, tris(4-phenylisocyanate) thiophosphate, 4,4',4"-triisocyanato-2,5-dimethoxytriphenylamine, 4,4',4"-triisocyanatotriphenylamine, m-xylylene diisocyanate, lysine diisocyanate, dimer acid diisocyanate, isopropylidene bis-4-cyclohexylisocyanate, dicyclohexylmethane diisocyanate and methylcyclohexane diisocyanate. As the isocyanate compound of the formula (r), there may also be used diisocyanate dimers such as N,N'-(4,4'-dimethyl-3,3'-diphenyldiisocyanato)urethodione (Desmodur TT, a trade name), a toluene diisocyanate dimer; and diisocyanate trimers such as 4,4',4"-trimethyl-3,3',3"-triisocyanato-2,4,6-triphenylcyanurate. There may also be used water adduct isocyanates of toluene diisocyanate, diphenylmethane diisocyanate and the like, such as 1,3-bis(3-isocyanato-4-methylphenyl)urea; polyol adducts such as trimethylolpropane adducts of toluene diisocyanate (Desmodur L and Coronate L, trade names); and amine adducts. There may also be used compounds having two or more isocyanate groups, among the isocyanate compounds and isocyanate adduct compounds described in the specification of JP-A-10-76,757 and the specification of JP-A-10-95,171 (the contents of these references are hereby incorporated herein by reference).

Of the above-exemplified isocyanate compounds, aromatic isocyanates having isocyanate groups bonded to a benzene ring are preferable. More preferable are p-phenylene diisocyanate, m-phenylene diisocyanate, o-phenylene diisocyanate, 2,4-toluene diisocyanate, 2,6-toluene diisocyanate, diphenylmethane diisocyanate, o-tolidine diisocyanate, diphenyl ether diisocyanate, 1,5-naphthylene diisocyanate, triphenylmethane triisocyanate, N,N'-(4,4'-dimethyl-3,3'-diphenyldiisocyanato)urethodione (Desmodur TT, a trade name), 4,4',4"-trimethyl-3,3',3"-triisocyanato-2,4,6-triphenylcyanurate, 1,3-bis(3-isocyanato-4-methylphenyl)urea, and trimethylolpropane adducts of toluene diisocyanate (Desmodur L and Coronate L, trade names). Especially preferable examples of the isocyanate compound of the formula (r) are toluene diisocyanates. Of the toluene diisocyanates, 2.4-toluene diisocyanate is preferable. Besides 2.4-toluene diisocyanate, mixtures of 2.4-toluene diisocyanate and 2,6-toluene diisocyanate are generally on the market and available at a low price and may also be used as the isocyanate compound of the formula (r).

The amine compound of the general formula (s) is not particularly limited so long as it has two or more amino groups. This compound includes, for example, aromatic amines such as 4,4'-diamino-3,3'-diethyldiphenylmethane, 4,4'-diaminobenzanilide, 3,5-diaminochlorobenzene, diaminodiphenyl ether, 3,3'-dichloro-4,4'-diaminodiphenylmethane, 3,3'-dimethyl-4,4'-diaminodiphenylmethane, tolidine base, dianisidine, bis[4-(m-aminophenoxy)phenyl] sulfone, bis[4-(p-aminophenoxy)phenyl] sulfone, bis[3-methyl-4-(p-aminophenoxy)phenyl] sulfone, 3,3'-dimethoxy-4,4'-diaminobiphenyl, 3,3'-dimethyl-4,4'-diaminobiphenyl, 2,2'-dichloro-4,4'-diamino-5,5'-dimethoxybiphenyl, 2,2',5,5'-tetrachloro-4,4'-diaminobiphenyl, o-tolidine sulfone, 2,4'-diaminobiphenyl, 2,2'-diaminobiphenyl, 4,4'-diaminobiphenyl, 2,2'-dichloro-4,4'-diaminobiphenyl, 3,3'-dichloro-4,4'-diaminobiphenyl, 2,2'-dimethyl-4,4'-diaminobiphenyl, 4,4'-thiodianiline, 2,2'-dithiodianiline, 4,4'-dithiodianiline, 4,4'-diaminodiphenyl ether, 3,3'-diaminodiphenyl ether, 3,4'-diaminodiphenyl ether, 4,4'-diaminodiphenylmethane, 3,4'-diaminodiphenylmethane, bis(3-amino-4-chlorophenyl)sulfone, bis(3,4-diaminophenyl)sulfone, 4,4'-diaminodiphenyl sulfone, 3,3'-diaminodiphenyl sulfone, 3,4'-diaminodiphenyl sulfone, 3,3'-diaminodiphenylmethane, 4,4'-diaminodiphenylamine, 4,4'-ethylenedianiline, 4,4'-diamino-2,2'-dimethyldibenzyl, 3,3'-diaminobenzophenone, 4,4'-diaminobenzophenone, 1,4-bis(4-aminophenoxy)benzene, 1,3-bis(4-aminophenoxy)benzene, 1,3-bis(3-aminophenoxy)benzene, 9,9-bis(4-aminophenyl)fluorene, 2,2-bis(4-aminophenoxyphenyl)propane, 4,4'-bis(4-aminophenoxy)diphenyl, dianisidine, 3,3'-dichlorobenzidine, tolidine base, o-phenylenediamine, m-phenylenediamine, p-phenylenediamine, etc.; heterocyclic compound amines such as guanamine, acetoguanamine, 2,4-diamino-6-[2'-methylimidazolyl-(1)]ethyl-5-triazine, 2,3-diaminopyridine, 2,5-diaminopyridine, 2,3,5-triaminopyridine, bis(aminopropyl)piperazine, etc.; and aliphatic amines such as methanediamine, 1,2-diaminopropane, 1,3-diaminopropane, 1,4-diaminobutane, 1,3-diamino-2-hydroxypropane, ethylenediamine, diethylenetriamine, triethylenetetramine, tetraethylenepentamine, N-methyl-3,3'-iminobis (propylamine), hexamethylenediamine, bis(aminomethyl)cyclohexane, isophoronediamine, isopropylidenebis(aminocyclohexane), 4,4'-diaminodicyclohexylmethane, xylylenediamine, etc. Of the above-exemplified amine compounds, the aromatic amines are preferable, and aniline derivatives having at least two amino groups and represented by the following formula (VIII) are especially preferable:

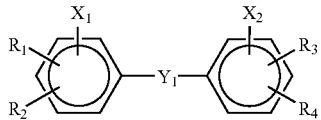

(VIII)

wherein $R_1$, $R_2$, $R_3$ and $R_4$ are independently a hydrogen atom, a halogen atom, an alkyl group, an alkoxy group or an amino group, $X_1$ and $X_2$ are independently an amino group or a group represented by the formula (b):

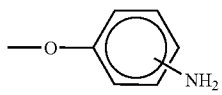

(b)

and $Y_1$ is any of $-SO_2-$, $-O-$, $-(S)_n-$, $-(CH_2)_n-$, $-CO-$, $-CONH-$, $-NH-$, $-CH(COOR_1)-$, $-C(CF_3)_2-$, $-CR_2R_3-$ and a group represented by any of the formulas (a):

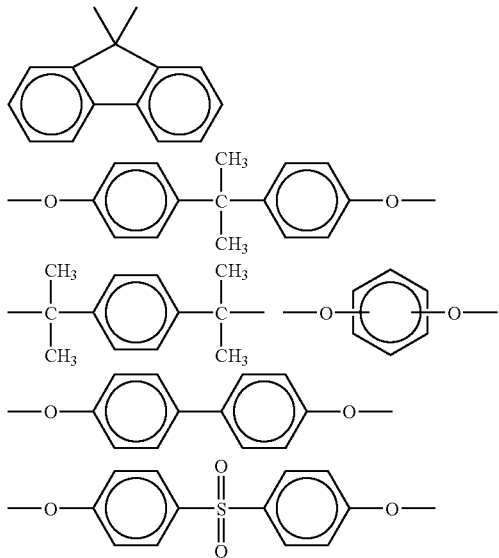

(a)

or is absent, each of $R_1$, $R_2$ and $R_3$ is an alkyl group, and n is 1 or 2.

The amine compound of the general formula (t) includes aromatic amines such as aniline, o-toluidine, m-toluidine, p-toluidine, o-anisidine, p-anisidine, p-phenetidine, N,N-dimethyl-p-phenylenediamine, N,N-diethyl-p-phenylenediamine, 2,4-dimethoxyaniline, 2,5-dimethoxyaniline, 3,4-dimethoxyaniline, p-aminoacetanilide, p-aminobenzoic acid, o-aminophenol, m-aminophenol, p-aminophenol, 2,3-xylidine, 2,4-xylidine, 3,4-xylidine, 2,6-xylidine, 4-aminobenzonitrile, anthranilic acid, p-cresidine, 2,5-dichloroaniline, 2,6-dichloroaniline, 3,4-dichloroaniline, 3,5-dichloroaniline, 2,4,5-trichloroaniline, α-naphthylamine, aminoanthracene, o-ethylaniline, o-chloroaniline, m-chloroaniline, p-chloroaniline, N-methylaniline, N-ethylaniline, N-propylaniline, N-butylaniline, N,N-diglycidylaniline, N,N-diglycidyl-o-toluidine, acetoacetic acid anilide, trimethylphenylammonium bromide, 4,4'-diamino-3,3'-diethyldiphenylmethane, 4,4'-diaminobenzanilide, 3,5-diaminochlorobenzene, diaminodiphenyl ether, 3,3'-dichloro-4,4'-diaminodiphenylmethane, 3,3'-dimethyl-4,4'-diaminodiphenylmethane, tolidine base, o-phenylenediamine, m-phenylenediamine, p-phenylenediamine, 2-chloro-p-phenylenediamine, dianisidine, methyl p-aminobenzoate, ethyl p-aminobenzoate, n-propyl p-aminobenzoate, isopropyl p-aminobenzoate, butyl p-aminobenzoate, dodecyl p-aminobenzoate, benzyl p-aminobenzoate, o-aminobenzophenone, m-aminoacetophenone, p-aminoacetophenone, m-aminobenzamide, o-aminobenzamide, p-aminobenzamide, p-amino-N-methylbenzamide, 3-amino-4-methylbenzamide, 3-amino-4-methoxybenzamide 3-amino-4-chlorobenzamide, p-(N-phenylcarbamoyl)aniline, p-[N-(4-chlorophenyl)carbamoyl]aniline, p-[N-(4-aminophenyl)carbamoyl]-aniline, 2-methoxy-5-(N-phenylcarbamoyl)aniline, 2-methoxy-5-[N-(2'-methyl-3'-chlorophenyl)carbamoyl]-aniline, 2-methoxy-5-[N-(2'-chlorophenyl)carbamoyl]-aniline, 5-acetylamino-2-methoxyaniline, 4-acetylaminoaniline, 4-(N-methyl-N-acetylamino)aniline, 2,5-diethoxy-4-(N-benzoylamino)aniline, 2,5-dimethoxy-4-(N-benzoylamino)aniline, 2-methoxy-4-(N-benzoylamino)-5-methylaniline, 4-sulfamoylaniline, 3-sulfamoylaniline, 2-(N-ethyl-N-phenylaminosulfonyl)aniline, 4-dimethylaminosulfonylaniline, 4-diethylaminosulfonylaniline, sulfathiazole, 4-aminodiphenyl sulfone, 2-chloro-5-N-phenylsulfamoylaniline, 2-methoxy-5-N,N-diethylsulfamoylaniline, 2,5-dimethoxy-4-N-phenysulfamoylaniline, 2-methoxy-5-benzylsulfonylaniline, 2-phenoxysulfonylaniline, 2-(2'-chlorophenoxy)sulfonylaniline, 3-anilinosulfonyl-4-methylaniline, bis[4-(m-aminophenoxy)phenyl]sulfone, bis[4-(p-aminophenoxy)phenyl]sulfone, bis[3-methyl-4-(p-aminophenoxy)phenyl] sulfone, 3,3'-dimethoxy-4,4'-diaminobiphenyl, 3,3'-dimethyl-4,4'-diaminobiphenyl, 2,2'-dichloro-4,4'-diamino-5,5'-dimethoxybiphenyl, 2,2',5,5'-tetrachloro-4,4'-diaminobiphenyl, o-tolidine sulfone, 2,4'-diaminobiphenyl, 2,2'-diaminobiphenyl, 4,4'-diaminobiphenyl, 2,2'-dichloro-4,4'-diaminobiphenyl, 3,3'-dichloro-4,4'-diaminobiphenyl, 2,2'-dimethyl-4,4'-diaminobiphenyl, 4,4'-thiodianiline, 2,2'-dithiodianiline, 4,4'-dithiodianiline, 4,4'-diaminodiphenyl ether, 3,3'-diaminodiphenyl ether, 3,4'-diaminodiphenyl ether, 4,4'-diaminodiphenylmethane, 3,4'-diaminodiphenylmethane, bis(3-amino-4-chlorophenyl)sulfone, bis(3,4-diaminophenyl)sulfone, 4,4'-diaminodiphenyl sulfone, 3,3'-diaminodiphenyl sulfone, 3,4'-diaminodiphenyl sulfone, 3,3'-diaminodiphenylmethane, 4,4-diaminodiphenylamine, 4,4'-ethylenedianiline, 4,4'-diamino-2,2'-dimethyldibenzyl, 3,3'-diaminobenzophenone, 4,4'-diaminobenzophenone, 1,4-bis(4-aminophenoxy)benzene, 1,3-bis(4-aminophenoxy)benzene, 1,3-bis(3-aminophenoxy)benzene, 9,9-bis(4-aminophenyl)fluorene, 2,2-bis(4-aminophenoxyphenyl)propane, 4,4'-bis(4-aminophenoxy)diphenyl, 3,3',4,4'-tetraminodiphenyl ether, 3,3',4,4'-tetraminodiphenyl sulfone, 3,3',4,4'-tetraminobenzophenone, 3-aminobenzonitrile, 4-phenoxyaniline, 3-phenoxyaniline, 4,4'-methylenebis-o-toluidine, 4,4'-(p-phenyleneisopropylidene)-bis-(2,6-xylidine), o-chloro-p-nitroaniline, o-nitro-p-chloroaniline, 2,6-dichloro-4-nitroaniline, 5-chloro-2-nitroaniline, 2-amino-4- chlorophenol, o-nitroaniline, m-nitroaniline, p-nitroaniline, 2-methyl-4-nitroaniline, m-nitro-p-toluidine, 2-amino-5-nitrobenzonitrile, Metol, 2,4-diaminophenol, N—(O-hydroxyethyl)-o-aminophenol sulfate, sulfanilic acid, metanilic acid, 4B acid, C acid, 2B acid, p-fluoroaniline, o-fluoroaniline, 3-chloro-4-fluoroaniline, 2,4-difluoroaniline, 2,3,4-trifluoroaniline, m-aminobenzotrifluoride, m-toluoylenediamine, 2-aminothiophenol, 2-amino-3-bromo-5-nitrobenzonitrile, diphenylamine, p-aminodiphenylamine, octylated diphenylamine, 2-methyl-4-methoxydiphenylamine, N,N-diphenyl-p-phenylenediamine, dianisidine, 3,3'-dichlorobenzidine, 4,4'-diaminostilbene-2,2'-disulfonic acid, benzylethylaniline, 1,8-naphthalenediamine, sodium naphthionate, Tobias acid, H acid, J acid, phenyl J acid, 1,4-diaminoanthraquinone, 1,4-diamino-2,3-dichloroanthraquinone, etc.; and heterocyclic compound amines such as 3-amino-1,2,4-triazole, 2-aminopyridine, 3-aminopyridine, 4-aminopyridine, α-amino-ε-caprolactam, acetoguanamine, 2,4-diamino-6-[2'-methylimidazolyl-(1)]ethyl-S-triazine, 2,3-diaminopyridine, 2,5-diaminopyridine, 2,3,5-triaminopyridine, 1-amino-4-methylpiperazine, 1-(2-aminoethyl)piperazine, bis(aminopropyl)piperazine, N-(3-aminopropyl)morpholine, etc. Of these, the aromatic monoamines are preferably used.

The alcohol compound of the general formula (u) is not particularly limited so long as it is a polyol compound having two or more OH groups. The alcohol compound includes diols such as ethylene glycol, diethylene glycol, triethylene glycol, 1,3-propanediol, 1,2-propanediol, propylene glycol, dipropylene glycol, tripropylene glycol, 1,4-butanediol, 1,5-pentanediol, 1,6-hexanediol, hexylene glycol, 1,9-nonanediol, neopentyl glycol, methylpentanediol, etc.; aliphatic polyols such as glycerin, castor oil, trimethylolpropane, trimethylolethane, hexanetriol, pentaerythritol, α-methyl glucoside, sorbitol, sucrose, etc.; polyols such as polyethylene glycols, polypropylene glycols, polytetramethylene glycols, adipate-derived polyols, epoxy-modified polyols, polyether ester polyols, polycarbonate polyols, polycaprolactone diols, amine-modified polyols, polyether polyols obtained by adding one of or a mixture of two or more of alkylene oxides (e.g. ethylene oxide and propylene oxide) to one of or a mixture of two or more of polyhydric alcohols (e.g. glycerin and propylene glycol), acryl polyols, fluorinated polyols, polybutadiene polyols, polyhydroxy polyols, castor oil-derived polyols, polymer polyols, halogen-containing polyols, phosphorus-containing polyols, etc.; and alkanolamines such as N-alkyldiethanolamines, N-alkyldiisopropanolamines, triethanolamine, triisopropanolamine, N,N,N',N'-tetrakis(2-hydroxyethyl)ethylenediamine, N,N,N',N'-tetrakis(2-hydroxypropyl)ethylenediamine, etc. Of these, the diols, the aliphatic polyols, the alkanolamines, and polyols having a molecular weight of 2,000 or less are preferably used.

The amine compound of the general formula (XVII) includes, for example, aromatic diamines such as 4,4'-diamino-3,3'-diethyldiphenylmethane, 4,4'-diaminobenzanilide, 3,5-diaminochlorobenzene, diaminodiphenyl ether, 3,3'-dichloro-4,4'-diaminodiphenylmethane, 3,3'-dimethyl-4,4'-diaminodiphenylmethane, tolidine base, dianisidine, bis[4-(m-aminophenoxy)phenyl] sulfone, bis[4-(p-aminophenoxy)phenyl] sulfone, bis[3-methyl-4-(p-aminophenoxy)phenyl] sulfone, 3,3'-dimethoxy-4,4'-diaminobiphenyl, 3,3'-dimethyl-4,4'-diaminobiphenyl, 2,2'-dichloro-4,4'-diamino-5,5'-dimethoxybiphenyl, 2,2',5,5'-tetrachloro-4,4'-diaminobiphenyl, o-tolidine sulfone, 2,4'-diaminobiphenyl, 2,2'-diaminobiphenyl, 4,4'-diaminobiphenyl, 2,2'-dichloro-4,4'-diaminobiphenyl, 3,3'-dichloro-4,4'-diaminobiphenyl, 2,2'-dimethyl-4,4'-diaminobiphenyl, 4,4'-thiodianiline, 2,2'-dithiodianiline, 4,4'-dithiodianiline, 4,4'-diaminodiphenyl ether, 3,3'-diaminodiphenyl ether, 3,4'-diaminodiphenyl ether, 4,4'-diaminodiphenylmethane, 3,4'-diaminodiphenylmethane, bis(3-amino-4-chlorophenyl)sulfone, bis(3,4-diaminophenyl) sulfone, 4,4'-diaminodiphenyl sulfone, 3,3'-diaminodiphenyl sulfone, 3,4'-diaminodiphenyl sulfone, 3,3'-diaminodiphenylmethane, 4,4'-diaminodiphenylamine, 4,4'-ethylenedianiline, 4,4'-diamino-2,2'-dimethyldibenzyl, 3,3'-diaminobenzophenone, 4,4'-diaminobenzophenone, 1,4-bis(4-aminophenoxy)benzene, 1,3-bis(4-aminophenoxy)benzene, 1,3-bis(3-aminophenoxy)benzene, 9,9-bis(4-aminophenyl)fluorene, 2,2-bis(4-aminophenoxyphenyl)propane, 4,4'-bis(4-aminophenoxy)diphenyl, dianisidine, 3,3'-dichlorobenzidine, etc. Amine compounds of the general formula (XVII) in which $\gamma_1$ is a sulfonyl group or a methylene group are preferable.

For obtaining each of the urea-urethane compounds of the third to sixth aspects of the present invention, an isocyanate and the corresponding reactants are mixed to be reacted in an organic solvent or without a solvent, after which the resulting crystals are collected by filtration, crystallization, solvent elimination, etc. to obtain the desired compound. The reaction may be carried out by a method in which a material having two or more groups in the molecule is used in large excess and another material to be reacted with the groups is added thereto in small portions. When this method is adopted, it is possible to react only one of the two or more groups. In the addition, it is preferable to stir the system thoroughly to effect sufficient dispersion of the added material immediately after the addition. The above applies to any of the urea-urethane compounds exemplified herein. A method for the reaction is not limited to the above method and any method may be adopted so long as the same result as above can be obtained. As each of the reactants, one or more compounds may be used depending on purposes. As the solvent, any solvent may be used so long as it does not react with isocyanate group and the functional groups of the reactants. The solvent includes, for example, aliphatic hydrocarbons, alicyclic hydrocarbons, aromatic hydrocarbons, chlorinated aliphatic hydrocarbons, chlorinated aromatic hydrocarbons, chlorinated alicyclic hydrocarbons, and ketones. Especially preferable are methyl ethyl ketone, toluene and the like, which dissolve the isocyanate and in which the reaction product has a low solubility. The product obtained by the above reaction procedure is not always a single compound but is obtained as a mixture of compounds different in the position of a substituent, in some cases.

Specific examples of the urea-urethane compounds of the third to sixth aspects of the present invention are the following compounds ((S-1) to (S-70)).

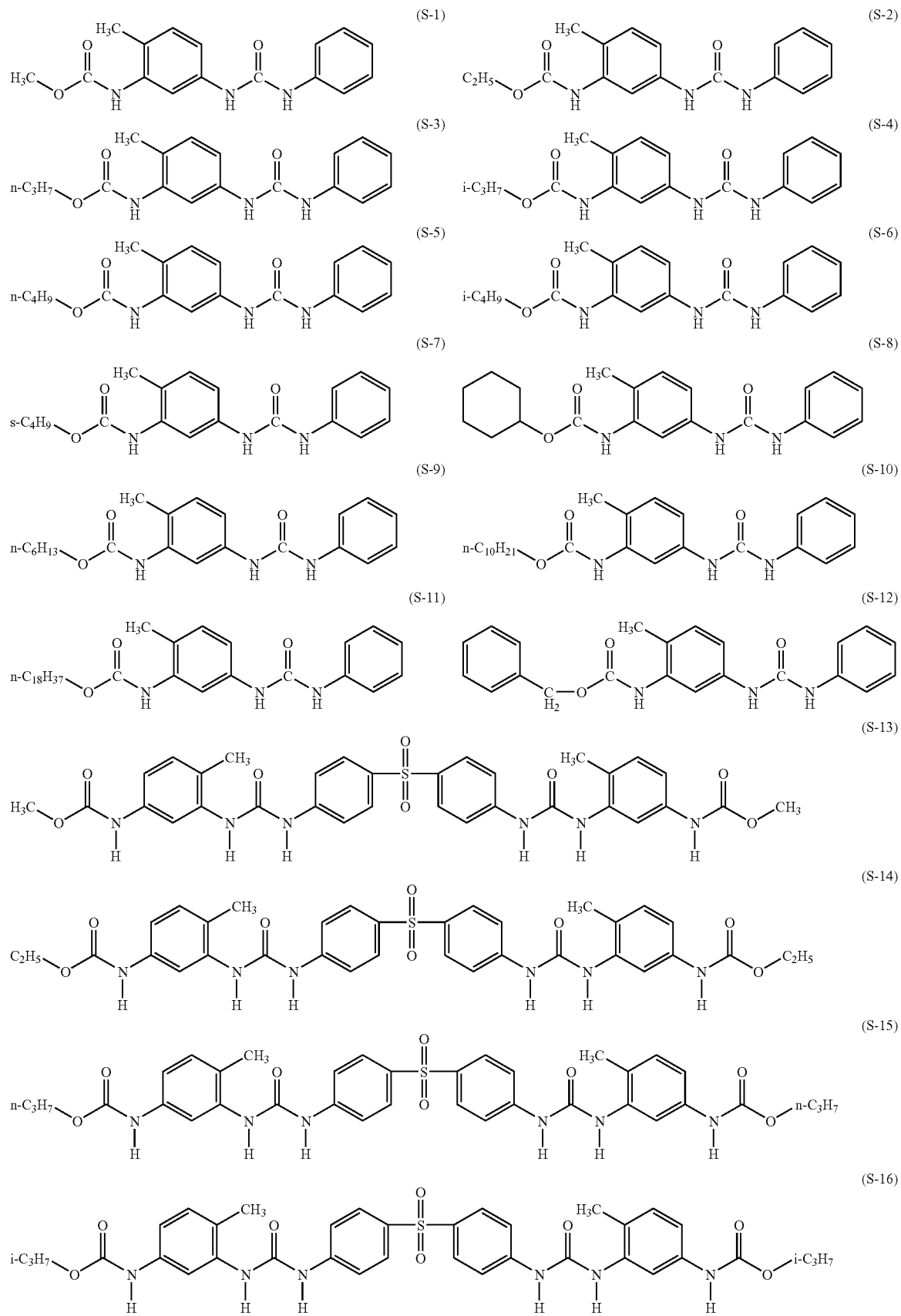

-continued
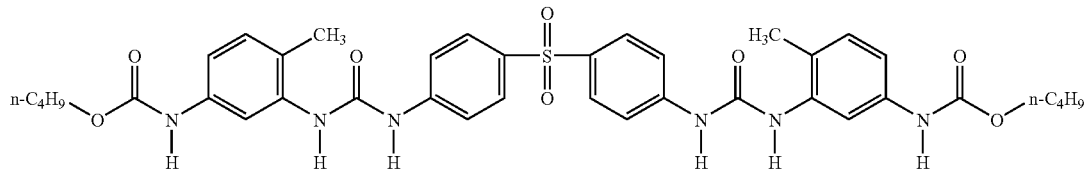
(S-17)
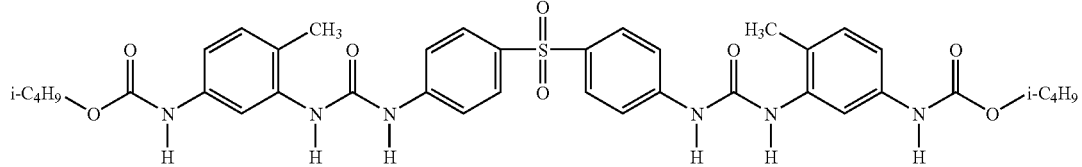
(S-18)
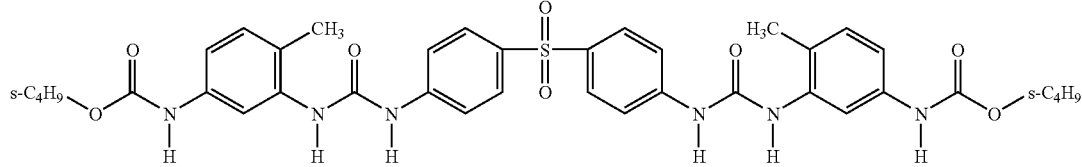
(S-19)
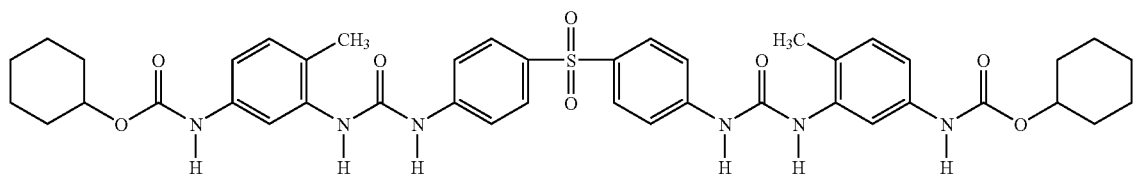
(S-20)
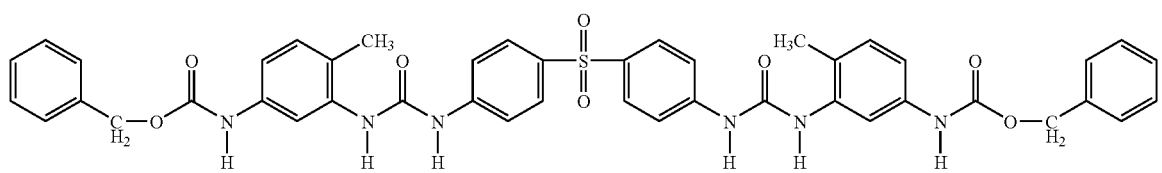
(S-21)
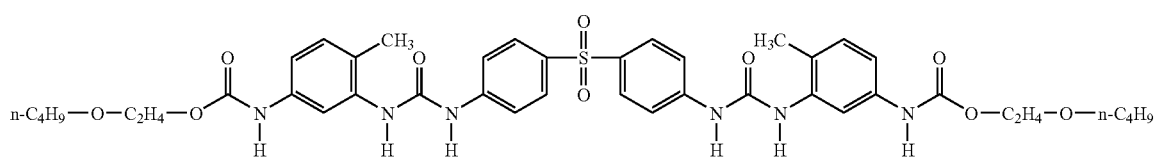
(S-22)
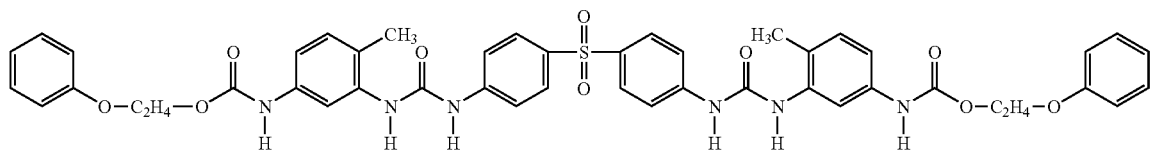
(S-23)
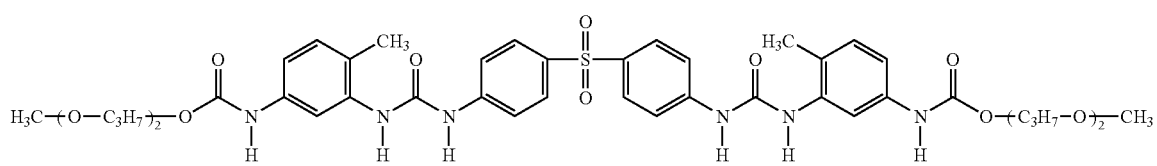
(S-24)

-continued
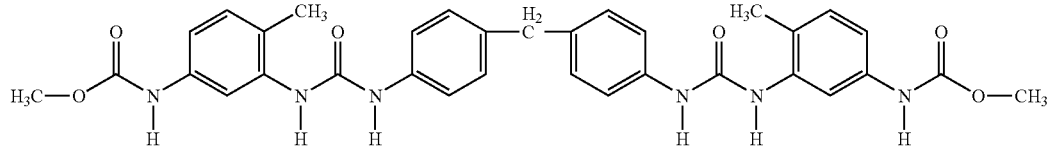 (S-25)
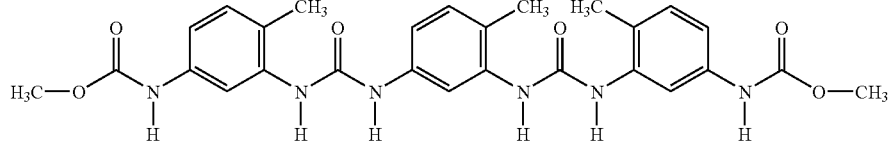 (S-26)
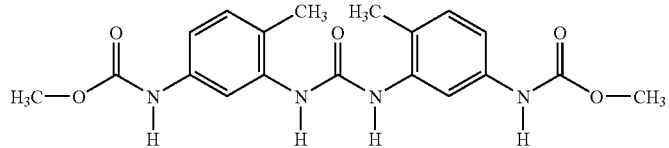 (S-27)
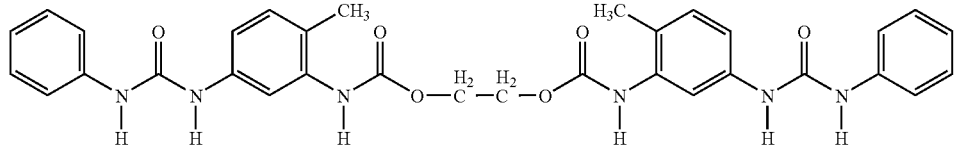 (S-28)
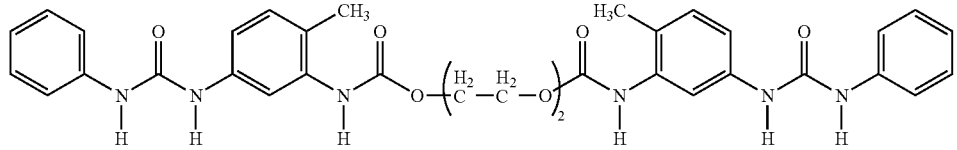 (S-29)
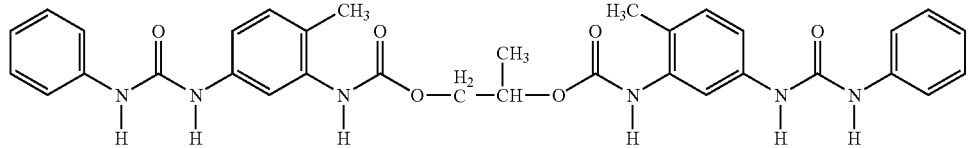 (S-30)
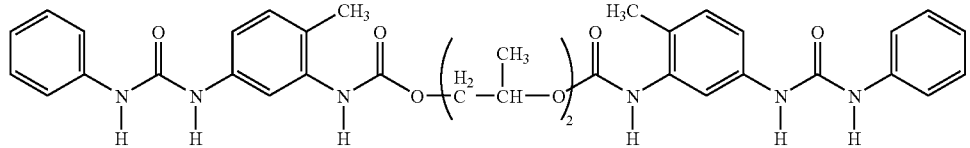 (S-31)
(S-32)
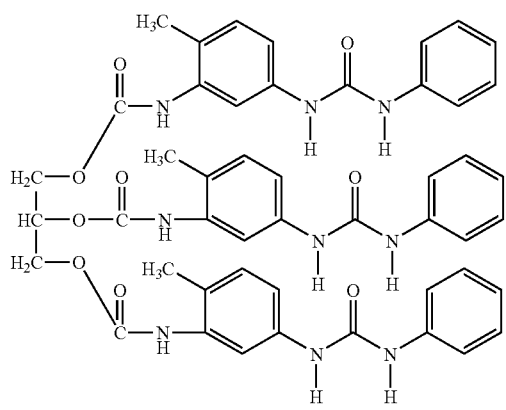
(S-33)
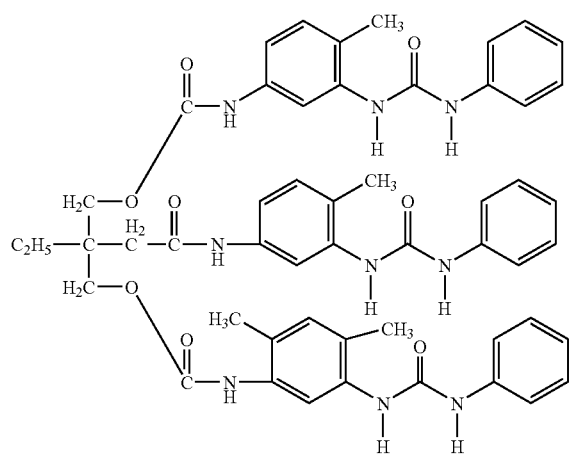

-continued
(S34) 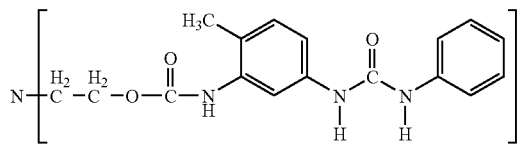
(S-35) 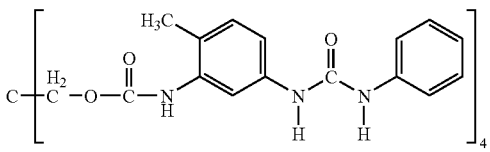
(S-36) 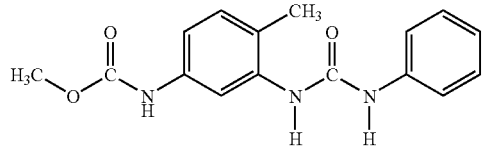
(S-37) 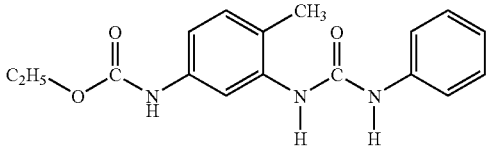
(S-38) 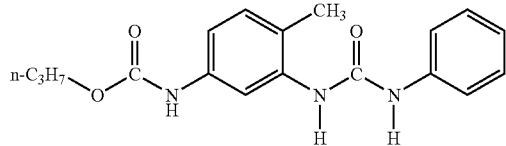
(S-39) 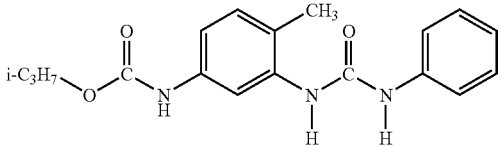
(S-40) 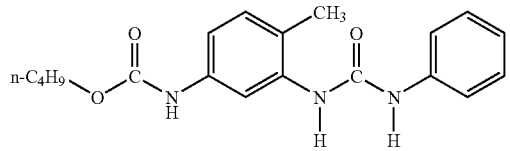
(S-41) 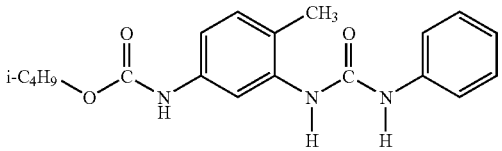
(S-42) 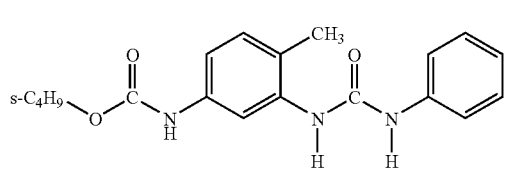
(S-43) 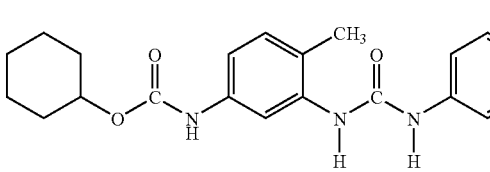
(S-44) 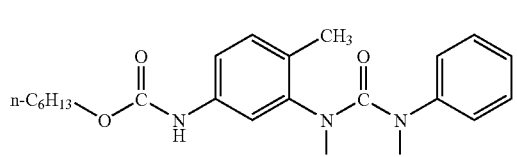
(S-45) 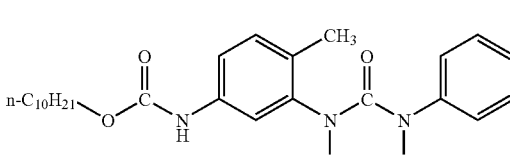
(S-46) 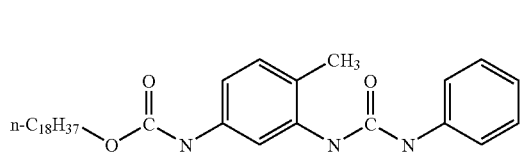
(S-47) 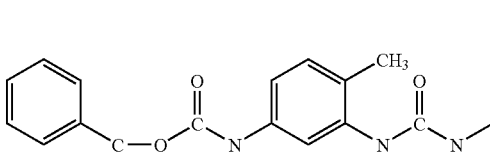
(S-48) 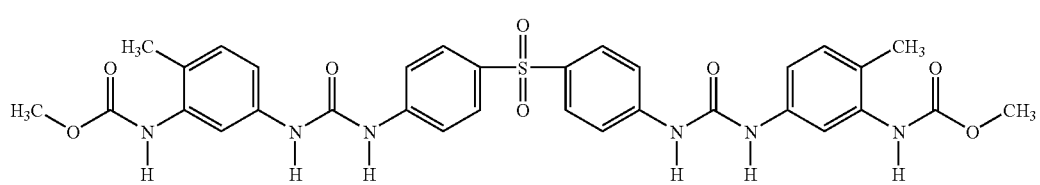
(S-49) 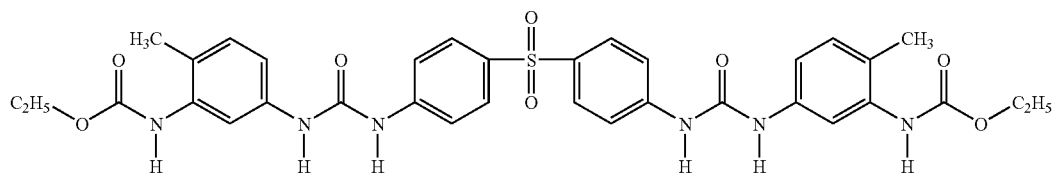

-continued
(S-50)
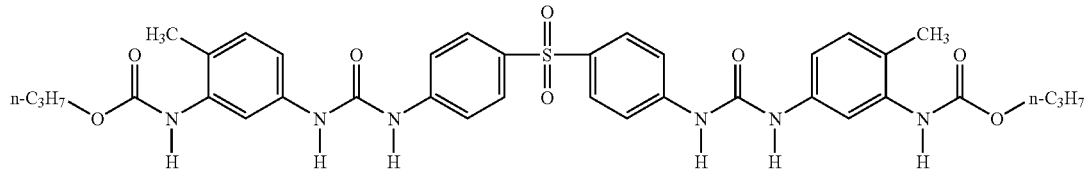
(S-51)
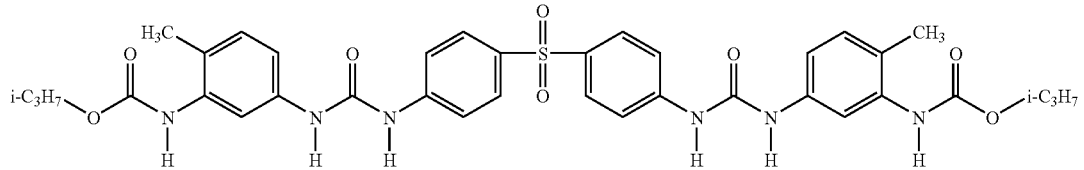
(S-52)
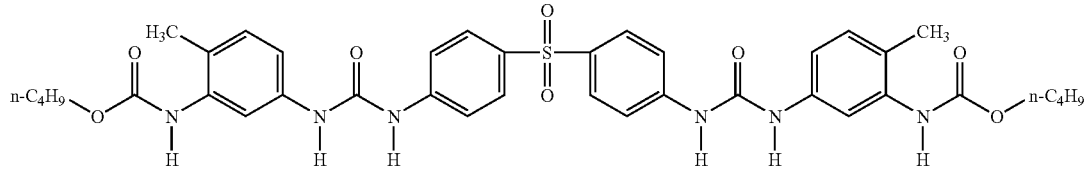
(S-53)
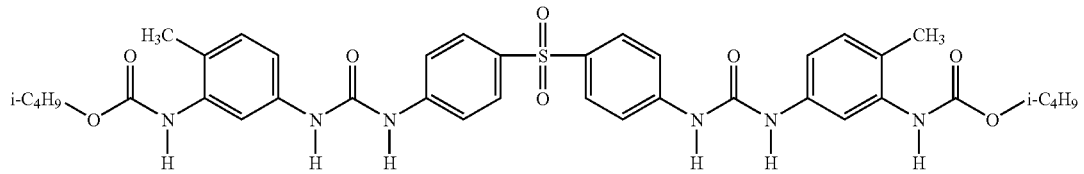
(S-54)
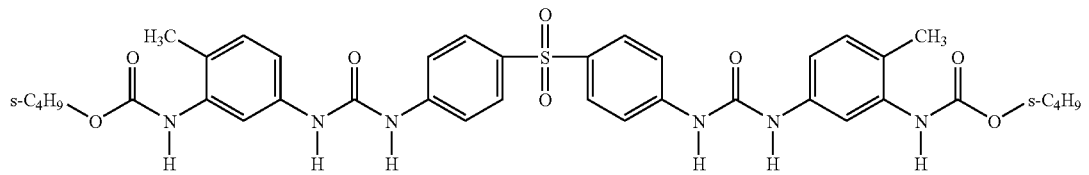
(S-55)
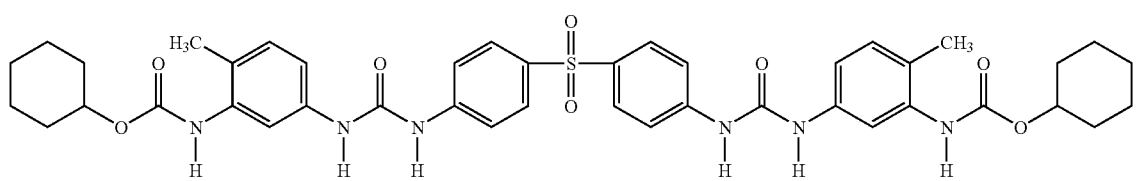
(S-56)
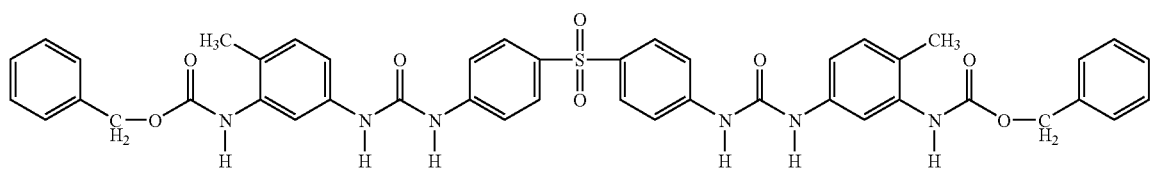
(S-57)
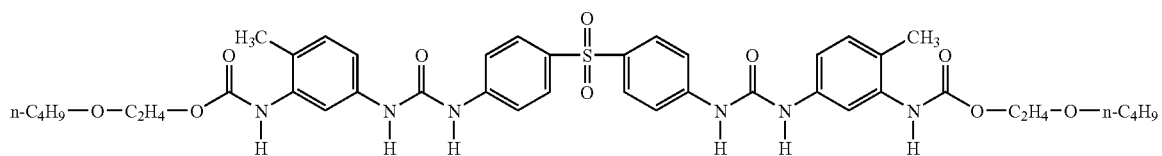

-continued
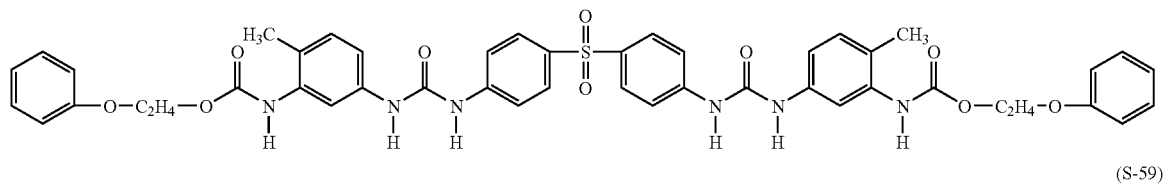
(S-58)
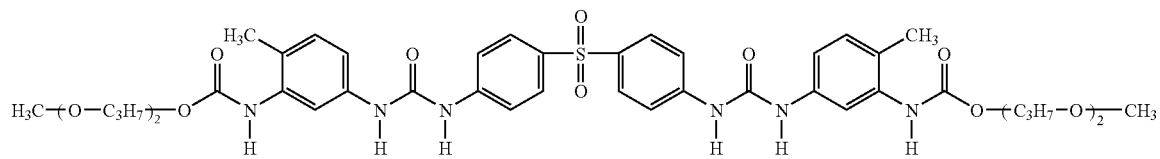
(S-59)
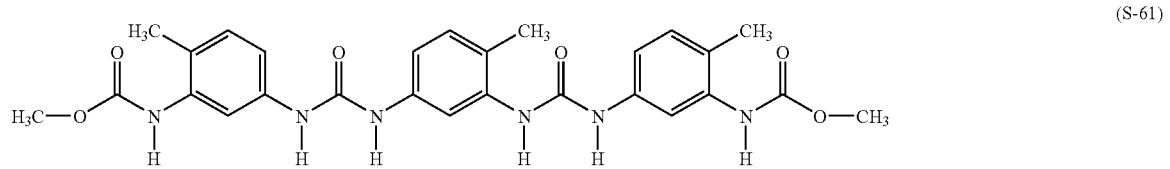
(S-60)
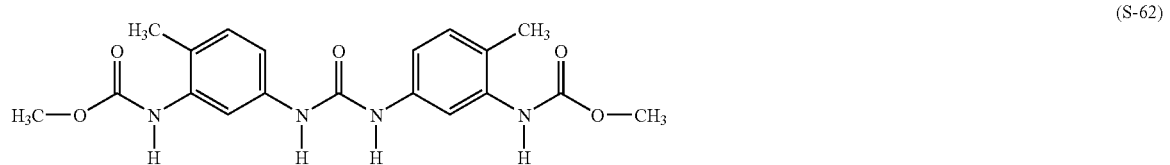
(S-61)
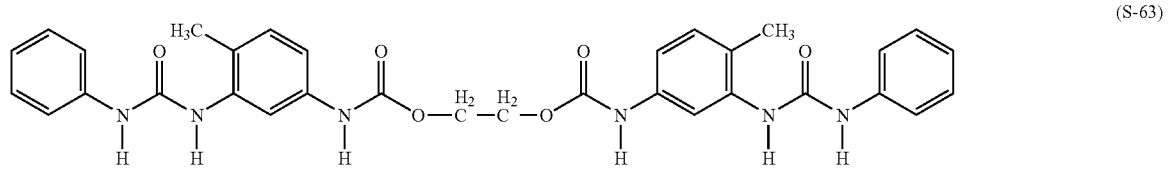
(S-62)
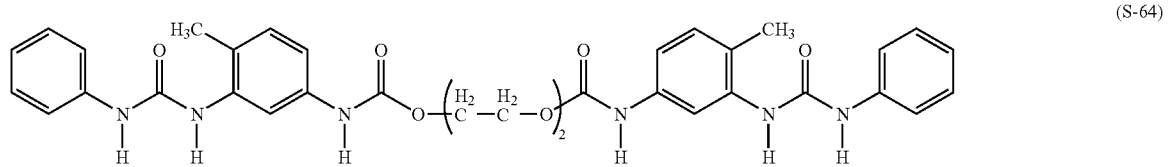
(S-63)
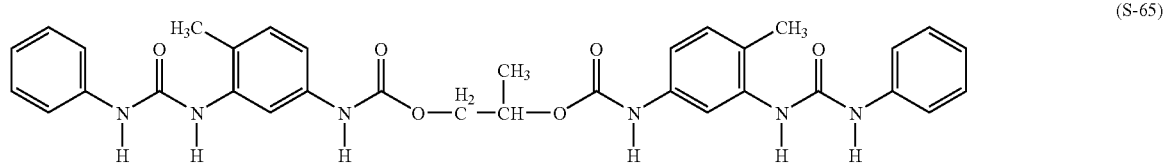
(S-64)
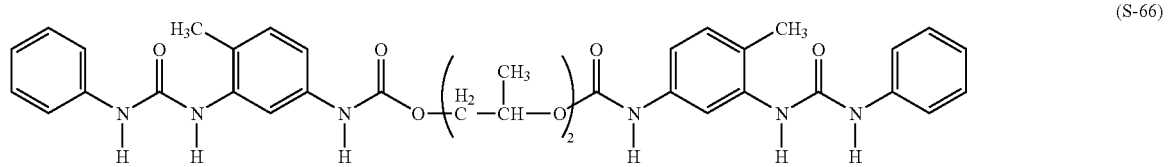
(S-65)
(S-66)

-continued (S-67)
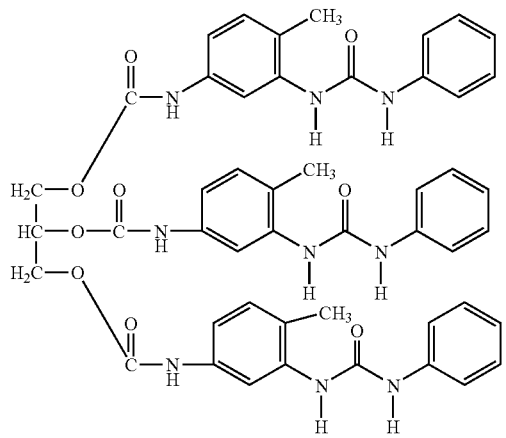

(S-68)
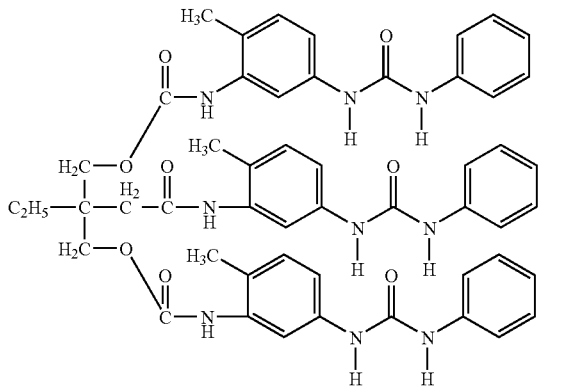

(S-69)
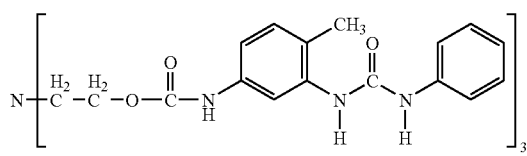

(S-70)
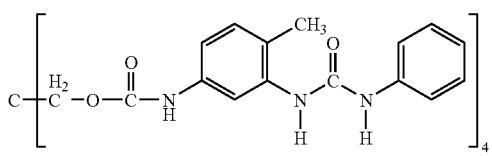

Each of the urea-urethane compositions according to the seventh to nineteenth aspects of the present invention comprises 50 wt % or more, preferably 60 wt % or more, more preferably 70 wt % or more of a urea-urethane compound having in the molecule at least one urethane group (—NH-COO— group) and at least one urea group (—NHCONH— group) in a total number of 2 to 10 and having a molecular weight of 5,000 or less. Such a urea-urethane composition can be used in combination with a colorless or light-colored dye precursor in order to obtain a color-producing composition for a heat-sensitive recording material or a pressure-sensitive recording material. This color-producing composition is so effective that it is excellent in both color-producing capability and print preservability.

The urea-urethane compound as the main constituent of the urea-urethane composition has at least one urea group and at least one urethane group in the molecule. The urea group and the urethane group are preferably adjacent to each other through at least one compound residue (such a structure portion is hereinafter referred to as a urea-urethane structure portion). The total number of the urethane group(s) and the urea group(s) is not more than 10 and not less than 2, preferably not more than 10 and not less than 3, more preferably not more than 10 and not less than 4.

The ratio of urethane group(s) to urea group(s) in a molecule of the urea-urethane compound is preferably 1:3 to 3:1, more preferably 1:2 to 2:1, most preferably 1:1.

The molecular weight of the urea-urethane compound is preferably 5,000 or less, more preferably 2,000 or less.

The content of the urea-urethane compound in each of the urea-urethane compositions of the seventh to nineteenth aspects of the present invention is 50 wt % or more. Such a urea-urethane composition can be produced by a relatively simple production process. On the other hand, it can exhibit excellent performance characteristics because of the high proportion of the urea-urethane compound capable of exhibiting excellent color-developing capability and preserving capability which are required of a color-producing composition. In addition, as the urea-urethane compound, either a single compound or a mixture of two or more compounds including isomers may be used. The mixture of two or more urea-urethane compounds including isomers may be used for the purpose of enhancing color-producing sensitivity and storage stability, etc.

On the other hand, the urea-urethane compound of the present invention can be optionally diluted with a material(s) which does not inhibit the effect of the invention. The diluent for this purpose includes, for example, a heat-meltable material, an acidic developer, an amine compound, an isocyanate compound, a urea compound and a urethane compound. Among them, a urea compound and a urethane compound, which are similar in molecular structure to the urea-urethane compound, are preferable because they can increase the sensitivity. More preferable is a compound obtained by reacting a polyisocyanate compound with a hydroxy compound or an amino compound. These diluents are preferably contained in a content of 0.0001 to 50 wt % based on the total of the urea-urethane compound and the diluent. The diluent content is more preferably 40 wt % or less, further preferably 30 wt % or less to show better storage stability. The diluent content is also more preferably 0.01 wt % or more, further preferably 1 wt % or more to increase the sensitivity. Some diluents may be produced during a reaction for synthesizing the urea-urethane compound. Some diluents, however, may be preferably added to the synthesis reaction to increase the sensitivity. The same effect can be obtained in the compositions according to the seventh to nineteenth aspects of the present invention.

Each of the urea-urethane compositions of the seventh to nineteenth aspects of the present invention is preferably a colorless or light-colored solid having a melting point, from the viewpoint of utility in a heat-sensitive recording material. The melting point of the composition is preferably 40° C. to 300° C., more preferably 60° C. to 260° C.

As a process for producing the urea-urethane composition of the present invention, there is preferably adopted a process of forming one or more urethane groups from at least one of the isocyanate groups of a polyisocyanate compound and the hydroxyl group(s) of a hydroxy compound, and then forming one or more urea groups from the remaining unreacted isocyanate groups of the same polyisocyanate compound and the amino group(s) of an amino compound; or a process of forming one or more urea groups from at least one of the isocyanate groups of a polyisocyanate compound and the amino group(s) of an amino compound, and then forming one or more urethane groups from the remaining unreacted isocyanate groups of the same polyisocyanate compound and the hydroxyl group(s) of a hydroxy compound.

When one or more urethane groups are formed from a polyisocyanate compound and a hydroxy compound, the urea-urethane composition can be efficiently obtained by using the polyisocyanate compound in an excess amount over hydroxyl group, bonding the polyisocyanate compound to the hydroxy compound in an amount of one molecule per hydroxyl group of the hydroxy compound to react only one of the isocyanate groups of the polyisocyanate compound and leave at least one of the isocyanate groups unreacted, and then reacting unreacted isocyanate group(s) with an amino compound to form one or more urea groups. In this case, it is preferable to form one or more urethane groups by reacting the polyisocyanate compound with the hydroxy compound so that the ratio of the number of moles of the polyisocyanate compound to the number of hydroxyl equivalents of the hydroxy compound may be 100/1 to 1/2. It is preferable to form one or more urethane groups by a reaction with a ratio of the number of isocyanate equivalents of the polyisocyanate compound to the number of hydroxyl equivalents of the hydroxy compound being 1000/1 to 1/1.

In adding the hydroxy compound to the polyisocyanate compound, the hydroxy compound is preferably added in small portions so that the polyisocyanate compound may be always present in the reaction system in an excess amount over hydroxyl group. Such an adding method is preferable particularly when the reaction is carried out at a ratio of the number of moles of the polyisocyanate compound to the number of hydroxyl equivalents of the hydroxy compound of near 1/1, for example, 5/1 to 1/2.

Similarly, when one or more urea groups are formed from a polyisocyanate compound and an amino compound, the urea-urethane composition can be efficiently obtained by using the polyisocyanate compound in an excess amount over amino group, bonding the polyisocyanate compound to the amino compound in an amount of one molecule per amino group of the amino compound to react one of the isocyanate groups of the polyisocyanate compound and leave at least one of the isocyanate groups unreacted, and then reacting unreacted isocyanate group(s) with a hydroxy compound to form one or more urethane groups. Also in this case, it is preferable to form one or more urea groups by reacting the polyisocyanate compound with the amino compound so that the ratio of the number of moles of the polyisocyanate compound to the number of amino equivalents of the amino compound may be 100/1 to 1/2. It is preferable to form one or more urea groups by a reaction with a ratio of the number of isocyanate equivalents of the polyisocyanate compound to the number of amino equivalents of the amino compound being 1000/1 to 1/1.

In adding the amino compound to the polyisocyanate compound, the amino compound is preferably added in small portions so that the polyisocyanate compound may be always present in the reaction system in an excess amount over amino group. Such an adding method is preferable particularly when the reaction is carried out at a ratio of the number of moles of the polyisocyanate compound to the number of amino equivalents of the amino compound of near 1/1, for example, 5/1 to 1/2.

In a process for producing the urethane-urea composition of the present invention, the reaction of a polyisocyanate compound with a hydroxy compound for forming one or more urethane groups is preferably carried out without a solvent or by adding, dropping or pouring the hydroxy compound without a solvent, a dilution of the hydroxy compound with a solvent or a dispersion of the hydroxy compound in a solvent continuously or by portions to a dilution of the polyisocyanate compound with a solvent or a dispersion of the polyisocyanate compound in a solvent. Similarly, the reaction of a polyisocyanate compound with an amino compound for forming one or more urea groups may be carried out without a solvent or by adding, dropping or pouring the amino compound without a solvent, a dilution of the amino compound with a solvent or a dispersion of the amino compound in a solvent continuously or by portions to a dilution of the polyisocyanate compound with a solvent or a dispersion of the polyisocyanate compound in a solvent.

The above production process comprising adding a hydroxy compound or an amino compound to a polyisocyanate compound in small portions is preferable particularly in the following case: in a reaction process for the production of the urea-urethane composition, while leaving at least one of the isocyanate groups in molecule of the polyisocyanate compound, the other isocyanate group(s) is reacted with the hydroxy compound or the amino compound to form one or more urethane groups or urea groups, respectively. Moreover, said production process is preferable when a hydroxy compound having two or more hydroxyl groups or an amino compound having two or more amino groups is reacted with a polyisocyanate compound having two or more isocyanate groups.

In carrying out the above reactions, it is preferable to stir the system thoroughly so that the hydroxy or amino compound added, dropped or poured to the polyisocyanate may be immediately and sufficiently dispersed. It is preferable to stir the reaction system sufficiently, for example, by adjusting the stirring rate in a reactor, choosing an agitating blade or setting a baffle plate.

It is preferable to carry out the reaction for forming one or more urethane groups and the reaction for forming one or more urea groups, individually and successively. When they are carried out at the same time, the urea-urethane compound content of the urea-urethane composition is undesirably decreased. It is preferable to carry out these urethane group forming reaction and urea group forming reaction continuously. In the process of the present invention, since separation and purification steps are not necessary in the course of the production, the production can be simplified by carrying out the two reaction steps continuously.

In the production of the urea-urethane composition of the present invention, when a polyisocyanate adduct with a hydroxy compound is used which is an isocyanate already having one or more urethane groups in the molecule, the urea-urethane composition can be obtained by reacting this adduct with an amino compound. In this case, it is preferable to form one or more urea groups by carrying out the reaction at an equivalent ratio of isocyanate group to amino group of 2/1 to 1/100, and remove the unreacted amino compound.

In the production of the urea-urethane composition of the present invention, when a polyisocyanate adduct with an amino compound is used which is an isocyanate already having one or more urea groups in the molecule, the urea-urethane composition can be obtained by reacting this adduct with a hydroxy compound. In this case, it is preferable to form one or more urethane groups by carrying out the reaction at an equivalent ratio of isocyanate group to hydroxyl group of 2/1 to 1/100, and remove the unreacted hydroxy compound.

When a solvent is used for carrying out the reaction(s) in the production of any of the urea-urethane compositions of the seventh to nineteenth aspects of the present invention, the solvent is not particularly limited so long as it does not react with isocyanate group and the like. The solvent includes, for example, aliphatic hydrocarbons, alicyclic hydrocarbons, aromatic hydrocarbons, chlorinated aliphatic hydrocarbons, chlorinated aromatic hydrocarbons, chlorinated alicyclic hydrocarbons, ketones and phosphoric esters. Especially preferable are acetone, methyl ethyl ketone, toluene and the like, which dissolve the isocyanate and in which the reaction product has a low solubility. When a high dissolving power for both the isocyanate and the reaction product is necessary, the phosphoric esters, in particular, trimethyl phosphate are preferable.

When such a solvent is used, the formation of one or more urethane groups and the formation of one or more urea groups are preferably carried out in one and the same solvent in order to make it easy to reuse the solvent and carry out the reaction for the urea group formation and the reaction for the urethane group formation continuously.

The reaction temperature at which a polyisocyanate is reacted with a hydroxy compound and/or an amino compound to form one or more urethane groups and/or one or more urea groups is 0° C. to 300° C., preferably 5° C. to 200° C., more preferably 10° C. to 150° C. The reaction temperature is properly adjusted depending on the polyisocyanate compound, hydroxy compound and amino compound selected. It is also possible to carry out the urethane group formation and the urea group formation at different temperatures suitable for the formations, respectively.

A catalyst may be used for reacting a polyisocyanate with a hydroxy compound and/or an amino compound to form one or more urethane groups and/or one or more urea groups. The catalyst includes, for example, tertiary amine compounds such as triethylamine, 1,4-diazabicyclo(2,2,2)octane, etc.; organic acid tin salts such as dibutyltin dilaurate, etc. Usually, the catalyst concentration is 1 to 10,000 ppm, preferably 10 to 2,000 ppm, relative to the isocyanate compound. Of the above-exemplified catalysts, the tertiary amine compounds are preferable.

A urea-urethane composition containing a urea-urethane compound having a plurality of urea-urethane structure portions in the molecule can be obtained by repeating the steps of the production process of the present invention two or more times by using, for example, an amino compound having two or more amino groups and a hydroxy compound having two or more hydroxyl groups. Since a sufficiently high yield from reaction can be attained in each step, the production process of the present invention permits relatively easy production of a urea-urethane composition having high performance characteristics.

The polyisocyanate compound used in each of the seventh to nineteenth aspects of the present invention is not particularly limited so long as it has two or more isocyanate groups bonded to carbon atoms, respectively. The polyisocyanate compound includes, for example, p-phenylene diisocyanate, m-phenylene diisocyanate, o-phenylene diisocyanate, 2,5-dimethoxybenzene-1,4-diisocyanate, 2,4-toluene diisocyanate, 2,6-toluene diisocyanate, diphenylmethane diisocyanate, o-tolidine diisocyanate, diphenyl ether diisocyanate, 1,5-naphthylene diisocyanate, dianisidine diisocyanate, 9-ethylcarbazole-3,6-diisocyanate, 3,3'-dimethyl-4,4'-diphenylmethane diisocyanate, hexamethylene diisocyanate, isophorone diisocyanate, triphenylmethane triisocyanate, tris(4-phenylisocyanate)thiophosphate, 4,4',4"-triisocyanato-2,5-dimethoxytriphenylamine, 4,4',4"-triisocyanatotriphenylamine, m-xylylene diisocyanate, lysine diisocyanate, dimer acid diisocyanate, isopropylidene bis-4-cyclohexylisocyanate, dicyclohexylmethane diisocyanate and methylcyclohexane diisocyanate. As the polyisocyanate compound, there may also be used diisocyanate dimers such as N,N'-(4,4'-dimethyl-3,3'-diphenyldiisocyanato)urethodione (Desmodur TT, a trade name), a toluene diisocyanate dimer; and diisocyanate trimers such as 4,4',4"-trimethyl-3,3',3"-triisocyanato-2,4,6-triphenylcyanurate. There may also be used water adduct isocyanates of toluene diisocyanate, diphenylmethane diisocyanate and the like, such as 1,3-bis(3-isocyanato-4-methylphenyl)urea; polyol adducts such as trimethylolpropane adducts of toluene diisocyanate (Desmodur L and Coronate L, trade names); and amine adducts. There may also be used compounds having two or more isocyanate groups, among the isocyanate compounds and isocyanate adduct compounds described in the specification of JP-A-10-76,757 and the specification of JP-A-10-95171 (the contents of these references are hereby incorporated herein by reference). The above-exemplified compounds may be used singly or in combination.

Of the above-exemplified compounds, preferable examples of the polyisocyanate compound are aromatic polyisocyanates having isocyanate groups bonded to a benzene ring, such as p-phenylene diisocyanate, m-phenylene diisocyanate, o-phenylene diisocyanate, 2,4-toluene diisocyanate, 2,6-toluene diisocyanate, diphenylmethane diisocyanate, o-tolidine diisocyanate, diphenyl ether diisocyanate, 1,5-naphthylene diisocyanate, triphenylmethane triisocyanate, N,N'-(4,4'-dimethyl-3,3'-diphenyldiisocyanato)urethodione (Desmodur TT, a trade name), 4,4',4"-trimethyl-3,3',3"-triisocyanato-2,4,6-triphenylcyanurate, 1,3-bis(3-isocyanato-4-methylphenyl)urea, trimethylolpropane adducts of toluene diisocyanate (Desmodur L and Coronate L, trade names), etc. Especially preferable examples of the polyisocyanate compound are toluene diisocyanates. Of the toluene diisocyanates, 2.4-toluene diisocyanate is preferable. Besides 2.4-toluene diisocyanate, mixtures of 2.4-toluene diisocyanate and 2,6-toluene diisocyanate are generally on the market and available at a low price and may also be used as the polyisocyanate compound.

As the hydroxy compound that is reacted with the polyisocyanate compound to form one or more urethane groups, phenol compounds and alcohol compounds are mentioned.

The phenol compounds include, for example, phenol, cresol, xylenol, p-ethylphenol, o-isopropylphenol, resorcinol, p-tert-butylphenol, p-tert-octylphenol, 2-cyclohexylphenol, 2-allylphenol, 4-indanol, thymol, 2-naphthol, p-nitrophenol, o-chlorophenol, p-chlorophenol, 2,2-bis(4-hydroxyphenyl)propane, 2,2-bis(hydroxyphenyl)butane, 2,2-bis(hydroxyphenyl)pentane, 2,2-bis(hydroxyphenyl)heptane, catechol, 3-methylcatechol, 3-methoxycatechol, pyrogallol, hydroquinone, methylhydroquinone, 4-phenylphenol, p,p'-biphenol, 4-cumylphenol, butyl bis(4-hydroxyphenyl)acetate, benzyl bis(4-hydroxyphenyl)acetate, bis(4-hydroxyphenyl)sulfone, bis(3-methyl-4-hydroxyphenyl)sulfone, bis(3,5-dimethyl-4-hydroxyphenyl)sulfone, 4-hydroxyphenyl-4'-methylphenyl sulfone, 3-chloro-4-hydroxyphenyl-4'-methylphenyl sulfone, 3,4-dihydroxyphenyl-4'-methylphenyl sulfone, 4-isopropyloxyphenyl-4'-hydroxyphenyl sulfone, bis(2-allyl-4-hydroxyphenyl)sulfone, 4-hydroxyphenyl-4'-benzyloxyphenyl sulfone, 4-isopropylphenyl-4'-hydroxyphenyl sulfone, 4-hydroxy-4'-isopropoxydiphenyl sulfone, bis(2-methyl-3-tert-butyl-4-hydroxyphenyl)sulfide, 4,4'-dihydroxydiphenyl ether, 4,4'-thiodiphenol, 4,4'-dihydroxybenzophenone, 2,2-bis(4-hydroxyphenyl)hexafluoropropane, 4,4'-dihydroxydiphenylmethane, 3,3'-dihydroxydiphenylamine, bis(4-hydroxy-3-methylphenyl)sulfide, bis(4-(2-hydroxy)-phenyl)sulfone, 2,4-dihydroxybenzophenone, 2,2',4,4'-tetrahydroxybenzophenone, phenyl salicylate, salicylanilide, methyl 4-hydroxybenzoate, benzyl 4-hydroxybenzoate, (4'-chlorobenzyl) 4-hydroxybenzoate, ethyl 1,2-bis(4'-hydroxybenzoate), pentyl 1,5-bis(4'-hydroxybenzoate), hexyl 1,6-bis (4'-hydroxybenzoate), dimethyl 3-hydroxyphthalate, stearyl gallate, lauryl gallate, methyl gallate, 4-methoxyphenol, 4-(benzyloxy)phenol, 4-hydroxybenzaldehyde, 4-n-octyloxysalicylic acid, 4-n-butyloxysalicylic acid, 4-n-pentyloxysalicylic acid, 3-n-dodecyloxysalicylic acid, 3-n-octanoyloxysalicylic acid, 4-n-octyloxycarbonylaminosalicylic acid and 4-n-octanoyloxycarbonylaminosalicylic acid.

Of the above-exemplified phenol compounds, phenol, phenol derivatives represented by the following formula (w) and diphenol compounds represented by the following formula (XVI) are preferable.

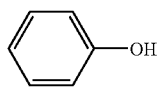
(W)

wherein at least one hydrogen atom of the benzene ring may be replaced by an alkyl group, a cycloalkyl group, a phenyl group, an amide group, an alkoxyl group, a nitro group, a nitrile group, a halogen atom, a formyl group, a dialkylamino group, a toluenesulfonyl group, a methanesulfonyl group or a OH group; and

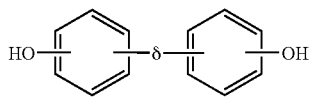
(XVI)

wherein at least one hydrogen atom of each benzene ring may be replaced by a substituent group, which is preferably an aromatic compound residue, an aliphatic compound residue or a heterocyclic compound residue or which may be a hydroxyl group, a nitro group, a nitrile group, a carbamoyl group, a sulfamoyl group, a carboxyl group, a nitroso group, an amino group, an oxyamino group, a nitroamino group, a hydrazino group, a ureido group, an isocyanate group, a mercapto group, a sulfo group or a halogen atom, each of the residues may have one or more substituents, δ is a group selected from the group consisting of —$SO_2$—, —O—, —(S)$_n$—, —($CH_2$)$_n$—, —CO—, —CONH—, —NH—, —CH(COOR$_1$)—, —C(CF$_3$)$_2$— and —CR$_2$R$_3$— or is absent, each of R$_1$, R$_2$ and R$_3$ is independently an alkyl group, and n is 1 or 2.

The term "aliphatic" used in the case of the seventh to nineteenth aspects of the present invention includes the term "alicyclic".

The term "aliphatic compound residue" used in the case of the seventh to nineteenth aspects of the present invention means a residue bonded by the carbon atom of the aliphatic hydrocarbon portion in the residue. The term "aromatic compound residue" used therein means a residue bonded by the carbon atom of the aromatic ring such as benzene ring in the residue. The term "heterocyclic compound residue" used therein means a residue bonded by the carbon atom forming the heterocyclic ring in the residue.

Preferable examples of the substituent of the aliphatic compound residue, heterocyclic compound residue or aromatic compound residue are alkyl groups, cycloalkyl groups, phenyl group, amide group, alkoxyl groups, nitro group, nitrile group, halogen atoms, formyl group, dialkylamino groups, toluenesulfonyl group and methanesulfonyl group.

As the alcohol compounds, compounds having at least one OH group bonded to the carbon atom of an aliphatic compound are mentioned. Examples of the alcohol compounds are the alcohols described in Solvent Handbook, Kodansha Scientific Co., Ltd., the ninth Impression (1989), pp. 327-420 and pp. 772-817. The alcohol compound includes, for example, aliphatic alcohols such as methanol, ethanol, propanol, isopropanol, n-butanol, isobutanol, sec butanol, tert-butanol, pentanol, cyclopentanol, tert-amyl alcohol, 2-pentanol, isoamyl alcohol, hexanol, 3-hexanol, cyclohexanol, cyclohexylmethanol, 4-methyl-2-pentanol, heptanol, isoheptanol, octanol, 2-ethyl-1-hexanol, capryl alcohol, nonyl alcohol, isononyl alcohol, decanol, undecyl alcohol, dodecyl alcohol, tridecyl alcohol, tetradecyl alcohol, hexadecyl alcohol, octadecyl alcohol, isostearyl alcohol, etc.; unsaturated aliphatic alcohols such as ally alcohol, 2-methyl-2-propen-1-ol, crotyl alcohol, propargyl alcohol, etc.; aliphatic alcohols having an aromatic compound residue bonded thereto, such as benzyl alcohol, cinnamyl alcohol, etc.; aliphatic alcohols having a heterocyclic compound residue bonded thereto, such as 2-pyridinemethanol, 3-pyridinemethanol, 4-pyridinemethanol, furfuryl alcohol, etc.; halogenated aliphatic alcohols such as 2-chloroethanol, 1-chloro-3-hydroxypropane, etc.; glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monoisobutyl ether, ethylene glycol monohexyl ether, ethylene glycol monophenyl ether, diethylene glycol monomethyl ether, diethylene glycol monoethyl ether, diethylene glycol monopropyl ether, diethylene glycol monoisopropyl ether, diethylene glycol monobutyl ether, diethylene glycol monoisobutyl ether, diethylene glycol monohexyl ether, diethylene glycol monophenyl ether, propylene glycol monomethyl ether, propylene glycol monoethyl ether, propylene glycol monopropyl ether, propylene glycol monoisopropyl ether, propylene glycol monobutyl ether, propylene glycol monoisobutyl ether, propylene glycol monophenyl ether, dipropylene glycol monomethyl ether, dipropylene glycol monoethyl ether, dipropylene glycol monopropyl ether, dipropylene glycol monoisopropyl ether, dipropylene glycol monobutyl ether, dipropylene glycol monoisobutyl ether, dipropylene glycol monophenyl ether, etc.; diols such as ethylene glycol, diethylene glycol, triethylene glycol, 1,3-propanediol, 1,2-propanediol, propylene glycol, dipropylene glycol, tripropylene glycol, 1,4-butanediol, 1,5-pentanediol, 1,6-hexanediol, hexylene glycol, 1,9-nonanediol, neopentyl glycol, methylpentanediol, etc.; aliphatic polyols such as glycerin, castor oil, trimethylolpropane, trimethylolethane, hexanetriol, pentaerythritol, α-methyl glucoside, sorbitol, sucrose, etc.; polyols such as polyethylene glycols, polypropylene glycols, polytetramethylene glycols, adipate-derived polyols, epoxy-modified polyols, polyether ester polyols, polycarbonate polyols, polycaprolactone diols, amine-modified polyols, polyether polyols obtained by adding one of or a mixture of two or more of alkylene oxides (e.g. ethylene oxide and propylene oxide) to one of or a mixture of two or more of polyhydric alcohols (glycerin and propylene glycol), acryl polyols, fluorinated polyols, polybutadiene polyols, polyhydroxy polyols, castor oil-derived polyols, polymer polyols, halogen-containing polyols, phosphorus-containing polyols, etc.; and alkanolamines such as N,N-dialkylethanolamines, N,N-dialkylisopropanolamines, N-alkyldiethanolamines, N-alkyldiisopropanolamines, triethanolamine, triisopropanolamine, N,N,N',N'-tetrakis(2-hydroxyethyl)ethylenediamine, N,N,N',N'-tetrakis(2-hydroxypropyl)ethylenediamine, etc.

Of the above-exemplified alcohol compounds, aliphatic alcohols having 10 or less carbon atoms, the glycol ethers, the diols, the aliphatic polyols, polyols having a molecular weight of 2,000 or less, and the alkanolamines are preferable.

The above-exemplified alcohol compounds may be used singly or in combination, and the above-exemplified phenol compounds may also be used singly or in combination.

As the amino compound that is reacted with the polyisocyanate compound to form one or more urea groups, any compound may be used so long as it has one or more amino groups bonded to carbon atoms, respectively. The amino compound includes, for example, aromatic amines such as aniline, o-toluidine, m-toluidine, p-toluidine, o-anisidine, p-anisidine, p-phenetidine, N,N-dimethyl-p-phenylenediamine, N,N-diethyl-p-phenylenediamine, 2,4-dimethoxyaniline, 2,5-dimethoxyaniline, 3,4-dimethoxyaniline, p-aminoacetanilide, p-aminobenzoic acid, o-aminophenol, m-aminophenol, p-aminophenol, 2,3-xylidine, 2,4-xylidine, 3,4-xylidine, 2,6-xylidine, 4-aminobenzonitrile, anthranilic acid, p-cresidine, 2,5-dichloroaniline, 2,6-dichloroaniline, 3,4-dichloroaniline, 3,5-dichloroaniline, 2,4,5-trichloroaniline, α-naphthylamine, aminoanthracene, o-ethylaniline, o-chloroaniline, m-chloroaniline, p-chloroaniline, N-methylaniline, N-ethylaniline, N-propylaniline, N-butylaniline, N,N-diglycidylaniline, N,N-diglycidyl-o-toluidine, acetoacetic acid anilide, trimethylphenylammonium bromide, 4,4'-diamino-3,3'-diethyldiphenylmethane, 4,4'-diaminobenzanilide, 3,5-diaminochlorobenzene, diaminodiphenyl ether, 3,3'-dichloro-4,4'-diaminodiphenylmethane, 3,3'-dimethyl-4,4'-diaminodiphenylmethane, tolidine base, o-phenylenediamine, m-phenylenediamine, p-phenylenediamine, 2-chloro-p-phenylenediamine, dianisidine, methyl p-aminobenzoate, ethyl p-aminobenzoate, n-propyl p-aminobenzoate, isopropyl p-aminobenzoate, butyl p-aminobenzoate, dodecyl p-aminobenzoate, benzyl p-aminobenzoate, o-aminobenzophenone, m-aminoacetophenone, p-aminoacetophenone, m-aminobenzamide, aminobenzamide, p-aminobenzamide, p-amino-N-methylbenzamide, 3-amino-4-methylbenzamide, 3-amino-4-methoxybenzamide, 3-amino-4-chlorobenzamide, p-(N-phenylcarbamoyl)aniline, p-[N-(4-chlorophenyl)carbamoyl]aniline, p-[N-(4-aminophenyl)carbamoyl]-aniline, 2-methoxy-5-(N-phenylcarbamoyl)aniline, 2-methoxy-5-[N-(2'-methyl-3'-chlorophenyl)carbamoyl]-aniline, 2-methoxy-5-[N-(2'-chlorophenyl)carbamoyl]-aniline, 5-acetylamino-2-methoxyaniline, 4-acetylaminoaniline, 4-(N-methyl-N-acetylamino)aniline, 2,5-diethoxy-4-(N-benzoylamino)aniline, 2,5-dimethoxy-4-(N-benzoylamino)aniline, 2-methoxy-4-(N-benzoylamino)-5-methylaniline, 4-sulfamoylaniline, 3-sulfamoylaniline, 2-(N-ethyl-N-phenylaminosulfonyl)aniline, 4-dimethylaminosulfonylaniline, 4-diethylaminosulfonylaniline, sulfathiazole, 4-aminodiphenyl sulfone, 2-chloro-5-N-phenylsulfamoylaniline, 2-methoxy-5-N,N-diethylsulfamoylaniline, 2,5-dimethoxy-4-N-phenysulfamoylaniline, 2-methoxy-5-benzylsulfonylaniline, 2-phenoxysulfonylaniline, 2-(2'-chlorophenoxy)sulfonylaniline, 3-anilinosulfonyl-4-methylaniline, bis[4-(m-aminophenoxy)phenyl]sulfone, bis[4-(p-aminophenoxy)phenyl] sulfone, bis[3-methyl-4-(p-aminophenoxy)phenyl] sulfone, 3,3'-dimethoxy-4,4'-diaminobiphenyl, 3,3'-dimethyl-4,4'-diaminobiphenyl, 2,2'-dichloro-4,4'-diamino-5,5'-dimethoxybiphenyl, 2,2',5,5'-tetrachloro-4,4'-diaminobiphenyl, o-tolidine sulfone, 2,4'-diaminobiphenyl, 2,2'-diaminobiphenyl, 4,4'-diaminobiphenyl, 2,2'-dichloro-4,4'-diaminobiphenyl, 3,3'-dichloro-4,4'-diaminobiphenyl, 2,2'-dimethyl-4,4'-diaminobiphenyl, 4,4'-thiodianiline, 2,2'-dithiodianiline, 4,4'-dithiodianiline, 4,4'-diaminodiphenyl ether, 3,3'-diaminodiphenyl ether, 3,4'-diaminodiphenyl ether, 4,4'-diaminodiphenylmethane, 3,4'-diaminodiphenylmethane, bis(3-amino-4-chlorophenyl)sulfone, bis(3,4-diaminophenyl) sulfone, 4,4'-diaminodiphenyl sulfone, 3,3'-diaminodiphenyl sulfone, 3,4'-diaminodiphenyl sulfone, 3,3'-diaminodiphenylmethane, 4,4-diaminodiphenylamine, 4,4'-ethylenedianiline, 4,4'-diamino-2,2'-dimethyldibenzyl, 3,3'-diaminobenzophenone, 4,4'-diaminobenzophenone, 1,4-bis(4-aminophenoxy)benzene, 1,3-bis(4-aminophenoxy)benzene, 1,3-bis(3-aminophenoxy)benzene, 9,9-bis(4-aminophenyl)fluorene, 2,2-bis(4-aminophenoxyphenyl)propane, 4,4'-bis(4-aminophenoxy)diphenyl, 3,3',4,4'-tetraminodiphenyl ether, 3,3',4,4'-tetraminodiphenyl sulfone, 3,3',4,4'-tetraminobenzophenone, 3-aminobenzonitrile, 4-phenoxyaniline, 3-phenoxyaniline, 4,4'-methylenebis-o-toluidine, 4,4'-(p-phenyleneisopropylidene)-bis-(2,6-xylidine), o-chloro-p-nitroaniline, o-nitro-p-chloroaniline, 2,6-dichloro-4-nitroaniline, 5-chloro-2-nitroaniline, 2-amino-4-chlorophenol, o-nitroaniline, m-nitroaniline, p-nitroaniline, 2-methyl-4-nitroaniline, m-nitro-p-toluidine, 2-amino-5-nitrobenzonitrile, Metol, 2,4-diaminophenol, N-(β-hydroxyethyl)-o-aminophenol sulfate, sulfanilic acid, metanilic acid, 4B acid, C acid, 2B acid, p-fluoroaniline, o-fluoroaniline, 3-chloro-4-fluoroaniline, 2,4-difluoroaniline, 2,3,4-trifluoroaniline, m-aminobenzotrifluoride, m-toluoylenediamine, 2-aminothiophenol, 2-amino-3-bromo-5-nitrobenzonitrile, diphenylamine, p-aminodiphenylamine, octylated diphenylamine, 2-methyl-4-methoxydiphenylamine, N,N-diphenyl-p-phenylenediamine, dianisidine, 3,3'-dichlorobenzidine, 4,4'-diaminostilbene-2,2'-disulfonic acid, benzylethylaniline, 1,8-naphthalenediamine, sodium naphthionate, Tobias acid, H acid, J acid, phenyl J acid, 1,4-diamino-anthraquinone, 1,4-diamino-2,3-dichloroanthraquinone, etc.; heterocyclic compound amines such as 3-amino-1,2,4-triazole, 2-aminopyridine, 3-aminopyridine, 4-aminopyridine, α-amino-ε-caprolactam, acetoguanamine, 2,4-diamino-6-[2'-methylimidazolyl-(1)]ethyl-S-triazine, 2,3-diaminopyridine, 2,5-diaminopyridine, 2,3,5-triaminopyridine, 1-amino-4-methylpiperazine, 1-(2-aminoethyl)piperazine, bis(aminopropyl)piperazine, N-(3-aminopropyl)morpholine, etc.; and aliphatic amines such as methylamine, ethylamine, dimethylamine, diethylamine, stearylamine, allylamine, diallylamine, isopropylamine, diisopropylamine, 2-ethylhexylamine, ethanolamine, 3-(2-ethylhexyloxy)propylamine, 3-ethoxypropylamine, diisobutylamine, 3-(diethylamino)propylamine, di-2-ethylhexylamine, 3-(dibutylamino)propylamine, t-butylamine, propylamine, 3-(methylamino)propylamine, 3-(dimethylamino)propylamine, 3-methoxypropylamine, methylhydrazine, 1-methylbutylamine, methanediamine, 1,4-diaminobutane, cyclohexanemethylamine, cyclohexylamine, 4-methylcyclohexylamine, 2-bromoethylamine, 2-2.0 methoxyethylamine, 2-ethoxymethylamine, 2-amino-1-propanol, 2-aminobutanol, 3-amino-1,2-propanediol, 1,3-diamino-2-hydroxypropane, 2-aminoethanethiol, ethylenediamine, diethylenetriamine, hexamethylenediamine, etc.

In addition, of the above-exemplified amino compounds, the aromatic amines are preferable, and aniline derivatives having at least one amino group and represented by the following formula (z) or (VIII) are especially preferable:

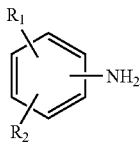
(Z)

wherein $R_1$ and $R_2$ are independently a hydrogen atom, a halogen atom, an alkyl group, an alkoxy group or an amino group; or

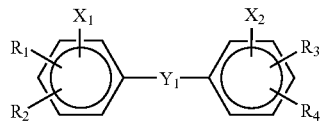
(VIII)

wherein $R_1$, $R_2$, $R_3$ and $R_4$ are independently a hydrogen atom, a halogen atom, an alkyl group, an alkoxy group or an amino group, $X_1$ and $X_2$ are independently an amino group or a group represented by the formula (b):

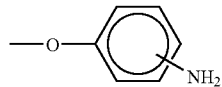
(b)

and $Y_1$ is any of —$SO_2$—, —O—, —(S)$_n$—, —(CH$_2$)$_n$—, —CO—, —CONH—, —NH—, —CH(COOR$_1$)—, —C(CF$_3$)$_2$—, —CR$_2$R$_3$— and a group represented by any of the formulas (a):

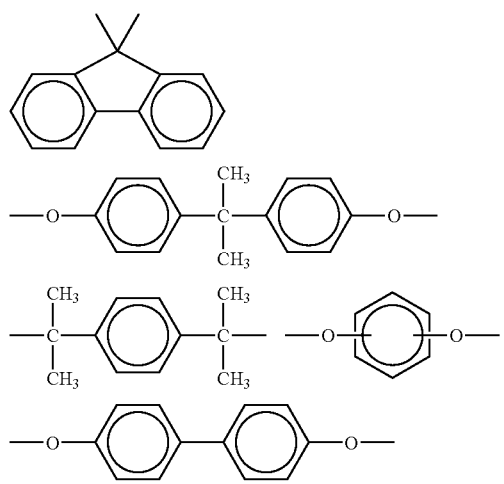
(a)

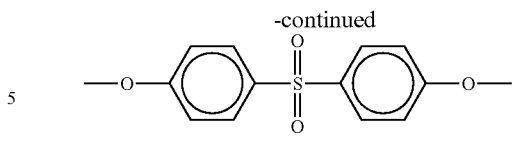
-continued or is absent, each of $R_1$, $R_2$ and $R_3$ is an alkyl group, and n is 1 or 2.

Such amine compounds may be used singly or in combination.

The urea-urethane compound used as developer in the twentieth aspect of the present invention refers to a compound having at least one urea group (—NHCONH— group) and at least one urethane group (—NHCOO— group) in the molecule.

It has been known that compounds having one or more urea groups have color-developing effect, but they have not been practical because they give a low coloring density and have an insufficient shelf stability. However, surprisingly, a urea-urethane compound having both at least one urea group and at least one urethane group in the molecule is an excellent developer for a colorless or light-colored dye precursor, and a color-producing composition comprising the urea-urethane compound and the dye precursor and a recording material obtained by using the color-producing composition give a high coloring density and have an excellent shelf stability.

Although a mechanism by which such a urea-urethane compound exhibits an excellent color-developing effect is unknown, it is conjectured that the effect is due to the interaction between the urea group(s) and the urethane group(s) in the molecule.

As the urea-urethane compound used as developer in the twentieth aspect of the present invention; any compound may be used so long as it has both at least one urea group (—NHCONH— group) and at least one urethane group (—NHCOO— group) in the molecule. The urea-urethane compound is preferably an aromatic compound or a heterocyclic compound. In addition, the urea-urethane compound is preferably a compound in which an aromatic compound residue or heterocyclic compound residue is directly bonded to each end of each of the urea group(s) and the urethane group(s). It is more preferable that besides the urea group(s) (—NHCONH— group(s)) and urethane group(s) (—NHCOO— group(s)), one or more sulfonic acid groups (—SO$_2$— groups), amide groups (—NHCO— groups) or isopropylidene groups (—C (CH$_3$)$_2$— groups) be present in the molecule without binding directly to the urea group(s).

The molecular weight of the urea-urethane compound is preferably 5,000 or less, more preferably 2,000 or less. The total number of urea group(s) and urethane group(s) in the urea-urethane compound is preferably 20 or less, more preferably 10 or less. The ratio of urea group(s) to urethane group(s) in the molecular structure of the urea-urethane compound is preferably 1:3 to 3:1, in particular, 1:2 to 2:1.

When used in a heat-sensitive recording material, the urea-urethane compound is preferably one that has a melting point. The melting point ranges preferably from 40° C. to 500° C., in particular, from 60° C. to 300° C.

A process for synthesizing the urea-urethane compound used as developer in the twentieth aspect of the present invention is not particularly limited so long as at least one urea group (—NHCONH— group) and at least one urethane group (—NHCOO— group) are formed. A process in which the urea-urethane compound is produced by the reaction of an isocyanate compound with an OH group-containing compound and an amine compound is preferable because of its ease.

In detail, in the case of the urea-urethane compound used as developer in the present invention, an isocyanate having at least two isocyanate groups is used as a starting material and one or more urethane groups are formed by reacting all the isocyanate groups except at least one with an OH group-containing compound, after which one or more urea groups can be formed by reacting the remaining isocyanate group(s) with an amine compound. It is also possible to form one or more urea groups by reacting all the isocyanate groups except at least one with an amine compound at first, and then form one or more urethane groups by reacting the remaining isocyanate group(s) with an OH group-containing compound.

The starting isocyanate is not particularly limited so long as it has two or more isocyanate groups. The starting isocyanate includes, for example, p-phenylene diisocyanate, 2,5-dimethoxybenzene-1,4-diisocyanate, 2,4-toluene diisocyanate, 2,6-toluene diisocyanate, diphenylmethane diisocyanate, o-tolidine diisocyanate, diphenyl ether diisocyanate, 1,5-naphthylene diisocyanate, dianisidine diisocyanate, 9-ethylcarbazole-3,6-diisocyanate, 3,3'-dimethyl-4,4'-diphenylmethane diisocyanate, hexamethylene diisocyanate, isophorone diisocyanate, triphenylmethane triisocyanate, tris(4-phenylisocyanato)thiophosphate, 4,4',4"-triisocyanato-2,5-dimethoxytriphenylamine, 4,4',4"-triisocyanatotriphenylamine, m-xylylene diisocyanate, lysine diisocyanate, dimer acid diisocyanate, isopropylidene bis-4-cyclohexylisocyanate, dicyclohexylmethane diisocyanate and methylcyclohexane diisocyanate. As the starting isocyanate, there may also be used diisocyanate dimers such as N,N'-(4,4'-dimethyl-3,3'-diphenyldiisocyanato)urethodione (Desmodur TT, a trade name), a toluene diisocyanate dimer; and diisocyanate trimers such as 4,4',4"-trimethyl-3,3',3"-triisocyanato-2,4,6-triphenylcyanurate. There may also be used water adduct isocyanates of toluene diisocyanate, diphenylmethane diisocyanate and the like, such as 1,3-bis(3-isocyanato-4-methylphenyl)urea; polyol adducts such as trimethylolpropane adduct of toluene diisocyanate (Desmodur L, a trade name); and amine adducts. There may also be used compounds having two or more isocyanate groups, among the isocyanate compounds and isocyanate adduct compounds described in the specification of JP-A-8-225,445 and the specification of JP-A-8-250,623.

Especially preferable examples of the starting isocyanate are toluene diisocyanates. Of the toluene diisocyanates, 2.4-toluene diisocyanate is preferable. Besides 2.4-toluene diisocyanate, mixtures of 2.4-toluene diisocyanate and 2,6-toluene diisocyanate are generally on the market and available at a low price and may also be used as the staring isocyanate.

As the amine compound that is reacted with the starting isocyanate for the urea-urethane compound as developer to form one or more urea groups, any compound may be used so long as it has one or more amino groups. The amine compound includes, for example, aromatic amines such as aniline, o-toluidine, m-toluidine, p-toluidine, o-anisidine, p-anisidine, p-phenetidine, N,N-dimethylaniline, N,N-diethylaniline, N,N-dimethyl-p-phenylenediamine, N,N-diethyl-p-phenylenediamine, 2,4-dimethoxyaniline, 2,5-dimethoxyaniline, 3,4-dimethoxyaniline, p-aminoacetanilide, p-aminobenzoic acid, o-aminophenol, m-aminophenol, p-aminophenol, 2,3-xylidine, 2,4-xylidine, 3,4-xylidine, 2,6-xylidine, 4-aminobenzonitrile, anthranilic acid, p-cresidine, 2,5-dichloroaniline, 2,6-dichloroaniline, 3,4-dichloroaniline, 3,5-dichloroaniline, 2,4,5-trichloroaniline, α-naphthylamine, aminoanthracene, o-ethylaniline, o-chloroaniline, m-chloroaniline, p-chloroaniline, N-methylaniline, N-ethylaniline, N-propylaniline, N-butylaniline, N,N-diglycidylaniline, N,N-diglycidyl-o-toluidine, acetoacetic acid anilide, trimethylphenylammonium bromide, 4,4'-diamino-3,3'-diethyldiphenylmethane, 4,4'-diaminobenzanilide, 3,5-diaminochlorobenzene, diaminodiphenyl ether, 3,3'-dichloro-4,4'-diaminodiphenylmethane, 3,3'-dimethyl-4,4'-diaminodiphenylmethane, tolidine base, o-phenylenediamine, m-phenylenediamine, p-phenylenediamine, 2-chloro-p-phenylenediamine, dianisidine, methyl p-aminobenzoate, ethyl p-aminobenzoate, n-propyl p-aminobenzoate, isopropyl p-aminobenzoate, butyl p-aminobenzoate, dodecyl p-aminobenzoate, benzyl p-aminobenzoate, o-aminobenzophenone, m-aminoacetophenone, p-aminoacetophenone, m-aminobenzamide, o-aminobenzamide, p-aminobenzamide, p-amino-N-methylbenzamide, 3-amino-4-methylbenzamide, 3-amino-4-methoxybenzamide, 3-amino-4-chlorobenzamide, p-(N-phenylcarbamoyl)aniline, p-[N-(4-chlorophenyl)carbamoyl]aniline, p-[N-(4-aminophenyl)carbamoyl]-aniline, 2-methoxy-5-(N-phenylcarbamoyl)aniline, 2-methoxy-5-[N-(2'-methyl-3'-chlorophenyl)carbamoyl]-aniline 2-methoxy-5-[N-(2'-chlorophenyl)carbamoyl]-aniline, 5-acetylamino-2-methoxyaniline, 4-acetylaminoaniline, 4-(N-methyl-N-acetylamino)aniline, 2,5-diethoxy-4-(N-benzoylamino)aniline, 2,5-dimethoxy-4-(N-benzoylamino)aniline, 2-methoxy-4-(N-benzoylamino)-5-methylaniline, 4-sulfamoylaniline, 3-sulfamoylaniline, 2-(N-ethyl-N-phenylaminosulfonyl)aniline, 4-dimethylaminosulfonylaniline, 4-diethylaminosulfonylaniline, sulfathiazole, 4-aminodiphenyl sulfone, 2-chloro-5-N-phenylsulfamoylaniline, 2-methoxy-5-N,N-diethylsulfamoylaniline, 2,5-dimethoxy-4-N-phenysulfamoylaniline, 2-methoxy-5-benzylsulfonylaniline, 2-phenoxysulfonylaniline, 2-(2'-chlorophenoxy)sulfonylaniline, 3-anilinosulfonyl-4-methylaniline, bis[4-(m-aminophenoxy)phenyl] sulfone, bis[4-(p-aminophenoxy)phenyl] sulfone, bis[3-methyl-4-(p-aminophenoxy)phenyl] sulfone, 3,3'-dimethoxy-4,4'-diaminobiphenyl, 3,3'-dimethyl-4,4'-diaminobiphenyl, 2,2'-dichloro-4,4'-diamino-5,5'-dimethoxybiphenyl, 2,2',5,5'-tetrachloro-4,4'-diaminobiphenyl, o-tolidine sulfone, 2,4'-diaminobiphenyl, 2,2'-diaminobiphenyl, 4,4'-diaminobiphenyl, 2,2'-dichloro-4,4'-diaminobiphenyl, 3,3'-dichloro-4,4'-diaminobiphenyl, 2,2'-dimethyl-4,4'-diaminobiphenyl, 4,4'-thiodianiline, 2,2'-dithiodianiline, 4,4'-dithiodianiline, 4,4'-diaminodiphenyl ether, 3,3'-diaminodiphenyl ether, 3,4'-diaminodiphenyl ether, 4,4'-diaminodiphenylmethane, 3,4'-diaminodiphenylmethane, bis(3-amino-4-chlorophenyl)sulfone, bis(3,4-diaminophenyl)sulfone, 4,4'-diaminodiphenyl sulfone, 3,3'-diaminodiphenyl sulfone, 3,4'-diaminodiphenyl sulfone, 3,3'-diaminodiphenylmethane, 4,4-diaminodiphenylamine, 4,4'-ethylenedianiline, 4,4'-diamino-2,2'-dimethyldibenzyl, 3,3'-diaminobenzophenone, 4,4'-diaminobenzophenone, 1,4-bis(4-aminophenoxy)benzene, 1,3-bis(4-aminophenoxy)benzene, 1,3-bis(3-aminophenoxy)benzene, 9,9-bis(4-aminophenyl)fluorene, 2,2-bis(4-aminophenoxyphenyl)propane, 4,4'-bis(4-aminophenoxy)diphenyl, 3,3',4,4'-tetraminodiphenyl ether, 3,3',4,4'-tetraminodiphenyl sulfone, 3,3',4,4'-tetraminobenzophenone, 3-aminobenzonitrile, 4-phenoxyaniline, 3-phenoxyaniline, 4,4'-methylenebis-o-toluidine, 4,4'-(p-phenyleneisopropylidene)-bis-(2,6-xylidine), o-chloro-p-nitroaniline, o-nitro-p-chloroaniline, 2,6-dichloro-4-nitroaniline, 5-chloro-2-nitroaniline, 2-amino-4-chlorophenol, o-nitroaniline, m-nitroaniline, p-nitroaniline, 2-methyl-4-nitroaniline, m-nitro-p-toluidine, 2-amino-5-nitrobenzonitrile, Metol, 2,4-diaminophenol, N-(4-hydroxyethyl)-o-aminophenol sulfate, sulfanilic acid, metanilic acid, 4B acid, C acid, 2B acid, p-fluoroaniline, o-fluoroaniline, 3-chloro-4-fluoroaniline, 2,4-difluoroaniline, 2,3,4-trifluoroaniline, m-aminobenzotrifluoride, m-toluoylenediamine, 2-aminothiophenol, 2-amino-3-bromo-5-nitrobenzonitrile, diphenylamine, p-aminodiphenylamine, octylated diphenylamine, 2-methyl-4-methoxydiphenylamine, N,N-diphenyl-p-phenylenediamine, dianisidine, 3,3'-dichlorobenzidine, 4,4'-diaminostilbene-2,2'-disulfonic acid, benzylethylaniline, 1,8-naphthalenediamine, sodium naphthionate, Tobias acid, H acid, J acid, phenyl J acid, 1,4-diamino-anthraquinone, 1,4-diamino-2,3-dichloroanthraquinone, etc.; heterocyclic compound amines such as 3-amino-1,2,4-triazole, 2-aminopyridine, 3-aminopyridine, 4-aminopyridine, α-amino-ε-caprolactam, acetoguanamine, 2,4-diamino-6-[2'-methylimidazolyl-(1)]ethyl-5-triazine, 2,3-diaminopyridine, 2,5-diaminopyridine, 2,3,5-triaminopyridine, 1-amino-4-methylpiperazine, 1-(2-aminoethyl)piperazine, bis(aminopropyl)piperazine, N-(3-aminopropyl)morpholine, etc.; and aliphatic amines such as methylamine, ethylamine, dimethylamine, diethylamine, stearylamine, allylamine, diallylamine, isopropylamine, diisopropylamine, 2-ethylhexylamine, ethanolamine, 3-(2-ethylhexyloxy)propylamine, 3-ethoxypropylamine, diisobutylamine, 3-(diethylamino)propylamine, di-2-ethylhexylamine, 3-(dibutylamino)propylamine, t-butylamine, propylamine, 3-(methylamino)propylamine, 3-(dimethylamino)propylamine, 3-methoxypropylamine, methylhydrazine, 1-methylbutylamine, methanediamine, 1,4-diaminobutane, cyclohexanemethylamine, cyclohexylamine, 4-methylcyclohexylamine, 2-bromoethylamine, 2-methoxyethylamine, 2-ethoxymethylamine, 2-amino-1-propanol, 2-aminobutanol, 3-amino-1,2-propanediol, 1,3-diamino-2-hydroxypropane, 2-aminoethanethiol, ethylenediamine, diethylenetriamine, hexamethylenediamine, etc.

Of the above-exemplified amine compounds, aniline derivatives having at least one amino group and represented by the following formula (VIII) are especially preferable:

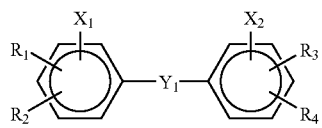

(VIII)

wherein $R_1$, $R_2$, $R_3$ and $R_4$ are independently a hydrogen atom, a halogen atom, an alkyl group, an alkoxy group or an amino group, $X_1$ and $X_2$ are independently an amino group or a group represented by the formula (b):

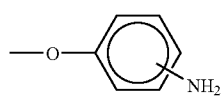

(b)

and $Y_1$ is any of —$SO_2$—, —O—, —(S)$_n$—, —(CH$_2$)$_n$—, —CO—, —CONH— and a group represented by any of the formulas (a):

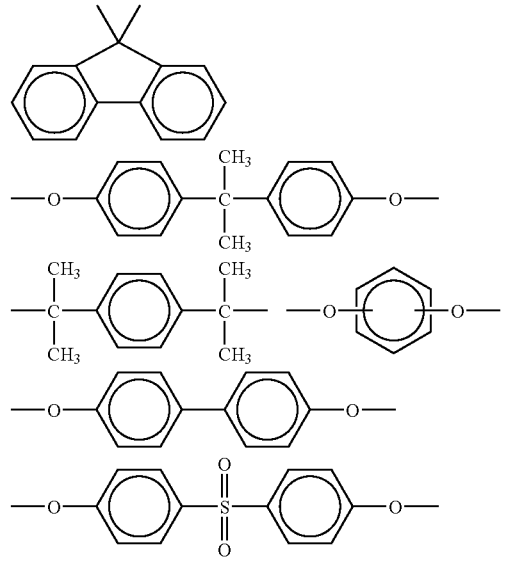

(a)

or is absent, and n is 1 or 2.

As the OH group-containing compound that is reacted with the isocyanate to form one or more urethane groups, any compound may be used so long as it contains one or more OH groups. The OH group-containing compound includes, for example, phenols such as phenol, cresol, xylenol, p-ethylphenol, o-isopropylphenol, resorcinol, p-tert-butylphenol, p-tert-octylphenol, 2-cyclohexylphenol, 2-allylphenol, 4-indanol, thymol, 2-naphthol, p-nitrophenol, o-chlorophenol, p-chlorophenol, 2,2-bis(4-hydroxyphenyl)propane, 2,2-bis(hydroxyphenyl)butane, 2,2-bis(hydroxyphenyl)pentane, 2,2-bis(hydroxyphenyl)heptane, catechol, 3-methylcatechol, 3-methoxycatechol, pyrogallol, hydroquinone, methylhydroquinone, 4-phenylphenol, p,p'-biphenol, 4-cumylphenol, butyl bis(4-hydroxyphenyl)acetate, benzyl bis(4-hydroxyphenyl)acetate, bis(4-hydroxyphenyl)sulfone, bis(3-methyl-4-hydroxyphenyl)sulfone, bis(3,5-dimethyl-4-hydroxyphenyl)sulfone, 4-hydroxyphenyl-4'-methylphenyl sulfone, 3-chloro-4-hydroxyphenyl-4'-methylphenyl sulfone, 3,4-dihydroxyphenyl-4'-methylphenyl sulfone, 4-isopropyloxyphenyl-4'-hydroxyphenyl sulfone, bis(2-allyl-4-hydroxyphenyl)sulfone, 4-hydroxyphenyl-4'-benzyloxyphenyl sulfone, 4-isopropylphenyl-4'-hydroxyphenyl sulfone, 4-hydroxy-4'-isopropoxydiphenyl sulfone, bis(2-methyl-3-tert-butyl-4-hydroxyphenyl)sulfide, 4,4'-dihydroxydiphenyl ether, 4,4'-thiodiphenol, 4,4'-dihydroxybenzophenone, 2,2-bis(4-hydroxyphenyl)hexafluoropropane, 4,4'-dihydroxydiphenylmethane, 3,3'-dihydroxydiphenylamine, bis(4-hydroxy-3-methylphenyl)sulfide, bis(4-(2-hydroxy)phenyl) sulfone, 2,4-dihydroxybenzophenone, 2,2',4,4'-tetrahydroxybenzophenone, phenyl salicylate, salicylanilide, methyl 4-hydroxybenzoate, benzyl 4-hydroxybenzoate, (4'-chlorobenzyl) 4-hydroxybenzoate, ethyl 1,2-bis(4'-hydroxybenzoate), pentyl 1,5-bis(4'-hydroxybenzoate), hexyl 1,6-bis (4'-hydroxybenzoate), dimethyl 3-hydroxyphthalate, stearyl gallate, lauryl gallate, methyl gallate, 4-methoxyphenol, 4-(benzyloxy)phenol, 4-hydroxybenzaldehyde, 4-n-octyloxysalicylic acid, 4-n-butyloxysalicylic acid, 4-n-pentyloxysalicylic acid, 3-n-dodecyloxysalicylic acid, 3-n-octanoyloxysalicylic acid, 4-n-octyloxycarbonylaminosalicylic acid, 4-n-octanoyloxycarbonylaminosalicylic acid, etc. However, as such phenols, those having an amino group are not desirable. Since the amino group has a higher reactivity with an isocyanate group than does an OH group, the amino group reacts with the isocyanate group before the OH group, so that it is difficult in some cases to obtain a desired compound. The OH group-containing compound also includes alcohols such as methanol, ethanol, propanol, butanol, pentanol, hexanol, heptanol, octanol, isopropanol, iosbutanol, isopentanol, 2-ethyl-1-hexanol, 1-decanol, 2-pentanol, 3-hexanol, tert-butanol, tert-amyl alcohol, methyl Cellosolve, butyl Cellosolve, methyl Carbitol, allyl alcohol, 2-methyl-2-propen-1-ol, benzyl alcohol, 4-pyridinemethanol, phenyl Cellosolve, furfuryl alcohol, cyclohexanol, cyclohexylmethanol, cyclopentanol, 2-chloroethanol, 1-chloro-3-hydroxypropane, glycerin, glycerol, etc.; polyether type polyols such as polypropylene glycols, polytetramethylene ether glycols, adipate-derived polyols, epoxy-modified polyols, polyether ester polyols, polycarbonate polyols, polycaprolactone diols, phenolic polyols, amine-modified polyols, etc.; and polyols such as ethylene glycol, diethylene glycol, 1,3-propanediol, 1,2-propanediol, propylene glycol, dipropylene glycol, 1,4-butanediol, 1,5-pentanediol, 1,6-hexanediol, 1,6-hexane glycol, 1,9-nonanediol, acryl polyols, fluorocarbon polyols, polybutadiene polyols, polyhydroxy polyols, trimethylolpropane, trimethylolethane, hexanetriol, phosphoric acid, neopentyl glycol, pentaerythritol, castor-oil-derived polyols, polymer polyols, methylpentanediol, halogen containing polyols, phosphorus-containing polyols, ethylenediamine, α-methylglucoside, sorbitol, sucrose, etc.

As the urea-urethane compound used as developer in the twenty-first aspect of the present invention, the urea-urethane compound of the first aspect of the present invention can be used. A process for synthesizing this compound is as already described in detail in the explanation of the first aspect of the present invention.

As the urea-urethane compound used as developer in the twenty-second aspect of the present invention, the urea-urethane compound represented by any of the general formulas (I) to (VI) of the second aspect of the present invention and a urea-urethane compound represented by the general formula (VII) can be used A process for synthesizing the urea-urethane compound represented by any of the general formulas (I) to (VI) is as already described in detail in the explanation of the second aspect of the present invention. A process for synthesizing the urea-urethane compound of the general formula (VII) is not particularly limited. This compound can be obtained, for example, by reacting an OH group-containing compound of the general formula (IX) with an isocyanate compound of the general formula (XII) and an amine compound of the general formula (XI) according to, for instance, the following reaction formula (L).

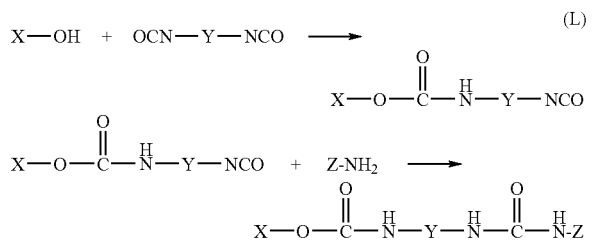

As the substituent of X bonded to the urethane group of the urea-urethane compound of the general formula (VII), alkyl groups, alkenyl groups, phenyl group, cycloalkyl groups amide group, alkoxyl groups, nitro group, nitroso group, nitrile group, toluenesulfonyl group, methanesulfonyl group, acetyl group, halogen atoms, formyl group, dialkylamino groups and isocyanate group are preferable.

Of such urea-urethane compounds of the general formulas (I) to (VII) as developer, compounds of the general formulas (II) to (VI) are preferable and compounds of the general formulas (V) and (VI) are especially preferable.

In the case of the urea-urethane compound used as developer in the twentieth aspect of the present invention and the compounds of any of the general formulas (I) to (VI) and the general formula (VII) as developer, if a residue bonded to their urea group or urethane group is an aliphatic compound residue, the coloring density and the print-preserving capability are deteriorated in some cases. Therefore, the residue bonded to the urea group or urethane group is preferably an aromatic compound residue or a heterocyclic compound residue. However, the deterioration of the coloring density and the print-preserving capability which is likely to be caused by the introduction of an aliphatic compound residue is reduced by an increase in the total number of the urea group(s) and urethane group(s). In the case of compounds of the formula (III) and the formula (IV), even if an aliphatic compound residue is among residues bonded to the urea group(s) or urethane group(s), almost no problem about performance characteristics is caused.

The urea-urethane compound used as developer in the present invention is usually a colorless or light-colored compound that is solid at ordinary temperature.

The molecular weight of the urea-urethane compound used as developer in the present invention is preferably 5,000 or less, more preferably 2,000 or less.

The total number of urea group(s) and urethane group(s) in the urea-urethane compound used as developer in the present invention is preferably 20 or less, more preferably 10 or less. The ratio of urea group(s) to urethane group(s) in the molecular structure of the urea-urethane compound is preferably 1:3 to 3:1, in particular, 1:2 to 2:1.

When used in a heat-sensitive recording material, the melting point of urea-urethane compound used as developer in the present invention is preferably a compound having a melting point, and its melting point ranges preferably from 40° C. to 500° C., in particular, from 60° C. to 300° C.

For producing a recording material by using the urea-urethane compound as developer, the urea-urethane compound of one kind or, if necessary, a combination of the urea-urethane compounds of two or more kinds may be used.

As the urea-urethane compound or urea-urethane composition used as developer in the twenty-third aspect of the present invention, any of the urea-urethane compounds of the third to sixth aspects of the present invention or any of the urea-urethane compositions of the seventh to eleventh aspects of the present invention can be used. Synthesis processes of these compounds and compositions are as already described in detail in the explanations of the third to eleventh aspects of the present invention.

The colorless or light-colored dye precursor used in the present invention is a compound well known as a color former used in pressure-sensitive recording materials and heat-sensitive recording materials and is not particularly limited. As the dye precursor, basic dye precursors are preferable and electron-donating dye precursors are more preferable. Leuco dyes, in particular, triarylmethane type leuco dyes, fluoran type leuco dyes, fluorene type leuco dyes, diphenylmethane type leuco dyes and the like are still more preferable. Typical examples of the dye precursor are given below.

(1) Triarylmethane Type Compounds 3,3-bis(p-dimethylaminophenyl)-6-dimethylaminophthalide (Crystal Violet lactone), 3,3-bis(p-dimethylaminophenyl)phthalide, 3-(p-dimethyl-aminophenyl)-3-(1,2'-dimethylindol-3-yl)phthalide, 3-(p-dimethylaminophenyl)-3-(2-methylindol-3-yl)phthalide, 3-(p-dimethylaminophenyl)-3-(2-phenylindol-3-yl)phthalide, 3,3-bis(1,2-dimethylindol-3-yl)-5-dimethylaminophthalide, 3,3-bis(1,2-dimethylindol-3-yl)-6-dimethylaminophthalide, 3,3-bis(9-ethylcarbazol-3-yl)-5-dimethylaminophthalide, 3,3-bis(2-phenylindol-3-yl)-5-dimethylaminophthalide, 3-p-dimethylamino-phenyl-3-(1-methylpyrrol-2-yl)-6-dimethylaminophthalide, etc.

(2) Diphenylmethane Type Compounds 4,4'-bis-dimethylaminophenylbenzhydryl benzyl ether, N-halophenylleucoauramines, N-2,4,5-trichlorophenylleucoauramine, etc.

(3) Xanthene Type Compounds

Rhodamine B anilinolactam, Rhodamine B-p-chloroanilinolactam, 3-diethylamino-7-dibenzylaminofluoran, 3-diethylamino-7-octylaminofluoran, 3-diethylamino-7-phenylfluoran, 3-diethylamino-7-chlorofluoran, 3-diethylamino-6-chloro-7-methylfluoran, 3-diethylamino-7-(3,4-dichloroanilino)fluoran, 3-diethylamino-7-(2-chloroanilino)fluoran, 3-diethylamino-6-methyl-7-anilinofluoran, 3-(N-ethyl-N-tolyl)amino-6-methyl-7-anilinofluoran, 3-piperidino-6-methyl-7-anilinofluoran, 3-(N-ethyl-N-tolyl)amino-6-methyl-7-phenethylfluoran, 3-diethylamino-7-(4-nitroanilino)fluoran, 3-dibutylamino-6-methyl-7-anilinofluoran, 3-(N-methyl-N-propyl)amino-6-methyl-7-anilinofluoran, 3-(N-ethyl-N-isoamyl)amino-6-methyl-7-anilinofluoran, 3-(N-methyl-N-cyclohexyl)amino-6-methyl-7-anilinofluoran, 3-(N-ethyl-N-tetrahydrofuryl)-amino-6-methyl-7-anilinofluoran, etc.

(4) Thiazine Type Compounds benzoylleucomethylene blue, p-nitrobenzoylleucomethylene blue, etc.

(5) Spiro-Compounds 3-methylspirodinaphthopyran, 3-ethylspirodinaphthopyran, 3,3-dichlorospirodinaphthopyran, 3-benzylspirodinaphthopyran, 3-methylnaphtho-(3-methoxybenzo)spiropyran, 3-propylspirobenzopyran, etc.

The dye precursor also includes, for example, the following compounds that can absorb a near infrared ray: 3,6-bis(dimethylamino)fluorene-9-spiro-3'-(6'-dimethylamino-phthalide), 3-diethylamino-6-dimethylaminofluorene-9-spiro-3'-(6'-dimethylaminophthalide), 3,6-bis(diethylamino)-fluorene-9-spiro-3'-(6'-dimethylaminophthalide), 3-dibutylamino-6-dimethylaminofluorene-9-spiro-3'-(6'-dimethylaminophthalide), 3-dibutylamino-6-diethylaminofluorene-9-spiro-3'-(6'-dimethylaminophthalide), 3,6-bis(dimethylamino)fluorene-9-spiro-3'-(6'-diethylaminophthalide), 3-diethylamino-6-dimethylaminofluorene-9-spiro-3'-(6'-diethylaminophthalide), 3-dibutylamino-6-dimethylaminofluorene-9-spiro-3'-(6'-diethylaminophthalide), 3,6-bis(diethylamino)fluorene-9-spiro-3'-(6'-diethylaminophthalide), 3,6-bis(dimethylamino)fluorene-9-spiro-3'-(6'-dibutylaminophthalide), 3-dibutylamino-6-diethylaminofluorene-9-spiro-3'-(6'-diethylaminophthalide), 3-diethylamino-6-dimethylaminofluorene-9-spiro-3'-(6'-dibutylaminophthalide), 3,3-bis[2-(4-dimethylaminophenyl)-2-(4-methoxyphenyl)ethenyl]-4,5,6,7-tetrachlorophthalide, etc.

Of the above-exemplified dye precursors, triarylmethane type leuco dyes, fluoran type leuco dyes, fluorene type leuco dyes and diphenylmethane type leuco dyes are preferable from the viewpoint of sensitivity and plasticizer resistance, and compounds having a structure represented by the following chemical formula (i) or (j) are more preferable:

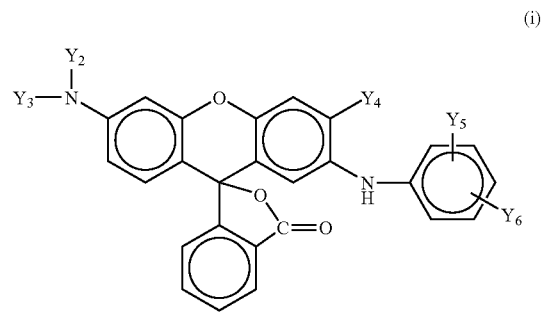

(i)

wherein both $Y_2$ and $Y_3$ are alkyl groups or alkoxyalkyl groups, $Y_4$ is a hydrogen atom, an alkyl group or an alkoxy group, and each of $Y_5$ and $Y_6$ is a hydrogen atom, a halogen atom, an alkyl group or an alkoxy group; or

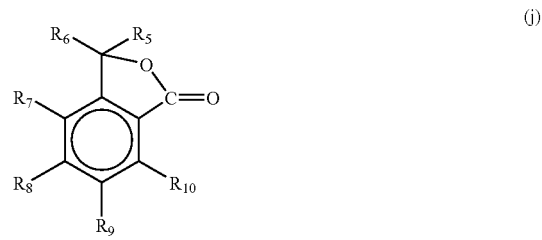

(j)

wherein each of $R_5$ and $R_6$ is a group represented by the formula (k) or the formula (l):

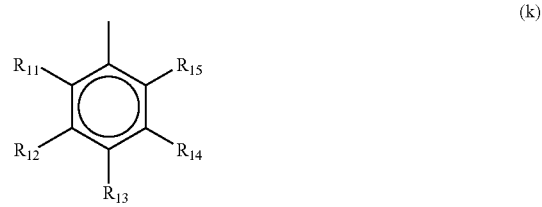

(k)

(wherein each of $R_{11}$ through $R_{15}$ is a hydrogen atom, a halogen atom, a $C_1$-$C_8$ alkyl group, a $C_1$-$C_8$ alkoxy group or $NR_{16}R_{17}$ wherein each of $R_{16}$ and $R_{17}$ is a $C_1$-$C_8$ alkyl group); or

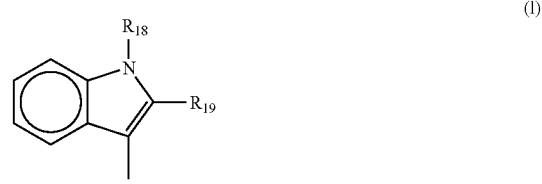

(l)

(wherein each of $R_{18}$ and $R_{19}$ is a hydrogen atom, a $C_1$-$C_8$ alkyl group or a phenyl group), and each of $R_7$ through $R_{10}$ is a hydrogen atom, a halogen atom, a $C_1$-$C_8$ alkyl group, a $C_1$-$C_8$ alkoxy group or $NR_{20}R_{21}$ wherein each of $R_{20}$ and $R_{21}$ is a $C_1$-$C_8$ alkyl group.

Such colorless or light-colored leuco dyes may be used in combination of two or more thereof if necessary.

The urea-urethane compound as developer is used in a proportion of preferably 5 to 1,000 parts by weight, more preferably 20 to 500 parts by weight, per 100 parts by weight of the colorless or light-colored dye precursor. As the proportion of the urea-urethane compound as developer, 5 parts by weight or more is sufficient to allow the dye precursor to develop a color. At such a proportion, the coloring density is high. When the proportion of the urea-urethane compound as developer is 1,000 parts by weight or less, the urea-urethane compound as developer hardly remains as a surplus, and this is economically advantageous and hence preferable.

The incorporation of an isocyanate compound into the color-producing composition of the present invention improves the shelf stability of the composition. The isocyanate compound incorporated into the color-producing composition of the present invention refers to a colorless or light-colored, aromatic or heterocyclic isocyanate compound that is solid at ordinary temperature. For example, one or more of the following isocyanate compounds are used.

The isocyanate compound incorporated includes 2,6-dichlorophenyl isocyanate, p-chlorophenyl isocyanate, 1,3-phenylene diisocyanate, 1,4-phenylene diisocyanate, 1,3-dimethylbenzene-4,6-diisocyanate, 1,4-dimethylbenzene-2,5-diisocyanate, 1-methoxybenzene-2,4-diisocyanate, 1-methoxybenzene-2,5-diisocyanate, 1-ethoxybenzene-2,4-diisocyanate, 2,5-dimethoxybenzene-1,4-diisocyanate, 2,5-diethoxylbenzene-1,4-diisocyanate, 2,5-dibutoxybenzene-1,4-diisocyanate, azobenzene-4,4'-diisocyanate, diphenyl ether-4,4'-diisocyanate, naphthalene-1,4-diisocyanate, naphthalene-1,5-diisocyanate, naphthalene-2,6-diisocyanate, naphthalene-2,7-diisocyanate, 3,3'-dimethyl-biphenyl-4,4'-diisocyanate, 3,3'-dimethoxybiphenyl-4,4'-diisocyanate, diphenylmethane-4,4'-diisocyanate, diphenyldimethyl-methane-4,4'-diisocyanate, benzophenone-3,3'-diisocyanate, fluorene-2,7-diisocyanate, anthraquinone-2,6-diisocyanate, 9-ethylcarbazole-3,6-diisocyanate, pyrene-3,8-diisocyanate, naphthalene-1,3,7-triisocyanate, biphenyl-2,4,4'-triisocyanate, 4,4',4"-triisocyanato-2,5-dimethoxytriphenylmethane, 4,4',4"-triisocyanatotriphenylamine, p-dimethylaminophenyl isocyanate, tris(4-phenylisocyanato)thiophosphate, etc. If necessary, these isocyanates may be used in the form of a so-called block isocyanate, i.e., an addition compound with a phenol, lactam, oxime or the like, they may be used in the form of a diisocyanate dimer such as 1-methylbenzene-2,4-diisocyanate dimmer, or a diisocyanurate trimer as an isocyanurate, and they may be used in the form of a polyisocyanate obtained as an adduct by the use of any of various polyols and the like. There may also be used water adduct isocyanates of 2,4-toluene diisocyanate, diphenylmethane diisocyanate and the like, such as 1,3-bis(3-isocyanato-4-methylphenyl)urea; polyol adducts such as trimethylolpropane adduct of toluene diisocyanate (Desmodur L, a trade name); phenol adduct isocyanates; amine adduct isocyanates; and the isocyanate compounds and isocyanate adduct compounds described in the specification of JP-A-10-76,757 and the specification of JP-A-10-95,171.

The isocyanate compound is used in a proportion of preferably 5 to 500 parts by weight, more preferably 20 to 200 parts by weight, per 100 parts by weight of the colorless or light-colored dye precursor. When the proportion of the isocyanate compound is 5 parts by weight or more, a sufficient improving effect on the shelf stability can be obtained and the coloring density is high. When the proportion of the isocyanate compound is 500 parts by weight or less, the isocyanate compound hardly remains as a surplus, and this is economically advantageous and hence preferable.

The incorporation of an imino compound into the color-producing composition of the present invention further improves the shelf stability.

The imino compound that can be incorporated into the color-producing composition of the present invention is a colorless or light-colored compound that has at least one imino group and is solid at ordinary temperature. Two or more imino compounds may be incorporated in combination, depending on purposes the imino compound, those described in JP-A-9-142,032 can be mentioned, and the contents of this reference are hereby incorporated herein by reference. Of the imino compounds described in the reference, iminoisoindoline derivatives are preferable, and 1,3-diimino-4,5,6,7-tetrachloroisoindoline, 3-imino-4,5,6,7-tetrachloroisoindolin-1-one and 1,3-diimino-4,5,6,7-tetrabromoisoindoline are more preferable.

The imino compound is used in a proportion of preferably 5 to 500 parts by weight, more preferably 20 to 200 parts by weight, per 100 parts by weight of the colorless or light-colored dye precursor. When the proportion of the imino compound is 5 parts by weight or more, an improving effect on the shelf stability is obtained. When the proportion of the imino compound is 500 parts by weight or less, the imino compound hardly remains as a surplus, and this is economically advantageous and hence preferable.

In addition, the incorporation of an amino compound into the color-producing composition of the present invention improves the preservability of an original recording material surface and print. The amino compound that can be incorporated is a colorless or light-colored substance having at least one primary, secondary or tertiary amino group. As such an amino compound, those described in JP-A-9-142,032 can be mentioned. Of the amino compounds described in this reference, aniline derivatives having at least one amino group and represented by the following formula (VIII) are especially preferable:

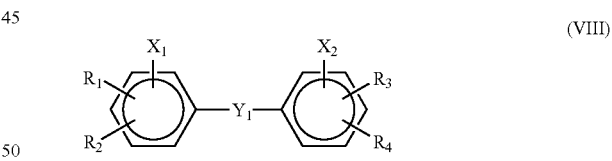

(VIII)

wherein $R_1$, $R_2$, $R_3$ and $R_4$ are independently a hydrogen atom, a halogen atom, an alkyl group, an alkoxy group or an amino group, $X_1$ and $X_2$ are independently an amino group or a group represented by the formula (b):

(b)

and $Y_1$ is any of —$SO_2$—, —O—, —(S)—, —$(CH_2)_n$—, —CO—, —CONH— and a group represented by any of the formulas (a):

(a)

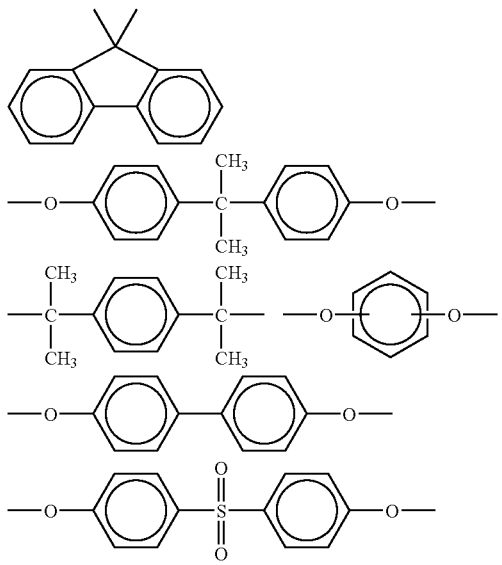

or is absent, and n is 1 or 2.

These amino compounds may be used singly or as a mixture thereof. For improving the print preservability in the plasticizer resistance, the proportion of the amino compound is preferably 1 to 500 parts by weight per 100 parts by weight of the colorless or light-colored dye precursor. When the content of the amino compound is 1 part by weight or more per part of the urea-urethane compound, the print preservability can be improved. When the content is 500 parts by weight or less, performance characteristics of the resulting composition can be sufficiently improved and such a content is advantageous from the viewpoint of cost.

The incorporation of also an acidic developer into the color-producing composition of the present invention improves the sensitivity and enables the color-producing composition to produce a brilliant color.

As the acidic developer that is used when the color-producing composition of the present invention is, used in a heat-sensitive recording material, conventional electron-accepting materials are used and, in particular, phenol derivatives; aromatic carboxylic acid derivatives or their metal compounds; salicylic acid derivatives or their metal salts; N,N-diarylthiourea derivatives; sulfonylurea derivatives; etc. are preferable. The phenol derivatives are especially preferable. Specific examples of the phenol derivatives are 2,2-bis(4-hydroxyphenyl)propane, 2,2-bis(hydroxyphenyl)butane, 2,2-bis(hydroxyphenyl)pentane, 2,2-bis(hydroxyphenyl)heptane, 1,1-bis(4-hydroxyphenyl)cyclohexane, butyl bis(4-hydroxyphenyl)-acetate, benzyl bis(4-hydroxyphenyl)acetate, bis(4-hydroxyphenyl)sulfone, bis(3-methyl-4-hydroxyphenyl) sulfone, 4-hydroxyphenyl-4'-methylphenyl sulfone, 3-chloro-4-hydroxyphenyl-4'-methylphenyl sulfone, 3,4-dihydroxyphenyl-4'-methylphenyl sulfone, 4-isopropylphenyl-4'-hydroxyphenyl sulfone, 4-isopropyloxyphenyl-4'-hydroxyphenyl sulfone, bis(2-allyl-4-hydroxyphenyl)sulfone, 4-hydroxyphenyl-4'-benzyloxyphenyl sulfone, 4-isopropylphenyl-4'-hydroxyphenyl sulfone, bis(2-methyl-3-tert-butyl-4-hydroxyphenyl)sulfide, methyl 4-hydroxybenzoate, benzyl 4-hydroxybenzoate, (4'-chlorobenzyl) 4-hydroxybenzoate, ethyl 1,2-bis(4'-hydroxybenzoate), pentyl 1,5-bis(4'-hydroxybenzoate), hexyl 1,6-bis(4'-hydroxybenzoate), dimethyl 3-hydroxyphthalate, stearyl gallate, lauryl gallate, etc. The salicylic acid derivatives include 4-n-octyloxysalicylic acid, 4-n-butyloxysalicylic acid, 4-n-pentyloxysalicylic acid, 3-n-dodecyloxysalicylic acid, 3-n-octanoyloxysalicylic acid, 4-n-octyloxycarbonylaminosalicylic acid, 4-n-octanoyloxycarbonylaminosalicylic acid, etc. The sulfonylurea derivatives include, for example, compounds containing one or more arylsulfonyl-aminoureido groups, such as 4,4-bis(p-toluenesulfonylaminocarbonylamino)diphenylmethane, 4,4-bis(o-toluenesulfonylaminocarbonylamino)diphenylmethane, 4,4-bis(p-toluenesulfonylaminocarbonylamino) diphenyl sulfide, 4,4-bis(p-toluenesulfonylaminocarbonylamino)diphenyl ether, N-(p-toluenesulfonyl)-N'-phenylurea, etc. Further, 4,4'-[oxybis(ethyleneoxy-p-phenylenesulfonyl)]diphenol, a mixture containing it as a main component (for example, D-90 (trade name) made by Nippon Soda Co., Ltd.) or the like can be used.

Among them, 2,2-bis(4-hydroxyphenyl)propane, 4-isopropyloxyphenyl-4'-hydroxyphenylsulfone, bis(3-allyl-4-hydroxyphenyl)sulfone, 2,4'-dihydroxydiphenylsulfone and 4,4'-[oybis(ethyleneoxy-p-phenylenesulfonyl)]diphenol are particularly preferable because they enhance the sensitivity to produce a heat-sensitive recording material capable of clear color production.

In order to improve fog, the thermal response and the like, it is also possible to add phenolic compounds such as N-stearyl-N'-(2-hydroxyphenyl)urea, N-stearyl-N'-(3-hydroxyphenyl)urea, N-stearyl-N'-(4-hydroxyphenyl)urea, p-stearoylaminophenol, o-stearoylaminophenol, p-lauroylaminophenol, p-butyrylaminophenol, m-acetylaminophenol, o-acetylaminophenol, p-acetylaminophenol, o-butylaminocarbonylphenol, o-stearylaminocarbonylphenol, p-stearylaminocarbonylphenol, 1,1,3-tris(3-tert-butyl-4-hydroxy-6-methylphenyl)butane, 1,1,3-tris(3-tert-butyl-4-hydroxy-6-ethylphenyl)butane, 1,1,3-tris(3,5-di-tert-butyl-4-hydroxyphenyl)butane, 1,1,3-tris(3-tert-butyl-4-hydroxy-6-methylphenyl)propane, 1,2,3-tris(3-tert-butyl-4-hydroxy-6-methylphenyl)butane, 1,1,3-tris(3-phenyl-4-hydroxyphenyl)butane, 1,1,3-tris(3-cyclohexyl-4-hydroxy-5-methylphenyl)butane, 1,1,3-tris(3-cyclohexyl-4-hydroxy-6-methylphenyl)butane, 1,1,3-tetra(3-phenyl-4-hydroxyphenyl)propane, 1,3,3-tetra(3-cyclohexyl-4-hydroxy-6-methylphenyl)propane, 1,1-bis(3-tert-butyl-4-hydroxy-6-methylphenyl)butane, 1,1-bis(3-cyclohexyl-4-hydroxy-6-methylphenyl)butane etc.

The above-mentioned acidic developer is used in a proportion of preferably 5 to 500 parts by weight, more preferably 20 to 200 parts by weight, per 100 parts by weight of the colorless or light-colored dye precursor. When the proportion of the acidic developer is 5 parts by weight or more, the color development of the dye precursor is satisfactory and the coloring density is high. When the proportion of the acidic developer is 500 parts by weight or less, the acidic developer hardly remains, and this is economically advantageous and hence preferable.

Also when the color-producing composition of the present invention is used in a pressure-sensitive recording material, the incorporation of an acidic developer into the color-producing composition improves the coloring density and enables the pressure-sensitive recording material to produce a brilliant color.

Also as this acidic developer, an electron-accepting material is used. The acidic developer includes, for example, inorganic compounds such as acid clay, activated clay, attapulgite, bentonite, zeolite, colloidal silica, magnesium silicate, talc, aluminum silicate, etc.; phenol, cresol, butylphenol, octylphenol, phenylphenol, chlorophenol, salicylic acid and the like, or aldehyde condensation novolak resins derived therefrom and their metal salts; and salicylic acid derivatives such as 3-isopropylsalicylic acid, 3-phenylsalicylic acid, 3-cyclohexylsalicylic acid, 3,5-di-t-butylsalicylic acid, 3,5-di (α-methylbenzyl)salicylic acid, 3,5-di-t-octylsalicylic acid, 3-methyl-5-benzylsalicylic acid, 3,5-di(α,α-dimethylbenzyl)salicylic acid, 3-phenyl-5-(α,α-dimethylbenzyl)salicylic, etc. and metal salts thereof.

The incorporation of also a fluorescent dye improves the whiteness. As the fluorescent dye to be incorporated into the color-producing composition of the present invention, various well-known ones can be used, and there are mentioned stilbene derivatives, coumarin derivatives, pyrazoline derivatives, bisstyrylbiphenyl derivatives, naphthalimide derivatives, bisbenzoxazolyl derivatives, etc. Although fluorescent dye is not limited to them, diaminostilbenesulfonic acid derivatives are especially preferable.

As to the amount of the fluorescent dye used, the fluorescent dye is made present in an amount of preferably 0.01 to 3 wt %, more preferably 0.1 to 2 wt %, based on the total weight (in terms of dry solids) of the color-producing composition. When the amount of the fluorescent dye used is more than 3 wt %, the color-producing composition is colored in some cases. When the amount is less than 0.01 wt %, the effect of the fluorescent dye on the whiteness is lessened.

Next, the color-producing composition of the present invention may contain shelf-life-imparting agents. The shelf-life-imparting agents usable in the present invention are additives such as image-stabilizing agents, light stabilizers, antioxidants, etc. By using these shelf-life-imparting agents in combination with the urea-urethane compound developer and the colorless and light-colored dye precursor, the light resistance of the color-producing composition can be improved and a recording material excellent in light resistance can be obtained.

The image-stabilizing agents as preferable examples of the shelf-life-imparting agents used in the present invention include, for example, 1,1,3-tris(2-methyl-4-hydroxy-5-tert-butylphenyl)butane, 1,1,3-tris(2-methyl-4-hydroxy-5-cyclohexylphenyl)butane, hindered phenol compounds [e.g. 4,4'-butylidenebis(2-tert-butyl-5-methylphenol), 4,4'-thiobis(2-tert-butyl-5-methylphenol), 2,2'-thiobis(6-tert-butyl-4-methylphenol) and 2,2'-methylenebis(6-tert-butyl-4-methylphenol)], 4-benzyloxy-4'-(2-methylglycidyloxy) diphenyl sulfone, 4,4'-diglycidyloxydiphenyl sulfone, 1,4-diglycidyloxybenzene, sodium 2,2'-methylenebis(4,6-di-tert-butylphenyl)phosphate, 2-propanol derivatives and salicylic acid derivatives. Usually, these image-stabilizing agents are used in a proportion of preferably 5 to 1,000 parts by weight, more preferably 10 to 500 parts by weight, per 100 parts by weight of the colorless or light-colored dye precursor. When the proportion of the image-stabilizing agents is 5 parts by weight or more, the light resistance is good and the coloring density is high. When the proportion of the image-stabilizing agents is more than 1,000 parts by weight, their effect on the light resistance is not heightened and moreover, such a proportion is economically disadvantageous.

The light stabilizers as preferable examples of the shelf-life-imparting agents used in the present invention include, for example, 2-(2'-hydroxy-5'-methylphenyl)benzotriazole, 2-(3',5'-di-t-butyl-2'-hydroxyphenyl)benzotriazole, 2-(5'-t-butyl-2'-hydroxyphenyl)benzotriazole, 2-[2'-hydroxy-5'-(1,1,3,3-tetramethylbutyl)phenyl]benzotriazole, 2-(3',5'-di-t-butyl-2'-hydroxyphenyl)-5-chlorobenzotriazole, 2-(3'-t-butyl-2'-hydroxy-5'-methylphenyl)-5-chlorobenzotriazole, 2-(2'-hydroxy-4'-octoxyphenyl)benzotriazole, 2-(3',5'-di-t-pentyl-2'-hydroxyphenyl)benzotriazole, 2-(3'-t-butyl-2'-hydroxy-5'-octyloxycarbonylethylphenyl)-5-chlorobenzotriazole and the like; 4-hydroxy-, 4-methoxy-, 4-octoxy-, 4-decyloxy-, 4-dodecyloxy-, 4-benzyloxy-, 4,2',4'-trihydroxy-, 2'-hydroxy-4,4'-dimethoxy- or 4-(2-ethylhexyloxy)-2-hydroxybenzophenone derivatives and the like; 4-t-butylphenyl salicylate, phenyl salicylate, octylphenyl salicylate, dibenzoylresorcinol, bis(4-t-butylbenzoyl)resorcinol, 2,4-di-t-butylphenyl 3,5-di-t-butyl-4-hydroxybenzoate, hexadecyl 3,5-di-t-butyl-4-hydroxybenzoate and the like; ethyl α-cyano-β,β-diphenylacrylate, isooctyl α-cyano-4,4-diphenylacrylate, methyl α-carbomethoxycinnamate, methyl α-cyano-β-methyl-p-methoxycinnamate and the like; bis(2,2,6,6-tetramethyl-4-piperidyl) sebacate, bis(2,2,6,6-tetramethyl-4-piperidyl) succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) adipate and the like; 4,4'-di-octyloxy-1-oxanilide, 2,2'-diethoxyoxyxanilide, 2,2'-di-octyloxy-5,5'-di-t-butyloxanilide, butyloxanilide, 2-ethoxy-2'-ethyloxanilide, N,N'-bis(3-dimethylaminopropyl)oxanilide, 2-ethoxy-5-t-butyl-2'-ethoxyoxanilide and the like; and 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl-6-(2,4-dimethylphenyl)-1,3,5-triazine, 2-(2-hydroxy-4-dodecyloxyphenyl)-4,6-bis(2,4-dimethylphenyl)-1,3,5-triazine and the like. Usually, these light stabilizers are used in a proportion of preferably 5 to 1,000 parts by weight, more preferably 10 to 500 parts by weight, per 100 parts by weight of the colorless or light-colored dye precursor. When the proportion of the light stabilizers is 5 parts by weight or more, the light resistance is good and the coloring density is high. When the proportion of the light stabilizers is more than 1,000 parts by weight, their effect on the light resistance is not heightened and moreover, such a proportion is economically disadvantageous.

The antioxidants as preferable examples of the shelf-life-imparting agents used in the present invention include, for example, 2,6-di-t-butyl-4-methylphenol, 2-t-4,6-dimethylphenol, 2,6-di-t-butyl-4-ethylphenol, 2,6-di-t-butyl-4-n-butylphenol, 2,6-di-t-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-dinonyl-4-methylphenol, 2,6-di-t-butyl-4-methoxymethylphenol, 2,4-dimethyl-6-(1'-methylundeca-1'-yl)-phenol, 2,4-dimethyl-6-(1'-methyl-heptadeca-1'-yl)-phenol, 2,4-dimethyl-6-(1'-methyl-trideca-1'-yl)-phenol and mixtures thereof; 2,4-di-octylthiomethyl-6-t-butylphenol, 2,4-di-octylthiomethyl-6-methylphenol, 2,4-di-octylthiomethyl-6-ethylphenol, 2,6-di-dodecylthiomethyl-4-nonylphenol and mixtures thereof; 2,6-di-t-butyl-4-methoxyphenol, 2,5-di-t-butylhydroquinone, 2,5-di-t-amylhydroquinone, 2,6-diphenyl-4-octadecyloxyphenol, 2,6-di-t-butylhydroquinone, 2,5-di-t-butyl-4-hydroxyanisole, 3,5-di-t-butyl-4-hydroxyanisole, 3,5-di-t-butyl-4-hydroxyphenyl stearate, bis(3,5-di-t-butyl-4-hydroxyphenyl) adipate and mixtures thereof; 2,4-bis-octylmercapto-6-(3,5-di-t-butyl-4-hydroxyanilino)-1,3,5-triazine, 2-octylmercapto-4,6-bis(3,5-di-t-butyl-4-hydroxyanilino)-1,3,5-triazine, 2-octylmercapto-4,6-bis(3,5-di-t-butyl-4-hydroxyphenoxy)-1,2,3-triazine, 1,3,5-tris(3,5-di-t-butyl-4-hydroxybenzyl)isocyanurate, 1,3,5-tris(4-t-butyl-3-hydroxy-2,6-dimethylbenzyl)isocyanurate, 2,4,6-tris(3,5-di-t-butyl-4-hydroxyphenylethyl)-1,3,5-triazine, 1,3,5-tris(3,5-di-t-butyl-4-hydroxyphenyl-propionyl)hexahydro-1,3,5-triazine, 1,3,5-tris(3,5-dicyclohexyl-4-hydroxybenzyl)isocyanurate and the like; 2,2'-methylenebis(6-t-butyl-4-methylphenol), 2,2'-methylenebis(6-t-butyl-4-ethylphenol), 2,2'-ethylidenebis(4,6-di-t-butylphenol), 2,2'-ethylidenebis(6-t-butyl-4-isobutylphenol), 4,4'-methylenebis(2,6-di-t-butylphenol), 4,4'-methylenebis-(6-t-butyl-2-methylphenol), 1,1-bis (5-t-butyl-4-hydroxy-2-methylphenyl)butane, ethylene glycol bis[3,3'-bis(3'-t-butyl-4'-hydroxyphenyl)butyrate] and the like; 1,3,5-tris(3,5-di-t-butyl-4-hydroxybenzyl)-2,4,6-trimethylbenzene, 1,4-bis(3,5-di-t-butyl-4-hydroxybenzyl)-2,3,5,6-tetramethylbenzene, 2,4,6-tris(3,5-di-t-butyl-4-hydroxybenzyl)phenol and the like. Usually, these antioxidants are used in a proportion of preferably 5 to 1,000 parts by weight, more preferably 10 to 500 parts by weight, per 100 parts by weight of the colorless or light-colored dye precursor. When the proportion of the antioxidants is 5 parts by weight or more, the light resistance is good and the coloring density is high. When the proportion of the antioxidants is more than 1,000 parts by weight, their effect on the light resistance is not heightened and moreover, such a proportion is economically disadvantageous.

The color-producing composition of the present invention can be made into a recording material by forming a color-producing layer of the composition on some substrate by a method such as coating. The structure of the recording material is varied depending on the kind of the recording material.

The color-producing composition of the present invention can be used in any of various recording materials such as heat-sensitive recording materials, pressure-sensitive recording materials and the like, and is suitable particularly for the heat-sensitive recording materials.

When the color-producing composition is used in a heat-sensitive recording material, a heat-sensitive recording layer capable of producing a color on heating is formed on a substrate. Specifically, the above-mentioned urea-urethane compound, the above-mentioned colorless or light-colored dye precursor such as a leuco dye, and the heat-meltable material described hereinafter, and the like should be applied on a substrate, each in the form of a dispersion together with other necessary components to form a heat-sensitive recording layer. The dispersion is prepared by finely grinding one or more compounds as each of the components described above, with a sand grinder or the like in an aqueous solution containing a compound having dispersing capability, such as a water-soluble polymer, a surfactant or the like. The particle size of each of the dispersions thus obtained is preferably adjusted to 0.1 to 10 μm, in particular, to about 1 μm. Specific examples of the compound having dispersing capability which can be used in the present invention are water-soluble polymers such as poly(vinyl alcohol)s, carboxylic acid-modified poly(vinyl alcohol)s, sulfonic acid-modified poly(vinyl alcohol)s, methyl cellulose, hydroxypropylmethyl cellulose, hydroxypropyl cellulose, etc.; anionic surfactants such as condensation naphthalene sulfonates, polyoxyethylene alkyl ether sulfuric acid ester salts (e.g. sodium polyoxyethylene lauryl ether sulfates, sodium polyoxyethylene alkyl ether sulfates and sodium polyoxyethylene alkyl phenyl ether sulfates), dialkylsulfosuccinic acid ester sodium, alkylphosphates (e.g. diethanolamine alkylphosphates and potassium alkylphosphates), specialty carboxylic acid-based polymers, etc.; nonionic surfactants such as polyoxyethylene alkyl ethers, polyoxyethylene alkyl phenyl ethers, polyoxyethylene sorbitan fatty acid esters, fatty acid monoglycerides, polyethylene glycol fatty acid esters, etc.; and cationic surfactants such as dicyanamidopolyamines, tertiary amine salts, quaternary ammonium salts, etc. Of these, the polyvinyl alcohols, carboxylic acid-modified polyvinyl alcohols, sulfonic acid-modified polyvinyl alcohols and methyl cellulose are especially preferable. The above-exemplified surfactants may be used singly or as a mixture thereof.

When the urea-urethane compound developer according to the present invention is used in a heat-sensitive recording material, the adjustment of the average particle size of the urea-urethane compound developer to not more than 5 μm and not less than 0.05 μm makes it possible to obtain a heat-sensitive recording material which has a sufficient color development sensitivity, gives a very stable printed developed color image, and has a good plasticizer resistance. The average particle size is more preferably not more than 3 μm and not less than 0.1 μm. When the average particle size is less than 0.05 μm, the preservability of the original recording material surface against plasticizers is deteriorated. On the other hand, when the average particle size is more than 5 μm, the sensitivity of the heat-sensitive recording material is decreased.

Particularly when the urea-urethane compound is subjected to wet grinding in an aqueous medium, the temperature of the aqueous medium is preferably 60° C. or lower. At the time of the grinding, the urea-urethane compound developer comes into contact with water, so that hydrolysis of its urethane group(s) proceeds depending on conditions. Therefore, the sensitivity of a heat-sensitive recording material obtained by the use of the urea-urethane compound developer tends to be decreased. Particularly when the medium temperature at the grinding is higher than 60° C., the sensitivity is remarkably decreased. The medium temperature at the grinding is more preferably 40° C. or lower.

In addition, when the urea-urethane compound developer is ground, it is preferably ground in a neutral pH range of 5 to 10. When the pH at the grinding is lower than 5, an inorganic pigment and the like are decomposed in the production of a heat-sensitive coating liquid, so that the sensitivity tends to be decreased. On the other hand, when the pH is higher than 10, the urea-urethane compound developer is hydrolyzed, so that the sensitivity is decreased in some cases.

Specific examples of dispersing agent usable for preparing a dispersion of the urea-urethane compound developer by grinding in the present invention are water-soluble polymers such as poly(vinyl alcohol)s, carboxylic acid-modified poly(vinyl alcohol)s, sulfonic acid-modified poly(vinyl alcohol)s, methyl cellulose, hydroxypropylmethyl cellulose, hydroxypropyl cellulose, etc.; anionic surfactants such as condensed naphthalenesulfonates, polyoxyethylene alkyl ether sulfuric acid ester salts (e.g. sodium polyoxyethylene lauryl ether sulfates, sodium polyoxyethylene alkyl ether sulfates and sodium polyoxyethylene alkyl phenyl ether sulfates), dialkylsulfosuccinic acid ester sodium, alkylphosphates (e.g. diethanolamine alkylphosphates and potassium alkylphosphates), specialty carboxylic acid-based polymers, etc.; nonionic surfactants such as polyoxy-1-ethylene alkyl phenyl ethers, polyoxyethylene sorbitan fatty acid esters, fatty acid monoglycerides, polyethylene glycol fatty acid esters, etc.; and cationic surfactants such as dicyanamidopolyamines, tertiary amine salts, quaternary ammonium salts, etc. Of these, the water-soluble polymers and the anionic surfactants are especially preferable because they make it possible to obtain a heat-sensitive recording material that has a high sensitivity irrespective of conditions of dispersing the urea-urethane compound developer and has an improved preservability of the original recording material surface against plasticizers irrespective of the average particle size of the urea-urethane compound developer. The poly(vinyl alcohol)s, modified poly(vinyl alcohol)s, methyl cellulose, hydroxypropylmethyl cellulose, sodium condensed naphthalenesulfonate, polycarboxylic acid ammonium salts, water-soluble low-molecular weight copolymers and sodium 2-ethylhexylsulfosuccinate are more preferable. Of these, the methyl cellulose, hydroxypropylmethyl cellulose, sodium condensed naphthalenesulfonate, water-soluble low-molecular weight copolymers are still more preferable, and hydroxypropylmethyl cellulose is the most preferable. The above-exemplified dispersing agents may be used singly or as a mixture thereof.

As a dispersing agent usable for preparing a dispersion of the colorless or light-colored dye by grinding in the present invention, the same compounds as those used as the dispersing agent for dispersing the urea-urethane compound developer can be used. Of such compounds, the water-soluble polymers, the anionic surfactants and mixed dispersing agents of these two kinds of the surfactants are especially preferable for Improving a heat-sensitive recording material in sensitivity and preservability of the original recording material surface against plasticizers. Mixed dispersing agents consisting of methyl cellulose or hydroxypropylmethyl cellulose as a water-soluble polymer and a polyoxyethylene alkyl ether sulfate or sodium 2-ethylhexylsulfosuccinate as an anionic surfactant are more preferable. A mixed dispersing agent of hydroxypropylmethyl cellulose and sodium 2-ethylhexylsulfosuccinate is the most preferable.

The pH of a coating liquid containing the urea-urethane compound and the colorless or light-colored dye precursor is preferably 5 to 12.

The heat-sensitive recording layer may contain, besides the components described above, pigments such as diatomaceous earth, talc, kaolin, calcined kaolin, calcium carbonate, magnesium carbonate, titanium oxide, zinc oxide, silicon oxide, aluminum hydroxide, urea-formaldehyde resin, etc. In addition, the heat-sensitive recording layer may, if necessary, contain metal salts of higher fatty acids, such as zinc stearate, calcium stearate, etc.; and waxes such as paraffin, oxidized, paraffin, polyethylenes, oxidized polyethylenes, stearamide, cator wax, etc., for the purpose of, for example, preventing the wear of a head and sticking. If necessary, the heat-sensitive recording layer may also contain dispersing agents such as sodium dioctylsulfosuccinate, etc.; ultraviolet absorbers of benzophenone type, benzotriazole type and the like; surfactants; fluorescent dyes; etc.

As a binder usable for forming the heat-sensitive recording layer, there can be mentioned, for example, water-soluble binders such as starches, hydroxyethyl cellulose, methyl cellulose, carboxymethyl cellulose, gelatin, casein, poly(vinyl alcohol)s, modified poly(vinyl alcohol)s, sodium poly(acrylate)s, acrylamide-acrylic ester copolymers, acrylamide-acrylic ester-methacrylic acid terpolymers, alkali salts of styrene-maleic anhydride copolymers, alkali salts of ethylene-maleic anhydride copolymers, etc.; and latex type water-insoluble binders of styrene-butadiene copolymers, acrylonitrile-butadiene copolymers, methyl acrylate-butadiene copolymers, etc.

As the substrate for the heat-sensitive recording layer, paper is mainly used, though any of various woven fabrics, nonwoven fabrics, synthetic resin films, laminated papers, synthetic papers, metal foils, and composite sheets obtained by combining two or more of them may be used besides paper, depending on purposes. The basis weight of the substrate is preferably 40 $g/m^2$ to 200 $g/m^2$. The substrate is preferably excellent in surface smoothness and flatness because a heat-sensitive recording material obtained by the use of the substrate is desired to have as high a flatness as possible. Therefore, the substrate is preferably subjected to surface treatment by applying heat and pressure by means of any of a machine calender, soft calender, supercalender and the like.

The surface pH of the substrate is preferably 3 to 9, more preferably 5 to 9, most preferably 6 to 8. When the surface pH of the substrate is lower than 3, fog tends to occur. When the surface pH of the substrate is higher than 12, the urea-urethane compound developer is decomposed, so that the coloring density is decreased in some cases.

The heat-sensitive recording layer may be composed of either a single layer or two or more layers. The heat-sensitive recording layer may have, for example, a multilayer structure formed by incorporating each color-producing component into one layer. A protective layer composed of a single layer or two or more layers may be formed on the heat-sensitive recording layer, and an intermediate layer composed of a single layer or two or more layers may also be formed between the substrate and the heat-sensitive recording layer. The heat-sensitive recording layer can be obtained by mixing aqueous dispersions prepared by fine grinding of each color-producing component or any other component, with a binder and the like, applying the resulting mixture on the substrate, and drying the mixture. The coating amount of this coating liquid is preferably 1 to 15 $g/m^2$ when the coating liquid is in a dried state.

When the color-producing composition of the present invention is used in a heat-sensitive recording material, a heat-meltable material may be incorporated into the color-producing composition in order to improve the sensitivity. The heat-meltable material is preferably one which has a melting point of 60° C. to 180° C., in particular, one which has a melting point of 80° C. to 140° C. The heat-meltable material includes, for example, benzyl p-benzyloxybenzoate, stearamide or its emulsified product, palmitamide, N-methylolstearamide, β-naphthyl benzyl ether, N-stearylurea, N,N'-distearylurea, phenyl β-naphthoate, phenyl 1-hydroxy-2-naphthoate, β-naphthol (p-methylbenzyl)ether, 1,4-dimethoxynaphthalene, 1-methoxy-4-benzyloxynaphthalene, N-stearoylurea, p-benzylbiphenyl, 1,2-di(m-methylphenoxy)ethane, 1-phenoxy-2-(4-chlorophenoxy)ethane, 1,4-butanediol phenyl ether, dimethyl terephthalate, m-terphenyl, dibenzyl oxalate and (p-chlorobenzyl) oxalate.

Also, 4,4'-dimethoxybenzophenone, 4,4'-dichlorobenzophenone, 4,4'-difluorobenzophenone, diphenyl sulfone, 4,4'-dichlorodiphenyl sulfone, 4,4'-difluorodiphenyl sulfone, 4,4'-dichlorodiphenyl disulfide, diphenylamine, 2-methyl-4-methoxydiphenylamine, N,N'-diphenyl-p-phenylenediamine, 1-(N-phenylamino)naphthalene, benzil, 1,3-diphenyl-1,3-propanedione and the like are preferable because they are highly effective for enhancing the sensitivity. Further, benzyl 4-hydroxybenzoate, 4-(benzyloxy)phenol, 2,4-dihydroxybenzophenone, 2,2',4,4'-tetrahydroxybenzophenone, 4,4'-dihydroxybenzophenone, 2,2-bis(4-hydroxyphenyl)propane, 4,4'-dihydroxydiphenyl sulfone, bis(3-methyl-4-hydroxyphenyl)sulfone, bis(3,5-dimethyl-4-hydroxyphenyl) sulfone, 3,4-dihydroxyphenyl-4'-methylphenyl sulfone, bis (2-methyl-3-tert-butyl-4-hydroxyphenyl)sulfide, 4,4'-dihydroxydiphenyl ether, 4,4'-thiodiphenol, 4,4'-dihydroxydiphenylmethane, 3,3'-dihydroxydiphenylamine, bis(4-hydroxy-3-methylphenyl)sulfide, 4-hydroxy-4'-isopropoxydiphenyl sulfone, 4,4'-thiobisbenzenethiol, salicylanilide, 4,4'-diamino-3,3'-diethyldiphenylmethane, 4,4'-diaminobenzanilide, 3,3'-dichloro-4,4'-diaminodiphenylmethane, 3,3'-dimethyl-1-4,4'-diaminodiphenylmethane, 4,4'-thiodianiline, 2,2'-dithiodianiline, 4,4'-dithiodianiline, 4,4'-diaminodiphenyl ether, 3,3'-diaminodiphenyl ether, 4,4'-diaminodiphenyl ether, 4,4'-diaminodiphenylmethane, 3,4'-diaminodiphenylmethane, bis(3-amino-4-chlorophenyl)sulfone, bis(3,4-diaminophenyl)sulfone, 4,4'-diaminodiphenyl sulfone, 3,3'-diaminodiphenyl sulfone, 3,4'-diaminodiphenyl sulfone, 3,3'-diaminodiphenylmethane, 4,4'-diaminodiphenylamine, 3,3'-diaminobenzophenone, 4,4'-diaminobenzophenone, acetoacetic o-chloroanilide, acetoacetic anilide, acetoacetic o-toluidide, acetoacetic p-toluidide, acetoacetic o-anisidide, acetoacetic m-xylidide, p-acetotoluidide etc. can be used.

Of these, diphenyl sulfone, di-p-methylbenzyl oxalate, benzil, β-naphthylbenzyl ether, p-benzylbiphenyl, 1,2-di(m-methylphenoxy)ethane, 1,2-diphenoxymethylbenzene, m-terphenyl and stearamide are preferably used.

In addition, employment of a heat-meltable material of the following structural formula (XVIII), among the above-exemplified heat-meltable materials, in a heat-sensitive recording material is markedly effective in increasing the sensitivity of the recording material and improving the plasticizer resistance of a print portion and the heat resistance of the original recording material surface. Heat-meltable materials represented by the structural formula (XIX) shown below are especially preferable.

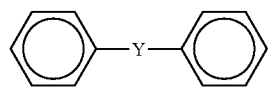

(XVIII)

wherein Y is any of —SO$_2$—, —(S)$_n$—, —O—, —CO—, —CH$_2$—, —CH(C$_6$H$_5$)—, —C(CH$_3$)$_n$—, —COCO—, —CO$_3$—, —COCH$_2$CO—, —COOCH$_2$—, —CONH—, —OCH$_2$— and —NH—, n is 1 or 2, and the hydrogen atom of each benzene ring may be replaced by a halogen atom, a hydroxyl group, a nitro group, a nitroso group, a nitrile group, an isocyanate group, an isothiocyanate group, a mercapto group, a sulfamoyl group, a sulfone group, an amino group, an aromatic compound residue, an aliphatic compound residue or a heterocyclic compound residue.

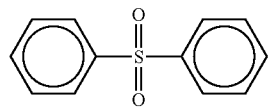

(XIX)

wherein the hydrogen atom of each benzene ring may be replaced by a halogen atom, a hydroxyl group, a nitro group, a nitroso group, a nitrile group, an isocyanate group, an isothiocyanate group, a mercapto group, a sulfamoyl group, a sulfone group, an amino group, an aromatic compound residue, an aliphatic compound residue or a heterocyclic compound residue.

The above-exemplified heat-meltable materials may be used singly or as a mixture thereof. For attaining a sufficient thermal response, the heat-meltable material is used in a proportion of preferably 10 to 300 parts by weight, more preferably 20 to 250 parts by weight, per 100 parts by weight of the colorless or light-colored dye precursor.

As a dispersing agent usable for preparing a dispersion of the heat-meltable material by grinding in the present invention, the same compounds as those used as the dispersing agent for dispersing the urea-urethane compound developer can be used. Of such compounds, the water-soluble polymers and the anionic surfactants are especially preferable for improving a heat-sensitive recording material in preservability of the original recording material surface against plasticizers. The poly(vinyl alcohol)s, modified poly(vinyl alcohol)s, methyl cellulose, hydroxypropylmethyl cellulose, sodium condensed naphthalenesulfonate, polycarboxylic acid ammonium salts, water-soluble low-molecular weight copolymers and sodium 2-ethylhexylsulfosuccinate are more preferable. Of these, the modified poly(vinyl alcohol)s, methyl cellulose, hydroxypropylmethyl cellulose, sodium condensed naphthalenesulfonate, polycarboxylic acid ammonium salts are still more preferable, and hydroxypropylmethyl cellulose is the most preferable. The above-exemplified dispersing agents may be used singly or as a mixture thereof.

When the urea-urethane compound developer is ground, fine grinding of the developer together with the above-mentioned heat-meltable material (co-grinding) further improves the sensitivity of a heat-sensitive recording material and improves the plasticizer resistance as compared with fine grinding of each compound followed by mixing of the ground compounds. The reason why these effects are obtained is not completely clear.

Furthermore, the moisture resistance of the non-print portion (the original surface) of a heat-sensitive recording material can be improved by using at least one dispersing agent for the urea-urethane compound developer selected from methyl cellulose, hydroxypropylmethyl cellulose, sodium condensed naphthalenesulfonate and water-soluble low-molecular weight copolymers, and at least one dispersing agent for the heat-meltable material selected from modified polyvinyl alcohol)s, methyl cellulose, hydroxypropylmethyl cellulose, sodium condensed naphthalenesulfonate and polycarboxylic acid ammonium salts.

The color-producing composition of the present invention can be used in various heat-sensitive recording materials and is especially suitable for heat-sensitive magnetic recording materials, labels for heat-sensitive recording, multicolor heat-sensitive recording materials, and heat-sensitive recording materials for laser marking.

When the color-producing composition of the present invention is used in a heat-sensitive magnetic recording material, the recording material is preferably in a form in which a heat-sensitive recording layer containing the urea-urethane compound developer is formed on one side of a substrate and a magnetic recording layer is formed on the other side.

The magnetic recording layer of the heat-sensitive magnetic recording material is formed by coating a substrate with a coating material prepared by uniformly dispersing ferromagnetic powder such as barium ferrite, strontium ferrite, Co-γ-Fe$_2$O$_2$, γ-Fe$_2$O$_2$ or the like in an aqueous binder such as an aqueous emulsion resin, and drying the coated substrate. In this case, various additives such as antistatic agents (e.g. carbon graphite), lubricants (e.g. wax), color pigments for hue adjustment, coating film flexibilizers [e.g. poly(ethylene oxide)s], etc. may be added.

The heat-sensitive magnetic recording material of the present invention is suitable as heat-sensitive magnetic recording materials used as rail road tickets, tickets, prepaid cards, etc.

When the color-producing composition of the present invention is used in a label for heat-sensitive recording, the label is preferably in a form in which a heat-sensitive recording layer containing the urea-urethane compound developer is formed on one side of a substrate and an adhesive layer is formed on the other side.

The adhesive layer of this heat-sensitive recording material is composed mainly of a pressure-sensitive adhesive. The pressure-sensitive adhesive includes, for example, syntheticrubber-based emulsion type adhesives, acrylic emulsion type adhesives, natural-rubber-based solvent type adhesives, acrylic solvent type adhesives and silicon-based solvent type adhesives. Of these, the acrylic emulsion type adhesives are especially preferable.

When a reverse-side layer (a back coating layer) is, if necessary, formed between the adhesive layer and the substrate in the label for heat-sensitive recording produced by a process according to the present invention, taking-out of curl, prevention of electrostatic charge, and adjustment of coefficient of friction are possible in the label for heat-sensitive recording material. As the components of a coating liquid for the reverse-side layer and a coating method for the coating liquid, the same components and method as in a method for forming the heat-sensitive recording layer may be employed. The dry spread ranges preferably from 0.2 to 10.0 g/m$^2$.

The order of coating in the production of the label for heat-sensitive recording material is not particularly limited. For example, either of the following orders may be employed: the heat-sensitive recording layer is formed on one side of the substrate and then the back coating layer is formed on the other side, after which the adhesive layer is formed thereon; or the back coating layer is formed on one side of the substrate and then the heat-sensitive recording layer is formed on the other side, after which the adhesive layer is formed on the back coating layer.

As to a method for forming the adhesive layer on the back coating layer, a liquid for forming the adhesive layer may be directly applied on the back coating layer and dried, or a material obtained by previously applying a liquid for forming the adhesive layer, on release paper, followed by drying may be attached to the back coating layer side of a heat-sensitive recording material having no adhesive layer formed thereon.

In addition, the thermal response can be improved by forming an intermediate layer composed of a single layer or two or more layers, between the heat-sensitive recording layer and the substrate. The intermediate layer is composed mainly of an organic or inorganic pigment, hollow particles and an aqueous binder such as a water-soluble polymer or a latex. As the organic or inorganic pigment and the aqueous binder, the same organic or inorganic pigment and aqueous binder as used in the heat-sensitive recording layer can be used. A method for forming the intermediate layer is not particularly limited. As this method, the same method as a method for forming the heat-sensitive recording layer can be adopted. A dry spread for forming the intermediate layer ranges preferably from 2.0 to 15.0 g/m$^2$.

When the color-producing composition of the present invention is used in a multicolor heat-sensitive recording material, this recording material is preferably in a form in which at least two heat-sensitive recording layers are formed on one side of a substrate and at least one of said heat-sensitive recording layers contains the urea-urethane compound developer.

As the substrate used, there can be used synthetic paper produced by kneading a polyolefin resin and a white inorganic pigment with heating, extruding the kneaded product through a die, stretching the extruded product in a lengthwise direction, laminating one or two films made of a polyolefin resin and a white inorganic pigment on each side of the stretched product, and stretching the resulting assembly in a crosswise direction to make the same semitransparent or opaque; films obtained by kneading one of or a mixture of two or more of thermoplastic resins such as polyethylenes, polypropylenes, ethylene-vinyl acetate copolymer resins, poly(vinyl chloride)s, polystyrenes, polyesters, etc. with heating, extruding the kneaded product through a die, and then stretching the kneaded product biaxially; opaque films obtained by mixing a white inorganic pigment with any of the above-exemplified resins, followed by biaxial stretching; and substrates produced from pulp fiber, such as woodfree paper, medium-duty paper, machine glazed paper, regenerated paper, coated paper, etc. The substrates made of pulp fiber are preferably coated with a heat-sensitive layer after previous formation of a coating layer in order to improve the uniformity of image.

A heat-sensitive color-producing layer according to the present invention comprises as its main constituents an adhesive and a color-producing composition capable of causing color development reaction owing to the contact of materials with each other made by heating. Specific examples of the color-producing composition are combinations of a colorless or light-colored dye precursor and the above-mentioned urea-urethane developer capable of allowing said dye precursor to develop a color, and combinations of a diazo compound and a coupler capable of developing a color by its reaction with a diazo compound. If necessary, crosslinking agents, pigments and heat-meltable materials may be added. Usually, the coating amount of the heat-sensitive color-producing layer is preferably 3 to 15 g/m$^2$ from the viewpoint of color development sensitivity and coloring density.

As a dye capable of developing a dye, the colorless or light-colored dye precursor described above is used which can develop a color when reacted with the urea-urethane compound developer with heating.

On the other hand, in a heat-sensitive layer comprising as its main constituents a diazo compound and a coupler capable of developing a color by its reaction with said diazo compound, these compounds are a well-known light-decomposable diazo compound and a coupler capable of forming a dye by its reaction with said diazo compound. If necessary, a basic material and the like may be added in order to accelerate the reaction of the diazo compound with the coupler. The coupler and the basic material are preferably used as a mixture thereof in proportions of 10 to 1,000 parts by weight and 10 to 2,000 parts by weight, respectively, per 100 parts by weight of the diazo compound.

The term "light-decomposable diazo compound" used herein means a diazo type photosensitive material capable of forming a dye by its reaction with a coupling component on heating, such as a diazonium salt, diazosulfonate compound, diazoamino compound, quinonediazide compound or the like. The diazonium salt refers to a compound represented by the general formula:

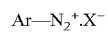

wherein Ar is an aromatic portion, $N_2^+$ is a diazonium group, and $X^-$ is a counter anion. Such compounds have various maximum absorption wavelengths, depending on the positions and kinds of substituents of the Ar portion.

Specific examples of the diazonium compound used in the present invention are 4-dimethylaminobenzenediazonium, 4-diethylaminobenzenediazonium, 4-dipropylaminobenzenediazonium, 4-methylbenzylaminobenzenediazonium, 4-dibenzylaminobenzenediazonium, 4-ethylhydroxyethylaminobenzenediazonium, 4-diethylamino-2-methoxybenzenediazonium, 4-dimethyl-3-methylbenzene diazonium, 4-benzoylamino-2,5-diethoxybenzenediazonium, 4-morpholinobenzenediazonium, 4-morpholino-2,5-diethoxybenzenediazonium, 4-morpholino-2,5-dibutoxybenzenediazonium, 4-anilinobenzenediazonium, 4-toluoylmercapto-2,5-diethoxybenzenediazonium, 4-(N,N-dioctylcarbamoyl)benzenediazonium, 2-octadecyloxybenzenediazonium, 4-(4- tert-octylphenoxy)benzenediazonium, 4-(2,4-di-tert-amylphenoxy)benzenediazonium, 2-(4-tert-octylphenoxy)benzenediazonium, 5-chloro-2-(4-tert-octylphenoxy)benzenediazonium, 2,5-bis-octadecyloxybenzenediazonium, 2,4-bis-octadecyloxybenzenediazonium, 4-(N-octyllauroylamino)benzenediazonium, etc. Specific examples of the counter anion of the diazonium salt used in the present invention are $Cl.1/2Z_nCl_2^-$, $BF_4^-$, $PF_6^-$, $B(ph)_4^-$, $C_nF_{2n+1}COO^-$ (n is 3 to 9), $C_mF_{2m+1}SO_3^-$ (m is 2 to 8), $(C_kF_{2k+1}SO_2)_2CH^-$ (k is 1 to 18), etc.

The diazosulfonate compound used in the present invention is a compound represented by the general formula:

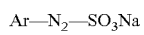

wherein Ar is an aromatic portion. Specific examples of the diazosulfonate compound used in the present invention are sodium benzenediazosulfonates having one or more substituents including 2-methoxy, 2-phenoxy, 2-methoxy-4-phenoxy, 2,4-dimethoxy, 2-methyl-4-methoxy, 2,4-dimethyl, 2,4,6-trimethyl, 2,4,6-trimethoxy, 2,4-dimethoxy-5-chloro, 2-methoxy-5-nitro, 2-methoxy-5-acetamido, 2-methoxy-5-N,N-diethylsulfonamido, 2-methoxy-5-N-phenylcarbamyl, 3-methyl, 4-methyl, 4-methoxy, 4-ethoxy, 4-phenyl, 4-phenoxy, 4-acetamido, etc.; and benzenediazosulfonates having one or more substituents including 4-(N-ethyl-N-benzylamino), 4-(N,N-dimethylamino), 4-(N,N-diethylamino), 4-(N,N-diethylamino)-3-chloro, 4-(N-ethylamino)-3-methyl, 4-(N,N-diethylamino)-2-methyl, 4-(N-ethyl-N-8-hydroxyethylamino), 4-pyrrolidino-3-chloro, 4-pyrrolidino-3,5-dichloro, 4-morpholino, 4-morpholino-3-chloro, 4-morpholino-3-methoxy, 4-morpholino-2,5-diethoxy, 4-morpholino-2,5-dibutoxy, 4-(4'-tolylmercapto)-2,5-dubutoxy, 4-(4'-tolylmercapto)-2,5-diethoxy, 4-(4'-methoxybenzoylamino)-2,5-dibutoxy, 4-diphenylamino, etc. When any of these diazosulfonate compounds is used, the diazosulfonate compound is preferably activated by light irradiation before printing.

The diazoamino compound usable in the present invention is a compound obtained by coupling a diazo group with dicyandiamide, sarcosine, methyltaurine, N-ethylanthranilic acid-5-sulfonic acid, monoethanolamine, diethanolamine, guanidine or the like.

The quinonediazide used in the present invention is considered as an internal-salt type diazonium salt from the viewpoint of structure and is, for example, o-quinonediazide or o-naphthoquinonediazide. The quinonediazide includes salts, esters and amide compounds of 1,2-quinonediazide-4-sulfonic acid, 1,2-naphthoquinonediazide-5-sulfonic acid, 1,2-naphthoquinonediazide-4-sulfonic acid, etc. Specific examples of the quinonediazide used in the present invention are sodium 1,2-quinonediazide-4-sulfonate, sodium 1,2-naphthoquinonediazide-5-sulfonate, sodium 1,2-naphthoquinonediazide-4-sulfonate, p-cumylphenyl 1,2-naphthoquinonediazide-5-sulfonate, p-cumylphenyl 1,2-naphthoquinonediazide-4-sulfonate, methyl 1,2-naphthoquinonediazide-5-sulfonate, ethyl 1,2-naphthoquinonediazide-5-sulfonate, 1,2-naphthoquinonediazide-5-sulfonic acid dimethylamide, esters of 1,2-naphthoquinonediazide-5-sulfonic acid and a novolak resin, etc. In addition, these light-decomposable diazo compounds may be used singly or in combination.

The coupler used in the present invention is one that reacts with the diazo compound to form a dye. For example, typical couplers capable of forming a yellow dye are compounds which have a methylene group activated by a carbonyl group adjacent thereto and is represented by the general formula $RCOCH_2CO-R'$ wherein R is an alkyl group or an allyl group, and R' is an aromatic amine. Magenta couplers are, for example, 1) cyanoacetyl derivatives of cyclic compounds, or 2) heterocyclic compounds having active methylene or any other coupling portion on the heterocyclic ring, and include, for example, pyrazolone compounds and indazolone compounds. Cyan couplers include, for example, phenols and naphthols.

Specific examples of the coupler used in the present invention are 4-(p-toluenesulfonylamino)-ω-benzoylacetanilide, α-benzoyl-o-methoxyacetanilide, 2-cyanoacetyl-coumarone, 1-(2,4,6-trichlorophenyl)-3-p-nitroamino-2-pyrazolon-5-one, resorcin, phloroglucin, 2,3-dihydroxynaphthalene, 2,6-dibromo-1,5-dihydroxynaphthalene, N-(o-acetamidophenethyl)-1-hydroxy-2-napthoamide, etc. In addition, these couplers may be used singly or in combination.

For smoother progress of the coupling reaction of the diazo compound with the coupler under a basic atmosphere, a basic material is preferably incorporated into the heat-sensitive color-producing layer. As the basic material, a slightly water-soluble or water-insoluble basic material or a material capable of producing an alkali on heating is used. The basic material includes, for example, nitrogen-containing compounds such as inorganic and organic ammonium salts, organic amines, amides, urea and thiourea and their derivatives, thiazoles, pyrroles, pyrimidines, piperazines, guanidines, imidazoles, imidazolines, triazoles, morpholines, piperidines, amidines, formamidines, pyridines, etc.

Specific examples of these compounds are tricyclohexylamine, tribenzylamine, octadodecylbenzylamine, stearylamine, allylurea, thiourea, methylthourea, allylthiourea, ethylenethiourea, 2-benzylimidazole, 4-phenylimidazole, 2-phenyl-4-methylimidazole, 2-undecylimidazoline, 2,4,5-trifuryl-2-imidazoline, 1,2-diphenyl-4,4-dimethyl-2-imidazoline, 2-phenyl-2-imidazoline, 1,2,3-triphenylguanidine, 1,2-dicyclohexylguanidine, 1,2,3-tricyclohexylguanidine, guanidine trichloroacetate, N,N'-dibenzylpiperazine, 4,4'-dithiomorpholine, morpholinium trichloroacetate, 2-aminobenzothiazole, 2-benzoylhydrazinobenzothiazole, etc. These basic materials may be used singly or in combination.

In the present invention, the storage stability can be improved by adding a weakly acidic material such as citric acid, tartaric acid, oxalic acid, boric acid, phosphoric acid, pyrophosphoric acid or the like to the heat-sensitive color-producing layer formed of a combination of the diazo compound and the coupler.

Needless to say, the color-producing components used in the present invention can be used in a solid dispersion state attained by dispersing the components in an aqueous solution of a water-soluble polymer, followed by coating and drying, as in a conventional method adopted in heat-sensitive recording materials. It is also possible to improve the green stability by making a color former into microcapsules and preventing the contact of the color former with a developer at ordinary temperature by utilizing the isolating effect of the capsule walls, as described in JP-A-59-190,886, JP-A-60-49,991, JP-A-61-169,281, etc. The microcapsules are characterized in that they enable the color former and the developer to come into contact with each other only during heating at a certain temperature or higher. The temperature at the starting of the color former-developer contact can be controlled by properly choosing a material for the capsule wall, a core material for the capsule, additives, etc.

As a material for the walls of the microcapsules in the present invention, there are mentioned conventional materials for microcapsule wall, such as polyurethanes, polyureas, polyesters, polycarbonates, urea-formaldehyde resins, melamine resins, polystyrenes, styrene-methacrylate copolymers, gelatin, poly(vinylpyrrolidone)s, poly(vinyl alcohol)s, etc. These polymers may be used singly or in combination.

In the present invention, as the adhesive contained in the heat-sensitive color-producing layer, either water-soluble resins or water-dispersible resins may be used. However, when any of these resins is mixed with dispersions of the above-mentioned dye capable of developing a color and developer, respectively, the resulting mixture should not undergo coloration or aggregation and should not have a high viscosity. In addition, a coating film formed as heat-sensitive recording layer should be tough and should not have desensitizing effect. The content of the adhesive in the heat-sensitive color-producing layer is preferably 8 to 20% based on the amount (in terms of solids) of the heat-sensitive color-producing layer. A content of less than 8% is disadvantageous in that the strength of the coating film is low. A content of more than 20% involves a problem of sensitivity decrease. In order to improve the water resistance of the heat-sensitive color-producing layer, a crosslinking agent for curing the resin can be used.

In the multicolor heat-sensitive recording material of the present invention, forming an intermediate layer between heat-sensitive recording layers is effective in improving the thermal partitionment. The intermediate layer comprises the same resin as the water-soluble or water-dispersible resin used as the adhesive in the heat-sensitive recording layers, as its main constituent and may further comprises pigments, crosslinking agents, etc. The coating amount of the intermediate layer is preferably 1.0 to 5.0 g/m$^2$. When the coating amount is less than 1.0 g/m$^2$, no sufficient preventive effect on diffusion between the recording layers can be obtained, resulting in a deteriorated quality of image. When the coating amount is more than 5.0 g/m$^2$, the sensitivity is disadvantageously decreased.

As an especially preferable form of the multicolor heat-sensitive recording material of the present invention, there can be mentioned a multicolor heat-sensitive recording material in which two heat-sensitive recording layers which have different color development temperatures, respectively, and undergo color development in different color tones, respectively, are laminated on one side of a substrate, and of the these recording layers, the upper heat-sensitive recording layer contains either an agent used both as developer and tone reducer, or a reversible developer, and the lower heat-sensitive recording layer contains the urea-urethane compound developer.

Of these, the agent used both as developer and tone reducer in the upper heat-sensitive recording layer is an amphoteric compound which has an acidic group having a color-developing function and a basic group having an achromatizing function, and performs the color-developing function on heating at a low temperature and performs the achromatizing function on heating at a high temperature. A typical example of the acidic group is phenolic hydroxyl group or carboxyl group. A typical example of the basic group is amino group. Although the amphoteric compound may have the basic group as a functional group, it preferably has the basic group as a portion of a salt compound as in a complex of a phenolcarboxylic acid compound and an amine compound. Specific examples of such an agent used both as developer and tone reducer are those mentioned below. The phenolcarboxylic acid compound that constitutes the agent used both as developer and tone reducer includes 2-hydroxybenzoic acid, 3-hydroxybenzoic acid, 4-hydroxybenzoic acid, 3,4-dihydroxybenzoic acid, 3,5-dihydroxybenzoic acid, 2,3-dihydroxybenzoic acid, 2,4-dihydroxybenzoic acid, 2,5-dihydroxybenzoic acid, 2,6-dihydroxybenzoic acid, gallic acid, bis(4-hydroxyphenyl)acetic acid, 3,3-bis(4-hydroxyphenyl)propionic acid, etc.

The amine compound that forms the complex salt together with the phenolcarboxylic acid compound includes octylamine, nonylamine, decylamine, laurylamine, tetradecylamine, heptadecylamine, stearylamine, behenylamine, 3-methoxypropylamine, hexamethylenediamine, etc.

The reversible developer is, for example, a phenolic compound or a phosphonic acid compound, which have an aliphatic hydrocarbon group of 8 or more carbon atoms. Specific examples of such a reversible developer are those mentioned below. The reversible developer is not limited to those mentioned below, and any reversible developer may be used so long as it performs a color-developing function on heating at a low temperature and performs an achromatizing function on heating at a high temperature.

The reversible developer includes 4-(octadecylthio)phenol, 4-(docycylthio)phenol, 4-(octadecyloxy)phenol, 4-(docycyloxy)phenol, N-octadecyl-4-hydroxybenzamide, 4'-hydroxydocosaneanilide, N-(4-hydroxyphenyl)-N'-n-octadecylurea, docosylphosphonic acid, etc. When recording is conducted with a thermal printer or the like by using the multicolor heat-sensitive recording material of the present invention, printing by heating at a low temperature causes color development only in the low-temperature color-producing layer, and printing by heating at a high temperature causes achromatization in the low-temperature color-producing layer in a print portion and causes color development only in the high-temperature color-producing layer.

Employment of the urea-urethane compound makes it possible to obtain an article for laser marking which is sufficient in coloring density and gives such a very stable printed developed color image that the image is hardly discolored or faded even by fats and oil, chemicals, fingerprints, etc. Therefore, the employment is especially advantageous from the viewpoint of long-term preservation of records.

In the present invention, the heat-sensitive recording layer of the article for laser marking preferably contains a recording sensitivity improving agent.

As the recording sensitivity improving agent usable therein, compounds capable of absorbing laser beams used for irradiation are used. Specific examples thereof are various inorganic compounds such as aluminum hydroxide, wollastonite, bentonite, micas (e.g. muscovite and phlogopite), calcium silicate, talc, kaolin, clay, and silicate minerals (e.g. foyaite, hornblende and albite). Aluminum hydroxide, muscovite, wollastonite and kaolin are especially preferable. These inorganic compounds may be used singly or as a mixture thereof.

The proportions of the colorless or light-colored dye precursor and recording sensitivity improving agent used in the heat-sensitive recording layer in the present invention are not particularly limited and may be properly chosen depending on the kinds of the dye precursor and recording sensitivity Improving agent used. Usually, the recording sensitivity improving agent can be used in a proportion of 10 to 5,000 parts by weight, preferably 100 to 2,000 parts by weight, per 100 parts by weight of the color former.

The contents of the dye precursor, the urea-urethane compound developer and the recording sensitivity improving agent in the heat-sensitive recording layer can be adjusted as follows: based on the total weight (in terms of solids) of said layer, the content of the dye precursor ranges from 5 to 30 wt %, preferably from 10 to 25 wt %, the content of the urea-urethane compound developer ranges from 10 to 60 wt %, preferably 20 to 50 wt %, and the content of the recording sensitivity improving agent ranges from 5 to 40 wt %, preferably 10 to 30 wt %.

The incorporation of also an acidic developer into the heat-sensitive recording layer of the article for laser marking of the present invention improves the sensitivity and enables the article for laser marking to develop a brilliant color. As the acidic developer, the above-exemplified conventional electron-accepting materials are used.

For further improving the sensitivity of the article for laser marking of the present invention, a heat-meltable material can be incorporated into the heat-sensitive recording layer. The heat-meltable material is preferably one which has a melting point of 60° C. to 180° C., in particular, 80° C. to 140° C.

The color-producing marking agent of the present invention can be obtained by using the above-mentioned colorless or light-colored dye precursor, urea-urethane compound developer, recording sensitivity improving agent and aqueous binder and water as essential constituents, and mixing various assistants therewith if necessary.

The water used in the color-producing marking agent has a pH in a range of 5 to 12, preferably 6 to 9. When the pH is lower than 5, fog is caused. When the pH is higher than 12, there are likely to be undesirable influences such as loss of the color-developing capability of the urea-urethane compound developer. The water may be used in admixture with a water-soluble organic solvent such as methanol, ethanol or the like.

In addition to the essential constituents described above, various assistants may, if necessary, be incorporated into the color-producing marking agent used in the present invention, in order to, for example, facilitate application on a substrate. The various assistants include, for example, dispersing agents (e.g. sodium dioctylsulfosuccinate, sodium dodecylbenzenesulfonate, lauryl alcohol sulfuric acid ester sodium salt, and fatty acid metal salts), opacifying agents (e.g. titanium oxide), defoaming agents, viscosity modifiers, fluorescent dyes, and coloring agents.

A substrate on which the color-producing marking agent of the present invention is printed (applied) is not particularly limited so long as it requires marking. As the substrate, there are mentioned, for example, the predetermined portions of food containers, packaging materials, electronic parts and the like, and articles (e.g. substrates for label) to be attached thereto. As the substrates for label, papers (e.g. paper and synthetic paper), synthetic resin films, plastics, metallized paper and synthetic paper, metallized films, metals, wood, etc. are properly used depending on purposes.

The color-producing marking agent is prepared, for example, as follows. The binder is dissolved or dispersed in water or a solvent composed mainly of water. Among the color former, the developer, the recording sensitivity improving agent and the like, components that should be dissolved or dispersed in water or a solvent composed mainly of water are treated together or individually in water or an aqueous solvent, which contains a dispersing agent such as a poly(vinyl alcohol), by using a dispersing machine such as a ball mill, attritor, sand grinder or the like. The average particle size of each component after the dispersion is usually about 2μ or less, preferably about 1μ or less. Then, the binder and the dispersions are mixed to obtain the color-producing marking agent of the present invention. The solid content of said color-producing marking agent is 20 to 70 wt %, preferably about 30 wt % to about 65 wt %.

The color-producing marking agent may be applied directly on the substrate, or it may be applied on the substrate that has been previously subjected to surface treatment, undercoating or the like. The application can be carried out by using a suitable coater such as a roll coater, gravure coater, micro-gravure coater, knife coater, spray coater or the like. The thickness of the coating film (the heat-sensitive recording layer) obtained by the application and drying can be usually adjusted to 1 to 4μ. When the thickness is less than 1μ, color development by laser irradiation is not sufficient and moreover, the coating film tends to be peeled off. On the other hand, when the thickness is more than 4μ, drying characteristics and the label attachability tend to be deteriorated. The drying is varied depending on coating conditions such as the speed of line and may be conducted either at room temperature or under conditions which do not cause color development in the heat-sensitive recording layer.

The protective layer of the article for laser marking of the present invention is formed by applying a transparent clear coating liquid on the heat-sensitive recording layer. The clear coating liquid is an aqueous composition consisting of an aqueous binder, water and the like.

As the aqueous binder used in the clear coating liquid for the protective layer in the present invention, there are mentioned those obtained by using as a base a per se known water-soluble or water-dispersible resin used in a coating material or ink. Such a resin has a hydrophilic group (e.g. carboxyl group or amino group) optionally introduced thereinto for impartment of the water-solubility or water-dispersibility. As said resin for the aqueous binder, a resin having a glass transition temperature in a range of 20-80° C., preferably 35-70° C. is used. When the glass transition temperature is lower than 20° C., the scuff resistance, chemical resistance, water resistance and the like of the protective layer are deteriorated. On the other hand when the glass transition temperature is higher than 80° C., the protective layer is brittle, is poor in flexibility and the like, and is easily cracked. Therefore, both of such glass transition temperatures are not desirable. If necessary, leveling agents, slip-properties-imparting agents, defoaming agents and the like may be incorporated into said clear coating liquid in addition to the components described above.

As the aqueous binder used in the clear coating liquid, an acrylic resin can be obtained by using an alkyl (number of carbon atoms: 1 to 24) ester of acrylic acid or methacrylic acid as a main component in combination with any of, for example, unsaturated carboxylic acids such as acrylic acid, methacrylic acid, maleic acid, etc.; hydroxy-containing unsaturated monomers such as hydroxyethyl acrylate, hydroxypropyl methacrylate, etc.; amino-containing unsaturated monomer such as acrylamide, methacrylamide, etc.; and other unsaturated monomers such as styrene, acrylonitrile, vinyl acetate, vinyl chloride, etc., and copolymerizing the alkyl ester with such a comonomer. A polyester resin can be obtained by carrying out the ester reaction of a polybasic acid (including acid anhydrides) having two or more carboxyl groups in the molecule with a polyhydric alcohol having two or more hydroxyl groups in the molecule. The glass transition point of such an aqueous binder can be arbitrarily adjusted by properly choosing the kinds, combination and proportions of components that constitute said binder.

Said clear coating liquid is prepared by dissolving or dispersing the above-mentioned aqueous binder in suitable water, and if necessary, it is incorporated with leveling agents, slip-properties-imparting agents, defoaming agents and the like. The solid content of said clear coating liquid ranges preferably from 20 to 70 wt %, in particular, 30 to 60 wt %.

Said clear coating liquid can be printed (applied) on the surface of the dried coating film formed as heat-sensitive recording layer. A method for the printing (application) is not particularly limited. The application can be carried out by means of a roll coater, gravure coater, micro-gravure coater, spray coater or the like.

The thickness of the coating film thus formed can be usually adjusted to 3 to 10μ. When the thickness is less than 3μ, the protection of the heat-sensitive recording layer afforded by said clear coating is not sufficient and the chemical resistance, rub resistance and the like are deteriorated. On the other hand, when the thickness is more than 10μ, the drying characteristics and physical performance of the coating film tend to be deteriorated. Drying of said clear coating liquid is varied depending on coating conditions such as the speed of line and may be conducted either at room temperature or under conditions which do not cause color development in the heat-sensitive recording layer.

When the thus formed heat-sensitive recording layer of the article for marking is irradiated with laser beams, the irradiated portion is heated, so that the urea-urethane compound developer and the dye precursor react with each other to develop a color, resulting in marking. Although the amount of energy of laser beams used for the irradiation is not particularly limited, it is preferably 1.4 J (joule)/cm$^2$ or less when the possibility of fracture of the coating film is taken into consideration. On the other hand, although the lower limit of the amount of energy required for color development is unknown because there is not apparatus capable of producing low energy, sufficient color development takes place at an amount of energy of 0.4 J/cm$^2$. Therefore, the suitable amount of energy for color development by the irradiation ranges from 0.4 to 1.4 J/cm$^2$, in particular, from 0.45 to 1.2 J/cm$^2$. As a laser used for the irradiation, a pulsed laser or scanning laser is suitable. As to the kind of the laser, any of, for example, gas lasers, excimer lasers and semiconductor lasers may be used. Specific examples of the laser are carbon dioxide lasers, mixed gas lasers, YAG lasers, ruby lasers, etc.

As a method for partially irradiating a portion of a desirable form with laser beams, there are mentioned a method of irradiating the coating film with laser beams through a metal mask to irradiate the coating film with laser beams corresponding to the form of the opening of the metal mask; and a method of inputting a desirable form to a computer and irradiating the coating film with laser beams in accordance with the desirable form in a manner of so-called drawing with a single stroke. When the heat-sensitive recording layer is irradiated with laser beams, the irradiated portion is increased in temperature to undergo color development caused by melting and mixing of the color-producing components in the heat-sensitive recording layer, resulting in the appearance of letters or a figure, which has a clear desirable form. This color change by irradiation can be carried out in a moment because the energy density of laser beams is high.

The label as the article for laser marking of the present invention can be produced by forming a heat-sensitive recording layer and a protective layer by the above-mentioned methods on a substrate for label properly selected depending on purposes from papers (e.g. paper and synthetic paper), synthetic resin films, plastics, metallized paper and synthetic paper, metallized films, metals, etc. Although the label thus obtained can be used in all the fields of conventional labels, it is preferably used in the field of, in particular, food, medicine, toiletries, publications, and electric and electronic parts, etc.

The packaging material as the article for laser marking of the present invention is produced by forming a heat-sensitive recording layer and a protective layer by the above-mentioned methods on any of various conventional packaging materials such as boxes, packing paper and packages, which are obtained by the use of a substrate properly selected depending on purposes from papers (e.g. paper and synthetic paper), synthetic resin films, plastics, metallized paper and synthetic paper, metallized films, metals, glass, wood, etc. Although said packaging material can be used in all the fields of conventional packaging materials, it is preferably used in the field of, in particular, food, medicine, toiletries, publications, and electric and electronic parts, etc.

The container as the article for laser marking of the present invention is produced by forming a heat-sensitive recording layer and a protective layer on a substrate such as glass, plastic, metal or the like by the above-mentioned methods. This food container can be used all the fields of conventional food containers, such as the fields of bottles for liquors and refreshing drinks, retort-food containers, instant-food containers, cosmetics containers, medicine container, toiletry products, etc.

When the recording material is a pressure-sensitive recording material, it can have, for example, the forms disclosed in U.S. Pat. Nos. 2,505,470, 2,712,507, 2,730,456, 2,730,457 and 3,418,250, etc. That is, various forms such as the following forms can be employed: pressure-sensitive recording paper obtained by dissolving the dye precursor or a mixture of the dye precursors in a solvent consisting of one of or a mixture of two or more of alkylated naphthalenes, alkylated diphenyls, alkylated diphenylmethanes, alkylated diarylethanes, synthetic oils (e.g. chlorinated paraffin), vegetable oils, animal oils, mineral oils, etc., dispersing the resulting solution in a binder or incorporating the solution into microcapsules, applying the dispersion on a substrate or applying the microcapsules on a substrate together with a binder, and placing the upper paper thus obtained and under paper coated with a dispersion of the urea-urethane compound (and an amino compound and/or a developer, etc.), one upon the other so that their coated surfaces may face each other; pressure-sensitive recording paper obtained by holding, between the above-mentioned upper paper and under paper, intermediate paper coated with a dispersion of the urea-urethane compound on one side and the dye precursor on the other side; self-type pressure-sensitive recording paper obtained by applying the above-mentioned dispersion of the urea-urethane compound (and an amino compound and/or a developer) and the above-mentioned dispersion containing the dye precursor, on the same surface of a substrate as a mixture or in a multilayer form; and self-type pressure-sensitive recording paper obtained by making each of the dye precursor and the urea-urethane compound (and an amino compound and/or a developer) into microcapsules, and applying a mixture of the microcapsules of the two kinds on the same surface of a substrate.

As a process for producing microcapsules, there can be adopted, for example, the coacervation processes disclosed in U.S. Pat. Nos. 2,800,457 and 2,800,458, the interfacial polymerization processes disclosed in JP-B-38-19,574, JP-B-42-446, JP-B-42-771, etc., the in-situ processes disclosed in JP-B-36-9168, JP-B-51-9079, etc., the melt dispersion cooling processes disclosed in Brit. Patent Nos. 952,807 and 96-5,074, etc., and the spray drying processes disclosed in U.S. Pat. No. 311,140, Brit. Patent No. 930,422, etc.

The color-producing composition of the present invention corresponds to the combination of a dye precursor and a developer described in each of the above references and the like.

For forming a pressure-sensitive layer, each component such as the urea-urethane compound may be used in the form of a solution or dispersion in a solvent. In the case of a color-producing system further comprising an amino compound and/or a developer, each component may be used in the form of a solution or dispersion in a solvent, or a combination of the urea-urethane compound, the amino compound and optionally the developer may be used in the form of a solution or dispersion in a solvent.

In the above-mentioned interfacial polymerization processes adopted for forming microcapsules, a film is formed on an interface by using two kinds of monomers, i.e., an oil monomer and a water-soluble monomer. There are known, for example, a process in which a polybasic acid chloride is used as an oil phase and a polyvalent amine as an aqueous phase, and a polyamide film is formed on the interface; a process in which a polybasic acid chloride is used as an oil phase and a polyhydric hydroxy compound as an aqueous phase, and a polyester film is formed on the interface; a process in which a polyvalent isocyanate is used as an oil phase and a polyhydric alcohol or a polyhydric phenol as an aqueous phase, and a polyurethane film is formed on the interface; and a process in which a polyvalent isocyanate is used as an oil phase and a polyvalent amine as an aqueous phase, and a polyurea film is formed on the interface. Thus, when the interfacial polymerization process is adopted for producing microcapsules, an isocyanate compound is used in some cases as a reactive monomer for forming a film.

In this case, said isocyanate compound is consumed in forming a film for microcapsules and is not directly concerned with a developed color image, and it is absolutely necessary to use a water-soluble monomer together with the isocyanate compound. In these points, its employment is distinguished from the employment of the isocyanate compound according to the present invention.

Dispersions of compounds which are not made into microcapsules are prepared by finely grinding one or more compounds as each component in an aqueous solution containing a compound having dispersing capability, such as a water-soluble polymer, a surfactant or the like. The urea-urethane compound may be dispersed together with an amino compound and an acidic developer.

As the substrate used in the pressure-sensitive recording material, paper is mainly used, though any of various woven fabrics, nonwoven fabrics, synthetic resin films, laminated papers, synthetic papers, metal foils, and composite sheets obtained by combining two or more of them may be used besides paper, depending on purposes.

As a binder, conventional various binders can be used. The binder includes, for example, water-soluble binders such as starches, hydroxyethyl cellulose, methyl cellulose, carboxymethyl cellulose, gelatin, casein, poly(vinyl alcohol)s, modified poly(vinyl alcohol)s, sodium poly(acrylate)s, acrylamide-acrylic ester copolymers, acrylamide-acrylic ester-methacrylic acid terpolymers, alkali salts of styrene-maleic anhydride copolymers, alkali salts of ethylene-maleic anhydride copolymers, etc.; and latex type water-insoluble binders of styrene-butadiene copolymers, acrylonitrile-butadiene copolymers, methyl acrylate-butadiene copolymers, etc.

In the recording material of the present invention, the recording layer may contain a hindered phenol compound or an ultraviolet absorber. The hindered phenol compound or ultraviolet absorber includes, for example, 1,1,3-tris(3'-cyclohexyl-4'-hydroxyphenyl)butane, 1,1,3-tris(2-methyl-4-hydroxy-5-tert-butylphenyl)butane, 4,4'-thiobis(3-methyl-6-tert-butylphenol), 1,3,5-trimethyl-2,4,6-tris(3,5-di-tert-butyl-4-hydroxybenzyl)benzene, 2,2'-dihydroxy-4,4'-dimethoxybenzophenone, p-octylphenyl salicylate, 2-(2'-hydroxy-5'-methylphenyl)benzotriazole, ethyl-2-cyano-3,3'-diphenyl acrylate and tetra(2,2,6,6-tetramethyl-4-piperidyl)-1,2,3,4-butanetetracarbonate.

A method for forming the color-producing layer is not particularly limited. The color-producing layer is formed, for example, by applying a coating liquid for the color-producing layer on a substrate by a suitable coating method such as free-fall curtain coating, air-knife coating, Bariber blade coating, Pure blade coating, short-dwell coating or the like, and drying the thus treated substrate. The coating amount of the coating liquid for the color-producing layer is not particularly limited and is usually controlled in a range of 1 to 15 $g/m^2$, preferably about 3 to about 10 $g/m^2$, in terms of dry weight.

The thermal response can be improved by forming an intermediate layer between the heat-sensitive recording layer and the substrate. The intermediate layer is composed mainly of an organic or inorganic pigment; hollow particles and an aqueous binder such as a water-soluble polymer or a latex. As the organic or inorganic pigment and the aqueous binder, the same organic or inorganic pigment and aqueous binder as used in the heat-sensitive recording layer can be used. A method for forming the intermediate layer is not particularly limited. As this method, the same method as a method for forming the heat-sensitive recording layer can be adopted. A dry spread for forming the intermediate layer ranges preferably from 2.0 to 15.0 $g/m^2$. In this case, the surface pH of the intermediate layer formed on the substrate is preferably 3 to 9, more preferably 5 to 9, most preferably 6 to 8.

In addition, in the present invention, the resistance to rubbing of recording paper can be improved by forming a protective layer composed mainly of a water-soluble polymer, on the heat-sensitive recording layer if necessary. Specific examples of the water-soluble polymer in this case are the water-soluble polymer binders mentioned in relation to the above-mentioned heat-sensitive recording layer. The water-soluble polymer can be used together with a conventional waterproofing agent capable of waterproofing the water-soluble polymer. Specific examples of the waterproofing agent are formaldehyde, glyoxal, chrome alum, melamine, melamine-formaldehyde resins, polyamide resins, polyamide-epichlorohydrin resins, etc.

Furthermore, pigments, metal soaps, waxes, crosslinking agents, etc. are incorporated into the protective layer for the purpose of, for example, improving the matching with a thermal head during printing and improving the water resistance of the protective layer.

The pigments include zinc oxide, calcium carbonate, barium sulfate, titanium oxide, lithopone, talc, pagodite, kaolin, aluminum hydroxide, silica, amorphous silica, etc. The amount of the pigments added is 0.5 to 4 times, preferably 0.8 to 3.5 times, the total weight of the polymers. When the amount is below the lower limit of the above range, the pigments are not effective in improving the matching with a thermal head. When the amount is above the upper limit, the sensitivity of the heat-sensitive recording material is remarkably decreased, so that the commercial value of the recording material is impaired.

The metal soaps include, for example, emulsions of higher fatty acid metal salts such as zinc stearate, calcium stearate, aluminum stearate, etc. The metal soaps are added in a proportion of 0.5 to 20 wt %, preferably 1 to 10 wt %, based on the total weight of the protective layer. The waxes include, for example, emulsions of paraffin wax, microcrystalline wax, carnauba wax, methylolstearoamide, polyethylene wax, etc. The waxes are added in a proportion of 1 to 20 wt %, preferably 1 to 10 wt %, based on the total weight of the protective layer.

In forming the protective layer on the heat-sensitive recording layer, a surfactant is added to a Coating liquid for forming the protective layer, in order to obtain a uniform coating layer. The surfactant includes alkali metal salts of sulfosuccinic acids, fluorine-containing surfactants, etc. Specific examples of the surfactant are sodium salts or ammonium salts of di-(2-ethylhexyl)sulfosuccinic acid, di-(n-hexyl)sulfosuccinic acid, etc. In general, any surfactant is effective so long as it is anionic. Conventional auxiliary additives such as fillers, heat-meltable materials (lubricants), surfactants, fluorescent dyes, etc. may also be incorporated into the protective layer. Specific examples of the fillers, heat-meltable materials and fluorescent dyes are those mentioned in relation to the above-mentioned heat-sensitive recording layer. The dry spread of the protective layer is preferably about 0.5 to about 10 g/m², in particular, about 1 to about 5 g/m².

When a reverse-side layer (a back coating layer) is, if necessary, formed on the side reverse to the recording layer of the recording material produced by the process of the present invention, curling of the resulting recording paper can be made difficult. As the components of a coating liquid for the reverse-side layer and a coating method for the coating liquid, the same components and method as in the case of the protective recording layer may be employed. The dry spread ranges preferably from 0.2 to 10.0 g/m².

The present invention is explained in further detail with the following examples.

The analyses of materials and the evaluation of physical properties were carried out by the following methods.

<IR Spectrum>

Measured by diffuse reflectance spectroscopy by the use of FTIR-8100M manufactured by Shimadzu Corp.

<Mass Spectrum>

Measured by using JMS-HX100 manufactured by JEOL LTD., nitrobenzyl alcohol as a matrix, and xenon as a primary gas.

<Color Development Sensitivity of Thermal Paper>

Coloring density at an applied voltage of 24 V and a pulse width of 1.5 msec was measured with an optical densitometer by using a printing tester manufactured by Ohkura Denki K.K., and a thermal head KJT-256-8MG manufactured by Kyocera Co., Ltd.

<Plasticizer Resistance>

A heat-sensitive recording material was held between vinyl chloride wrap films or in a vinyl chloride file, and a load of 300 g/cm² was applied thereto from above. After standing at 40° C. for 24 hours, the coloring density of the printed portion and the non-printed portion (the original recording material surface) was visually estimated. When there was only a slight decrease in print density, the print preservability was rated as good.

<Heat Resistance>

A heat-sensitive recording material was allowed to stand in a circumstance of 60° C. and 25% RH for 24 hours and the degree of fading of print was visually estimated. When the degree of fading is low, the print preservability was rated as good.

In addition, a heat-sensitive recording material was allowed to stand in a circumstance of 80° C. and 25% RH for 24 hours and the degree of fading of print was visually estimated. When the degree of fading was low, the print preservability was rated as good. The coloring density of the original recording material surface was also visually estimated. When the color development was slight, the preservability of original recording material surface was rated good.

<Coloring Density of Pressure-Sensitive Paper>

Upper paper and under paper were placed one upon the other so that their coated surfaces might face each other. A pressure was applied thereto from above to obtain a developed color image on the under paper. The color density of the developed color image was measured by means of a densitometer Macbeth RD917.

<Solvent Resistance>

Hand cream (Atrix, a trade name, mfd. by Kao Corp.) was thinly applied on the developed color image portion obtained in the coloring density estimation, and after standing at ordinary temperature for 7 days, the color density of print portion was visually estimated. When there was only a slight decrease in a print density, the print preservability was rated as good.

EXAMPLE 1

To 88.2 g of 2,4-toluene diisocyanate were added 124 g of methyl ethyl ketone and 15 g of dimethylformamide as solvents, followed by adding dropwise thereto a dilution of 6.3 g of 4,4'-diaminodiphenyl sulfone with a mixture of 25 g of methyl ethyl ketone and 3 g of dimethylformamide, and the reaction was carried out at 25° C. for 8 hours. After completion of the reaction, the methyl ethyl ketone was removed by concentration and toluene was added to the residue, and the white solid precipitated was recovered by filtration, washed with toluene and then dried overnight in a vacuum to obtain 10.0 g of a compound as white crystals. Subsequently, 33 g of phenol and 180 g of methyl ethyl ketone were added to 8.4 g of the obtained compound, followed by adding thereto 8.5 mg of triethylamine, and the reaction was carried out at 25° C. for 7 hours. After completion of the reaction, toluene was added to the reaction solution and the crystals precipitated were recovered by filtration, washed with toluene and then dried overnight in a vacuum to obtain 10.0 g of a compound as white crystals. Analytical values of these white crystals were as follows.

Result of IR Measurement:

Characteristic peaks appeared at 990 cm$^{-1}$, 1110 cm$^{-1}$, 1320 cm$^{-1}$, 1590 cm$^{-1}$, 1700 cm$^{-1}$ and 3350 cm$^{-1}$. An IR spectrum is shown in FIG. 1.

Result of Mass Spectrum Measurement:

[M+H]* was detected at m/z 785.

The structural formula of the major component of this compound is presumed to be the structural formula of the above-mentioned compound (E-24).

Next, 2 g of this compound was ground together with 8 g of a 2.5 wt % aqueous solution of a poly(vinyl alcohol) (Goseran L-3266, a trade name, mfd. by The Nippon Synthetic Chemical Industry Co., Ltd.) in a paint shaker for 45 minutes to be dispersed, whereby a dispersion was obtained. The temperature of the dispersion immediately after the dispersing operation was 25° C. The diameter of dispersed particles of the compound was 0.9 μm.

Separately, 70 g of 3-dibutylamino-6-methyl-7-anilinofluoran was ground together with 130 g of a 5.4 wt % poly(vinyl alcohol) aqueous solution in a sand grinder (mfd. by AIMEX CO., LTD.; vessel capacity 400 ml) at a number of revolution of 2,000 rpm for 3 hours to be dispersed, whereby a dispersion was obtained.

Separately, 7.0 g of diphenyl sulfone was ground together with 130 g of a 5.4 wt % poly(vinyl alcohol) aqueous solution in a sand grinder (mfd. by AIMEX CO., LTD.; vessel capacity 400 ml) at a number of revolution of 2,000 rpm for 3 hours to be dispersed, whereby a dispersion was obtained.

Separately, 10 g of calcium carbonate was mixed with 30 g of water and dispersed by stirring by the use of a stirrer to obtain a dispersion.

A coating liquid was obtained by stirring and mixing the above-mentioned dispersions and other components in the following proportions (dry basis proportions); the dispersion of the above-mentioned compound in terms of dry solids: 20 parts by weight, the 3-dibutylamino-6-methyl-7-anilinofluoran dispersion in terms of dry solids: 10 parts by weight, the diphenyl sulfone dispersion in terms of dry solids: 25 parts by weight, the calcium carbonate dispersion in terms of dry solids: 40 parts by weight, a zinc stearate dispersion (solid content: 16 wt %) in terms of dry solids: 20 parts by weight, and a 15 wt % poly(vinyl alcohol) in terms of dry solids: 15 parts by weight.

The coating liquid was applied on base paper with a basis weight of 50 g/m² by the use of a bar coater of rod number 10 and dried, followed by supercalendering, to obtain a heat-sensitive recording material.

The result of sensitivity evaluation was so good that the optical density was 1.3.

The result of estimating the degree of a thermal color change of the original recording material surface (the heat resistance) was so good that the color change was slight. The thermal fading of the print portion was desirably slight. The result of evaluating the plasticizer resistance by the use of vinyl chloride wrap films was so good that only a slight color change was caused. The results are summarized in Table 1.

EXAMPLE 2

To 30 g of 2,4-toluene diisocyanate was added 57 g of methyl ethyl ketone as a solvent, followed by adding dropwise thereto a dilution of 2.15 g of 4,4'-diaminodiphenyl sulfone with 12 g of methyl ethyl ketone, and the reaction was carried out at 50° C. for 6 hours. After completion of the reaction, the reaction solution was cooled to room temperature and then toluene was added thereto, and the white solid precipitated was recovered by filtration, washed with toluene and then dried overnight in a vacuum to obtain 4.1 g of a compound as white crystals. Subsequently, 11.8 g of phenol and 78 g of methyl ethyl ketone were added to 3.0 g of the obtained compound, followed by adding thereto 3 mg of triethylamine, and the reaction was carried out at 25° C. for 4 hours. After completion of the reaction, toluene was added to the reaction solution and the crystals precipitated were recovered by filtration, washed with toluene and then dried overnight in a vacuum to obtain 3.9 g of a compound as white crystals. The result of IR measurement of these white crystals was the same as in Example 1.

The structural formula of the major component of this compound is presumed to be the structural formula of the above-mentioned compound (E-24).

Next, 2 g of this compound was ground together with 8 g of a 2.5 wt % aqueous solution of a poly(vinyl alcohol) (Gosenol KL-05, a trade name, mfd. by The Nippon Synthetic Chemical Industry Co., Ltd.) in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and using p-benzylbiphenyl in place of diphenyl sulfone, and was evaluated. The results obtained are summarized in Table 1.

EXAMPLE 3

While stirring 31.5 g of 2,4-toluene diisocyanate at 60° C., a dilution of 21.5 g of 4,4'-diaminodiphenyl sulfone with 120 ml of methyl ethyl ketone was added dropwise thereto over a period of 4 hours, and the reaction was continued at 60° C. for another 2 hours. After completion of the reaction, the reaction solution was cooled to room temperature and then toluene was added thereto, and the white solid precipitated was recovered by filtration, washed with toluene and then dried overnight in a vacuum to obtain 47 g of a compound as white crystals. Subsequently, 9.5 g of phenol and 95 ml of methyl ethyl ketone were added to 30 g of the obtained compound, followed by adding thereto 30 mg of triethylamine, and the reaction was carried out at 25° C. for 4 hours. After completion of the reaction, toluene was added to the reaction solution and the crystals precipitated were recovered by filtration, washed with toluene and then dried overnight in a vacuum to obtain 38.5 g of a compound as white crystals. The result of IR measurement of these white crystals was the same as in Example 1.

The structural formula of the major component of this compound is presumed to be the structural formula of the above-mentioned compound (E-24).

Next, 2 g of this compound was ground together with 8 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

EXAMPLE 4

To 10.4 g of 2,4-toluene diisocyanate was added 20 g of methyl ethyl ketone as a solvent, followed by adding thereto a dilution of 3.7 g of 4,4'-diaminodiphenyl sulfone with 30 g of methyl ethyl ketone, and the reaction was carried out at ordinary temperature for 20 hours. After completion of the reaction, the methyl ethyl ketone was removed by concentration and then toluene was added to the residue, and the white solid precipitated was recovered by filtration, washed with hexane and then dried overnight in a vacuum to obtain 8.8 g of a compound as white crystals. Subsequently, 15 g of phenol and then a small amount of dibutyltin dilaurate, were added to 4 g of the obtained compound, and the reaction was carried out at 50° C. for 4 hours. After completion of the reaction, toluene was added to the reaction solution and the crystals precipitated were recovered by filtration, washed with hexane and then dried overnight in a vacuum to obtain 5.2 g of a compound as white crystals.

The structural formula of the major component of this compound is presumed to be the structural formula of the above-mentioned compound (E-24).

Next, 2 g of this compound was ground together with 8 g of a 2.5 wt % methyl cellulose aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and using benzyloxynaphthalene in place of diphenyl sulfone, and was evaluated. The results obtained are summarized in Table 1.

EXAMPLE 5

To 30 g of 2,4-toluene diisocyanate was added 30 g of toluene as a solvent, followed by adding thereto 3.24 g of phenol, and the reaction was carried out at 100° C. for 1 hour and 30 minutes. After completion of the reaction, the toluene was removed by concentration and hexane was added to the residue, and the white solid precipitated was recovered by filtration, washed with hexane and then dried overnight in a vacuum to obtain 6.9 g of a compound as white crystals. Subsequently, methyl ethyl ketone was added as a solvent to 2 g of the obtained compound, followed by adding thereto 0.9 g of 4,4'-diaminodiphenyl sulfone, and the reaction was carried out at 50° C. for 22 hours. The crystals precipitated were recovered by filtration, washed with hexane and then dried overnight in a vacuum to obtain 2.3 g of a compound as white crystals. Analytical values of these white crystals were as follows.

Result of IR Measurement:

Characteristic peaks appeared at 550 cm$^{-1}$, 1030 cm$^{-1}$, 1110 cm$^{-1}$, 1150 cm$^{-1}$, 1590 cm$^{-1}$, 1700 cm$^{-1}$ and 3300 cm$^{-1}$.

The structural formula of the major component of this compound is presumed to be the structural formula of the above-mentioned compound (E-22).

Next, 2 g of this compound was ground together with 8 g of a 2.5 wt % polyvinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and using di-p-methylbenzyl oxalate in place of diphenyl sulfone, and was evaluated. The results obtained are summarized in Table 1.

EXAMPLE 6

To 30 g of 2,4-toluene diisocyanate was added 30 g of toluene as a solvent, followed by adding thereto 3.24 g of phenol, and the reaction was carried out at 100° C. for 1 hour and 30 minutes. After completion of the reaction, the toluene was removed by concentration and hexane was added to the residue, and the white solid precipitated was recovered by filtration, washed with hexane and then dried overnight in a vacuum to obtain 6.9 g of a compound as white crystals. Subsequently, methyl ethyl ketone was added as a solvent to 2 g of the obtained compound, followed by adding thereto 0.9 g of 3,3'-diaminodiphenyl sulfone, and the reaction was carried out at 50° C. for 22 hours. The crystals precipitated were recovered by filtration, washed with hexane and then dried overnight in a vacuum to obtain 2.5 g of a compound as white crystals. Analytical values of these white crystals were as follows.

Result of IR Measurement:

Characteristic peaks appeared at 620 cm$^{-1}$, 880 cm$^{-1}$, 1030 cm$^{-1}$, 1300 cm$^{-1}$, 1590 cm$^{-1}$, 1700 cm$^{-1}$ and 3300 cm$^{-1}$.

The structural formula of the major component of this compound is presumed to be the structural formula of the above-mentioned compound (E-19).

Next, 2 g of this compound was ground together with 8 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and using benzil in place of diphenyl sulfone, and was evaluated. The results obtained are summarized in Table 1.

EXAMPLE 7

To 10.4 g of 2,4-toluene diisocyanate was added 20 g of methyl ethyl ketone as a solvent, followed by adding dropwise thereto a dilution of 3.7 g of 3,3'-diaminodiphenyl sulfone with 30 g of methyl ethyl ketone, and the reaction was carried out at 15° C. for 3 hours. The white crystals precipitated were recovered by filtration, washed with hexane and then dried overnight in a vacuum to obtain 6.3 g of a compound as white crystals. Subsequently, 15 g of phenol and then 3 mg of dibutyltin dilaurate were added to 3.0 g. of the obtained compound, and the reaction was carried out at 50° C. for 3 hours. After completion of the reaction, hexane was added to the reaction solution and the crystals precipitated were recovered by filtration, washed and then dried overnight in a vacuum to obtain 3.3 g of a compound as white crystals. Analytical values of these white crystals were as follows.

Result of IR Measurement:

Characteristic peaks appeared at 520 cm$^{-1}$, 880 cm$^{-1}$, 1030 cm$^{-1}$, 1430 cm$^{-1}$, 1590 cm$^{-1}$, 1710 cm$^{-1}$ and 3300 cm$^{-1}$.

The structural formula of the major component of this compound is presumed to be the structural formula of the above-mentioned compound (E-21).

Next, 2 g of this compound was ground together with 8 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and using 1,2-di(3-methylphenoxy)ethane in place of diphenyl sulfone, and was evaluated. The results obtained are summarized in Table 1.

EXAMPLE 8

To 27.8 g of 2,4-toluene diisocyanate was added 111 g of toluene as a solvent, followed by adding dropwise thereto a solution of 7.4 g of aniline in 37 g of toluene, and the reaction was carried out at 10° C. for 8 hours. After completion of the reaction, the white solid precipitated was recovered by filtration and then dried overnight in a vacuum to obtain 20.0 g of a compound as white crystals. Subsequently, 20 g of dimethylformamide was added as a solvent to 6.6 g of the obtained compound, followed by adding thereto 2.7 g of 2,2-bis(4-hydroxyphenyl)propane, and the reaction was carried out at 15° C. for 5 hours. After completion of the reaction, 8 g of acetone and then 160 g of water were added to the reaction solution, and the crystals precipitated were recovered by filtration and then dried overnight in a vacuum to obtain 9.3 g of a compound as white crystals. Analytical values of these white crystals were as follows.

Figure 2:
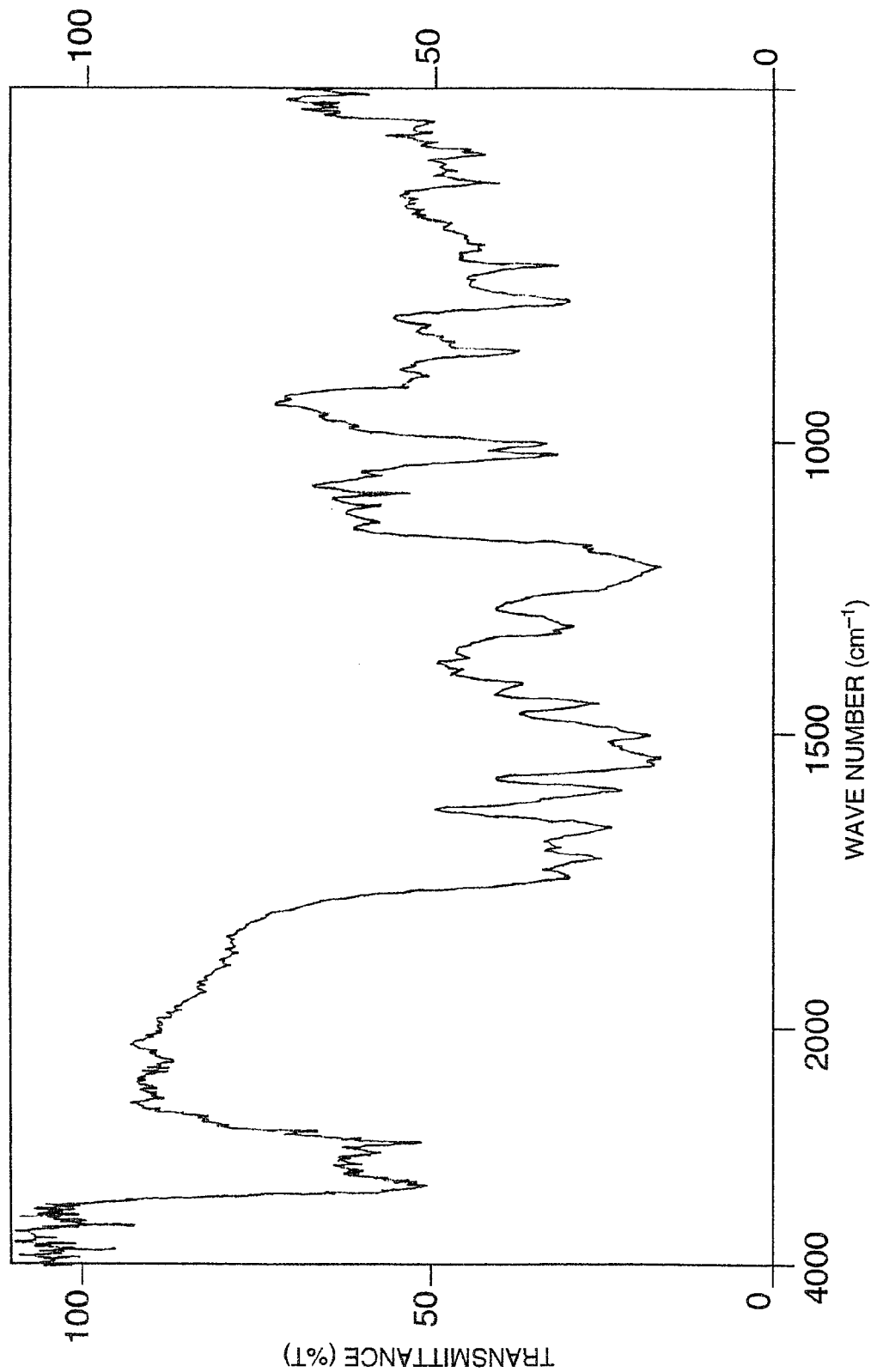
FIG. 2 is an IR spectrum of the white crystals obtained in Example 8.

Result of IR Measurement:

Characteristic peaks appeared at 750 cm$^{-1}$, 840 cm$^{-1}$, 1020 cm$^{-1}$, 1500 cm$^{-1}$, 1600 cm$^{-1}$, 1720 cm$^{-1}$ and 3320 cm$^{-1}$. An IR spectrum is shown in FIG. 2.

Result of Mass Spectrum Measurement:

[M+H]⁺ was detected at m/z 763.

The structural formula of the major component of this compound is presumed to be the structural formula of the above-mentioned compound (E-30).

Next, 2 g of this compound was ground together with 8 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

EXAMPLE 9

To 12.2 g of 2,4-toluene diisocyanate was added 90 g of toluene as a solvent, followed by adding dropwise thereto a solution of 5.2 g of aniline in 30 g of toluene, and the reaction was carried out at 5° C. for 7 hours. After completion of the reaction, the white solid precipitated was recovered by filtration, washed with toluene and then dried overnight in a vacuum to obtain 14 g of a compound as white crystals. Subsequently, 60 g of toluene was added as a solvent to 4.3 g of the obtained compound, followed by adding thereto 1.73 g of 2,2-bis(4-hydroxyphenyl)propane and 0.043 mg of triethylamine, and the reaction was carried out at 70° C. for 8 hours. Thereafter, the temperature was raised to 80° C. and the reaction was continued for another 1 hour. After completion of the reaction, the reaction solution was cooled to room temperature, and the crystals precipitated were recovered by filtration, washed with toluene and then dried overnight in a vacuum to obtain 6.0 g of a compound as white crystals. The result of IR measurement of these white crystals was the same as in Example 8.

The structural formula of the major component of this compound is presumed to be the structural formula of the above-mentioned compound (E-30).

Next, 2 g of this compound was ground together with 8 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

EXAMPLE 10

To 61 g of 2,4-toluene diisocyanate was added 450 g of toluene as a solvent, followed by adding dropwise thereto a solution of 26 g of aniline in 150 g of toluene over a period of 6 hours, and the reaction was carried out at 5° C. for 7 hours. After completion of the reaction, the white solid precipitated was recovered by filtration, washed with toluene and then dried overnight in a vacuum to obtain 70 g of a compound as white crystals. Subsequently, 365 g of toluene was added as a solvent to 30 g of the obtained compound, followed by adding thereto 12.2 g of 2,2-bis(4-hydroxyphenyl)propane and 0.3 mg of triethylamine, and the reaction was carried out with stirring at 60° C. for 4 hours and then at 70° C. for 3 hours. Thereafter, the temperature was raised and the reaction was continued at 80° C. for another 3 hours. After completion of the reaction, the reaction solution was cooled to room temperature, and the crystals precipitated were recovered by filtration, washed with toluene and then dried overnight in a vacuum to obtain 42 g of a compound as white crystals. The result of IR measurement of these white crystals was the same as in Example 8.

The structural formula of the major component of this compound is presumed to be the structural formula of the above-mentioned compound (E-30).

Next, 2 g of this compound was ground together with 8 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

EXAMPLE 11

To 27.8 g of 2,4-toluene diisocyanate was added 111 g of toluene as a solvent, followed by adding dropwise thereto a solution of 7.4 g of aniline in 37 g of toluene, and the reaction was carried out at 10° C. for 8 hours. After completion of the reaction, the white solid precipitated was recovered by filtration and then dried overnight in a vacuum to obtain 20.0 g of a compound as white crystals. Subsequently, 65 g of toluene was added as a solvent to 2.8 g of the obtained compound, followed by adding thereto 1.14 g of 2,2-bis(4-hydroxyphenyl)propane and 2.7 mg of dibutyltin dilaurate, and the reaction was carried out at 60° C. for 7 hours. After completion of the reaction, the reaction solution was concentrated, followed by adding thereto acetone and then 160 g of water, and the crystals precipitated were recovered by filtration and dried overnight in a vacuum to obtain 3.5 g of a compound as white crystals.

The structural formula of the major component of this compound is presumed to be the structural formula of the above-mentioned compound (E-30).

Next, 2 g of this compound was ground together with 8 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

EXAMPLE 12

To 27.8 g of 2,4-toluene diisocyanate was added 111 g of toluene as a solvent, followed by adding dropwise thereto a solution of 7.4 g of aniline in 37 g of toluene, and the reaction was carried out at 10° C. for 8 hours. After completion of the reaction, the white solid precipitated was recovered by filtration and then dried overnight in a vacuum to obtain 20.0 g of a compound as white crystals. Subsequently, 30 g of methyl ethyl ketone was added as a solvent to 4.7 g of the obtained compound, followed by adding thereto 1.0 g of 2,2-bis(4-hydroxyphenyl)propane and 4.7 mg of dibutyltin dilaurate, and the reaction was carried out at 75° C. for 4 hours. After completion of the reaction, the reaction solution was concentrated, followed by adding thereto acetone and then 160 g of water, and the crystals precipitated were recovered by filtration and then dried overnight in a vacuum to obtain 3.0 g of a compound as white crystals.

The structural formula of the major component of this compound is presumed to be the structural formula of the above-mentioned compound (E-30).

Next, 2 g of this compound was ground together with 8 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

EXAMPLE 13

To 19.5 g of 2,4-toluene diisocyanate was added 155 g of toluene as a solvent, followed by adding thereto 3.2 g of 2,2-bis(4-hydroxyphenyl)propane, and the reaction was carried out at 80° C. for 12 hours. After completion of the reaction, the reaction solution was cooled to −20° C. and the white solid precipitated was recovered by filtration and dissolved in chlorobenzene. Hexane was added to the resulting solution and the crystals precipitated were recovered by filtration and then dried overnight in a vacuum to obtain 8.0 g of a compound as white crystals. Subsequently, 50 g of toluene was added as a solvent to 4 g of the obtained compound, followed by adding thereto 4 g of aniline, and the reaction was carried out at 25° C. for 24 hours. After completion of the reaction, the crystals precipitated were recovered by filtration, washed with toluene and then dried overnight in a vacuum to obtain 5.0 g of a compound as white crystals. Analytical values of these white crystals were as follows.

Result of IR Measurement:

Characteristic peaks appeared at 750 cm$^{-1}$, 840 cm$^{-1}$, 1020 cm$^{-1}$, 1500 cm$^{-1}$, 1600 cm$^{-1}$, 1720 cm$^{-1}$ and 3300 cm$^{-1}$.

The structural formula of the major component of this compound is presumed to be the structural formula of the above-mentioned compound (E-32).

Next, 2 g of this compound was ground together with 8 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

EXAMPLE 14

To 30 g of 2,4-toluene diisocyanate was added 30 g of toluene as a solvent, followed by adding thereto 3.24 g of phenol, and the reaction was carried out at 100° C. for 1 hour and 30 minutes. After completion of the reaction, the toluene was removed by concentration and hexane was added to the residue, and the white solid precipitated was recovered by filtration, washed with hexane and then dried overnight in a vacuum to obtain 6.9 g of a compound as white crystals. Subsequently, toluene was added as a solvent to 1.5 g of the obtained compound, followed by adding thereto 1.44 g of 2-methoxy-5-N,N-diethylsulfamoylaniline, and the reaction was carried out at 50° C. for 16 hours. The crystals precipitated were recovered by filtration, washed with hexane and then dried overnight in a vacuum to obtain 2.3 g of a compound as white crystals. Analytical values of these white crystals were as follows.

Result of IR Measurement:

Characteristic peaks appeared at 750 cm$^{-1}$, 840 cm$^{-1}$, 1020 cm$^{-1}$, 1500 cm$^{-1}$, 1600 cm$^{-1}$, 1700 cm$^{-1}$ and 3320 cm$^{-1}$.

The structural formula of the major component of this compound is presumed to be the structural formula of the above-mentioned compound (E-13).

Next, 2 g of this compound was ground together with 8 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

EXAMPLE 15

To 40 g of 2,4-toluene diisocyanate was added 100 g of toluene as a solvent, followed by adding dropwise thereto a dilution of 4.28 g of aniline with 40 g of toluene, and the reaction was carried out at 5° C. for 1 hour. After completion of the reaction, the white solid precipitated was recovered by filtration, washed with hexane and then dried overnight in a vacuum to obtain 12.2 g of a compound as white crystals. Subsequently, 40 g of methyl ethyl ketone was added as a solvent to 4 g of the obtained compound, followed by adding thereto a dilution of 4.23 g of phenol with 10 g of methyl ethyl ketone, and the reaction was carried out at 90° C. for 3 hours. Thereafter, the reaction solution was cooled at 5° C. for 6 days, and the crystals precipitated were recovered by filtration and dried overnight in a vacuum to obtain 2.58 g of a compound as white crystals. Analytical values of these white crystals were as follows.

Result of IR Measurement:

Characteristic peaks appeared at 880 cm$^{-1}$, 1000 cm$^{-1}$, 1040 cm$^{-1}$, 1440 cm$^{-1}$, 1720 cm$^{-1}$, 1720 cm$^{-1}$ and 3300 cm$^{-1}$.

The structural formula of the major component of this compound is presumed to be the structural formula of the above-mentioned compound (E-1).

Next, 2 g of this compound was ground together with 8 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

EXAMPLE 16

To 30 g of 2,4-toluene diisocyanate was added 30 g of toluene as a solvent, followed by adding thereto 3.24 g of phenol, and the reaction was carried out at 100° C. for 1 hour and 30 minutes. After completion of the reaction, the toluene was removed by concentration and hexane was added to the residue, and the white solid precipitated was recovered by filtration, washed with hexane and then dried overnight in a vacuum to obtain 6.9 g of a compound as white crystals.

Subsequently, toluene was added as a solvent to 5.4 g of the obtained compound, followed by adding thereto 0.9 g of water and then a small amount of dibutyltin dilaurate, and the reaction was carried out at ordinary temperature for 10 hours. The crystals precipitated were recovered by filtration, washed with hexane and then dried overnight in a vacuum to obtain 2.1 g of a compound as white crystals. Analytical values of these white crystals were as follows.

Result of IR Measurement:

Characteristic peaks appeared at 990 cm$^{-1}$, 1030 cm$^{-1}$, 1300 cm$^{-1}$, 1480 cm$^{-1}$, 1540 cm$^{-1}$, 1720 cm$^{-1}$ and 3300 cm$^{-1}$.

The structural formula of the major component of this compound is presumed to be the structural formula of the above-mentioned compound (E-17).

Next, 2 g of this compound was ground together with 8 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

EXAMPLE 17

To 40 g of 2,4-toluene diisocyanate was added 100 g of toluene as a solvent, followed by adding dropwise thereto a dilution of 4.28 g of aniline with 40 g of toluene, and the reaction was carried out at 5° C. for 1 hour. After completion of the reaction, the white solid precipitated was recovered by filtration, washed with hexane and then dried overnight in a vacuum to obtain 12.2 g of a compound as white crystals. Subsequently, 40 g of methyl ethyl ketone as a solvent and then 5 mg of dibutyltin laurate were added to 5 g of the obtained compound. A dilution of 2.58 g of p-methoxyphenol with 10 g of methyl ethyl ketone was added thereto, and the reaction was carried out at 90° C. for 6 hours. Thereafter, the reaction solution was poured into hexane, and the crystals precipitated were recovered by filtration and dried overnight in a vacuum to obtain 3.7 g of a compound as whitish-purple crystals. Analytical values of the whitish-purple crystals were as follows.

Result of IR Measurement:

Characteristic peaks appeared at 840 cm$^{-1}$, 1040 cm$^{-1}$, 1440 cm$^{-1}$, 1720 cm$^{-1}$ and 3300 cm$^{-1}$.

The structural formula of the major component of this compound is presumed to be the structural formula of the above-mentioned compound (E-3).

Next, 2 g of this compound was ground together with 8 g of a 2.5 wt % polyvinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

EXAMPLE 18

To 40 g of 2,4-toluene diisocyanate was added 100 g of toluene as a solvent, followed by adding dropwise thereto a dilution of 4.28 g of aniline with 40 g of toluene, and the reaction was carried out at 5° C. for 1 hour. After completion of the reaction, the white solid precipitated was recovered by filtration, washed with hexane and then dried, overnight in a vacuum to obtain 12.2 g of a compound as white crystals. Subsequently, 40 g of methyl ethyl ketone as a solvent and then 5 mg of dibutyltin laurate were added to 5 g of the obtained compound. A dilution of 2.22 g of p-cresol with 10 g of methyl ethyl ketone was added thereto, and the reaction was carried out at 90° C. for 6 hours. Thereafter, the reaction solution was poured into hexane, and the crystals precipitated were recovered by filtration and dried overnight in a vacuum to obtain 3.7 g of a compound as white crystals. Analytical values of these white crystals were as follows.

Result of IR Measurement:

Characteristic peaks appeared at 880 cm$^{-1}$, 1000 cm$^{-1}$, 1040 cm$^{-1}$, 1500 cm$^{-1}$, 1720 cm$^{-1}$ and 3300 cm$^{-1}$.

The structural formula of the major component of this compound is presumed to be the structural formula of the above-mentioned compound (E-4).

Next, 2 g of this compound was ground together with 8 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

EXAMPLE 19

To 40 g of 2,4-toluene diisocyanate was added 100 g of toluene as a solvent, followed by adding dropwise thereto a dilution of 5.66 g of p-methoxyaniline with 40 g of toluene, and the reaction was carried out at 10° C. for 1 hour. After completion of the reaction, the whitish-purple solid precipitated was recovered by filtration, washed with hexane and then dried overnight in a vacuum to obtain 13.4 g of a compound as whitish-purple crystals. Subsequently, 65 g of methyl ethyl ketone as a solvent and then 5 mg of dibutyltin laurate were added to 5 g of the obtained compound. A dilution of 2.37 g of phenol with 15 g of methyl ethyl ketone was added thereto, and the reaction was carried out at 90° C. for 4 hours. Thereafter, the reaction solution was concentrated and then cooled at 5° C. for 1 day, and the crystals precipitated were recovered by, filtration and dried overnight in a vacuum to obtain 2.50 g of a compound as whitish-purple crystals. Analytical values of these whitish-purple crystals were as follows.

Result of IR Measurement:

Characteristic peaks appeared at 820 cm$^{-1}$, 1030 cm$^{-1}$, 1420 cm$^{-1}$, 1730 cm$^{-1}$ and 3300 cm$^{-1}$.

The structural formula of the major component of this compound is presumed to be the structural formula of the above-mentioned compound (E-6).

Next, 2 g of this compound was ground together with 8 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

EXAMPLE 20

To 30 g of 2,4-toluene diisocyanate was added 30 g of toluene as a solvent, followed by adding thereto 3.24 g of phenol, and the reaction was carried out at 100° C. for 1 hour and 30 minutes. After completion of the reaction, the toluene was removed by concentration and hexane was added to the residue, and the white solid precipitated was recovered by filtration, washed with hexane and then dried overnight in a vacuum to obtain 6.9 g of a compound as white crystals. Subsequently, 100 g of toluene was added as a solvent to 5.0 g of the obtained compound, followed by adding thereto 3.50 g of aniline, and the reaction was carried out at 25° C. for 3 hours. The crystals precipitated were recovered by filtration, washed with hexane and then dried overnight in a vacuum to obtain 5.5 g of a compound as white crystals. Analytical values of these white crystals were as follows.

Result of IR Measurement:
Characteristic peaks appeared at 890 $cm^{-1}$, 1000 $cm^{-1}$, 1030 $cm^{-1}$, 1440 $cm^{-1}$, 1720 $cm^1$ and 3350 $cm^{-1}$.

The structural formula of the major component of this compound is presumed to be the structural formula of the above-mentioned compound (E-8).

Next, 2 g of this compound was ground together with 8 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

EXAMPLE 21

To 30 g of 2,4-toluene diisocyanate was added 30 g of toluene as a solvent, followed by adding thereto 3.24 g of phenol, and the reaction was carried out at 100° C. for 1 hour and 30 minutes. After completion of the reaction, the toluene was removed by Concentration and hexane was added to the residue, and the white solid precipitated was recovered by filtration, washed with hexane and then dried overnight in a vacuum to obtain 6.9 g of a compound as white crystals. Subsequently, 100 g of toluene was added as a solvent to 5.0 g of the obtained compound, followed by adding thereto 3.00 g of p-toluidine, and the reaction was carried out at 25° C. for 3 hours. The crystals precipitated were recovered by filtration, washed with hexane and then dried overnight in a vacuum to obtain 5.5 g of a compound as white crystals. Analytical values of these white crystals were as follows.

Result of IR Measurement:
Characteristic peaks appeared at 870 $cm^{-1}$, 1000 $cm^{-1}$, 1030 $cm^{-1}$, 1460 $cm^{-1}$, 1720 $cm^{-1}$ and 3350 $cm^{-1}$.

The structural formula of the major component of this compound is presumed to be the structural formula of the above-mentioned compound (E-10).

Next, 0.2 g of this compound was ground together with 8 g of a 2.5 wt % poly(vinyl alcohol) aqueous solution in a paint shaker for 45 minutes to be dispersed, whereby a dispersion was obtained.

Separately, 70 g of 2,2-bis(4-hydroxyphenyl)propane was ground together with 130 g of a 5.4 wt % poly(vinyl alcohol) aqueous solution in a sand grinder (mfd. by AIMEX CO., LTD.; vessel capacity 400 ml) at a number of revolution of 2,000 rpm for 3 hours to be dispersed, whereby a dispersion was obtained.

Then, a heat-sensitive recording material was produced in the same manner as in Example 1 except for using the dispersion of the compound obtained in Example 21, in place of the dispersion, of the compound obtained in Example 1, and adding the 2,2-bis(4-hydroxyphenyl)propane dispersion to the coating liquid in a proportion of 10 parts by weight in terms of dry solids, and this recording material was evaluated. The results obtained are summarized in Table 1.

EXAMPLE 22

To 30 g of 2,4-toluene diisocyanate was added 30 g of toluene as a solvent, followed by adding thereto 3.24 g of phenol, and the reaction was carried out at 100° C. for 1 hour and 30 minutes. After completion of the reaction, the toluene was removed by concentration and hexane was added to the residue, and the white solid precipitated was recovered by filtration, washed with hexane and then dried overnight in a vacuum to obtain 6.9 g of a compound as white crystals. Subsequently, 100 g of toluene was added as a solvent to 5.0 g of the obtained compound, followed by adding thereto 3.58 g of p-chloroaniline, and the reaction was carried out at 25° C. for 6 hours. The crystals precipitated were recovered by filtration, washed with hexane and then dried overnight in a vacuum to obtain 7.0 g of a compound as whitish-purple crystals. Analytical values of the whitish-purple crystals were as follows.

Result of IR Measurement:
Characteristic peaks appeared at 870 $cm^{-1}$, 1030 $cm^{-1}$, 1390 $cm^{-1}$, 1540 $cm^{-1}$, 1720 $cm^{-1}$ and 3350 $cm^{-1}$.

The structural formula of the major component of this compound is presumed to be the structural formula of the above-mentioned compound (E-11).

Next, 2 g of this compound was ground together with 8 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and using Crystal Violet lactone in place of 3-dibutylamino-6-methyl-7-anilinofluoran, and was evaluated. The results obtained are summarized in Table 1.

EXAMPLE 23

To 10 g of diphenylmethane-4,4'-diisocyanate was added 120 g of methyl ethyl ketone as a solvent, followed by adding dropwise thereto a dilution of 3.72 g Of aniline with 15 g of methyl ethyl ketone, and the reaction was carried out at 25° C. for 3 hours. After completion of the reaction, the white solid precipitated was recovered by filtration, washed with hexane and then dried overnight in a vacuum to obtain 11.8 g of a compound as white crystals. Subsequently, 80 g of methyl ethyl ketone was added as a solvent to 5 g of the obtained compound, followed by adding thereto a dilution of 2.06 g of phenol with 15 g of methyl ethyl ketone, and the reaction was carried out at 70° C. for 8 hours. Thereafter, the reaction solution was concentrated and then cooled, and the crystals precipitated were recovered by filtration and dried overnight in a vacuum to obtain 2.7 g of a compound as white crystals.

Analytical values of these white crystals were as follows.

Result of IR Measurement:
Characteristic peaks appeared at 890 $cm^{-1}$, 1030 $cm^{-1}$, 1420 $cm^{-1}$, 1720 $cm^{-1}$ and 3300 $cm^{-1}$.

The structural formula of the major component of this compound is presumed to be the structural formula of the above-mentioned compound (E-15).

Next, 2 g of this compound was ground together with 8 g of a 2.5 wt % poly(vinyl alcohol) aqueous solution in a paint shaker for 45 minutes to be dispersed, whereby a dispersion was obtained.

Separately, 70 g of 4-hydroxy-4'-isopropoxydiphenyl sulfone was ground together with 130 g of a 5.4 wt % poly(vinyl alcohol) aqueous solution in a sand grinder (mfd. by AIMEX CO., LTD.; vessel capacity 400 ml) at a number of revolution of 2,000 rpm for 3 hours to be dispersed, whereby a dispersion was obtained.

Then, a heat-sensitive recording material was produced in the same manner as in Example 1 except for using the dispersion of the compound obtained in Example 23, in place of the dispersion of the compound obtained in Example 1, and adding the 4-hydroxy-4'-isopropoxydiphenyl sulfone dispersion to the coating liquid in a proportion of 10 parts by weight in terms of dry solids, and this recording material was evaluated. The results obtained are summarized in Table 1.

EXAMPLE 24

To 30 g of 2,4-toluene diisocyanate was added 30 g of toluene as a solvent, followed by adding thereto 3.24 g of phenol, and the reaction was carried out at 100° C. for 1 hour and 30 minutes. After completion of the reaction, the toluene was removed by concentration and hexane was added to the residue, and the white solid precipitated was recovered by filtration, washed with hexane and then dried overnight in a vacuum to obtain 6.9 g of a compound as white crystals. Subsequently, 30 g of toluene was added as a solvent to 2.0 g of the obtained compound, followed by adding thereto 0.41 g of p-phenylenediamine, and the reaction was carried out at 50° C. for 10 hours. The crystals precipitated were recovered by filtration, washed with hexane and then dried overnight in a vacuum to obtain 2.3 g of a compound as white crystals. Analytical values of these white crystals were as follows.

Result of IR Measurement:

Characteristic peaks appeared at 840 $cm^{-1}$, 1000 $cm^1$, 1200 $cm^{-1}$, 1640 $cm^{-1}$, 1720 $cm^{-1}$ and 3300 $cm^{-1}$.

The structural formula of the major component of this compound is presumed to be the structural formula of the above-mentioned compound (E-28).

Next, 2 g of this compound was ground together with 8 g of a 2.5 wt % poly(vinyl alcohol) aqueous solution in a paint shaker for 45 minutes to be dispersed, whereby a dispersion was obtained.

Separately, 70 g of bis(4-hydroxyphenyl) sulfone was ground together with 130 g of a 5.4 wt % poly(vinyl alcohol) aqueous solution in a sand grinder (mfd. by AIMEX CO., LTD.; vessel capacity 400 ml) at a number of revolution of 2,000 rpm for 3 hours to be dispersed, whereby a dispersion was obtained.

Then, a heat-sensitive recording material was produced in the same manner as in Example 1 except for using the dispersion of the compound obtained in Example 24, in place of the dispersion of the compound obtained in Example 1, and adding the bis(4-hydroxyphenyl)sulfone dispersion to the coating liquid in a proportion of 10 parts by weight in terms of dry solids, and this recording material was evaluated. The results obtained are summarized in Table 1.

EXAMPLE 25

To 30 g of 2,4-toluene diisocyanate was added 30 g of toluene as a solvent, followed by adding thereto 3.24 g of phenol, and the reaction was carried out at 100° C. for 1 hour and 30 minutes. After completion of the reaction, the toluene was removed by concentration and hexane was added to the residue, and the white solid precipitated was recovered by filtration, washed with hexane and then dried overnight in a vacuum to obtain 6.9 g of a compound as white crystals. Subsequently, 30 g of toluene was added as a solvent to 2.0 g of the obtained compound, followed by adding thereto 0.90 g of o-dianisidine, and the reaction was carried out at 50° C. for 6 hours. The crystals precipitated were recovered by filtration, washed with hexane and then dried overnight in a vacuum to obtain 2.6 g of a compound as white crystals. Analytical values of these white crystals were as follows.

Result of IR Measurement:

Characteristic peaks appeared at 820 $cm^{-1}$, 1000 $cm^{-1}$, 1030 $cm^{-1}$, 1320 $cm^{-1}$, 1590 $cm^{-1}$, 1710 $cm^{-1}$ and 3300 $cm^{-1}$.

The structural formula of the major component of this compound is presumed to be the structural formula of the above-mentioned compound (E-29).

Next, 2 g of this compound was ground together with 8 g of a 2.5 wt % polyvinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

EXAMPLE 26

To 30 g of 2,4-toluene diisocyanate was added 30 g of toluene as a solvent, followed by adding thereto 3.24 g of phenol, and the reaction was carried out at 100° C. for 1 hour and 30 minutes. After completion of the reaction, the toluene was removed by concentration and hexane was added to the residue, and the white solid precipitated was recovered by filtration, washed with hexane and then dried overnight in a vacuum to obtain 6.9 g of a compound as white crystals. Subsequently, 30 g of dimethylformamide was added as a solvent to 2.7 g of the obtained compound, followed by adding thereto 1.2 g of 4,4-diaminobenzanilide and then 3 mg of dibutyltin dilaurate, and the reaction was carried out at 25° C. for 24 hours. Methanol was poured into the reaction solution, and the crystals precipitated were recovered by filtration, washed and then dried overnight in a vacuum to obtain 2.3 g of a compound as white crystals.

The structural formula of the major component of this compound is presumed to be the structural formula of the above-mentioned compound (E-26).

Next, 2 g of this compound was ground together with 8 g of a 2.5 wt % polyvinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

EXAMPLE 27

To 40 g of 2,4-toluene diisocyanate was added 100 g of toluene as a solvent, followed by adding dropwise thereto a dilution of 4.28 g of aniline with 40 g of toluene, and the reaction was carried out at 5° C. for 1 hour. After completion of the reaction, the white solid precipitated was recovered by filtration, washed with hexane and then dried overnight in a vacuum to obtain 12.2 g of a compound as white crystals. Subsequently, 60 g of methyl ethyl ketone as a solvent and then a small amount of dibutyltin dilaurate were added to 3 g of the obtained compound. Thereafter, a dilution of 1.4 g of 4,4'-dihydroxydiphenyl sulfone (bisphenol S) with 10 g of methyl ethyl ketone was added dropwise thereto at 90° C., and the reaction was carried out for 16 hours. After completion of the reaction, the resulting crystals were recovered by filtration, washed with methyl ethyl ketone and then dried overnight in a vacuum to obtain 2.1 g of a compound as white crystals.

The structural formula of the major component of this compound is presumed to be the structural formula of the above-mentioned compound (E-33).

Next, 2 g of this compound was ground together with 8 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

EXAMPLE 28

To 40 g of 2,4-toluene diisocyanate was added 100 g of toluene as a solvent, followed by adding dropwise thereto a dilution of 4.28 g of aniline with 40 g of toluene, and the reaction was carried out at 5° C. for 1 hour. After completion of the reaction the white solid precipitated was recovered by filtration, washed with hexane and then dried overnight in a vacuum to obtain 12.2 g of a compound as white crystals.

Subsequently, 40 g of methyl ethyl ketone as a solvent and then 5 mg of dibutyltin laurate were added to 5 g of the obtained compound. A dilution of 2.64 g of p-chlorophenol with 10 g of methyl ethyl ketone was added thereto, and the reaction was carried out at 90° C. for 5 hours. Thereafter, the reaction solution was poured into hexane, and the crystals precipitated were recovered by filtration and dried overnight in a vacuum to obtain 1.1 g of a compound as white crystals.

The structural formula of the major component of this compound is presumed to be the structural formula of the above-mentioned compound (E-5).

Next, 1 g of this compound was ground together with 4 g of a 2.5 wt % poly(vinyl alcohol) aqueous solution in a paint shaker for 45 minutes to be dispersed, whereby a dispersion was obtained.

Then, 2 g of 1,3-bis(3-isocyanato-4-methylphenyl)urea was ground together with 8 g of a 2.5 wt % poly(vinyl alcohol) aqueous solution in a paint shaker for 45 minutes to be dispersed, whereby a dispersion was obtained.

Subsequently, a heat-sensitive recording material was produced in the same manner as in Example 1 except for using the dispersion of the compound obtained in Example 28, in place of the dispersion of the compound obtained in Example 1, and adding the 1,3-bis(3-isocyanato-4-methylphenyl)urea dispersion to the coating liquid in a proportion of 10 parts by weight in terms of dry solids, and this recording material was evaluated. The results obtained are summarized in Table 1.

EXAMPLE 29

To 40 g of 2,4-toluene diisocyanate was added 100 g of toluene as a solvent, followed by adding dropwise thereto a dilution of 6.21 g of p-aminoacetophenone with a mixture of 30 g of toluene and 30 g of methyl ethyl ketone, and the reaction was carried out at 25° C. for 20 hours. After completion of the reaction, the white solid precipitated was recovered by filtration, washed with hexane and then dried overnight in a vacuum to obtain 13.0 g of a compound as white crystals.

Subsequently, 65 g of methyl ethyl ketone as a solvent and then 5 mg of dibutyltin laurate were added to 5 g of the obtained compound. A dilution of 2.28 g of phenol with 15 g of methyl ethyl ketone was added thereto, and the reaction was carried out at 90° C. for 4 hours. Thereafter, the reaction solution was concentrated and then cooled at 5° C. for 1 day, after which the crystals precipitated were recovered by filtration and dried overnight in a vacuum to obtain 1.0 g of a compound as white crystals.

The structural formula of the major component of this compound is presumed to be the structural formula of the above-mentioned compound (E-7).

Next, 1 g of this compound was ground together with 4 g of a 2.5 wt % poly(vinyl alcohol) aqueous solution in a paint shaker for 45 minutes to be dispersed, whereby a dispersion was obtained.

Separately, 70 g of an imino compound 1,3-diimino-4,5,6, 7-tetrachloroisoindoline was ground together with 130 g of a 5.4 wt % poly(vinyl alcohol) aqueous solution in a sand grinder (mfd. by AIMEX CO., LTD.; vessel capacity 400 ml) at a number of revolution of 2,000 rpm for 3 hours to be dispersed, whereby a dispersion was obtained.

Separately, 70 g of an isocyanate compound 4,4',4"-triisocyanato-2,5-dimethoxytriphenylamine was ground together with 130 g of a 5.4 wt % poly(vinyl alcohol) aqueous solution in a sand grinder (mfd. by AIMEX CO., LTD.; vessel capacity 400 ml) at a number of revolution of 1,000 rpm for 1 hour to be dispersed, whereby a dispersion was obtained.

Separately, 70 g of 3,3'-diaminodiphenyl sulfone was ground together with 130 g of a 5.4 wt % poly(vinyl alcohol) aqueous solution in a sand grinder (mfd. by AIMEX CO., LTD.; vessel capacity 400 ml) at a number of revolution of 2,000 rpm for 3 hours to be dispersed, whereby a dispersion was obtained.

Then, a heat-sensitive recording material was produced in the same manner as in Example 1 except for using the dispersion of the compound obtained in Example 29, in place of the dispersion of the compound obtained in Example 1, and adding to the coating liquid the 1,3-diimino-4,5,6,7-tetrachloroisoindoline dispersion in a proportion of 8 parts by weight in terms of dry solids, the 4,4',4"-triisocyanato-2,5-dimethoxytripheylamine dispersion in a proportion of 5.3 parts by weight in terms of dry solids, and the 3,3'-diaminodiphenyl sulfone dispersion in a proportion of 5.3 parts by weight in terms of dry solids, and this recording material was evaluated. The results obtained are summarized in Table 1.

EXAMPLE 30

To 30 g of 2,4-toluene diisocyanate was added 30 g of toluene as a solvent, followed by adding thereto 3.24 g of phenol, and the reaction was carried out at 100° C. for 1 hour and 30 minutes. After completion of the reaction, the toluene was removed by concentration and hexane was added to the residue, and the white solid precipitated was recovered by filtration, washed with hexane and then dried overnight in a vacuum to obtain 6.9 g of a compound as white crystals. Subsequently, 30 g of toluene was added as a solvent to 2.0 g of the obtained compound, followed by adding thereto 0.75 g of 4,4'-diaminodiphenyl ether, and the reaction was carried out at 50° C. for 16 hours. The crystals precipitated were recovered by filtration, washed with hexane and then dried overnight in a vacuum to obtain 2.4 g of a compound as white crystals.

The structural formula of the major component of this compound is presumed to be the structural formula of the above-mentioned compound (E-25).

Next, 2 g of this compound was ground together with 8 g of a 2.5 wt % polyvinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

EXAMPLE 31

To 30 g of 2,4-toluene diisocyanate was added 30 g of toluene as a solvent, followed by adding thereto 3.24 g of phenol, and the reaction was carried out at 100° C. for 1 hour and 30 minutes. After completion of the reaction, the toluene was removed by concentration and hexane was added to the residue, and the white solid precipitated was recovered by filtration, washed with hexane and then dried overnight in a vacuum to obtain 6.9 g of a compound as white crystals. Subsequently, 30 g of toluene was added as a solvent to 2.0 g of the obtained compound, followed by adding thereto 0.74 g of 4,4'-diaminodiphenylmethane and 10 g of methyl ethyl ketone, and the reaction was carried out at 50° C. for 10 hours. The crystals precipitated were recovered by filtration, washed with hexane and then dried overnight in a vacuum to obtain 2.1 g of a compound as white crystals.

The structural formula of the major component of this compound is presumed to be the structural formula of the above-mentioned compound (E-27).

Next, 2 g of this compound was ground together with 8 g of a 2.5 wt % polyvinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

EXAMPLE 32

To 30 g of 2,4-toluene diisocyanate was added 30 g of toluene as a solvent, followed by adding thereto 3.24 g of phenol, and the reaction was carried out at 100° C. for 1 hour and 30 minutes. After completion of the reaction, the toluene was removed by concentration and hexane was added to the residue, and the white solid precipitated was recovered by filtration, washed with hexane and then dried overnight in a vacuum to obtain 6.9 g of a compound as white crystals. Subsequently, 30 g of toluene was added as a solvent to 1.5 g of the obtained compound, followed by adding thereto 0.3 g of ethylamine, and the reaction was carried out at 50° C. for 6 hours. The crystals precipitated were recovered by filtration, washed with hexane and then dried overnight in a vacuum to obtain 1.8 g of a compound as white crystals.

The structural formula of the major component of this compound is presumed to be the structural formula of the above-mentioned compound (E-44).

Next, 1 g of this compound was ground together with 4 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

EXAMPLE 33

While stirring 150 g of 2,4-toluene diisocyanate at 50° C. a solution of 17.2 g of 4,4'-diaminodiphenylmethane in 120 ml of methyl ethyl ketone was added dropwise thereto over a period of 4 hours, and the reaction was continued at 50° C. for another 2 hours. After completion of the reaction, the reaction solution was cooled to room temperature and then toluene was added thereto, and the white solid precipitated was recovered by filtration, washed with toluene and then dried overnight in a vacuum to obtain 43 g of a compound as white crystals. Subsequently, 51.5 g of phenol and 100 ml of methyl ethyl ketone were added to 30 g of the obtained compound, followed by adding thereto 30 mg of triethylamine, and the reaction was carried out at 50° C. for 20 hours. After completion of the reaction, toluene was added to the reaction solution and the crystals precipitated were recovered by filtration, washed with toluene and then dried overnight in a vacuum to obtain 38.5 g of a compound as white crystals.

The structural formula of the major component of this compound is presumed to be the structural formula of the above-mentioned compound (E-27).

Next, 2 g of this compound was ground together with 8 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

EXAMPLE 34

While stirring 31.5 g of 2,4-toluene diisocyanate at 60° C., a solution of 21.5 g of 4,4'-diaminodiphenyl sulfone in 120 ml of methyl ethyl ketone was added dropwise thereto over a period of 6 hours. Uninterruptedly, the reaction solution was cooled to 25° C., followed by adding thereto 17.1 g of phenol and then 30 mg of triethylamine, and the reaction was carried out at 25° C. for 4 hours. After completion of the reaction, the methyl ethyl ketone was distilled off and the solid thus obtained was ground and then dried overnight in a vacuum to obtain 70 g of a compound as light-yellow powder.

The structural formula of the major component of this compound is presumed to be the structural formula of the above-mentioned compound (E-24).

Next, 2 g of this compound was ground together with 8 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

COMPARATIVE EXAMPLE 1

A heat-sensitive recording material was produced in the same manner as in Example 1 except for using 2,2-bis(4- hydroxyphenyl)propane in place of the urea-urethane compound synthesized in Example 1, and was evaluated. The results obtained are summarized in Table 1.

COMPARATIVE EXAMPLE 2

To 10 g of 2,4-toluene diisocyanate was added 50 g of toluene as a solvent, followed by adding thereto 30 g of aniline, and the reaction was carried out at 25° C. for 3 hours. After completion of the reaction, the white solid precipitated was recovered by filtration, washed with hexane and then dried overnight in a vacuum to obtain 17 g of a compound as white crystals.

The presumed structural formula of the major component of this compound is the structural formula of the compound (C-1) shown below.

Next, 2 g of this compound was ground together with 8 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

COMPARATIVE EXAMPLE 3

To 10 g of 2,4-toluene diisocyanate was added 30 g of toluene as a solvent, followed by adding thereto 30 g of phenol, and the reaction was carried out at 100° C. for 3 hours. After completion of the reaction, the toluene was removed by concentration and hexane was added to the residue, and the white solid precipitated was recovered by filtration, washed with hexane and then dried overnight in a vacuum to obtain 15 g of a compound as white crystals.

The presumed structural formula of the major component of this compound is the structural formula of the compound (C-2) shown below.

Next, 2 g of this compound was ground together with 8 g of a 2.5 wt % poly(vinyl alcohol) aqueous solution in a paint shaker for 45 minutes to be dispersed, whereby a dispersion was obtained.

Then, a heat-sensitive recording material was produced in the same manner as in Example 1 except for using this dispersion of said compound in place of the dispersion of the compound obtained in Example 1, and was evaluated. The results obtained are summarized in Table 1.

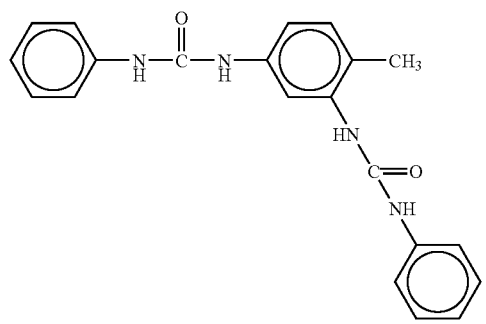

(C-1)

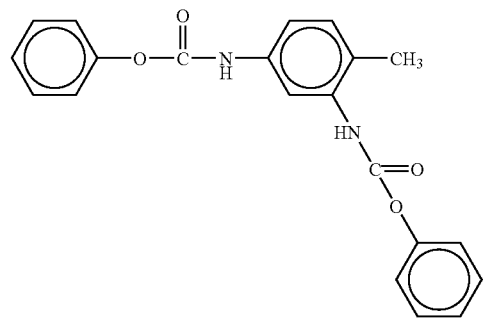

(C-2)

COMPARATIVE EXAMPLE 4

A heat-sensitive recording material was produced in the same manner as in Example 1 except for using 1,3-diphenylurea in place of the urea-urethane compound synthesized in Example 1, and was evaluated. The results obtained are summarized in Table 1.

1. Sensitivity becomes higher with an increase of optical density (OD value).
2. Plasticizer resistance (print preservability)
    ⊚~Substantially no fading.
    ○~A slight color tone change without blur and the like.
    Δ~Marked fading.
    x~Complete loss of the color of print.
3. Heat resistance (print preservability at 60° C. and 80° C.)
    ⊚~Substantially no fading.
    ○~A slight color tone change without blur and the like.
    Δ~Marked fading.
    x~Complete loss of the color of print.
4. Heat resistance (the preservability of an original recording material surface at 80° C.)
    ⊚~Substantially no fog was caused.
    ○~Reading of a print portion was possible though there was a slight color tone change.
    Δ~Reading of a print portion was difficult owing to fog.
    x~Reading of a print portion was impossible owing to serious fog.

EXAMPLE 35

(1) Production of Upper Paper

A solution prepared by dissolving 2.5 parts by weight of 3-diethylamino-7-chlorofluoran in 80 parts by weight of NISSEKI HISOL N-296 (an oil, a trade name, mfd. by Nippon Sekiyu Kagaku K.K.) was emulsified in 100 parts by weight of a 5% aqueous solution of pH 4.0 prepared by dissolving a styrene-maleic anhydride copolymer together with a small amount of sodium hydroxide. On the other hand, when a mixture of 10 parts by weight of melamine, 25 parts by weight of a 37% aqueous formaldehyde solution and 65 parts by weight of water was adjusted to pH 9.0 with sodium hydroxide and heated at 60° C., the mixture became transparent after 15 minutes and a melamine-formaldehyde precondensate was obtained. The precondensate was added to the emulsion obtained above, and the resulting mixture was continuously stirred for 4 hours while maintaining the mixture at 60° C., and then was cooled to room temperature. The solid content of the resulting microcapsule dispersion was 45%.

The thus obtained microcapsule dispersion was applied on paper and dried to obtain upper paper.

(2) Production of Under Paper

At ordinary temperature, 15 g of a compound (the presumed structural formula of the major component of this compound is the structural formula of the above-mentioned compound (E-22)) synthesized in the same manner as in Example 4 was ground together with 45 g of a 2 wt % poly (vinyl alcohol) aqueous solution in a paint shaker for 45 minutes to be dispersed, whereby a dispersion was obtained.

Separately, 60 g of calcium carbonate was mixed with 90 g of water and dispersed with a stirrer to obtain a dispersion.

A coating liquid was prepared by mixing and stirring 40 parts by weight of the dispersion of the aforesaid synthesized compound, 125 parts by weight of the calcium carbonate dispersion and 120 parts by weight of a 10 wt % poly(vinyl alcohol) aqueous solution.

The coating liquid was applied on base paper with a basis weight of 40 g/m$^2$ by the use of a bar coater of rod number 10 to obtain under paper The result of color density evaluation was so good that the optical density was 0.7.

The result of evaluating the solvent resistance by the use of hand cream was so good that reading of a print portion was possible. The results are summarized in Table 2.

COMPARATIVE EXAMPLE 5

A pressure-sensitive recording material was produced in the same manner as in Example 35 except for using activated clay as developer in place of the urea-urethane compound, and was evaluated. The results are summarized in Table 2.
1. Coloring density becomes higher with an increase of optical density (OD value).
2. Solvent resistance (hand cream)
   ⊚~Substantially no fading.
   ○~A slight color tone change without blur and the like.
   Δ~Marked fading.
   x~Complete loss of the color of print.

EXAMPLE 36

To 27.8 g of 2,4-toluene diisocyanate was added 111 g of toluene as a solvent, followed by adding dropwise thereto a solution of 7.4 g of aniline in 37 g of toluene at room temperature over a period of 1 hour, and the reaction was carried out for another 1 hour. The white solid precipitated was recovered by filtration, washed with hexane and then dried overnight in a vacuum to obtain 20 g of white crystals. Subsequently, 5 g of the thus obtained compound was added to 50 mL of methanol, and the reaction was carried out at 60° C. for 30 minutes, after which the excess methanol was removed by the use of an evaporator, and toluene was added to the residue to effect crystallization. The resulting white crystals were recovered by filtration, washed with hexane and then dried overnight in a vacuum to obtain 5.4 g of white crystals. The melting point of these white crystals was 196° C.

Analytical values of these white crystals were as follows.

Result of IR Measurement:

Characteristic peaks appeared at 1060 cm$^{-1}$, 1250 cm$^{-1}$, 1600 cm$^{-1}$, 1650 cm$^{-1}$, 1670 cm$^{-1}$, 1700 cm$^{-1}$ and 3300 cm$^{-1}$.

The structural formula of the major component of this compound is presumed to be the structural formula of the above-mentioned compound (S-1).

Next, a dispersion was prepared by dispersing 2 g of this compound by grinding the compound together with 8 g of a 2.5 wt % aqueous solution of a polyvinyl alcohol) (Goseran L-3266, a trade name, mfd. by The Nippon Synthetic Chemical Industry Co., Ltd.) in a paint shaker for 6 hours. The temperature of the dispersion immediately after the dispersing operation was 25° C. The diameter of dispersed particles of the compound was about 0.6 µm.

Another dispersion was prepared by dispersing 70 g of 3-dibutylamino-6-methyl-7-anilinofluoran by grinding it together with 130 g of a 8 wt % poly(vinyl alcohol) aqueous solution in a sand grinder (mfd. by AIMEX CO., LTD.; vessel capacity 400 ml) at a number of revolution of 2,000 rpm for 3 hours.

A still another dispersion was prepared by dispersing 70 g of diphenyl sulfone by grinding it together with 130 g of a 5.4 wt % poly(vinyl alcohol) aqueous solution in a sand grinder (mfd. by AIMEX CO., LTD.; vessel capacity 400 ml) at a number of revolution of 2,000 rpm for 3 hours.

Separately, 10 g of calcium carbonate was mixed with 30 g of water and dispersed by stirring by the use of a stirrer to obtain a dispersion.

A coating liquid was obtained by stirring and mixing the above-mentioned dispersions and other components in the following proportions (dry basis); the dispersion of the above-mentioned compound in terms of dry solids: 30 parts by weight, the 3-dibutylamino-6-methyl-7-anilinofluoran dispersion in terms of dry solids: 15 parts by weight, the diphenyl sulfone dispersion in terms of dry solids: 30 parts by weight, the calcium carbonate dispersion in terms of dry solids: 20 parts by weight, a zinc stearate dispersion (solid content: 16 wt %) in terms of dry solids: 10 parts by weight, and a 15 wt % poly(vinyl alcohol) in terms of dry solids: 7 parts by weight.

The coating liquid was applied on base paper with a basis weight of 50 g/m$^2$ by the use of a bar coater of rod number 10. After drying, supercalendering was conducted to obtain a heat-sensitive recording material. The coating amount of the coating liquid was 4 g/m$^2$ in terms of dry weight.

The result of evaluating the sensitivity of the heat-sensitive recording material obtained was so good that the optical density was 1.2. The result of estimating the degree of a thermal color change of the original recording material surface (the heat resistance) was so good that the color change was slight.

The thermal fading of a printed portion was desirably slight. These evaluation results are summarized in Table 3.

EXAMPLE 37

To 17 g of 2,4-toluene diisocyanate was added 40 g of methyl ethyl ketone as a solvent, followed by adding dropwise thereto 3.8 g of methanol, and the reaction was carried out with stirring at 60° C. for 5 hours. Then, 9.9 g of 4,4'-diaminodiphenyl sulfone was added thereto, and the reaction was carried out with stirring at 60° C. for 4 hours. After completion of the reaction, the reaction solution was cooled to room temperature and poured into 800 g of acetonitrile, and the crystals precipitated were recovered by filtration, washed with hexane and then dried overnight in a vacuum to obtain 15 g of a compound as white crystals.

The melting point of the white crystals was 169° C., and their analytical values were as follows.

Result of IR Measurement:

Characteristic peaks appeared at 1220 cm$^{-1}$, 1550 cm$^{-1}$, 1590 cm$^{-1}$, 1660 cm$^{-1}$, 1740 cm$^{-1}$ and 3300 cm$^{-1}$.

Result of Mass Spectrum Measurement:

[M+H]$^+$ was detected at m/z 661.

The structural formula of the major component of this compound is presumed to be the structural formula of the above-mentioned compound (S-13).

Then, a heat-sensitive recording material was produced in the same manner as in Example 36 except for using the compound obtained above, in place of the urea-urethane compound synthesized in Example 36, and was evaluated. The results are summarized in Table 3.

EXAMPLE 38

In 100 mL of methyl acetate was dissolved 3.46 g of aniline, and the resulting solution was stirred at room temperature. A solution of 10 g of trimethylolpropane adduct of toluene diisocyanate (Coronate L, a trade name, mfd. by Nippon Polyurethane Industry Co., Ltd.; a 75% ethyl acetate solution) in 50 mL of ethyl acetate was added dropwise thereto over a period of 1 hour, and the reaction was carried out for another 1 hour. The crystals formed were recovered by filtration and dried overnight in a vacuum to obtain 5.1 g of a compound as white crystals. The melting point of the white crystals was 161° C., and their analytical values were as follows.

Result of IR Measurement:

Characteristic peaks appeared at 1070 cm$^{-1}$, 1220 cm$^{-1}$, 1550 cm$^{-1}$, 1600 cm$^{-1}$, 1700 cm$^{-1}$ and 3300 cm$^{-1}$.

The structural formula of the major component of this compound is presumed to be the structural formula of the above-mentioned compound (S-33).

Then, a heat-sensitive recording material was produced in the same manner as in Example 36 except for using the compound obtained above, in place of the urea-urethane compound synthesized in Example 36, and was evaluated. The results are summarized in Table 3.

EXAMPLE 38-1

To 10.4 g of 2,4-toluene diisocyanate was added 20 g of methyl ethyl ketone as a solvent, followed by adding dropwise thereto a solution of 3.7 g of 4,4-diaminodiphenylsulfone in 30 g of methyl ethyl ketone, and the reaction was carried out at room temperature for 20 hours, after which methyl ethyl ketone was removed by evaporation, and toluene was added to the residue. The white solid precipitated was recovered by filtration, washed with hexane and then dried overnight in a vacuum to obtain 8.8 g of white crystals. Subsequently, 4 g of the thus obtained compound was added to 15 g of phenol and a small amount of dibutyl tin dilaurate. The reaction was then carried out at 50° C. for 4 hours, after which toluene was added to the residue to effect crystallization. The resulting crystals were recovered by filtration, washed with hexane and then dried overnight in a vacuum to obtain 5.2 g of a urea-urethane compound as white crystals.

To 10 g of 2,4-toluene diisocyanate was then added 30 g of toluene as a solvent, followed by adding dropwise thereto 30 g of phenol, and the reaction was carried out at 100° C. for 3 hours, after which toluene was removed by evaporation, and hexane was added to the residue. The white solid precipitated was recovered by filtration, washed with hexane and then dried overnight in a vacuum to obtain 15 g of a urethane compound as white crystals.

The structural formula of the major component of this compound is presumed to be the structural formula of the above-mentioned compound (C-2).

Next, 3 g of the above urea-urethane compound and 2 g of the urethane compound were mixed to obtain a urea-urethane composition. Subsequently, a dispersion was prepared by dispersing 2 g of the urea-urethane composition by grinding the composition together with 8 g of a 2.5 wt % aqueous solution of methyl cellulose in a paint shaker for 45 minutes.

Then, a heat-sensitive recording material was produced in the same manner as in Example 36 except for using the dispersion of the above composition in place of the dispersion of the compound obtained in Example 36, and was evaluated. The results are summarized in Table 3.

EXAMPLE 38-2

A heat-sensitive recording material was produced in the same manner as in Example 38-1 except for using a urea-urethane composition obtained by mixing 4.5 g of the urea-urethane compound and 0.5 g of the urethane compound obtained in Example 38-1, and was evaluated. The results are summarized in Table 3.

EXAMPLE 38-3

A heat-sensitive recording material was produced and evaluated in the same manner as in Example 38-1, except that after completion of the reaction for synthesis of the urea-urethane compound in Example 38-1, 2.2 g of diphenylsulfone was added to the reaction and stirred before the precipitation with toluene, then the crystals precipitated with toluene were recovered by filtration, washed with hexane and then dried overnight in a vacuum to obtain 7.4 g of a urea-urethane composition as white crystals. The results are summarized in Table 3.

EXAMPLE 39

To 31.5 g of 2,4-toluene diisocyanate was added dropwise a solution of 21.5 g of 4,4'-diaminodiphenyl sulfone in 60 mL of MEK at 70° C. with stirring at 300 to 500 rpm over a period of 4 hours, and the reaction was carried out for another 4 hours to obtain a white viscous slurry reaction mixture. Then, the reaction mixture was cooled to 50° C., and 17.1 g of phenol was poured into the reaction mixture to be dissolved therein, after which 0.015 g of triethylamine was added thereto as a catalyst, and the reaction was carried out for 4 hours to obtain a yellow, transparent and viscous reaction mixture. This reaction mixture was freed of the solvent and concentrated under reduced pressure to be solidified, after which the resulting solid was ground and then dried overnight in a vacuum to obtain about 70 g of a urea-urethane composition as light-yellow powder.

The melting point of the light-yellow powder was 160-180° C. In IR measurement for the powder, a wide peak formed by overlapping of characteristic peaks due to a urea group and a urethane group, respectively, appeared at 1700 cm$^{-1}$. The content of the urea-urethane main constituent in the urea-urethane composition was 68% as measured by liquid chromatography.

Then, a heat-sensitive recording material was produced in the same manner as in Example 36 except for using the above-mentioned composition in place of the urea-urethane compound synthesized in Example 36, and was evaluated. The results are summarized in Table 3.

EXAMPLE 40

To 158.5 g of 2,4-toluene diisocyanate was added 240 g of methyl ethyl ketone as a solvent, and 107.5 g of 4,4'-diaminodiphenyl sulfone was added thereto in the form of powder at 30° C. with stirring at 400 rpm over a period of 8 hours. After 1 hour, 26 g of methyl ethyl ketone was added thereto and stirred for another 15 hours to obtain a white viscous slurry reaction mixture. Then, a solution of 89.5 g of phenol in 15.8 g of methyl ethyl ketone was poured into the reaction mixture to be dissolved therein, after which 9.3 g of a 1 wt % solution of triethylamine in methyl ethyl ketone was added thereto as a catalyst over a period of 2 hours, and the reaction was uninterruptedly carried out for 1 hour. Thereafter, the reaction mixture was cooled to 20° C. and continuously stirred for 3 hours to obtain a slurry containing slightly yellow crystals precipitated therein. The slurry was freed of the solvent and concentrated under reduced pressure to be solidified, after which the resulting solid was ground and then dried overnight in a vacuum to obtain 355 g of a urea-urethane composition as slightly yellow powder.

The melting point of the slightly yellow powder was 130-170° C. In IR measurement for the powder, a wide peak formed by overlapping of characteristic peaks due to a urea group and a urethane group, respectively, appeared at 1700 $cm^{-1}$. The content of the urea-urethane main constituent in the urea-urethane composition was 65% as measured by liquid chromatography.

Then, a heat-sensitive recording material was produced in the same manner as in Example 36 except for using the above-mentioned composition in place of the urea-urethane compound synthesized in Example 36, and was evaluated. The results obtained are summarized in Table 3.

EXAMPLE 41

To 27.8 g of 2,4-toluene diisocyanate was added 100 g of toluene as a solvent, followed by adding dropwise thereto a solution of 7.4 g of aniline in 37 g of toluene at room temperature over a period of 1 hour, and the reaction was carried out for another 1 hour. The white solid precipitated was recovered by filtration, washed with hexane and then dried overnight in a vacuum to obtain 20 g of white crystals. Subsequently, 5 g of the thus obtained compound was added to 50 mL of methanol, and the reaction was carried out at 60° C. for 30 minutes, after which the excess methanol was removed by the use of an evaporator, and the residue was dried overnight in a vacuum to obtain 5.4 g of a urea-urethane composition as white crystals. The melting point of the white crystals was 196° C. In IR measurement for the crystals, characteristic peaks due to a urea-urethane compound appeared at 1670 $cm^{-1}$ and 1700 $cm^{-1}$. The content of the urea-urethane main constituent in the urea-urethane composition was 92% as measured by liquid chromatography.

Then, a heat-sensitive recording material was produced in the same manner as in Example 36 except for using the above-mentioned composition in place of the urea-urethane compound synthesized in Example 36, and was evaluated. The results are summarized in Table 3.

EXAMPLE 42

To 17 g of 2,4-toluene diisocyanate was added 40 g of methyl ethyl ketone as a solvent, followed by adding dropwise thereto 3.8 g of methanol, and the reaction was carried out with stirring at 60° C. for 5 hours. Then, 9.9 g of 4,4'-diaminodiphenyl sulfone was added thereto, and the reaction was carried out with stirring at 60° C. for 4 hours. After completion of the reaction, the methyl ethyl ketone as solvent was removed by the use of an evaporator, and the residue was dried overnight in a vacuum to obtain 16 g of a urea-urethane composition as white crystals. The melting point of the white crystals was 169° C. In IR analysis on the crystals, characteristic peaks due to a urea-urethane compound appeared at 1660 $cm^{-1}$ and 1740 $cm^{-1}$. The content of the urea-urethane main constituent in the urea-urethane composition was 52% as measured by liquid chromatography.

Then, a heat-sensitive recording material was produced in the same manner as in Example 36 except for using the above-mentioned composition in place of the urea-urethane compound synthesized in Example 36, and was evaluated. The results are summarized in Table 3.

EXAMPLE 43

In 253 mL of toluene was dissolved 27.5 g of 2,4-toluene diisocyanate, followed by adding dropwise thereto a solution of 14.7 g of aniline in 85 mL of toluene at 40° C. with stirring at 200 rpm over a period of 30 minutes, and the reaction was carried out for another 30 minutes. To the thus obtained white slurry were added 18.0 g of 2,2-bis(4-hydroxyphenyl)propane, 262 mL of toluene and 0.42 mg of triethylamine as catalyst, and the stirring rate was increased to 400 rpm. In order to prevent the aggregation of particles in the slurry in the initial reaction by controlling the reaction rate, the reaction was carried out as follows while raising the reaction temperature stepwise: 60° C. for 5 h, 65° C. for 2 h, 70° C. for 1 h, and 75° C. for 1 h. Then, 0.42 mg of triethylamine was added, and the reaction was carried out at 80° C. for another 8 h. The reaction mixture was cooled to room temperature and the white crystals were recovered by filtration. The white crystals were dried overnight in a vacuum to obtain 59 g of a urea-urethane composition as white crystals. The melting point of these white crystals was 170° C. In IR analysis on the crystals, a wide characteristic peak due to urea-urethane appeared at 1720 $cm^{-1}$. The content of the urea-urethane main constituent in the urea-urethane composition was 81% as measured by liquid chromatography.

Then, a heat-sensitive recording material was produced in the same manner as in Example 36 except for using the above-mentioned composition in place of the urea-urethane compound synthesized in Example 36, and was evaluated. The results are summarized in Table 3.

EXAMPLES 44 TO 55

Heat-sensitive recording materials were produced in the same manner as in Example 40 except for using 4,4'-dichlorodiphenyl sulfone (Example 44), 4,4'-dihydroxydiphenyl sulfone (Example 45), 2,4'-dihydroxydiphenyl sulfone (Example 46), 4-(benzyloxy)phenol (Example 47), salicylanilide (Example 48), 4,4'-diaminodiphenyl sulfone (Example 49), 4,4'-dichlorobenzophenone (Example 50), 4,4'-diaminodiphenylmethane (Example 51), 4,4'-dimethoxybenzophenone (Example 52), diphenyl carbonate (Example 53), 4,4'-dimethoxydiphenyl sulfone (Example 54) or 4,4'-diallyloxydiphenyl sulfone (Example 55) in place of diphenyl sulfone, and the heat-sensitive recording materials were evaluated. The results are summarized in Table 3.

COMPARATIVE EXAMPLE 6

A heat-sensitive recording material was produced in the same manner as in Example 36 except for using 2,2-bis(4- hydroxyphenyl)propane in place of the urea-urethane compound synthesized in Example 36, and was evaluated. The results are summarized in Table 3.

COMPARATIVE EXAMPLE 7

To 17.4 g of 2,4-toluene diisocyanate was added 5 ml of methyl ethyl ketone as a solvent, followed by adding dropwise thereto a solution of 3.2 g of methanol in 5 mL of methyl ethyl ketone, and the reaction was carried out with stirring at room temperature for 2 hours. Then, a solution of 7.3 g of n-butylamine in 100 mL of methyl ethyl ketone was added dropwise thereto at room temperature, and the resulting solution was stirred for 1 hour. The crystals precipitated were recovered by filtration, washed with hexane and then dried overnight in a vacuum to obtain 27 g of a compound as white crystals.

The melting point of the white crystals was 156° C., and their analytical values were as follows.

Result of IR Measurement:

Characteristic peaks appeared at 1240 $cm^{-1}$, 1550 $cm^{-1}$, 1640 $cm^{-1}$, 1720 $cm^{-1}$ and 3300 $cm^{-1}$.

The presumed structural formula of the major component of this compound is the formula (R-1) shown hereinafter.

Then, a heat-sensitive recording material was produced in the same manner as in Example 36 except for using the compound obtained above, in place of the urea-urethane compound synthesized in Example 36, and was evaluated. The results are summarized in Table 3.

COMPARATIVE EXAMPLE 8

To 10.0 g of 2,4-toluene diisocyanate was added 100 mL of toluene, and the resulting mixture was stirred at 25° C. A solution of 15.5 g of stearylamine in 100 mL of toluene was added thereto, and the reaction was uninterruptedly carried out at 25° C. for 22 hours. After completion of the reaction, the white solid precipitated was recovered by filtration, washed with toluene and then dried overnight in a vacuum to obtain 20.4 g of white crystals. Subsequently, 5 g of this compound was added to 50 mL of methyl ethyl ketone and the resulting mixture was stirred at 80° C. A solution of 8.6 g of p-hydroxybenzylcarboxylic acid in 20 mL of methyl ethyl ketone and then 5 mg of dibutyltin laurate as catalyst were added thereto, and the reaction was uninterruptedly carried out at 80° C. for 12 hours. After completion of the reaction, the reaction mixture was cooled to room temperature, and the crystals precipitated were recovered by filtration, washed with methyl ethyl ketone and then dried overnight in a vacuum to obtain 5.6 g of white crystals. Analytical values of the white crystals were as follows.

Result of IR Measurement:

Characteristic peaks appeared at 1220 $cm^{-1}$, 1520 $cm^{-1}$, 1630 $cm^{-1}$, 1710 $cm^{-1}$, 2900 $cm^{-1}$ and 3300 $cm^{-1}$.

Result of Mass Spectrum Measurement:

$[M+H]^+$ was detected at m/z 596.

The presumed structural formula of the major component of this compound is the formula (R-2) shown hereinafter.

A heat-sensitive recording material was produced in the same manner as in Example 36 except for using the compound obtained above, in place of the urea-urethane compound synthesized in Example 36, and was evaluated. The results are summarized in Table 3.

COMPARATIVE EXAMPLE 9

To 100 mL of dioxane was added 3.0 g of p-aminophenol and the resulting mixture was stirred at 50° C. A solution of 5.4 g of toluenesulfonyl isocyanate in 30 ml of dioxane was added dropwise thereto over a period of 1 hour, and the reaction was uninterruptedly carried out at 50° C. for 5 hours. After completion of the reaction, the reaction mixture was concentrated and then poured into hexane to effect crystallization. The solid precipitated was recovered by filtration, washed with hexane and then dried overnight in a vacuum to obtain 4.9 g of brown crystals. Subsequently, 2 g of this compound was added to 50 mL of dioxane and the resulting mixture was stirred at 80° C. A solution of 3.8 g of octadecyl isocyanate in 10 mL of dioxane and then 2 mg of dibutyltin laurate as catalyst were added thereto, and the reaction was uninterruptedly carried out at 80° C. for 20 hours. After completion of the reaction, the reaction mixture was cooled to room temperature, and the crystals precipitated were recovered by filtration, washed with dioxane and then dried overnight in a vacuum to obtain 2.7 g of slightly pink crystals. Analytical values of the slightly pink crystals were as follows.

Result of IR Measurement:

Characteristic peaks appeared at 1230 $cm^{-1}$, 1470 $cm^{-1}$, 1510 $cm^{-1}$, 1570 $cm^{-1}$, 1620 $cm^{-1}$, 1700 $cm^{-1}$, 2900 $cm^{-1}$ and 3300 $cm^{-1}$.

The presumed structural formula of the major component of this compound is the formula (R-3) shown below.

A heat-sensitive recording material was produced in the same manner as in Example 36 except for using the compound obtained above, in place of the urea-urethane compound synthesized in Example 36, and was evaluated. The results are summarized in Table 3.

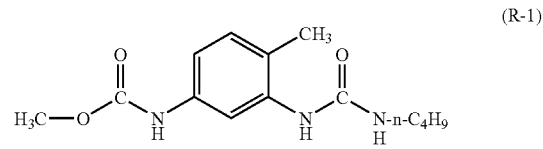

(R-1)

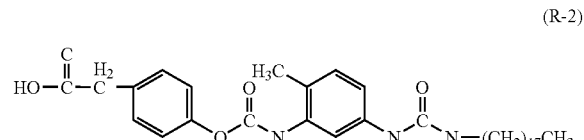

(R-2)

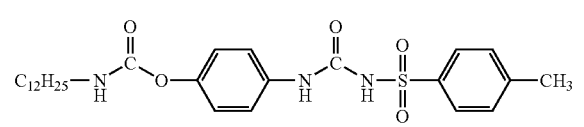

(R-3)

TABLE 3

|  | Color development sensitivity of thermal paper | Plasticizer resistance (print preservability) | Heat resistance Print preservability at 60° C. | Heat resistance Preservability of original recording material surface at 80° C. | Total evaluation |
|---|---|---|---|---|---|
| Example 36 | 1.2 | Δ | ⊚ | ○ | ○ |
| Example 37 | 1.2 | ⊚ | ⊚ | ○ | ⊚ |
| Example 38 | 1.1 | ○ | ⊚ | ○ | ○~⊚ |
| Example 38-1 | 1.2 | ○ | ⊚ | ○ | ○~⊚ |
| Example 38-2 | 1.2 | ⊚ | ⊚ | ⊚ | ⊚ |
| Example 38-3 | 1.2 | ○ | ⊚ | ○ | ○~⊚ |
| Example 39 | 1.2 | ⊚ | ⊚ | ○ | ⊚ |
| Example 40 | 1.2 | ⊚ | ⊚ | ○ | ⊚ |
| Example 41 | 1.2 | Δ | ⊚ | ○ | ○ |
| Example 42 | 1.2 | ⊚ | ⊚ | ○ | ⊚ |
| Example 43 | 1.2 | ○ | ⊚ | ○ | ○~⊚ |
| Example 44 | 1.2 | ⊚ | ⊚ | ⊚ | ⊚ |
| Example 45 | 1.2 | ○ | ⊚ | ⊚ | ○~⊚ |
| Example 46 | 1.3 | ○ | ⊚ | ○~⊚ | ○~⊚ |
| Example 47 | 1.2 | ⊚ | ⊚ | ○ | ○~⊚ |
| Example 48 | 1.2 | ⊚ | ⊚ | ⊚ | ⊚ |
| Example 49 | 1.1 | ○ | ⊚ | ⊚ | ○~⊚ |
| Example 50 | 1.2 | ⊚ | ⊚ | ○ | ○~⊚ |
| Example 51 | 1.2 | ○~⊚ | ⊚ | ○~⊚ | ○~⊚ |
| Example 52 | 1.3 | ○ | ⊚ | ⊚ | ○~⊚ |
| Example 53 | 1.2 | ⊚ | ⊚ | ⊚ | ⊚ |
| Example 54 | 1.2 | ⊚ | ⊚ | ⊚ | ⊚ |
| Example 55 | 1.2 | ⊚ | ⊚ | ⊚ | ⊚ |
| Comparative Example 6 | 1.3 | X | Δ~○ | X | X |
| Comparative Example 7 | 0.3 | X | X | Δ | X |
| Comparative Example 8 | 0.3 | X | Δ | ○ | X |
| Comparative Example 9 | 0.4 | X | Δ | ○ | X |

1. Sensitivity becomes higher with an increase of optical density (OD value).
2. Plasticizer resistance (print preservability)
⊚~ Substantially no fading.
○~ A slight color tone change without blur and the like.
Δ~ Marked fading.
X~ Complete loss of the color of print.
3. Heat resistance (print preservability at 60° C.)
⊚~ Substantially no fading.
○~ A slight color tone change without blur and the like.
Δ~ Marked fading.
X~ Complete loss of the color of print.
4. Heat resistance (the preservability of an original recording material surface at 80° C.)
⊚~ Substantially no fog was caused.
○~ Reading of a print portion was possible though there was a slight color tone change.
Δ~ Reading of a print portion was difficult owing to fog.
X~ Reading of a print portion was impossible owing to serious fog.

EXAMPLE 56

A dispersion was prepared by dispersing 2 g of the compound obtained in Example 3, by grinding this compound together with 8 g of a 2.5 wt % poly(vinyl alcohol) aqueous solution in a paint shaker for 6 hours. The temperature of the dispersion immediately after the dispersing operation was 25° C. The diameter of dispersed particles of the compound was 0.6 am.

Another dispersion was prepared by dispersing 70 g of 3-dibutylamino-6-methyl-7-anilinofluoran by grinding it together with 130 g of a 5.4 wt % aqueous solution of hydroxypropylmethyl cellulose (Metolose 60SH-03, mfd. by Shin-etsu Chemical Co., Ltd.) in a sand grinder (mfd. by AIMEX CO., LTD.; vessel capacity 400 ml) at a number of revolution of 2,000 rpm for 3 hours.

A still another dispersion was prepared by dispersing 70 g of diphenyl sulfone by grinding it together with 130 g of a 8 wt % poly(vinyl alcohol) aqueous solution in a sand grinder (mfd. by AIMEX CO., LTD.; vessel capacity 400 ml) at a number of revolution of 2,000 rpm for 3 hours.

Separately, 10 g of calcium carbonate was mixed with 30 g of water and dispersed by stirring by the use of a stirrer to obtain a dispersion.

A coating liquid was obtained by stirring and mixing the above-mentioned dispersions and other components in the following proportions (dry basis); the dispersion of the above-mentioned compound in terms of dry solids: 20 parts by weight, the 3-dibutylamino-6-methyl-7-anilinofluoran dispersion in terms of dry solids: 10 parts by weight, the diphenyl sulfone dispersion in terms of dry solids: 25 parts by weight, the calcium carbonate dispersion in terms of dry solids: 40 parts by weight, a zinc stearate dispersion (solid content: 16 wt %) in terms of dry solids: 20 parts by weight, and a 15 wt % polyvinyl alcohol) in terms of dry solids: 15 parts by weight.

The coating liquid was applied on base paper with a basis weight of 50 g/m² by the use of a bar coater of rod number 10. The coating amount of the coating liquid was 5 g/m² in terms of dry weight. After drying, supercalendering was conducted to obtain a heat-sensitive recording material.

The result of evaluating the sensitivity of the heat-sensitive recording material obtained was so good that the optical density was 1.3. The print preservability evaluated by the use of vinyl chloride wrap films was good. The whiteness of the original recording material surface was as good as 82. These results are summarized in Table 4.

EXAMPLES 57 TO 58

Heat-sensitive recording materials were produced in the same manner as in Example 56 except for using 3-diethylamino-6-methyl-7-anilinofluoran (Example 57) or 3,3-bis(p-dimethylaminophenyl)-6-dimethylaminophthalide (Example 58) in place of 3-dibutylamino-6-methyl-7-anilinofluoran, and were evaluated. The results are summarized in Table 4.

EXAMPLES 59 TO 61

Heat-sensitive recording materials were produced in the same manner as in Example 56 except for using methyl cellulose (Metolose M-15, mfd. by Shin-etsu Chemical Co., Ltd.) (Example 59), a polyoxyethylene alkyl ether sulfate (Rebenol WX, mfd. by Kao Corp.) (Example 60) or sodium 2-ethylhexylsulfosuccinate (Neocol SWC, mfd. by Dai-ichi Kogyo Seiyaku Co., Ltd.) in place of the hydroxypropylmethyl cellulose used in Example 56 for dispersing 3-dibutylamino-6-methyl-7-anilinofluoran, and the heat-sensitive recording materials were evaluated. The results are summarized in Table 4.

EXAMPLE 62

A urea-urethane compound developer dispersion, a 3-dibutylamino-6-methyl-7-anilinofluoran dispersion, a diphenyl sulfone dispersion and a calcium carbonate dispersion were prepared in the same manner as in Example 56.

On the other hand, a dispersion was prepared by dispersing 70 g of 2,2-bis(4-hydroxyphenyl)propane by grinding it together with 130 g of a 5.4 wt % poly(vinyl alcohol) aqueous solution in a sand grinder (mfd. by AIMEX CO., LTD.; vessel capacity 400 ml) at a number of revolution of 2,000 rpm for 3 hours.

A coating liquid was obtained by stirring and mixing the above-mentioned dispersions and other components in the following proportions (dry basis); the urea-urethane compound dispersion in terms of dry solids: 10 parts by weight, the 3-dibutylamino-6-methyl-7-anilinofluoran dispersion in terms of dry solids: 10 parts by weight, the diphenyl sulfone dispersion in terms of dry solids: 20 parts by weight, the 2,2-bis(4-hydroxyphenyl)propane dispersion in terms of dry solids: 10 parts by weight, the calcium carbonate dispersion in terms of dry solids: 20 parts by weight, a zinc stearate dispersion (solid content: 16 wt %) in terms of dry solids: 10 parts by weight, and a 15 wt % poly(vinyl alcohol) in terms of dry solids: 10 parts by weight. A heat-sensitive recording material was produced in the same manner as in Example 56 except for using the coating liquid obtained above, and was evaluated.

The results are summarized in Table 4.

EXAMPLES 63 TO 66

Heat-sensitive recording materials were produced in the same manner as in Example 62 except for using 4-isopropyloxyphenyl-4'-hydroxyphenyl sulfone (D-8, a trade name, mfd. by Nippon Soda Co., Ltd.), (Example 63), bis(3-allyl-4-hydroxyphenyl) sulfone (TG-SA, a trade name, mfd. by Nippon Kayaku Co., Ltd.) (Example 64), 2,4'-dihydroxydiphenyl sulfone (24BPS, a trade name, mfd. by Nicca Chemical Co., Ltd.) (Example 65) or a mixture composed mainly of 4,4'-[oxybis(ethyleneoxy-p-phenylenesulfonyl)]diphenol (D-90, a trade name, mfd. by Nippon Soda Co., Ltd.) (Example 66) in place of 2,2-bis(4-hydroxyphenyl)propane, and the heat-sensitive recording materials were evaluated. The results are summarized in Table 4.

EXAMPLES 67 TO 96

Heat-sensitive recording materials were produced in the same manner as in each of Examples 62 to 66 except for using β-naphthylbenzyl ether (BON, a trade name, mfd. by Ueno Fine Chemicals Industry Ltd.) (Examples 67 to 71), p-benzylbiphenyl (PBBP, a trade name, mfd. by Nippon Steel Chemical Co., Ltd.) (Examples 72 to 76), 1,2-di(m-methylphenoxy)ethane (KS-235, a trade name, mfd. by SANKO-SHA CO., LTD.) (Examples 77 to 81), di-p-methylbenzyl oxalate (HS3520, a trade name, mfd. by Dainippon Ink and Chemicals, Inc.) (Examples 82 to 86), 1,2-diphenoxymethylbenzene (PMB-2, a trade name, mfd. by Nicca Chemical Co., Ltd.) (Examples 87 to 91) or m-terphenyl (mtp, a trade name, mfd. by Nippon Steel Chemical Co., Ltd.) (Examples 92 to 96) in place of diphenyl sulfone, and the heat-sensitive recording materials were evaluated. The results are summarized in Table 4.

EXAMPLES 97 TO 98

Heat-sensitive recording materials were produced in the same manner as in Example 56 except for using a stearamide emulsified product (Highmicron G-270, a trade name, mfd. by Chukyo Yushi Co., Ltd.) (Example 97) or acetoactic o-chloroanilide (mfd. by Mitsuboshi Chemical Co., Ltd.) (Example 98) in place of diphenyl sulfone, and were evaluated. The results are summarized in Table 4.

EXAMPLE 99

A heat-sensitive recording material was produced in the same manner as in Example 62 except for adding a stilbene type fluorescent dye (Kayahol 3BS, a trade name, mfd. by Nippon Kayaku Co., Ltd.) to the coating liquid prepared in Example 62, in a proportion of 1 part by weight per 100 parts by weight (in terms of dry solids) of the coating liquid, and was evaluated. The results are summarized in Table 4.

EXAMPLE 100

A dispersion was obtained by dispersing 70 g of 1,13-tris(2-methyl-4-hydroxy-5-tert-butylphenyl)butane by grinding this compound together with 130 g of a 5.4 wt % poly(vinyl alcohol) aqueous solution in a sand grinder (mfd. by AIMEX CO., LTD.; vessel capacity 400 ml) at a number of revolution of 2,000 rpm for 3 hours.

Then, a heat-sensitive recording material was produced in the same manner as in Example 62 except for adding the aforesaid 1,1,3-tris(2-methyl-4-hydroxy-5-tert-butylphenyl)butane dispersion to the coating liquid prepared in Example 62, in a proportion of 10 parts by weight per 10.0 parts by weight (in terms of dry solids) of the coating liquid, and was evaluated. The results are summarized in Table 4.

EXAMPLE 101

A heat-sensitive recording material was produced in the same manner as in Example 100 except for using the urea-urethane compound obtained in Example 20, in place of the urea-urethane compound used in Example 100, and was evaluated. The results are summarized in Table 4.

EXAMPLES 102 TO 107

Heat-sensitive recording materials were produced in the same manner as in Example 100 except for using 1,1,3-tris(2-methyl-4-hydroxy-5-cyclohexylphenyl)butane (Adkarkls DH-43, mfd. by Asahi Denka Kogyo. K.K.) (Example 102), 4-benzyloxy-4'-(2,3-epoxy-2-methylprop-1-yloxy)diphenyl sulfone (NTZ-95, mfd. by Nippon Soda Co., Ltd.), (Example 103), methylenebis(2-hydroxy-3-(benzotriazol-2-yl)-5-tert-octylphenyl) (Example 104), 2-(2'-hydroxy-5'-methylphenyl)benzotriazole (Adkarkls DN-13, mfd. by Asahi Denka Kogyo K.K.) (Example 105), 1,3,5-tris(2,6-dimethyl-4-tert-butyl-3-hydroxybenzyl) isocyanurate (Adkarkls DH-48, mfd. by Asahi Denka Kogyo K.K.) (Example 106) or sodium 2,2-methylenebis(4,6-di-tertbutylphenyl)phosphate (Adkarkls F-85, mfd. by Asahi Denka Kogyo K.K.) (Example 107) in place of 1,1,3-tris(2-methyl-4-hydroxy-5-tert-butylphenyl)butane, and the heat-sensitive recording materials were evaluated. The results are summarized in Table 4.

COMPARATIVE EXAMPLE 10

A heat-sensitive recording material was produced in the same manner as in Example 56 except for using 2,2-bis(4-hydroxyphenyl)propane in place of the urea-urethane compound used in Example 56, and was evaluated. The results are summarized in Table 4.

TABLE 4

| | Sensitivity of thermal paper | Plasticizer resistance (print preservability) | Whiteness | Total evaluation |
|---|---|---|---|---|
| Example 56 | 1.3 | ⊚ | 82 | ⊚ |
| Example 57 | 1.3 | ⊚ | 81 | ⊚ |
| Example 58 | 1.3 | ⊚ | 82 | ⊚ |
| Example 59 | 1.3 | ⊚ | 82 | ⊚ |
| Example 60 | 1.3 | ⊚ | 82 | ⊚ |
| Example 61 | 1.3 | ⊚ | 82 | ⊚ |
| Example 62 | 1.3 | ○~⊚ | 81 | ○ |
| Example 63 | 1.3 | ○~⊚ | 81 | ○ |
| Example 64 | 1.3 | ○~⊚ | 81 | ○ |
| Example 65 | 1.3 | ○~⊚ | 81 | ○ |
| Example 66 | 1.2 | ⊚ | 81 | ○ |
| Example 67 | 1.4 | ○~⊚ | 82 | ○~⊚ |
| Example 68 | 1.4 | ○~⊚ | 83 | ○~⊚ |
| Example 69 | 1.4 | ○~⊚ | 82 | ○~⊚ |
| Example 70 | 1.3 | ○~⊚ | 82 | ○~⊚ |
| Example 71 | 1.2 | ⊚ | 82 | ○~⊚ |
| Example 72 | 1.3 | ○~⊚ | 82 | ○~⊚ |
| Example 73 | 1.3 | ○~⊚ | 83 | ○~⊚ |
| Example 74 | 1.3 | ○~⊚ | 82 | ○~⊚ |
| Example 75 | 1.3 | ○~⊚ | 82 | ○~⊚ |
| Example 76 | 1.2 | ⊚ | 82 | ○~⊚ |
| Example 77 | 1.3 | ○~⊚ | 83 | ○~⊚ |
| Example 78 | 1.3 | ○~⊚ | 83 | ○~⊚ |
| Example 79 | 1.3 | ○~⊚ | 82 | ○~⊚ |
| Example 80 | 1.3 | ○~⊚ | 82 | ○~⊚ |
| Example 81 | 1.2 | ⊚ | 82 | ○~⊚ |
| Example 82 | 1.3 | ○~⊚ | 83 | ○~⊚ |
| Example 83 | 1.4 | ○~⊚ | 82 | ○~⊚ |
| Example 84 | 1.4 | ○~⊚ | 82 | ○~⊚ |
| Example 85 | 1.3 | ○~⊚ | 82 | ○~⊚ |
| Example 86 | 1.2 | ⊚ | 82 | ○~⊚ |
| Example 87 | 1.3 | ○~⊚ | 83 | ○~⊚ |
| Example 88 | 1.3 | ○~⊚ | 82 | ○~⊚ |
| Example 89 | 1.3 | ○~⊚ | 82 | ○~⊚ |
| Example 90 | 1.3 | ○~⊚ | 82 | ○~⊚ |
| Example 91 | 1.2 | ⊚ | 82 | ○~⊚ |
| Example 92 | 1.3 | ○~⊚ | 82 | ○~⊚ |
| Example 93 | 1.3 | ○~⊚ | 82 | ○~⊚ |
| Example 94 | 1.3 | ○~⊚ | 82 | ○~⊚ |
| Example 95 | 1.3 | ○~⊚ | 82 | ○~⊚ |
| Example 96 | 1.2 | ⊚ | 82 | ○~⊚ |
| Example 97 | 1.3 | ○~⊚ | 83 | ⊚ |
| Example 98 | 1.2 | ⊚ | 82 | ⊚ |
| Example 99 | 1.3 | ○~⊚ | 85 | ○~⊚ |
| Example 100 | 1.3 | ⊚ | 82 | ⊚ |
| Example 101 | 1.3 | ⊚ | 82 | ⊚ |
| Example 102 | 1.3 | ⊚ | 82 | ⊚ |
| Example 103 | 1.3 | ⊚ | 82 | ⊚ |
| Example 104 | 1.3 | ○~⊚ | 83 | ○~⊚ |
| Example 105 | 1.3 | ○~⊚ | 82 | ○~⊚ |
| Example 106 | 1.3 | ○~⊚ | 82 | ○~⊚ |
| Example 107 | 1.3 | ○~⊚ | 83 | ○~⊚ |
| Comparative Example 10 | 1.3 | X | 78 | X |

1. Sensitivity becomes higher with an increase of optical density (OD value).
2. Plasticizer resistance (print preservability)
⊚~ Substantially no fading.
○~ A slight color tone change without blur and the like.
△~ Marked fading.
X~ Complete loss of the color of print.
3. Whiteness becomes higher with an increase of its numeral value. Whiteness is sufficient in practice when its numeral value is 80 or more.

<Resistance to Rubbing>

The surface of each heat-sensitive recording material was strongly rubbed with a nail, and whether color development had been caused in the rubbed portion was visually judged. When the recording material showed no remarkable trace of the rubbing, it was rated good in resistance to rubbing.

<Accumulation of Traces of Rubbing>

A cylinder (weight: 2 kg) having a surface with a diameter of 5 cm was moved 50 times on one and the same portion with a length of 20 cm of the recording surface of each heat-sensitive recording material produced, at a rate of 20 cm/sec, and then the recording material was allowed to stand at room temperature for one week. After one week of the standing, whether a printed image could be read was visually judged. When the printed image could be sufficiently read, the recording material was rated good.

EXAMPLE 108

A heat-sensitive coating liquid was obtained in the same manner as in Example 56. Then, the coating liquid was applied on base paper with a basis weight of 50 g/m$^2$ by the use of a bar coater of rod number 10. After drying, supercalendering was conducted to form a heat-sensitive color-producing layer on the substrate. The coating amount of the coating liquid was 5 g/m$^2$ in terms of dry weight.

Then, a dispersion was prepared by dispersing 40 g of kaolin by grinding it together with 60 g of a 0.7% sodium hexametaphosphate aqueous solution in a sand grinder (mfd. by AMEX CO., LTD.; vessel capacity 400 ml) at a number of revolution of 2,000 rpm for 3 hours.

A coating liquid for forming a protective layer was obtained by stirring and mixing this dispersion and other components in the following proportions (dry basis); the kaolin dispersion in terms of dry solids: 20 parts by weight, a zinc stearate dispersion (solid content: 16 wt %) in terms of dry solids: 10 parts by weight, a carboxy-modified poly(vinyl alcohol) aqueous solution in terms of dry solids: 40 parts by weight, and a polyacrylamidoepichlorohydrin crosslinking agent aqueous solution in terms of dry solids: 5 parts by weight.

The coating liquid for forming a protective layer was applied on the heat-sensitive color-producing layer by the use of a bar coater of rod number 5. After drying, supercalendering was conducted to obtain a heat-sensitive recording material. The coating amount of the coating liquid for forming a protective layer was 2 g/m$^2$ in terms of dry weight.

The result of evaluating the sensitivity of the heat-sensitive recording material obtained was so good that the optical density was 1.3.

The print preservability evaluated by the use of vinyl chloride wrap films was good. The surface of the heat-sensitive recording material was strongly rubbed with a nail and whether color development had been caused in the rubbed portion was visually judged to find that the trace of the rubbing was not remarkable, namely, the resistance to rubbing was good.

Even after a long-term test for evaluating the resistance to rubbing, a printed image could be sufficiently read, namely, the resistance to rubbing was good. These evaluation results are summarized in Table 5.

EXAMPLES 109 TO 110

Heat-sensitive recording materials were produced in the same manner as in Example 108 except for using a poly(vinyl alcohol) (Example 109) or an acrylic copolymer (Example 110) in place of the carboxy-modified poly(vinyl alcohol), and were evaluated. The results are summarized in Table 5.

EXAMPLES 111 TO 113

Heat-sensitive recording materials were produced in the same manner as in Example 108 except for using aluminum hydroxide (Example 111), a crosslinkable poly(methyl methacrylate) resin (Example 112) or silica dioxide (Example 113) in place of kaolin, and were evaluated. The results are summarized in Table 5.

EXAMPLE 114

A coating liquid for intermediate layer was obtained by stirring and mixing a 33 wt % calcined kaolin dispersion and a 50 wt % styrene/butadiene based latex aqueous dispersion in proportions (dry basis) of 100 parts by weight and 12 parts by weight, respectively.

Then, a back coating liquid was obtained by stirring and mixing a 20 wt % acrylic emulsion and a 10 wt % silica fine powder dispersion (Fineseal SP-10) in proportions (dry basis) of 100 parts by weight and 7 parts by weight, respectively.

The aforesaid coating liquid for intermediate layer was applied on one side of base paper (50 g/m$^2$) in an amount of 10 g/m$^2$ in terms of solids and dried, and the heat-sensitive coating liquid prepared in Example 108 was applied on the same side in an amount of 5 g/m$^2$ in terms of solids and dried, after which the coating liquid for protective layer prepared in Example 108 was applied on the same side in an amount of 2 g/m$^2$ in terms of solids and dried. Then, the aforesaid back coating liquid was applied on the uncoated side in an amount of 1 g/m$^2$ in terms of solids and dried, and calendaring was conducted to obtain a heat-sensitive recording material, which was evaluated. The results are summarized in Table 5.

COMPARATIVE EXAMPLE 11

A heat-sensitive recording material was produced in the same manner as in Example 108 except that no coating liquid for forming a protective layer was applied on the heat-sensitive color-producing layer, and the recording material was evaluated. The results are summarized in Table 5.

TABLE 5

|  | Sensitivity of thermal paper | Plasticizer resistance (print preservability) | Resistance to rubbing | Accumulation of traces of rubbing | Total evaluation |
|---|---|---|---|---|---|
| Example 108 | 1.3 | ◎ | ◎ | ◎ | ◎ |
| Example 109 | 1.3 | ◎ | ◎ | ◎ | ◎ |
| Example 110 | 1.3 | ◎ | ○~◎ | ◎ | ○~◎ |
| Example 111 | 1.3 | ◎ | ◎ | ◎ | ◎ |
| Example 112 | 1.3 | ◎ | ○~◎ | ◎ | ○~◎ |
| Example 113 | 1.3 | ◎ | ◎ | ◎ | ◎ |
| Example 114 | 1.4 | ◎ | ◎ | ◎ | ◎ |
| Comparative Example 11 | 1.3 | Δ~ | X~ | X | X |

1. Sensitivity becomes higher with an increase of optical density (OD value).
2. Plasticizer resistance (print preservability)
◎~ Substantially no fading.
○~ A slight color tone change without blur and the like.
Δ~ Marked fading.
X~ Complete loss of the color of print.
3. Resistance to rubbing
◎~ A trace of rubbing shows no development of a black color.
○~ A trace of rubbing shows slight color development but is not remarkable.
Δ~ A trace of rubbing shows color development to a limited extent and is remarkable.
X~ A trace of rubbing shows development of a black color and is remarkable.
4. Accumulation of traces of rubbing
◎~ A good result is obtained without difficulty in reading a printed image.
○~ Traces of rubbing show slight color development but a printed image can be sufficiently read.
Δ~ Traces of rubbing show color development, so that a printed image is difficult to read.
X~ Traces of rubbing show development of a black color, so that a printed image cannot be read.

EXAMPLE 115

A dispersion was prepared by dispersing 2 g of the compound obtained in Example 3, by grinding this compound together with 8 g of a 2.5 wt % aqueous solution of a poly (vinyl alcohol) (Gosenol KL-05, mfd. by The Nippon Synthetic Chemical Industry Co., Ltd.) in a paint shaker for 6 hours. The temperature of the dispersion immediately after the dispersing operation was 2.5° C. and the pH of the dispersion was 8. The diameter of dispersed particles of the compound was 0.6 µm.

Another dispersion was prepared by dispersing 70 g of 3-dibutylamino-6-methyl-7-anilinofluoran by grinding it together with 130 g of a 5.4 wt % poly(vinyl alcohol) aqueous solution in a sand grinder (mfd. by AIMEX CO., LTD.; vessel capacity 400 ml) at a number of revolution of 2,000 rpm for 3 hours.

A still another dispersion was prepared by dispersing 70 g of diphenyl sulfone by grinding it together with 130 g of a 5.4 wt % aqueous solution of a poly(vinyl alcohol) (Gosenol KL-05, mfd. by The Nippon Synthetic Chemical Industry Co., Ltd.) in a sand grinder (mfd. by AMEX Co., LTD.; vessel capacity 400 ml) at a number of revolution of 2,000 rpm for 3 hours.

Separately, 10 g of calcium carbonate was mixed with 30 g of water and dispersed by stirring by the use of a stirrer to obtain a dispersion.

A coating liquid was obtained by stirring and mixing the above-mentioned dispersions and other components in the following proportions (dry basis); the dispersion of the above-mentioned compound in terms of dry solids: 30 parts by weight, the 3-dibutylamino-6-methyl-7-anilinofluoran dispersion in terms of dry solids: 15 parts by weight, the diphenyl sulfone dispersion in terms of dry solids: 30 parts by weight, the calcium carbonate dispersion in terms of dry solids: 20 parts by weight, a zinc stearate dispersion (solid content: 16 wt %) in terms of dry solids: 10 parts by weight, and a 15 wt % poly(vinyl alcohol) in terms of dry solids: 7 parts by weight. The pH of the coating liquid was 8.2.

Then, the coating liquid was applied on the surface of woodfree paper with a basis weight of 50 g/m$^2$ in an amount of 5 g/m$^2$ in terms of dry weight and dried, after which supercalendering was conducted to produce a heat-sensitive recording material.

The result of evaluating the color development sensitivity of the heat-sensitive recording material obtained was so good that the optical density was 1.3. The print preservability evaluated by the use of vinyl chloride wrap films was so good that no fading occurred. The results are summarized in Table 6.

EXAMPLE 116

A dispersion was prepared by dispersing 2 g of the same urea-urethane compound as used in Example 115 and 2 g of diphenyl sulfone by grinding them together with 16 g of a 2.5 wt % aqueous solution of a modified poly(vinyl alcohol) (Gosenol KL-05, mfd. by The Nippon Synthetic Chemical Industry Co., Ltd.) in a paint shaker for 6 hours.

Then, a heat-sensitive recording material was produced in the same manner as in Example 115 except for adding the aforesaid co-dispersion in a proportion of 60 parts by weight in terms of dry solids, in place of the dispersion of the urea-urethane compound used in Example 115 and the diphenyl sulfone dispersion, and the recording material was evaluated. The results are summarized in Table 6.

EXAMPLE 117

A dispersion was prepared by dispersing 2 g of the compound obtained in Example 10 and 2 g of diphenyl sulfone by grinding them together with 16 g of a 2.5 wt % aqueous solution of a modified poly(vinyl alcohol) (Goseran L-3266, mfd. by The Nippon Synthetic Chemical Industry Co., Ltd.) in a paint shaker for 6 hours.

Then, a heat-sensitive recording material was produced in the same manner as in Example 115 except for adding the aforesaid co-dispersion of the aforesaid compound and diphenyl sulfone in a proportion of 60 parts by weight in terms of dry solids, in place of the dispersion of the urea-urethane compound used in Example 115 and the diphenyl sulfone dispersion, and the recording material was evaluated. The results are summarized in Table 6.

EXAMPLE 118

A dispersion was prepared by dispersing 2 g of the compound obtained in Example 20 and 2 g of dimethylbenzyl oxalate by grinding them together with 16 g of a 2.5 wt % aqueous solution of a modified poly(vinyl alcohol) (Goseran L-3266, mfd. by The Nippon Synthetic Chemical Industry Co., Ltd.) in a paint shaker for 6 hours.

Then, a heat-sensitive recording material was produced in the same manner as in Example 115 except for adding the aforesaid co-dispersion of the aforesaid compound and dimethylbenzyl oxalate in a proportion of 60 parts by weight in terms of dry solids, in place of the dispersion of the urea-urethane compound used in Example 115 and the diphenyl sulfone dispersion, and the recording material was evaluated. The results are summarized in Table 6.

EXAMPLE 119

A dispersion was prepared by dispersing 2 g of the compound obtained in Example 37, by grinding this compound together with 8 g of a 2.5 wt % aqueous solution of methyl cellulose (Metolose SM-15, mfd. by Shin-etsu Chemical Co., Ltd.) in a paint shaker for 6 hours.

Then, a heat-sensitive recording material was produced in the same manner as in Example 115 except for using the dispersion of the aforesaid compound in place of the dispersion of the urea-urethane compound used in Example 3, and the recording material was evaluated. The results obtained are summarized in Table 6.

EXAMPLES 120 TO 124

Heat-sensitive recording materials were produced in the same manner as in Example 115 except for using a polycarboxylic acid ammonium salt (Dispersant 5027, mfd. by Sunnopco Co., Ltd.) (Example 120), a water-soluble low-molecular weight copolymer (Discort N14, mfd. by Dai-ichi Kogyo Seiyaku Co., Ltd.) (Example 121), sodium 2-ethylhexylsulfosuccinate (Neocol SWC, mfd. by Dai-ichi Kogyo Seiyaku Co., Ltd.) (Example 122), hydroxypropylmethyl cellulose (Metolose 60SH-03, mfd. by Shin-etsu Chemical Co., Ltd.) (Example 123), or sodium condensed naphthalene-sulfonate (Roma D, mfd. by Sunnopco Co., Ltd.) (Example 124) in place of the poly(vinyl alcohol) (Gosenol KL-05, mfd. by The Nippon Synthetic Chemical Industry Co., Ltd.) used as a dispersing agent for the urea-urethane compound in Example 115, and the heat-sensitive recording materials were evaluated. The results are summarized in Table 6.

EXAMPLES 125 TO 130

Heat-sensitive recording materials were produced in the same manner as in Example 115 except for using methyl cellulose (Metolose SM-15, mfd. by Shin-etsu Chemical Co., Ltd.) (Example 125), a water-soluble low-molecular weight copolymer (Discort N14, mfd. by Dai-ichi Kogyo Seiyaku Co., Ltd.) (Example 126), sodium 2-ethylhexylsulfosuccinate (Neocol SWC, mfd. by Dai-ichi Kogyo Seiyaku Co., Ltd.) (Example 127), hydroxypropylmethyl cellulose (Metolose 60SH-03, mfd. by Shin-etsu Chemical Co., Ltd.) (Example 128), sodium condensed naphthalenesulfonate (Roma D, mfd. by Sunnopco Co., Ltd.) (Example 129) or a polycarboxylic acid ammonium salt (Dispersant 5027, mfd. by Sunnopco Co., Ltd.) (Example 130) in place of the poly(vinyl alcohol) (Gosenol KL-05, mfd. by The Nippon Synthetic Chemical Industry Co., Ltd.) used as a dispersing agent for diphenyl sulfone in Example 115, and the heat-sensitive recording materials were evaluated. The results are summarized in Table 6.

EXAMPLES 131 TO 133

Heat-sensitive recording materials were produced in the same manner as in Example 119 except for using methyl cellulose (Metolose SM-15, mfd. by Shin-etsu Chemical Co., Ltd.) (Example 131), hydroxypropylmethyl cellulose (Metolose 60SH-03, mfd. by Shin-etsu Chemical Co., Ltd.) (Example 132) or a modified poly(vinyl alcohol) (Goseran L-3266, mfd. by The Nippon Synthetic Chemical Industry Co., Ltd.) (Example 133) in place of the poly(vinyl alcohol) (Gosenol KL-05, mfd. by The Nippon Synthetic Chemical Industry Co., Ltd.) used as a dispersing agent for diphenyl sulfone in Example 119, and the heat-sensitive recording materials were evaluated. The results are summarized in Table 6.

EXAMPLE 134

A heat-sensitive recording material was produced in the same manner as in Example 131 except for using a modified poly(vinyl alcohol) (Goseran L-3266, mfd. by The Nippon Synthetic Chemical Industry Co., Ltd.) in place of the methyl cellulose (Metolose SM-15, mfd. by Shin-etsu Chemical Co., Ltd.) used as a dispersing agent for the urea-urethane compound in Example 131, and the recording material was evaluated. The results are summarized in Table 6.

EXAMPLES 135 AND 136

Heat-sensitive recording materials were produced in the same manner as in Example 121 except for using methyl cellulose (Metolose SM-15, mfd. by Shin-etsu Chemical Co., Ltd.) (Example 135) or hydroxypropylmethyl cellulose (Metolose 60SH-03, mfd. by Shin-etsu Chemical Co., Ltd.) (Example 136) in place of the poly(vinyl alcohol) (Gosenol KL-05, mfd. by The Nippon Synthetic Chemical Industry Co., Ltd.) used as a dispersing agent for diphenyl sulfone in Example 121, and the heat-sensitive recording materials were evaluated. The results are summarized in Table 6.

EXAMPLES 137 AND 138

Heat-sensitive recording materials were produced in the same manner as in Example 123 except for using methyl cellulose (Metolose SM-15, mfd. by Shin-etsu Chemical Co., Ltd.) (Example 137) or hydroxypropylmethyl cellulose (Metolose 60SH-03, mfd. by Shin-etsu Chemical Co., Ltd.) (Example 138) in place of the poly(vinyl alcohol) (Gosenol KL-05, mfd. by The Nippon Synthetic Chemical Industry Co., Ltd.) used as a dispersing agent for diphenyl sulfone in Example 123, and the heat-sensitive recording materials were evaluated. The results are summarized in Table 6.

EXAMPLES 139 AND 140

Heat-sensitive recording materials were produced in the same manner as in Example 136 except for using hydroxypropylmethyl cellulose (Metolose 60SH-03, mfd. by Shin-etsu Chemical Co., Ltd.) (Example 139) or a mixed dispersing agent of hydroxypropylmethyl cellulose (Metolose 60SH-03, mfd. by Shin-etsu Chemical Co., Ltd.) and sodium 2-ethylhexylsulfosuccinate (Neocol SWC, mfd. by Dai-ichi Kogyo Seiyaku Co., Ltd.) (weight ratio: 1/1) (Example 140) in place of the poly(vinyl alcohol) used as a dispersing agent for 3-dibutylamino-6-methyl-7-anilinofluoran in Example 136, and the heat-sensitive recording materials were evaluated. The results are summarized in Table 6.

COMPARATIVE EXAMPLE 12

A heat-sensitive recording sheet was produced in the same manner as in Example 115 except for using 2,2-bis(4-hydroxyphenyl)propane in place of the urea-urethane compound used in Example 115, and was evaluated. The results are summarized in Table 6.

COMPARATIVE EXAMPLES 13 AND 14

The same urea-urethane compound as used in Example 115 was dispersed in the same manner as in Example 115 except for changing the dispersion time, and the average particle sizes of the resulting dispersions were measured and found to be 0.04/Lm (Comparative Example 10) and 6.5 µm (Comparative Example 11). Heat-sensitive recording sheets were produced in the same manner as in Example 115 except for using each of the above-mentioned dispersions, and were evaluated. The results are summarized in Table 6.

COMPARATIVE EXAMPLE 15

The same urea-urethane compound as used in Example 115 was dispersed in the same manner as in Example 115. In this case, the dispersion temperature was maintained at 65° C. during the dispersing operation. Except for using the dispersion thus obtained, a heat-sensitive recording sheet was produced in the same manner as in Example 115, and was evaluated. The results are summarized in Table 6.

COMPARATIVE EXAMPLE 16

The same urea-urethane compound as used in Example 115 was dispersed in the same manner as in Example 115. In this case, the pH of the dispersion medium used for the dispersing operation was adjusted to 4. Except for using the dispersion thus obtained, a heat-sensitive recording sheet was produced in the same manner as in Example 115, and was evaluated. The results are summarized in Table 6.

COMPARATIVE EXAMPLE 17

The same urea-urethane compound as used in Example 115 was dispersed in the same manner as in Example 115; In this case, the pH of the dispersion medium used for the dispersing operation was adjusted to 11. Except for using the dispersion thus obtained, a heat-sensitive recording sheet was produced in the same manner as in Example 115, and was evaluated. The results are summarized in Table 6.

COMPARATIVE EXAMPLE 18

The pH of the coating liquid prepared in Example 115 was adjusted to 4.0 with 1N-sulfuric acid. Except for using the coating liquid thus adjusted, a heat-sensitive recording sheet was produced in the same manner as in Example 115, and was evaluated. The results are summarized in Table 6.

COMPARATIVE EXAMPLE 19

The pH of the coating liquid prepared in Example 115 was adjusted to 12.5 with 1N-sodium hydroxide. Except for using the coating liquid thus adjusted, a heat-sensitive recording sheet was produced in the same manner as in Example 115, and was evaluated. The results are summarized in Table 6.

TABLE 6

| | Sensitivity of thermal paper | Plasticizer resistance (print preservability) | Plasticizer resistance (preservability of original recording material surface) | Total evaluation |
|---|---|---|---|---|
| Example 115 | 1.3 | ◉ | ○~◉ | ○~◉ |
| Example 116 | 1.4 | ◉ | ○~◉ | ○~◉ |
| Example 117 | 1.3 | ○~◉ | ◉ | ○~◉ |
| Example 118 | 1.3 | ○ | ◉ | ○~◉ |
| Example 119 | 1.3 | ○~◉ | ◉ | ○~◉ |
| Example 120 | 1.3 | ◉ | ◉ | ◉ |
| Example 121 | 1.3 | ◉ | ◉ | ◉ |
| Example 122 | 1.2 | ◉ | ◉ | ◉ |
| Example 123 | 1.3 | ◉ | ○~◉ | ○~◉ |
| Example 124 | 1.2 | ◉ | ○~◉ | ○~◉ |
| Example 125 | 1.3 | ◉ | ◉ | ◉ |
| Example 126 | 1.3 | ◉ | ◉ | ◉ |
| Example 127 | 1.3 | ◉ | ◉ | ◉ |
| Example 128 | 1.3 | ◉ | ○~◉ | ○~◉ |
| Example 129 | 1.3 | ◉ | ○~◉ | ○~◉ |
| Example 130 | 1.3 | ◉ | ○~◉ | ○~◉ |
| Example 131 | 1.3 | ◉ | ◉ | ◉ |
| Example 132 | 1.3 | ◉ | ◉ | ◉ |
| Example 133 | 1.4 | ◉ | ◉ | ◉ |
| Example 134 | 1.4 | ◉ | ◉ | ◉ |
| Example 135 | 1.3 | ◉ | ◉ | ◉ |
| Example 136 | 1.3 | ◉ | ◉ | ◉ |
| Example 137 | 1.3 | ◉ | ◉ | ◉ |
| Example 138 | 1.3 | ◉ | ◉ | ◉ |
| Example 139 | 1.3 | ◉ | ◉ | ◉ |
| Example 140 | 1.4 | ◉ | ◉ | ◉ |
| Comparative Example 12 | 1.3 | X | ○ | X |
| Comparative Example 13 | 1.3 | ○ | X | X |
| Comparative Example 14 | 0.7 | Δ | ○ | X |
| Comparative Example 15 | 0.8 | Δ | Δ | X |
| Comparative Example 16 | 1.0 | Δ | X | X |
| Comparative Example 17 | 0.8 | Δ | Δ | X |
| Comparative Example 18 | 1.1 | Δ | X | X |

TABLE 6-continued

| | Sensitivity of thermal paper | Plasticizer resistance (print preservability) | Plasticizer resistance (preservability of original recording material surface) | Total evaluation |
|---|---|---|---|---|
| Comparative Example 19 | 0.9 | X | Δ | X |

1. Sensitivity becomes higher with an increase of optical density (OD value).
2. Plasticizer resistance (print preservability)
◉~ Substantially no fading.
○~ A slight color tone change without blur and the like.
Δ~ Marked fading.
X~ Complete loss of the color of print.
3. Plasticizer resistance (the preservability of an original recording material surface)
◉~ The original recording material surface is hardly colored.
○~ The original recording material surface is very slightly colored though there was a subtle color tone change.
Δ~ The original recording material surface is markedly colored.
X~ The original recording material surface is so seriously colored that reading of a print was difficult.

EXAMPLE 141

The coating liquid prepared in Example 115 was applied on woodfree paper with a surface pH of 3.2 in an amount of 5 g/m² in terms of dry weight and dried, after which supercalendering was conducted to produce a heat-sensitive recording material.

The result of evaluating the color development sensitivity of the heat-sensitive recording material obtained was so good that the optical density was 1.3. The print preservability evaluated by the use of vinyl chloride wrap films was so good that no fading occurred. The preservability or the original recording material surface was so good that the surface was hardly colored. The results are summarized in Table 7.

EXAMPLES 142 AND 143

Heat-sensitive recording materials were produced in the same manner as in Example 141 except for using woodfree paper with a surface pH of 5 (Example 142) or woodfree paper with a surface pH of 6.8 (Example 143) in place of the woodfree paper with a surface pH of 3.2, and were evaluated. The results are summarized in Table 7.

COMPARATIVE EXAMPLES 20 AND 21

Heat-sensitive recording materials were produced in the same manner as in Example 141 except for using woodfree paper with a surface pH of 2.8 (Comparative Example 20) or woodfree paper with a surface pH of 9.5 (Comparative Example 21) in place of the woodfree paper with a surface pH of 3.2, and were evaluated. The results are summarized in Table 7.

TABLE 7

| | Sensitivity of thermal paper | Plasticizer resistance (print preservability) | Plasticizer resistance (preservability of original recording material surface) | Total evaluation |
|---|---|---|---|---|
| Example 141 | 1.3 | ◉ | ○~◉ | ○~◉ |
| Example 142 | 1.3 | ◉ | ◉ | ◉ |
| Example 13 | 1.3 | ◉ | ◉ | ◉ |
| Comparative Example 20 | 1.3 | Δ | X | X |

TABLE 7-continued

|  | Sensitivity of thermal paper | Plasticizer resistance (print preservability) | Plasticizer resistance (preservability of original recording material surface) | Total evaluation |
|---|---|---|---|---|
| Comparative Example 21 | 1.0 | Δ | Δ | X |

1. Sensitivity becomes higher with an increase of optical density (OD value).
2. Plasticizer resistance (print preservability)
◉~ Substantially no fading.
○~ A slight color tone change without blur and the like.
Δ~ Marked fading.
X~ Complete loss of the color of print.
3. Plasticizer resistance (the preservability of an original recording material surface)
◉~ The original recording material surface is hardly colored.
○~ The original recording material surface is very slightly colored though there was a subtle color tone change.
Δ~ The original recording material surface is markedly colored.
X~ The original recording material surface is so seriously colored that reading of a print was difficult.

EXAMPLE 144

A) Preparation of a Coating Liquid for Magnetic Recording Layer

A coating liquid for magnetic recording layer was prepared by subjecting 100 parts by weight of barium ferrite (coercive force: 2700), 25 parts by weight of sodium polyacrylate (a 20 wt % aqueous solution), 100 parts by weight of a poly(vinylidene chloride) (a 49 wt % dispersion), 15 parts by weight of carbon black (a 36 wt % dispersion), 10 parts by weight of paraffin wax (a 20 wt % dispersion in methyl cellulose) and 100 parts by weight of water to dispersion in a ball mill for 10 hours.

B) Preparation of a Coating Liquid for Heat-Sensitive Recording Layer

A coating liquid for heat-sensitive recording layer was obtained in the same manner as in Example 56.

Next, the coating liquid for magnetic recording layer prepared in A) was applied on one side of woodfree paper with a basis weight of 150 g/m² in an amount of 30 g/m² in terms of dry weight to obtain a magnetic recording layer. Then, the coating liquid for heat-sensitive recording layer prepared in B) was applied on the other side of the substrate having the aforesaid magnetic recording layer, in an amount of 6 g/m² in terms of dry weight and dried, after which supercalendering was conducted to obtain a heat-sensitive magnetic recording material.

The result of evaluating the color development sensitivity of the heat-sensitive magnetic recording material obtained was so good that the optical density was 1.3. The print preservability evaluated by the use of vinyl chloride wrap films was so good that no fading occurred. The results are summarized in Table 8.

EXAMPLE 145

C) Preparation of a Coating Liquid for Protective Layer

Twenty parts by weight of zinc stearate, 20 parts by weight of a 5 wt % methyl cellulose aqueous solution and 60 parts by weight of water were mixed and subjected to dispersion in a sand grinder for 2 hours. Then, 20 parts by weight of a 10 wt % carboxy-modified poly(vinyl alcohol) aqueous solution, 1.5 parts by weight of silica, 6.5 parts by weight of a 12.5 wt % polyamidoepichlorohydrin aqueous solution and 15.0 parts by weight of water were mixed and then subjected to dispersion in a sand grinder for 2 hours.

Subsequently, 0.7 part by weight of the zinc stearate dispersion obtained above, 45.0 parts by weight of the silica dispersion obtained above and 11.3 parts by weight of water were mixed to prepare a coating liquid for protective layer. A heat-sensitive magnetic recording material was produced in the same manner as in Example 144 except for forming a protective layer by applying the aforesaid coating liquid for protective layer on the heat-sensitive recording layer of the heat-sensitive magnetic recording material of Example 144 in an amount of 3 g/m² in terms of dry weight, followed by drying, and was evaluated. The results are summarized in Table 8.

EXAMPLE 146

D) Preparation of a Coating Liquid for Intermediate Layer

A coating liquid for intermediate layer was prepared which was composed of 80 parts by weight (in terms of dry solids) of a 48% dispersion of polystyrene fine particles and 20 parts by weight (in terms of dry solids) of a 40% styrene-acrylic ester copolymer emulsion.

A heat-sensitive magnetic recording material was produced in the same manner as in Example 145 except for forming an intermediate layer by applying the aforesaid coating liquid between the heat-sensitive recording layer and substrate of the heat-sensitive magnetic recording material of Example 145 in an amount of 8 g/m² in terms of dry weight, followed by drying, and was evaluated. The results are summarized in Table 8.

COMPARATIVE EXAMPLE 22

A heat-sensitive recording sheet was produced in the same manner as in Example 144 except for using 2,2-bis(4-hydroxyphenyl)propane in place of the urea-urethane compound used in Example 144, and was evaluated. The results are summarized in Table 8.

TABLE 8

|  | Sensitivity of thermal paper | Plasticizer resistance (print preservability) | Total evaluation |
|---|---|---|---|
| Example 144 | 1.3 | ◉ | ◉ |
| Example 145 | 1.2 | ◉ | ◉ |
| Example 146 | 1.3 | ◉ | ◉ |
| Comparative Example 22 | 1.3 | X | X |

1. Sensitivity becomes higher with an increase of optical density (OD value).
2. Plasticizer resistance (print preservability)
◉~ Substantially no fading.
○~ A slight color tone change without blur and the like.
Δ~ Marked fading.
X~ Complete loss of the color of print.

EXAMPLE 147

A) Preparation of a Coating Liquid for Heat-Sensitive Recording Layer

A coating liquid for heat-sensitive recording layer was obtained in the same manner as in Example 56.

The coating liquid for heat-sensitive recording layer prepared in A) was applied on the surface of woodfree paper with a basis weight of 150 g/m² in an amount of 7 g/m² in terms of dry weight and dried, and supercalendering was conducted to produce a sheet coated with a heat-sensitive recording layer.

B) Production of a Release Sheet

A mold release agent consisting of oily dimethyl silicone was applied on base paper with a basis weight of 40 g/m² in an amount of 1 g/m² by the use of a gravure coater to form a release layer. Then, an adhesive layer component consisting of 100 parts by weight of chlorinated rubber, 20 parts by weight of ester gum and 120 parts by weight of dibutyl phthalate was applied on the release layer in an amount of 10 g/m³.

C) Production of a Label for Heat-Sensitive Recording

The uncoated surface of the sheet coated with a heat-sensitive recording layer which had been produced in the above item A) and the surface coated with an adhesive layer of the release sheet produced in the above item B) were stuck together so that they might face each other, whereby a label for heat-sensitive recording was produced.

The result of evaluating the color development sensitivity of the obtained label for heat-sensitive recording was so good that the optical density was 1.3. The print preservability evaluated by the use of vinyl chloride wrap films was so good that no fading occurred. The results are summarized in Table 9.

EXAMPLE 148

D) Preparation of a Coating Liquid for Back Coating Layer

A coating liquid for back coating layer was prepared by mixing 100 parts by weight of a styrene-maleic acid copolymer with 50 parts by weight of kaolin. A label for heat-sensitive recording was produced in the same manner as in Example 147 except for forming a back coating layer by applying the aforesaid coating liquid on the side reverse to the side coated with a heat-sensitive recording layer of the label for heat-sensitive recording of Example 147 in an amount of 1 g/m² in terms of dry weight, followed by drying, and the label was evaluated. The results are summarized in Table 9.

EXAMPLE 149

E) Preparation of a Coating Liquid for Intermediate Layer

A coating liquid for intermediate layer was prepared which was composed of 80 parts by weight (in terms of dry solids) of a 48% dispersion of polystyrene fine particles and 20 parts by weight (in terms of dry solids) of a 40% styrene-acrylic ester copolymer emulsion.

A label for heat-sensitive recording was produced in the same manner as in Example 148 except for forming an intermediate layer by applying the aforesaid coating liquid between the heat-sensitive recording layer and substrate of the label for heat-sensitive recording of Example 148 in an amount of 8 g/m² in terms of dry weight, followed by drying, and the label was evaluated. The results are summarized in Table 9.

EXAMPLE 150

F) Preparation of a Coating Liquid for Protective Layer

Twenty parts by weight of zinc stearate, 20 parts by weight of a 5 wt % methyl cellulose aqueous solution and 60 parts by weight of water were mixed and then subjected to dispersion in a sand grinder for 2 hours. Then, 20 parts by weight of a 10 wt % carboxy-modified poly(vinyl alcohol) aqueous solution, 1.5 parts by weight of silica, 6.5 parts by weight of a 12.5 wt % polyamidoepichlorohydrin aqueous solution and 15.0 parts by weight of water were mixed and then subjected to dispersion in a sand grinder for 2 hours.

Subsequently, 0.7 part by weight of the zinc stearate dispersion obtained above, 45.0 parts by weight of the silica dispersion obtained above and 11.3 parts by weight of water were mixed to prepare a coating liquid for protective layer. A label for heat-sensitive recording was produced in the same manner as in Example 149 except for forming a protective layer by applying the aforesaid coating liquid on the heat-sensitive recording layer of the label for heat-sensitive recording of Example 149 in an amount of 3 g/m² in terms of dry weight, followed by drying, and the label was evaluated. The results are summarized in Table 9.

COMPARATIVE EXAMPLE 23

A heat-sensitive recording sheet was produced in the same manner as in Example 147 except for using 2,2-bis(4-hydroxyphenyl)propane in place of the urea-urethane compound used in Example 147, and was evaluated. The results are summarized in Table 9.

TABLE 9

|  | Sensitivity of thermal paper | Plasticizer resistance (print preservability) | Total evaluation |
|---|---|---|---|
| Example 147 | 1.3 | ○~◎ | ○~◎ |
| Example 148 | 1.3 | ○~◎ | ○~◎ |
| Example 149 | 1.4 | ○~◎ | ◎ |
| Example 150 | 1.3 | ◎ | ◎ |
| Comparative Example 23 | 1.3 | X | X |

1. Sensitivity becomes higher with an increase of optical density (OD value).
2. Plasticizer resistance (print preservability)
◎~ Substantially no fading.
○~ A slight color tone change without blur and the like.
△~ Marked fading.
X~ Complete loss of the color of print.

EXAMPLE 151

The coating materials for heat-sensitive color-producing layers and intermediate layers described below were applied on one side of a commercial poly(ethylene terephthalate) film of 75 μm in thickness (Lumilar E, a trade name, Toray Industries, Inc.) so that the following multiple layers might be formed on the substrate in the following order: a cyan color development heat-sensitive recording layer, an intermediate layer, a magenta color development heat-sensitive recording layer, an intermediate layer, a yellow color development heat-sensitive recording layer, and an intermediate layer. The application was carried out by bar coating so that the coating amounts of each heat-sensitive recording layer and each intermediate layer after drying might be 6.5 g/m² and 2.0 g/m², respectively, whereby a multi-color heat-sensitive recording material was obtained.

Preparation of a Coating Material for Cyan Color Development Heat-Sensitive Recording Layer Liquid A (a Heat-Sensitive Color Development Dye Dispersion)

Twenty parts by weight of 3,3-bis(p-dimethylaminophenyl)-6-dimethylaminophthalide, 20 parts by weight of a 10% poly(vinyl alcohol) aqueous solution and 10 parts by weight of water were mixed and then subjected to dispersion and grinding in a sand grinder (mfd. by AIMEX CO., LTD.) to prepare a dispersion having an average particle size of 0.7 μm.

Liquid B (a Developer Dispersion)

A urea-urethane compound was synthesized in the same manner as in Example 3, and a dispersion was prepared by dispersing 30 g of this compound by grinding it together with 120 g of a 2.5 wt % poly(vinyl alcohol) aqueous solution in a sand grinder for 3 hours. The temperature of the dispersion immediately after the dispersing operation was 25° C. The diameter of dispersed particles of the compound was 0.6 μm.

A coating material for cyan color development heat-sensitive color-producing layer was prepared by mixing 30 parts by weight of the liquid A, 120 parts by weight of the liquid B, 52 parts by weight of a 60% calcium carbonate slurry, 40 parts by weight of a 10% poly(vinyl alcohol) aqueous solution, 28 parts by weight of a SBR latex (L-1537, a trade name, ASAHI Chemical Industry, Co., Ltd.; solid content 50%), 11 parts by weight of stearamide (Celozol. A-877, a trade name, mfd. by Chukyo Yushi Co., Ltd.; solid content 26.5%) and 82 parts by weight of water.

Preparation of a Coating Material for Magenta Color Development Heat-Sensitive Recording Layer Liquid A (a Heat-Sensitive Color Development Dye Dispersion)

Twenty parts by weight of 4-N-(2-(2,4-ditertamylphenoxy)butyryl)piperazinobenzenediazonium hexafluorophosphate, 20 parts by weight of a 10% poly(vinyl alcohol) aqueous solution and 10 parts by weight of water were mixed and then subjected to dispersion and grinding in a sand grinder to prepare a dispersion having an average particle size of 0.7 μm.

Liquid B (a Coupler Dispersion)

Fifty parts by weight of 1-(2'-octylphenyl)-3-methyl-5-pyrazolone, 50 parts by weight of 1,2,3-triphenylguanidine, 56 parts by weight of a 10% poly(vinyl alcohol) aqueous solution and 25 parts by weight of water were mixed and then subjected to dispersion and grinding in a sand grinder to prepare a dispersion having an average particle size of 1.0 μm A coating material for magenta color development heat-sensitive color-producing layer was prepared by mixing 30 parts by weight of the liquid A, 90 parts by weight of the liquid B, 52 parts by weight of a 60% calcium carbonate slurry, 40 parts by weight of a 10% poly(vinyl alcohol) aqueous solution, 28 parts by weight of a SBR latex (L-1537, a trade name, ASAHI Chemical Industry, Co., Ltd.; solid content 50%), 11 parts by weight of stearamide (Celozol A-877, a trade name, mfd. by Chukyo Yushi Co., Ltd.; solid content 26.5%) and 82 parts by weight of water.

Preparation of a Coating Material for Yellow Color Development Heat-Sensitive Recording Layer Liquid A (a Heat-Sensitive Color Development Dye Dispersion)

Twenty parts by weight of 2,5-dibutoxy-4-tolylthiobenzenebenzenediazonium hexafluorophosphate, 20 parts by weight of a 10% poly(vinyl alcohol) aqueous solution and 10 parts by weight of water were mixed and then subjected to dispersion and grinding in a sand grinder to prepare a dispersion having an average particle size of 0.7 μm.

Liquid B (a Coupler Dispersion)

Fifty parts by weight of 2-chloro-5-(3-(2,4-di-tertpentyl) phenoxypropylamino)acetanilide, 50 parts by weight of 1,2, 3-triphenylguanidine, 50 parts by weight of a 10% poly(vinyl alcohol) aqueous solution and 25 parts by weight of water were mixed and then subjected to dispersion and grinding in a sand grinder to prepare a dispersion having an average particle size of 1.0 μm.

A coating material for yellow color development heat-sensitive color-producing layer was prepared by mixing 30 parts by weight of the liquid A, 90 parts by weight of the liquid B, 52 parts by weight of a 60% calcium carbonate slurry, 40 parts by weight of a 10% poly(vinyl alcohol) aqueous solution, 28 parts by weight of a SBR latex (L-1537, a trade name, ASAHI Chemical Industry, Co., Ltd.; solid content 50%), 11 parts by weight of stearamide (Celozol A-877, a trade name, mfd. by Chukyo Yushi Co., Ltd.; solid content 26.5%) and 82 parts by weight of water.

Preparation of a Coating Material (Solid Content: 15%) for Intermediate Layer

A coating material for intermediate layer was prepared by mixing 42 parts by weight of a 60% kaolinite clay (average particle size: 0.6 μm) dispersion, 200 parts by weight of a carboxylic acid-modified poly(vinyl alcohol) aqueous solution (Gosenol T-330, a trade name, mfd. by The Nippon Synthetic Chemical Industry co., Ltd.; solid content 40%), 100 parts by weight of an acrylic emulsion (SC-2250, a trade name, mfd. by Nippon Shokubai Co., Ltd.; solid content 40%), 33 parts by weight of a dimethylolurea solution (J-001, a trade name, mfd. by Showa Denko K. R.; solid content 30%), 13 parts by weight of a 40% zinc stearate dispersion (Highmicron F-930, a trade name, mfd. by Chukyo Yushi Co., Ltd.; average particle size 0.9 μm), 70 parts by weight of heavy calcium carbonate (NS-100, a trade name, mfd. by Nitto Funka Kogyo Co., Ltd.), 25 parts by weight of a urethane acrylate emulsion (EM90, a trade name, mfd. by Arakawa Chemical Industries Ltd.; solid content 40%), 5 parts by weight of a polysiloxane (SM7025, a trade name, mfd. by Dow Corning Toray Silicone Co., Ltd.; solid content 33%) and 40 parts by weight of water.

EXAMPLE 152

An example of the production of a two-color heat-sensitive recording material is described below.

(A) Dye precursor for high-temperature color-producing layer: 3-(4'-dibutylamino-2'-hydroxyphenyl)-3-(5'-anilino-4'-methyl-2'-methoxyphenyl)phthalide.

(B) Dye precursor for low-temperature color-producing layer: 3-diethylamino-7-chlorofluoran.

(C) Developer: the urea-urethane compound synthesized in Example 151.

(D) Sensitizer: diphenyl sulfone.

Forty grams of each of the above-mentioned organic compounds (A) to (D) was mixed with 40 g of a 10% poly(vinyl alcohol) solution (degree of polymerization 500, and degree of saponification 90%) and 20 g of water, and each of the thus obtained compositions was subjected to dispersion in a vertical sand mill (a sand grinder manufactured by AIMEX CO., LTD.) so that the particle size might be 1 μm. From the dispersions thus obtained, liquids (A) to (D) corresponding to the compound (A) to (D) were prepared.

On the other hand, 40 g of light calcium carbonate (Brilliant 15, mfd. by Siraishi Industry Co., Ltd.; average particle size 0.15 μm) and 60 g of a 0.7% sodium hexametaphosphate solution were mixed, and the resulting composition was subjected to dispersion in a Cowles dispersing machine.

Separately, a 21% zinc stearate dispersion was prepared as a lubricant dispersion, liquid (F), and a 10% poly(vinyl alcohol) (NM11, mfd. by The Nippon Synthetic Chemical Industry Co., Ltd.) was prepared as a adhesive solution, liquid (G).

Preparation of a Coating Liquid (I) for High-Temperature Color Development Heat-Sensitive Layer A coating liquid for high-temperature color development heat-sensitive layer was prepared by blending the above-mentioned liquids (A), (C), (D) and (G) so that their weight ratio after drying might be as follows: (A):(C):(E):(G)=20:40:25:15.

Formation of a High-Temperature Color Development Heat-Sensitive Layer

A high-temperature color development heat-sensitive layer was formed by applying the aforesaid coating liquid (I) for high-temperature color development heat-sensitive layer on woodfree paper (neutral paper) with a basis weight of 60 g/m² in an amount of 8 g/m² (dry) by means of a Mayer bar.

Preparation of a Coating Liquid (II) for Low-Temperature Color Development Heat-Sensitive Layer A coating liquid for low-temperature color development heat-sensitive layer was prepared by blending the above-mentioned liquids (B), (c), (D), (E), (F) and (G) so that their weight ratio after drying might be as follows: (B):(C):(D):(E):(F):(G)=10:20:20:20:10:10.

Production of a Two-Color Heat-Sensitive Recording Material

The coating liquid (II) for low-temperature color development heat-sensitive layer was applied on the above-mentioned high-temperature color development heat-sensitive layer in an amount of 5 g/m² (dry). Then, the Bekk smoothness (JIS-P8119) of the heat-sensitive recording surface was adjusted to 150 seconds by smoothing treatment by means of a supercalender, whereby a two-color heat-sensitive recording material was obtained.

COMPARATIVE EXAMPLE 24

A multicolor heat-sensitive recording material was produced in the same manner as in Example 151 except for using 2,2-bis(4-hydroxyphenyl)propane in place of the urea-urethane compound synthesized in Example 151, and was evaluated. The results are summarized in Table 10.

COMPARATIVE EXAMPLE 25

A two-color heat-sensitive recording material was produced in the same manner as in Example 152 except for using 2,2-bis(4-hydroxyphenyl)propane in place of the urea-urethane compound used in Example 152, and was evaluated. The results are summarized in Table 10.

Evaluation of the Multicolor Heat-Sensitive Recording Materials

The multicolor heat-sensitive recording materials obtained in Examples 151 and 152 and Comparative Examples 21 and 22 were subjected to printing by the use of a commercial thermal printer (NC-1, a trade name, mfd. by Fuji Photo Film Co., Ltd.), and the quality of image and the image preservability were evaluated by the following methods.

<Quality of Image>

For 5 sheets of each recording material, the definition, contrast, density nonuniformity of image, and the like were visually judged and they were evaluated in the 5 grades (○: good, ○~Δ: somewhat good, Δ: mediocre, Δ~x: somewhat bad, x: bad)

<Image Preservability>

Each recording material was held between vinyl chloride wrap films or in a vinyl chloride file, and a load of 300 g/cm² was applied thereto from above. After standing at 40° C. for 24 hours, the coloring density of the printed portion and the non-printed portion (the original recording material surface) was visually estimated. When there was only a slight decrease in printing density, the image preservability was rated good.

The results are as shown in Table 10. That is, the recording materials of Examples 151 and 152 were good in quality of image and exhibited an excellent image preservability, while the recording materials of Comparative Examples 21 and 22 were inferior to the recording materials of Examples 151 and 152.

TABLE 10

| | Quality of image | Image preservability | Total evaluation |
|---|---|---|---|
| Example 151 | ○ | ⊙ | ⊙ |
| Example 152 | ○ | ⊙ | ⊙ |
| Comparative Example 24 | Δ | Δ~X | X |
| Comparative Example 25 | X | X | X |

1. Quality of image
○~ Good.
Δ~ Mediocre.
X~ Bad.
2. Print preservability
⊙~ Substantially no fading.
○~ A slight color tone change without blur and the like.
Δ~ Marked fading.
X~ Complete loss of the color of print.

EXAMPLE 153

A urea-urethane compound was synthesized in the same manner as in Example 3, and a dispersion was prepared by dispersing 2 g of this compound by grinding it together with 8 g of a 2.5 wt % poly(vinyl alcohol) aqueous solution in a paint shaker for 6 hours. The temperature of the dispersion immediately after the dispersing operation was 25° C. The diameter of dispersed particles of the compound was 0.6 μm.

Another dispersion was prepared by dispersing 70 g of 3-dibutylamino-6-methyl-7-anilinofluoran by grinding it together with 130 g of a 5.4 wt % poly(vinyl alcohol) aqueous solution in a sand grinder (mfd. by AIMEX CO., LTD.; vessel capacity 400 ml) at a number of revolution of 2,000 rpm for 3 hours.

A still another dispersion was prepared by dispersing 70 g of diphenyl sulfone by grinding it together with 130 g of a 5.4 wt % poly(vinyl alcohol) aqueous solution in a sand grinder (mfd. by AIMEX CO., LTD.; vessel capacity 400 ml) at a number of revolution of 2,000 rpm for 3 hours.

Separately, 10 g of calcium carbonate was mixed with 30 g of water and dispersed by stirring by the use of a stirrer to obtain a dispersion.

On the other hand, an aluminum hydroxide dispersion was prepared by treating a mixture of 60 parts by weight of aluminum hydroxide and 40 parts by weight of a 12.5 wt % polyvinyl alcohol) aqueous solution for 2 hours by the use of a sand grinder to disperse aluminum hydroxide so that the average particle size might be about 1 μm.

A coating liquid was obtained by stirring and mixing the above-mentioned dispersions and other components in the following proportions (dry basis); the dispersion of the above-mentioned compound in terms of dry solids: 20 parts by weight, the 3-dibutylamino-6-methyl-7-anilinofluoran dispersion in terms of dry solids: 10 parts by weight, the diphenyl sulfone dispersion in terms of dry solids: 25 parts by weight, the calcium carbonate dispersion in terms of dry solids: 40 parts by weight, the aluminum hydroxide dispersion in terms of dry solids: 13 parts by weight, a zinc stearate dispersion (solid content: 16 wt %) in terms of dry solids: 20 parts by weight, and a 15 wt % polyvinyl alcohol) in terms of dry solids: 15 parts by weight.

Subsequently, this coating liquid for heat-sensitive recording layer was applied on aluminized paper at a rate of 50 m/min by the use of a gravure coater (200 mesh; plate depth 20μ). The paper thus treated was dried at 80° C. for 3 seconds to obtain a heat-sensitive recording layer of 2 g in thickness. Then, a clear coating liquid consisting of an aqueous dispersion of acrylic resin (composed mainly of methyl methacrylate units, 2-ethylhexyl acrylate units and styrene units, and having a glass transition point of about 40° C.) was applied on the coated surface of the paper to a thickness of 8μ by the use of a roll coater and dried at 80° C. for 10 seconds to obtain metallized paper for laser marking according to the present invention.

The metallized paper was irradiated with laser beams from a carbon dioxide laser. A clear mark could be obtained and the color developability was good. A plasticizer resistance test was carried out by holding the metallized paper between vinyl chloride wrap films, to find that the plasticizer resistance was so good that no fading took place in a printed portion. The results are summarized in Table 11.

EXAMPLE 154

A urea-urethane compound was synthesized in the same manner as in Example 10, and a dispersion was prepared by dispersing 2 g of this compound by grinding it together with 8 g of a 2.5 wt % poly(vinyl alcohol) aqueous solution in a paint shaker for 6 hours.

Then, metallized paper for laser marking was produced in the same manner as in Example 153 except for using the dispersion of the aforesaid compound in place of the dispersion of the compound obtained in Example 153, and using diphenyl sulfone in place of aluminum hydroxide, and was evaluated. The results are summarized in Table 11.

COMPARATIVE EXAMPLE 26

Metallized paper for laser marking was produced in the same manner as in Example 153 except for using 2,2-bis(4-hydroxyphenyl)propane in place of the urea-urethane compound synthesized in Example 153, and was evaluated. The results are summarized in Table 11.

<Color Development Sensitivity>
An article for laser marking was irradiated with laser beams in a dose of 0.6 J/cm$^2$ from a carbon dioxide laser (Unimark, mfd. by USHIO INC.) by using a stencil capable of permitting appearance of figures. When a clear mark was obtained and the coloring density was high, the color development sensitivity was rated good.

<Pasticizer Resistance>
Three vinyl chloride wrap films were placed on each of the top and under surfaces of the marked article for laser marking, and the resulting assembly was allowed to stand under a load of 300 kg/cm$^2$ at 40° C. for 24 hours. After the standing, the density of the printed portion was visually estimated. When there was only a slight decrease in printing density, the print preservability was rated good.

TABLE 11

| | Marking sensitivity | Plasticizer resistance (print preservability) | Total evaluation |
|---|---|---|---|
| Example 153 | ⊚ | ⊚ | ⊚ |
| Example 154 | ○~⊚ | ⊚ | ⊚ |
| Comparative Example 26 | ○ | X | X |

1. Marking sensitivity
⊚~ Good color developability. A clear mark can be obtained.
○~ Somewhat insufficient color development without a problem about visibility.
X~ Low color developability and unclear print.
2. Plasticizer resistance (print preservability)
⊚~ Substantially no fading.
○~ A slight color tone change without blur and the like.
X~ Complete loss of the color of print.

INDUSTRIAL APPLICABILITY

Employment of a specific urea-urethane compound makes it possible to provide at a low price a color-producing composition and a recording material which are excellent in image preservability and color development sensitivity.

What is claimed is:

1. A urea-urethane compound represented by the following formula (III):

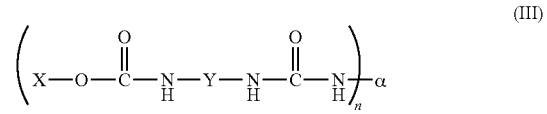

wherein X is a phenyl group, Y is a tolylene group or a methylenediphenyl group represented by -φ-CH$_2$-φ-, α is a residue having a valence of 2 represented by -φ- or -φ-ε-φ-, and n is 2, wherein -φ- is a phenylene group and -ε- is a group selected from —SO$_2$—, —O—, —CH$_2$—, and —CONH—, wherein the tolylene group has the following structure

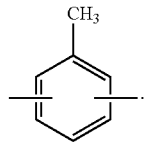

* * * * *